US009875324B2

(12) United States Patent
Shokooh et al.

(10) Patent No.: US 9,875,324 B2
(45) Date of Patent: Jan. 23, 2018

(54) TRACTION POWER SIMULATION

(71) Applicant: OPERATION TECHNOLOGY, INC., Irvine, CA (US)

(72) Inventors: Farrokh Shokooh, Laguna Beach, CA (US); Tanuj Khandelwal, Riverside, CA (US)

(73) Assignee: OPERATION TECHNOLOGY, INC., Irvine, CA (US)

( * ) Notice: Subject to any disclaimer, the term of this patent is extended or adjusted under 35 U.S.C. 154(b) by 610 days.

(21) Appl. No.: 14/461,356

(22) Filed: Aug. 15, 2014

(65) Prior Publication Data

US 2015/0051894 A1 Feb. 19, 2015

Related U.S. Application Data

(60) Provisional application No. 61/866,915, filed on Aug. 16, 2013.

(51) Int. Cl.
*G06F 17/50* (2006.01)

(52) U.S. Cl.
CPC ...... *G06F 17/5009* (2013.01); *G06F 17/5095* (2013.01); *G06F 2217/78* (2013.01)

(58) Field of Classification Search
None
See application file for complete search history.

(56) References Cited

U.S. PATENT DOCUMENTS 7,693,608 B2 4/2010 Nasle
7,729,808 B2 6/2010 Nasle et al.
7,826,990 B2 11/2010 Nasle et al.
7,840,395 B2 11/2010 Nasle et al.
7,840,396 B2 11/2010 Radibratovic et al.
7,844,439 B2 11/2010 Nasle et al.
7,844,440 B2 11/2010 Nasle et al.
8,036,872 B2 10/2011 Nasle
8,126,685 B2 2/2012 Nasle
8,131,401 B2 3/2012 Nasle
8,155,908 B2 4/2012 Nasle et al.
8,155,943 B2 4/2012 Nasle
8,165,723 B2 4/2012 Nasle
8,170,856 B2 5/2012 Nasle
8,180,622 B2 5/2012 Nasle
8,229,722 B2 7/2012 Nasle
8,321,194 B2 11/2012 Meagher et al.
8,401,833 B2 3/2013 Radibratovic et al.
8,494,830 B2 7/2013 Radibratovic et al.
8,577,661 B2 11/2013 Nasle
8,688,429 B2 4/2014 Nasle et al.
8,775,934 B2 7/2014 Nasle et al.
8,831,801 B1 * 9/2014 Raghunathan .......... G06F 17/11
700/291

(Continued)

OTHER PUBLICATIONS

C.S. Chen, Analysis of dynamic load behavior for electrified mass rapid transit systems, Oct. 1999, Industrial Application Conference, pp. 1-7.*

(Continued)

*Primary Examiner* — Syed Roni
(74) *Attorney, Agent, or Firm* — ONE LLP

(57) ABSTRACT

Systems and methods are provided for simulating fraction power and control in transportation systems under design conditions and/or utilizing real-time data.

9 Claims, 197 Drawing Sheets

(56) References Cited

U.S. PATENT DOCUMENTS

| | | | |
|---|---|---|---|
| 8,868,398 B2 | 10/2014 | Radibratovic et al. | |
| 8,959,006 B2 | 2/2015 | Nasle | |
| 9,031,824 B2 | 5/2015 | Nasle | |
| 9,092,593 B2 | 7/2015 | Nasle | |
| 9,111,057 B2 | 8/2015 | Radibratovic et al. | |
| 9,557,723 B2 | 1/2017 | Nasle | |
| 2009/0113049 A1 | 4/2009 | Nasle et al. | |
| 2011/0082597 A1 | 4/2011 | Meagher | |
| 2011/0095604 A1* | 4/2011 | Bavard | B60M 3/06 307/12 |
| 2013/0166232 A1* | 6/2013 | Lee | G01R 21/00 702/62 |
| 2015/0112907 A1 | 4/2015 | Nasle et al. | |
| 2015/0153757 A1 | 6/2015 | Meagher | |
| 2015/0178627 A1 | 6/2015 | Radibratovic et al. | |
| 2015/0248617 A1 | 9/2015 | Nasle | |
| 2016/0048757 A1 | 2/2016 | Nasle et al. | |
| 2016/0196375 A1 | 7/2016 | Nasle | |
| 2016/0246905 A1 | 8/2016 | Radibratovic et al. | |
| 2016/0246906 A1 | 8/2016 | Radibratovic et al. | |
| 2016/0247065 A1 | 8/2016 | Nasle et al. | |
| 2017/0046458 A1 | 2/2017 | Meagher et al. | |

OTHER PUBLICATIONS

S. de Fabris, Automated analysis of train event recorder data to improve micro-simulation models, 2010, WIT Transactions on State of the Art in Science and Engineering vol. 40, pp. 1-10.*

* cited by examiner

- [ ] Rail Devices
  - [ ] Track / Route
  - [ ] Platform
  - [ ] Train
  - [ ] Section Insulator / Insulated Overlap
  - [ ] Isolator / Isolator Switch / Isolator Switch w/Earth Heel
  - [ ] PTFE Neutral Section
  - [ ] Signal
  - [ ] Level Crossing
  - [ ] Speed Limits
  - [ ] Distance Markers

FIG. 10D

- [ ] Substation
  - [ ] Traction Substation
  - [ ] Switching/Paralleling Station
  - [ ] Nodes

FIG. 11I

| Property | Field Type | Range | Default | Contents |
|---|---|---|---|---|
| **ID** | Alphanumeric | Same as Bus | Track Node (TN+#) | |
| **Service** | Radio | Same as Bus | In | |
| **Connection** | Radio | Same as Bus | 1P 2W | 1P 2W (propogated from source)<br>1P 3W (propogated from source) |
| **Grounded** | Drop Down List | Yes / No | No | |
| **Bonded to Rail** | Drop Down List | Yes / No | No | |
| **Coordinates** | Numeric | Same as Markers | | X, Y, Z |

| | | |
|---|---|---|
| Class 1 | 10 mph (16 km/h) | 15 mph (24 km/h) |
| Class 2 | 25 mph (40 km/h) | 30 mph (48 km/h) |
| Class 3 | 40 mph (64 km/h) | 60 mph (97 km/h) |
| Class 4 [us 2] | 60 mph (97 km/h) | 80 mph (129 km/h) |
| Class 5 [us 3] | 80 mph (129 km/h) | 90 mph (145 km/h) |
| Class 6 | 110 mph (177 km/h) | |
| Class 7 [us 4] | 125 mph (201 km/h) | |
| Class 8 [us 5] | 160 mph (257 km/h) | |
| Class 9 [us 6] | 200 mph (322 km/h) | |

(i) Group ‘A’- Speeds upto 160 kilometer per hour (kmph)
(ii) Group ‘B’-Speeds upto 130 kmph
(iii) Group ‘C’- Suburban section of Mumbai, Chennai, Delhi & Calcutta
(iv) Group ‘D’ Special & ‘D’ -Speeds upto 110 kmph
(v) Group ‘E’-Speeds upto 100 kmph

| # of Lights |
|---|
| 1 |
| 2 |
| 3 |
| 4 |

| Type |
|---|
| Repeating signal |
| Pre-warner signal |
| Warner signal |
| Running signal |

FIG. 13B

| Warehouse ID | Standard | Unit | Unit Length | Electrical Resistance (ohms / unit length) | Cross-sectional area | Depth of Section | Width of Flange |
|---|---|---|---|---|---|---|---|
| TRACK-WH1 | British | English or Metric | 1 | 0.03038 | 90 | 6.5 | 6.5 |
| ... | | | | | | | |

| | |
|---|---|
| | Stations |
| | Track |
| < < < < OR > > > > | Direction |
| < < < < vs <<<<<< | Relative track speed |
| | Signaling Post. Bend point color shows Red, Yellow or Green |
| | Electrical node (appears in schematic view along with upstream transformer secondary winding) |
| | Train showing number of rail cars. Different color for locomotive position |
| | Mile / Km markers (user-defined constant spacing) |

Paralleling Station for 2 x 25 kV Autotransformer

AC Power Distribution System (Reference)

DC Power Distribution System

FIG. 17C

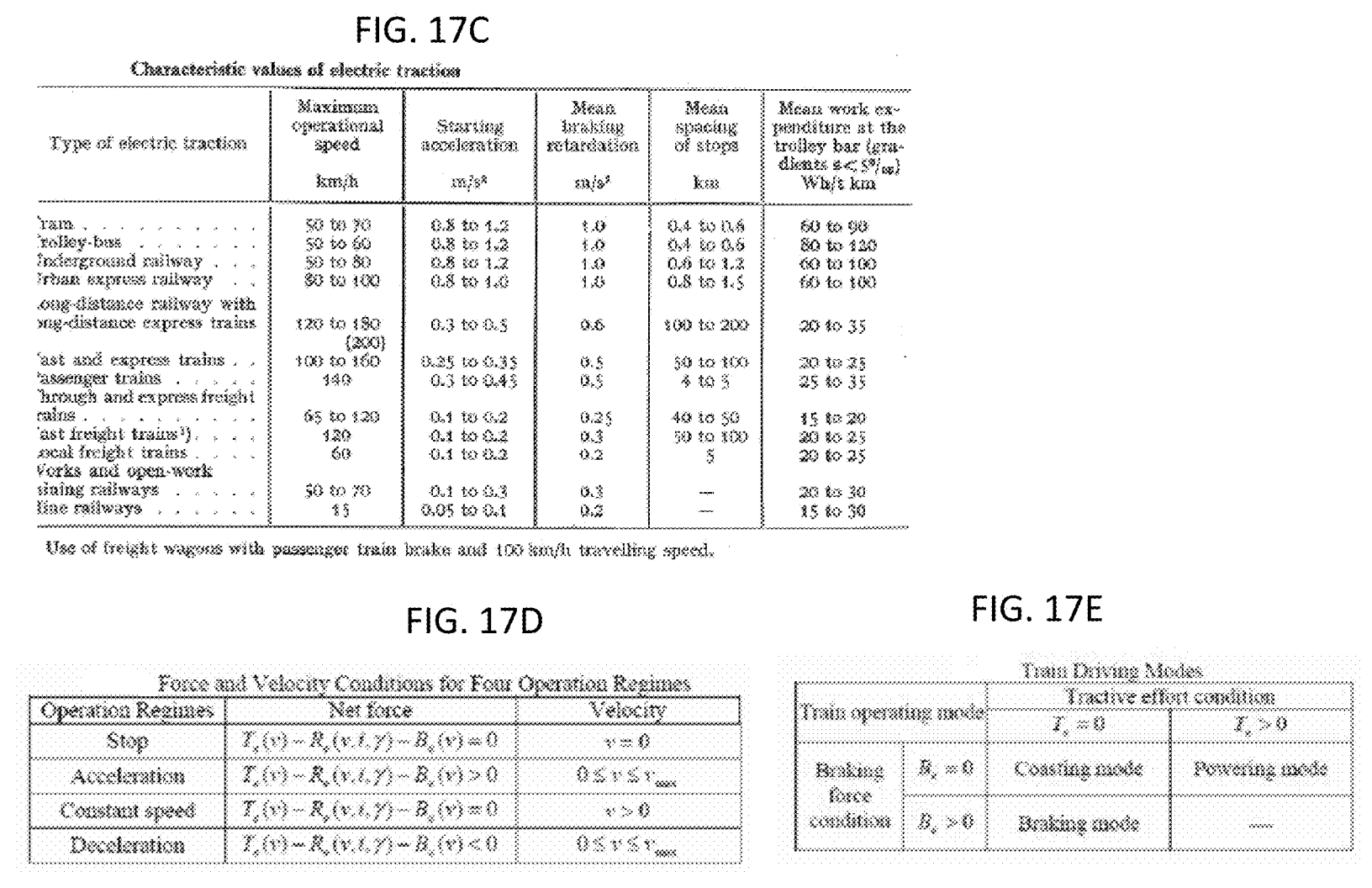

Characteristic values of electric traction

| Type of electric traction | Maximum operational speed km/h | Starting acceleration m/s² | Mean braking retardation m/s² | Mean spacing of stops km | Mean work expenditure at the trolley bar (gradients s<5‰) Wh/t km |
|---|---|---|---|---|---|
| ram | 50 to 70 | 0.8 to 1.2 | 1.0 | 0.4 to 0.6 | 60 to 90 |
| rolley-bus | 50 to 60 | 0.8 to 1.2 | 1.0 | 0.4 to 0.6 | 80 to 120 |
| nderground railway | 50 to 80 | 0.8 to 1.2 | 1.0 | 0.6 to 1.2 | 60 to 100 |
| rban express railway | 80 to 100 | 0.8 to 1.0 | 1.0 | 0.8 to 1.5 | 60 to 100 |
| ong-distance railway with ong-distance express trains | 120 to 180 (200) | 0.3 to 0.5 | 0.6 | 100 to 200 | 20 to 35 |
| ast and express trains | 100 to 160 | 0.25 to 0.35 | 0.5 | 30 to 100 | 20 to 25 |
| assenger trains | 140 | 0.3 to 0.45 | 0.5 | 4 to 5 | 25 to 35 |
| hrough and express freight rains | 65 to 120 | 0.1 to 0.2 | 0.25 | 40 to 50 | 15 to 20 |
| ast freight trains¹) | 120 | 0.1 to 0.2 | 0.3 | 50 to 100 | 20 to 25 |
| ocal freight trains | 60 | 0.1 to 0.2 | 0.2 | 5 | 20 to 25 |
| Vorks and open-work ining railways | 50 to 70 | 0.1 to 0.3 | 0.3 | — | 20 to 30 |
| line railways | 15 | 0.05 to 0.1 | 0.2 | — | 15 to 30 |

Use of freight wagons with passenger train brake and 100 km/h travelling speed.

FIG. 17D

Force and Velocity Conditions for Four Operation Regimes

| Operation Regimes | Net force | Velocity |
|---|---|---|
| Stop | $T_e(v) - R_v(v,l,\gamma) - B_e(v) = 0$ | $v = 0$ |
| Acceleration | $T_e(v) - R_v(v,l,\gamma) - B_e(v) > 0$ | $0 \le v \le v_{max}$ |
| Constant speed | $T_e(v) - R_v(v,l,\gamma) - B_e(v) = 0$ | $v > 0$ |
| Deceleration | $T_e(v) - R_v(v,l,\gamma) - B_e(v) < 0$ | $0 \le v \le v_{max}$ |

FIG. 17E

Train Driving Modes

| Train operating mode | | Tractive effort condition $T_e = 0$ | Tractive effort condition $T_e > 0$ |
|---|---|---|---|
| Braking force condition | $B_e = 0$ | Coasting mode | Powering mode |
| Braking force condition | $B_e > 0$ | Braking mode | — |

*Values of C Coefficient For Use with Canadian National Train Resistance Formula Only*

| Degree of Streamlining | Equipment | C Coefficient | |
|---|---|---|---|
| | | Leading Equipment | Trailing Equipment |
| Nil 1 | Open auto transporter | – | 12.3 |
| Nil 2 | Freight locomotive | 24.0 | 5.5 |
| | Mixed consist of freight cars | – | 5.0 |
| Low 3 | RDC | 19.0 | 4.0 |
| Low 4 | Conventional passenger including locomotive | 19.0 | 3.5 |
| Med 5 | | 14.0 | 3.0 |
| Med 6 | | 10.0 | 2.6 |
| High 7 | High speed passenger | 7.6 | 2.3 |
| High 8 | Maximum possible streamlining | 7.0 | 2.0 |

FIG. 17G

*Values of C Coefficient and Areas for Freight and Passenger Equipment For Use with Canadian National Train Resistance Formula Only*

| Type of Equipment | C Coefficient | Area (Square Feet) |
|---|---|---|
| Box Car | 4.9 | 140 |
| Bulkhead Flat (loaded) | 5.3 | 140 |
| Bulkhead Flat (empty) | 12.0 | 140 |
| Coal Gondola (loaded) | 4.2 | 105 |
| Coal Gondola (empty) | 12.0 | 105 |
| Covered Hopper | 7.1 | 125 |
| Tank Car | 5.5 | 95 |
| Standard Flat Car (without trailers) | 5.0 | 25 |
| Standard Flat Car (with trailers) | 5.0 | 125 |
| Caboose | 5.5 | 145 |
| Conventional Passenger Coach | 3.5 | 130 |
| Modern Lightweight Passenger Equipment | 2.0 | 110 |
| Leading Freight Locomotive | 24.0 | 160 |
| Multi-level Auto Transporter (open) | 12.3 | 150 |
| Multi-level Auto Transporter (closed) | 7.1 | 170 |

Empirical Formulas for Propulsion Resistance–Freight Rollingstock

| Description | Equation 9.20 |
|---|---|
| Modified Davis equation (U.S.A.) | $K_a[2.943 + 89.2/m_a + 0.0306V + 1.741k_{ad}V^2/(m_a n)]$<br>$K_a = 1.0$ for pre 1950, 0.85 for post 1950, 0.95 container on flat car, 1.05 trailer on flat car, 1.05 hopper cars, 1.2 empty covered auto racks, 1.3 for loaded covered auto racks, 1.9 empty, uncovered auto racks<br>$k_{ad} = 0.07$ for conventional equipment, 0.0935 of containers and 0.16 for trailers on flatcars |
| French Locomotives | $0.65m_a n + 13n + 0.01m_a nV + 0.03V^2$ |
| French Standard UIC vehicles | $9.81(1.25 + V^2/6300)$ |
| French Express Freight | $9.81(1.5 + V^2/(2000\ldots2400))$ |
| French 10 tonne/axle | $9.81(1.5 + V^2/1600)$ |
| French 18 tonne/axle | $9.81(1.2 + V^2/4000)$ |
| German Strahl formula | $25 + k(V + \Delta V)/10$ $k = 0.05$ for mixed freight trains, 0.025 for block trains |
| Broad gauge (i.e., 1.676 m) | $9.81[0.87 + 0.0103V + 0.000056V^2]$ |
| Broad gauge (i.e., ~ 1.0 m) | $9.81[2.6 + 0.0003V^2]$ |

$K_a$ is an adjustment factor depending on rollingstock type; $k_{ad}$ is an air drag constant depending on car type; $m_a$ is mass supported per axle in tonnes; $n$ is the number of axles; $V$ is the velocity in kilometres per hour; and $\Delta V$ is the head wind speed, usually taken as 15 km/h.

FIG. 17J

Empirical Formulas for Propulsion Resistance–Passenger Rollingstock

| Description | Equation 9.21 |
|---|---|
| French passenger on bogies | $9.81(1.5 + V^2/4500)$ |
| French passenger on axles | $9.81(1.5 + V^2/(2000\ldots2400))$ |
| French TGV | $2500 + 33V + 0.543V^2$ |
| German Sauthoff Formula Freight (Intercity Express, ICE) | $9.81[1 + 0.0025V + 0.0055((V + \Delta V)/10)^2]$ |
| Broad gauge (i.e., 1.676 m) | $9.81[0.6855 + 0.02112V + 0.000082V^2]$ |
| Narrow gauge (i.e., ~ 1.0 m) | $9.81[1.56 + 0.0075V + 0.0003V^2]$ |

$K_a$ is an adjustment factor depending on rollingstock type; $k_{ad}$ is an air drag constant depending on car type; $m_a$ is mass supported per axle in tonnes; $n$ is the number of axles; $V$ is the velocity in kilometres per hour; and $V$ is the head wind speed, usually taken as 15 km/h.

FIG. 17K

Sources of rail vehicle resistance

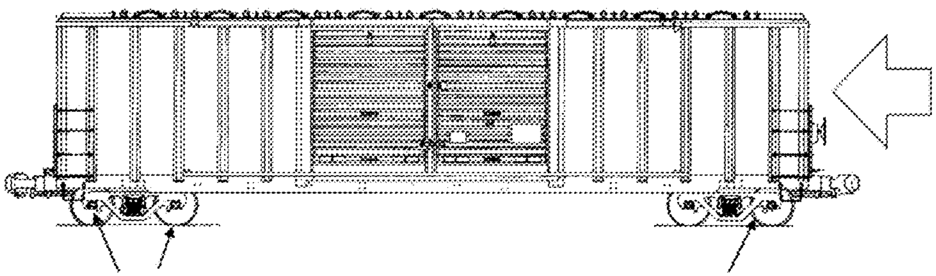

C = resistances that vary as the square of speed (affected by aerodynamics of the train)

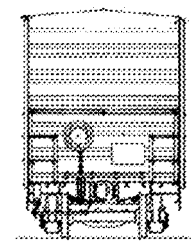

Cross-section of the vehicle, streamlining of the front & rear, and surface smoothness all affect air resistance

A = resistances that vary with axle load (includes bearing friction, rolling friction and track resistance)

B = resistances that vary directly with speed (primarily flange friction and effects of sway and oscillation)

A varies with weight ("journal" or "bearing" resistance)

B varies directly with velocity ("flange" resistance)

C varies with the square of velocity (air resistance)

The general expression for train resistance is thus:

$$R = AW + BV + CV^2$$

where: R equals total resistance

W = weight

V = velocity

Resistances that vary with weight

- Journal resistance
  - Friction between journal and bearing
- Rolling Friction
  - Friction between wheel and rail due to "creepage" at interface
  - Minute elastic deformation of wheel and rail surfaces
- Track Resistance
  - Deformation of track structure
  - Consequent "uphill" running

FIG. 17O

Matlab Script to Calculate Resistance Forces (Shinkansen Series 200)

- % Script to estimate the total resistance of a Series 200 train

```
% Equations provided by Rochard and Schmid (2000)

% Coefficients of Davis equation applied to Japanese Shinkansen system
% Series 200

A = 8.202;        % units are kN
B = 0.10656;    % units are kN s/m
C = 0.0119322;  % units are kN s-s/m-m

% Create a speed vector
V = 0:1:90;             % speed in meters/second

% Calculate Resistance (in KiloNewtons) according to modified Davis equation

R = A + B * V + C * V.^2;

% Make a plot of total resistance vs speed
plot(V,R,'o--')
xlabel(' Speed (m/s)')
ylabel('Resistance (kN)')
title('Reisistance of Series 200 Shinkansen Rail System')
```

FIG. 17P

Matlab Script to Calculate Tractive Effort (Shinkansen Series 200)

```
% Coefficients of Davis equation applied to Japanese Shinkansen system
% Series 200

plot(V,R,'o--')
xlabel(' Speed (m/s)')
ylabel('Resistance (kN) or T (kN)')
title('Reisistance of Series 200 Shinkansen Rail System')
grid

hold on

% Calculate the Tractive Effort (T) profile

P = 15900;          % horsepower (hp)
Vkmhr = V*3.6;      % velocity in km/hr (needed in the TE equation)
nu = 0.7;           % efficiency

T = 2650 * nu * P ./ Vkmhr / 1000;     % in kN

plot(Vkmhr/3.6,T,'^-r')

grid
```

OLV Drawing / Animation

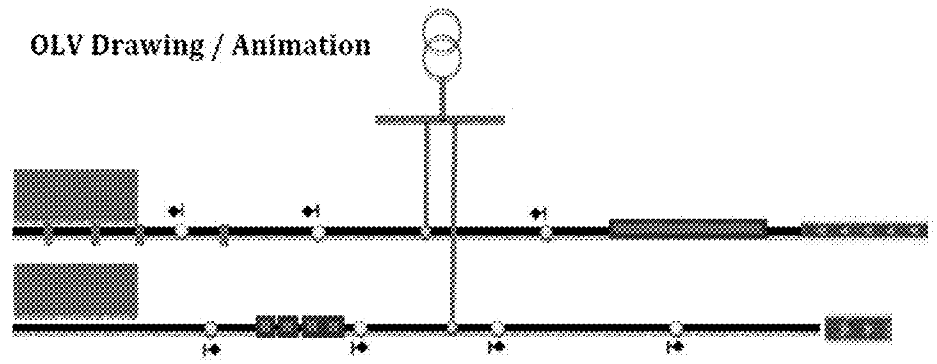

| | |
|---|---|
| | Stations |
| | Track |
| < < < < OR > > > > | Direction |
| < < < < vs <<<<<< | Relative track speed |
| | Signaling Post. Bend point color shows Red, Yellow or Green |
| | Electrical node (appears in schematic view along with upstream transformer secondary winding) |
| | Train showing number of rail cars. Different color for locomotive position |
| | Mile / Km markers (user-defined constant spacing) |

Motor Characteristics Tab

| Name | Variable | Curve Type | Notes | Lock |
|---|---|---|---|---|
| Output at Motor shaft | P2 | Equation | | |
| Phase to Phase Voltage | U1 | Equation | | |
| Phase Current | I1 | Equation | | |
| Torque at Motor Shaft | T | Equation | | |
| Motor Speed | N | Equation | | |
| Power Factor | PF | Equation | | |
| Motor Efficiency | Eff | Equation | | |
| Stator Freq | F1 | Equation | | |
| Rotor Freq | F2 | Equation | | |

Edit...

FIG. 19M

| Selected Variable | Speed (kph) |
|---|---|
| | |
| | |

Add Delete

FIG. 19N

| Speed | | Polynominal |
|---|---|---|
| Min | Max | |
| 0 | 15 | ((28.2/((Math.Pow(M,2))-1))+0.1215)*TD) |
| 15 | 30 | ((28.2/((Math.Pow(M,2))-1))+0.1215)*TD) |
| 30 | 100 | ((28.2/((Math.Pow(M,2))-1))+0.1215)*TD) |
| 100 | 140 | ((28.2/((Math.Pow(M,2))-1))+0.1215)*TD) |

Add Delete

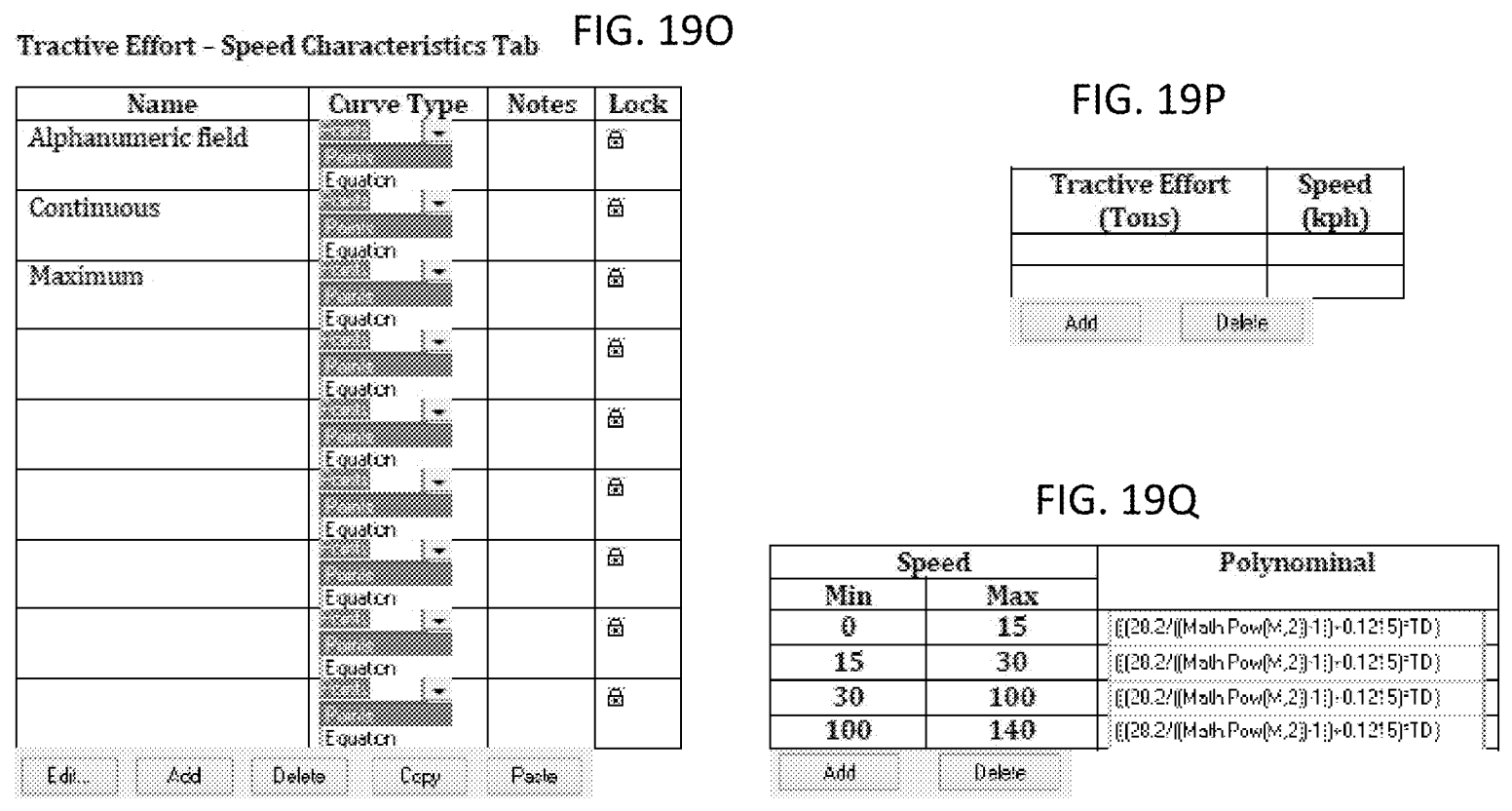

Tractive Effort – Speed Characteristics Tab

FIG. 19O

| Name | Curve Type | Notes | Lock |
|---|---|---|---|
| Alphanumeric field | Equation | | 🔒 |
| Continuous | Equation | | 🔒 |
| Maximum | Equation | | 🔒 |
| | Equation | | 🔒 |
| | Equation | | 🔒 |
| | Equation | | 🔒 |
| | Equation | | 🔒 |
| | Equation | | 🔒 |
| | Equation | | 🔒 |

Edit... Add Delete Copy Paste

FIG. 19P

| Tractive Effort (Tons) | Speed (kph) |
|---|---|
| | |
| | |

Add Delete

FIG. 19Q

| Speed | | Polynominal |
|---|---|---|
| Min | Max | |
| 0 | 15 | (((28.2/((Math.Pow(M,2))-1))+0.1215)*TD) |
| 15 | 30 | (((28.2/((Math.Pow(M,2))-1))+0.1215)*TD) |
| 30 | 100 | (((20.2/((Math.Pow(M,2))-1))+0.1215)*TD) |
| 100 | 140 | (((28.2/((Math.Pow(M,2))-1))+0.1215)*TD) |

Add Delete

FIG. 19R

Braking Effort – Speed Characteristics Tab

| Name | Curve Type | Notes | Lock |
|---|---|---|---|
| Alphanumeric field | Equation | | |
| Continuous | Equation | | |
| Maximum | Equation | | |

Edit... Add Delete Copy Paste

FIG. 19S

| Braking Effort (Tons) | Speed (kph) |
|---|---|
| | |
| | |

Add Delete

FIG. 19T

| Speed | | Polynominal |
|---|---|---|
| Min | Max | |
| 0 | 15 | {((20.2/((Math.Pow(M,2))-1))+0.1215)*TD} |
| 15 | 30 | {((20.2/((Math.Pow(M,2))-1))+0.1215)*TD} |
| 30 | 100 | {((20.2/((Math.Pow(M,2))-1))+0.1215)*TD} |
| 100 | 140 | {((20.2/((Math.Pow(M,2))-1))+0.1215)*TD} |

Add Delete

FIG. 19U

| Section | Property | Value Type | Unit |
|---|---|---|---|
| | Weight | Numeric | Ton |
| | # of Axles | Numeric | |
| | Weight / Axle | Numeric | Ton |
| | Cross Sectional Area (A) | Numeric | $Ft^2$ |
| | Coefficient of friction (B) | Numeric (0.03 default) | |
| | Drag Coefficient of Air | Numeric (0.0025 default) | |
| | | | |

| Object | Type | Distance | Speed | | GIS Coordinates | | | | Bend Radius | Segment Length |
|---|---|---|---|---|---|---|---|---|---|---|
| | | | Class | Limit | X | Y | Z | Grade | | |
| Churchgate | STN | 0 | | | 32 | 45 | 100 | | | |
| | | | | | | | | calc | | 1.1 |
| M1 | SIG | 1.1 | | | 35 | 45 | 200 | | | |
| | | | | | | | | calc | | 0.4 |
| M2 | SPD | 1.5 | Class A | 80 | 35 | 45 | 200 | | | |
| | | | | | | | | calc | | 0.5 |
| M3 | LC | 2 | | | 35 | 45 | 200 | | | |
| | | | | | | | | calc | | 0.1 |
| 4593875 | ND | 2.1 | | | 35 | 45 | 200 | | | |
| | | | | | | | | calc | | 0.4 |
| M4 | SIG | 2.5 | | | 35 | 45 | 200 | | | |
| | | | | | | | | calc | | 1.2 |
| M5 | SPD | 2.8 | Class B | 100 | 35 | 45 | 200 | | | |
| | | | | | | | | calc | | 0.6 |
| M6 | SPD | 3.4 | Class A | 80 | 35 | 45 | 200 | | | |
| | | | | | | | | calc | | 0.3 |
| BR1 | BR | 3.7 | | | 35 | 45 | 200 | | | |
| | | | | | | | | calc | 300 | 0.1 |
| BR2 | BR | 3.8 | | | 35 | 45 | 200 | | | |
| | | | | | | | | calc | | 0.1 |
| M7 | SIG | 3.9 | | | 35 | 45 | 200 | | | |
| | | | | | | | | calc | | 0.9 |
| 34593458 | ND | 4.8 | | | 35 | 45 | 200 | | | |
| | | | | | | | | calc | | 0.5 |
| Marine Lines | STN | 5.3 | | | 35 | 45 | 200 | | | |

25000

25100

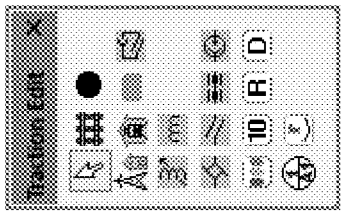
FIG. 31A
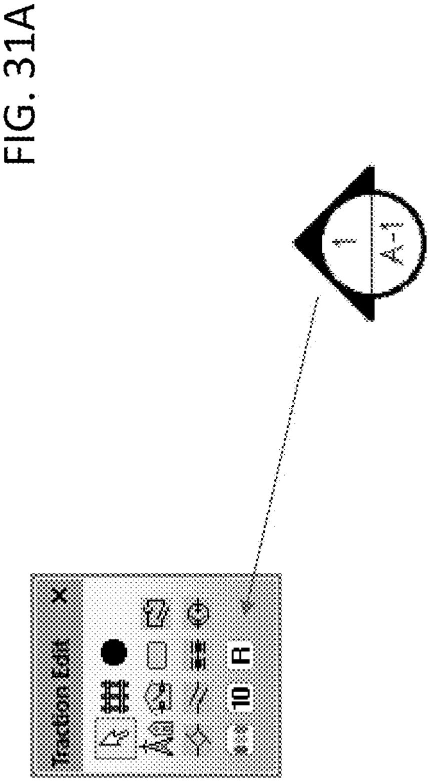
FIG. 31B
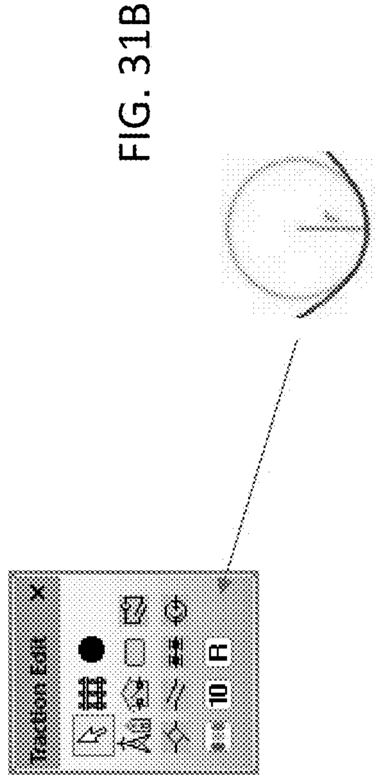

FIG. 33

| SRS ID | Field Name | Light/ Heavy/ NA | Display Only | Format | Range | Display Format | Default English | | Default Metric | | Help Line / (Description) |
|---|---|---|---|---|---|---|---|---|---|---|---|
| | | | | | | | Value | Unit | Value | Unit | |
| | Duty Cycles | | | Check box | | | unchecked | | unchecke d | | The charger system duty cycle category. |
| | From | Heavy | N | Float | 0.001 - 9999 | xxxx.xxx | | | | | The simulation begin time. |
| | To | Heavy | N | Float | 0.001 - 9999 | xxxx.xxx | | | | | The simulation end time. |
| | Begin | Heavy | N | Float | 0.001 - 9999 | xxxx.xxx | | | | | The plot begin time. |
| | End | Heavy | N | Float | 0.001 - 9999 | xxxx.xxx | | | | | The plot end time. |

FIG. 36E

| Device Type | Device ID | Action | % | Time (sec) |
|---|---|---|---|---|
| Bus | | Load Impact | 50 (default)<br>-200 to +200 | disabled |
| | | Load Ramp | 50 (default)<br>-200 to +200 | 5 (default)<br>0 - 9999 |
| | | Delete | Disabled | Disabled |
| | | | | |
| Utility | | Voltage Impact | 0 (default)<br>-200 to +200 | disabled |
| | | Voltage Ramp | 0 (default)<br>-200 to +200 | 0 (default)<br>0 - 9999 |
| | | Delete | Disabled | Disabled |
| | | | | |
| Circuit Breaker | | Open | Disabled | Disabled |
| | | Close | Disabled | Disabled |
| | | | | |
| Switch | | Open | Disabled | Disabled |
| | | Close | Disabled | Disabled |
| | | | | |
| NONE | | Load Flow | Disabled | Disabled |

FIG. 40C

| | |
|---|---|
| | # of rectangles = # of cars in the consist (based on the train configuration) |
| | Color = orange if type is traction motor<br>Color = blue if type is not traction motor |
| | Shape length should be proportional to Total length of the train configuration |

FIG. 41B

| | ID | Rating | kV | A | Phase | Z | DB |
|---|---|---|---|---|---|---|---|
| Station | X | - | - | - | - | - | X |
| Platform | X | - | - | - | - | - | X |
| | | | | | | | |
| Autotransformer | X | X | X | X | X | X | X |
| Booster Transformer | X | X | X | X | X | X | X |
| | | | | | | | |
| | ID | WH ID | kV | Length | Phase | | |
| Track Node | X | - | X | - | X | - | X |
| Track - OCS | X | X | - | X | X | X | X |
| Track – Rail | X | X | - | X | X | X | X |
| | | | | | | | |
| | ID | Rating | kV | A | Open | | DB |
| Insulator with Isolator | X | X | X | X | X | | X |
| Section Insulator | X | X | X | X | X | | X |
| Insulated Overlap | X | X | X | X | X | | X |
| Isolator Switch | X | X | X | X | X | | X |
| | | | | | | | |
| | ID | Nearest Station Distance | Elevation | Value 1 | Value 2 | Status | DB |
| Speed Limit | X | X | X | X | X | | X |
| Signal | X | X | X | X | X | X | X |
| Level Crossing | X | X | X | | | | X |
| Distance | X | X | X | | | | X |
| Elevation | X | X | X | | | | X |
| Bend Radius | X | X | X | X | | | X |
| | | | | | | | |
| | | | | | | | |
| X Use Default Options | | | | | | | |
| | | | | | | | |

FIG. 41C

| SRS ID | Field Name | Light/ Heavy/ NA | Display Only | Format | Range | Display Format | Default English | | Default Metric | | Help Line / [Description] |
|---|---|---|---|---|---|---|---|---|---|---|---|
| | | | | | | | Value | Unit | Value | Unit | |
| | | | | | | | | | | | |
| | | | | | | | | | | | |
| | | | | | | | | | | | |
| | | | | | | | | | | | |

TRACTION POWER SIMULATION

CROSS-REFERENCE TO RELATED APPLICATIONS

The present application claims priority to and the benefit of U.S. provisional application Ser. No. 61/866,915 filed on Aug. 16, 2013, which is incorporated by reference herein in its entirety for all purposes.

FIELD

The subject matter described herein relates generally to a system, process and method for simulating fraction power and control in transportation systems under design conditions and/or utilizing real-time data.

BACKGROUND

Management of complex electrical systems such as power delivery and management in the transportation sector requires analysis of a wide array of variables. Some variables may include physical properties unique to power delivery lines, stopping and starting power required to move large vehicles such as trolleys and buses, weather, line interruptions, and many others. Use of a discrete resource, namely a specific number of tracks, rails, etc. on which vehicles may move also requires management of complex timetables and budgeting for expected and unexpected delays in the system. Because physical movement of vehicles in the system constantly impacts and influences the electrical load being felt by different parts of the system, analysis may become quite complex and burdensome. To this point an integrated system which is able to catalog and utilize the vast number of variables used in complex transportation systems has not existed in a way that makes it convenient for users to model real world scenarios, run effective simulations, and predict future scenarios in an effective and time efficient manner.

SUMMARY

Provided herein are embodiments of a system and method of which simulates and/or monitors real-world conditions and operation and is able to use this data in order to simulate and predict future operational conditions. The system and method are also robust in that they do not require the shut down and testing of equipment but rather can be used during normal operation of the transportation system to be analyzed.

Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 10C shows an example embodiment of a group under rail devices.

FIG. 10D shows an example embodiment of a group under the heading substation with group members.

FIG. 11I shows an example embodiment of node properties in accordance with the present invention.

FIG. 11P shows an example embodiment of a track speed limit editor.

FIGS. 11Q-R shows an example embodiment of numerous class types and ANSI standard speed limits are shown for freight and passenger trains.

FIG. 11AA shows an example embodiment of an editor for a single throw switch in accordance with the present invention.

FIG. 11AB shows an example embodiment of an editor for a single throw switch in accordance with the present invention.

FIG. 11AC shows an example embodiment of an isolator switch editor in accordance with the present invention.

FIG. 11AD shows an example embodiment of a PTFE Neutral Section editor in accordance with the present invention.

FIG. 11AE shows an example embodiment of a surge arrestor editor in accordance with the present invention.

FIGS. 11AF-11AH show example embodiments of classification and housing menus with numerous buttons based on standards in accordance with the present invention.

FIG. 11AI shows an example embodiment of a surge arrestor editor in accordance with the present invention.

FIG. 11AJ shows an example embodiment of an IEC standard rating and continuous operating voltage.

FIG. 11AK shows an example embodiment of a surge arrestor editor screen with current rating options in accordance with the present invention.

FIG. 11AL shows an example embodiment of a surge arrestor editor screen with sizing options in accordance with the present invention.

FIG. 11AM shows an example embodiment of a surge arrestor editor.

FIG. 11AN shows an example embodiment of a signal editor.

FIG. 11AO shows an example embodiment of a single throw switch editor.

FIG. 11AP shows an example of the correspondence between a number of lights and a type of signal which may be displayed.

FIG. 11AQ shows an example embodiment of a level crossing editor.

FIG. 13B shows an example embodiment of a chart displaying all defined characteristics of a warehouse.

FIGS. 17C-E show tables representing characteristic values of electric fraction, force and velocity conditions for four operation regimes and train driving modes respectively.

FIG. 17G, 17H show tables of values of C coefficient for use with Canadian National Train Resistance Formulas.

FIGS. 17I, 17J show tables of formulas for propulsion resistance for freight rollingstock and passenger rollingstock respectively.

FIG. 17K shows an example embodiment of a diagram depicting the direction of forces used to calculated total vehicle resistance.

FIG. 17O shows an example embodiment of coding which can be used in Matlab to calculate resistance forces for a Shinkansen Series 200 train.

FIG. 17P shows an example embodiment of coding which can be used to calculate tractive effort of a Shinkansen Series 200 train.

FIG. 18 shows an example embodiment of an animation which may appear in OLV along with a key explaining the features.

FIG. 19L shows an example embodiment of an editable motor characteristics tab.

FIG. 19M shows an example of an editable selected variable and speed relationship chart.

FIG. 19N shows an example embodiment of an editable speed and polynomial chart

FIG. 19O shows an example embodiment of an editable tractive effort-speed characteristics tab.

FIG. 19P shows an editable chart including fields for tractive effort in tons and speed in kph.

FIG. 19Q shows an example embodiment of an editable chart.

FIG. 19R shows an example embodiment of an editable braking effort-speed characteristics tab.

FIG. 19S shows an example embodiment of an editable chart with fields for braking effort in tons and speed in kph.

FIG. 19T shows an example embodiment of an editable chart.

FIG. 19U is an example embodiment of a chart showing section, property, value type, unit.

FIG. 20 shows an example embodiment of two charts, the left is instantaneous power vs. distance while the right is accumulated energy (total consumed power) vs. distance.

FIG. 21 shows an example embodiment of traction editing tools are shown.

FIG. 22A shows an example embodiment of a graphical view.

FIG. 22B shows an example embodiment of a station identification editor.

FIG. 23A shows an example embodiment a graphical view of a platform.

Figure 23A:
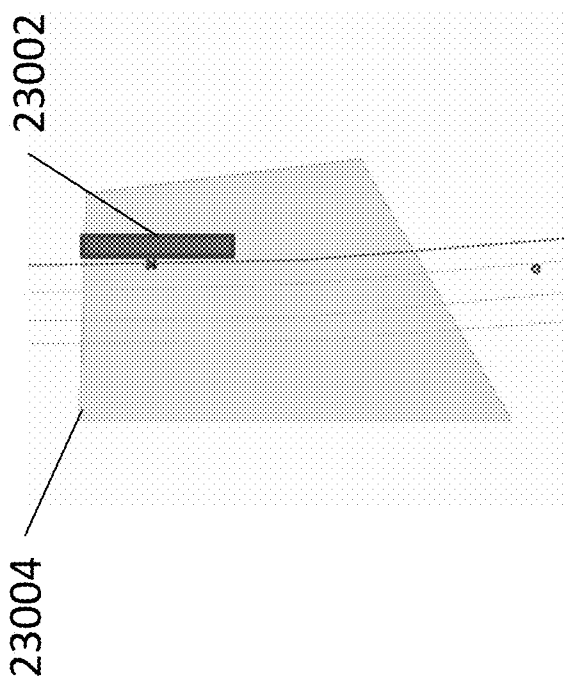
Figure 23B:
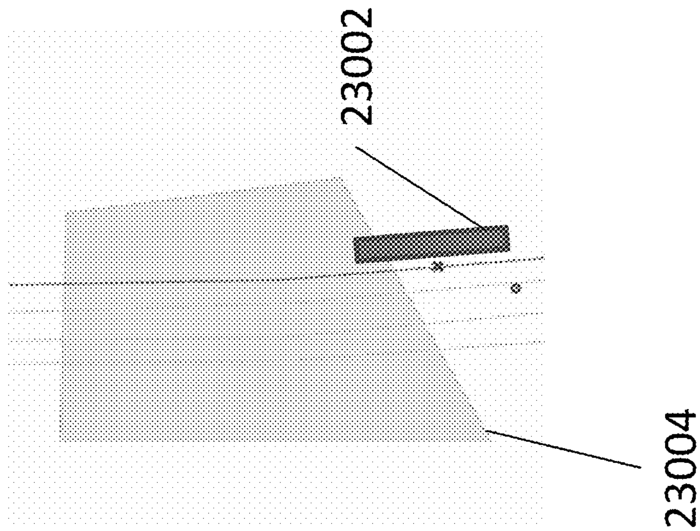

FIG. 23B shows an example embodiment of how platform 23002 may be moved along a track.

Figure 23C:
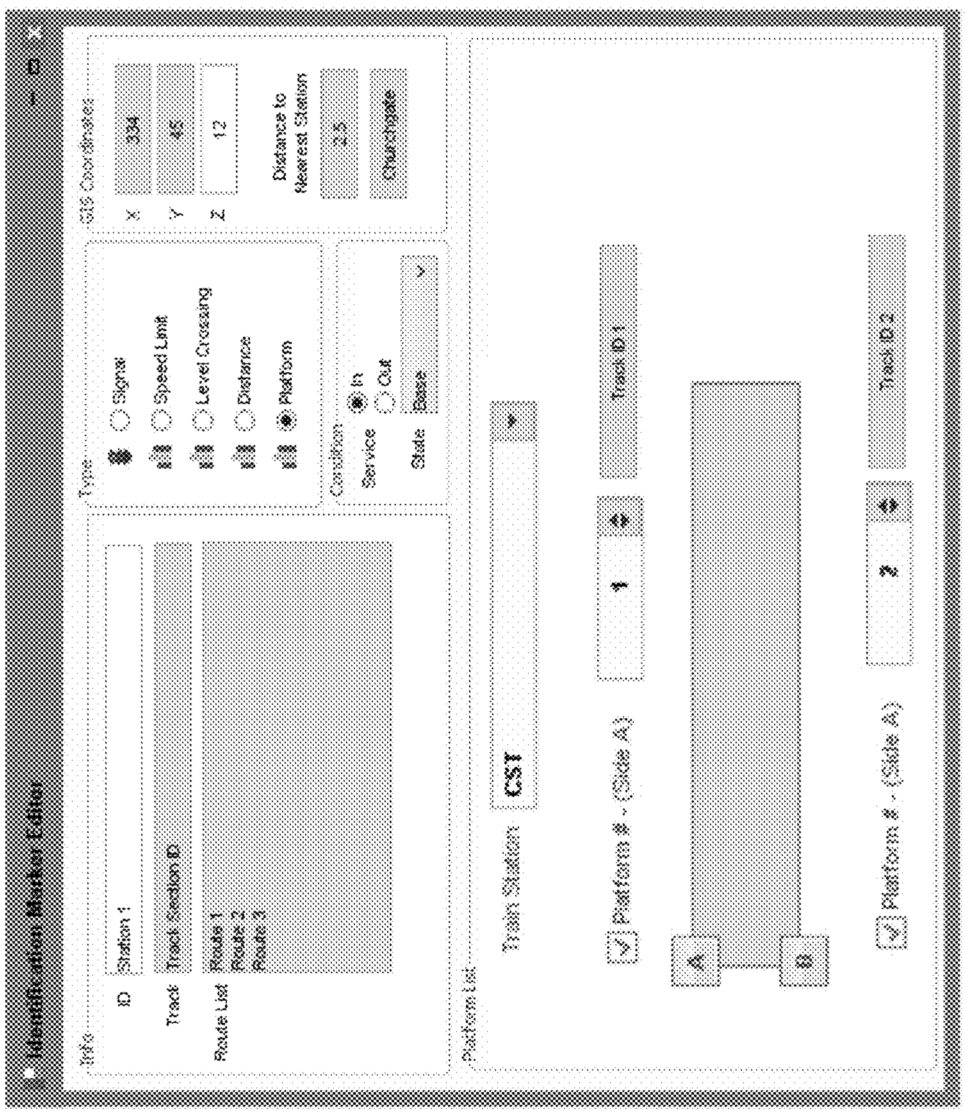

FIG. 23C shows an example embodiment of a platform editor.

Figure 23D:
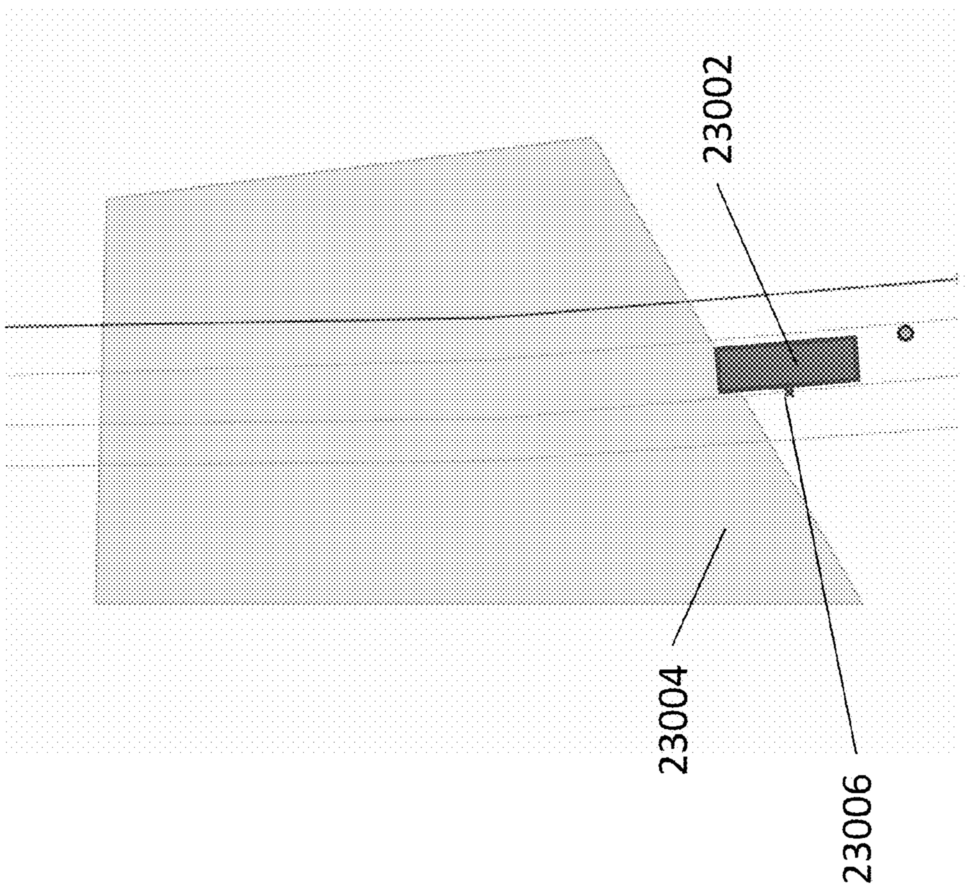

FIG. 23D shows an example embodiment of platform with one active side.

Figure 23E:
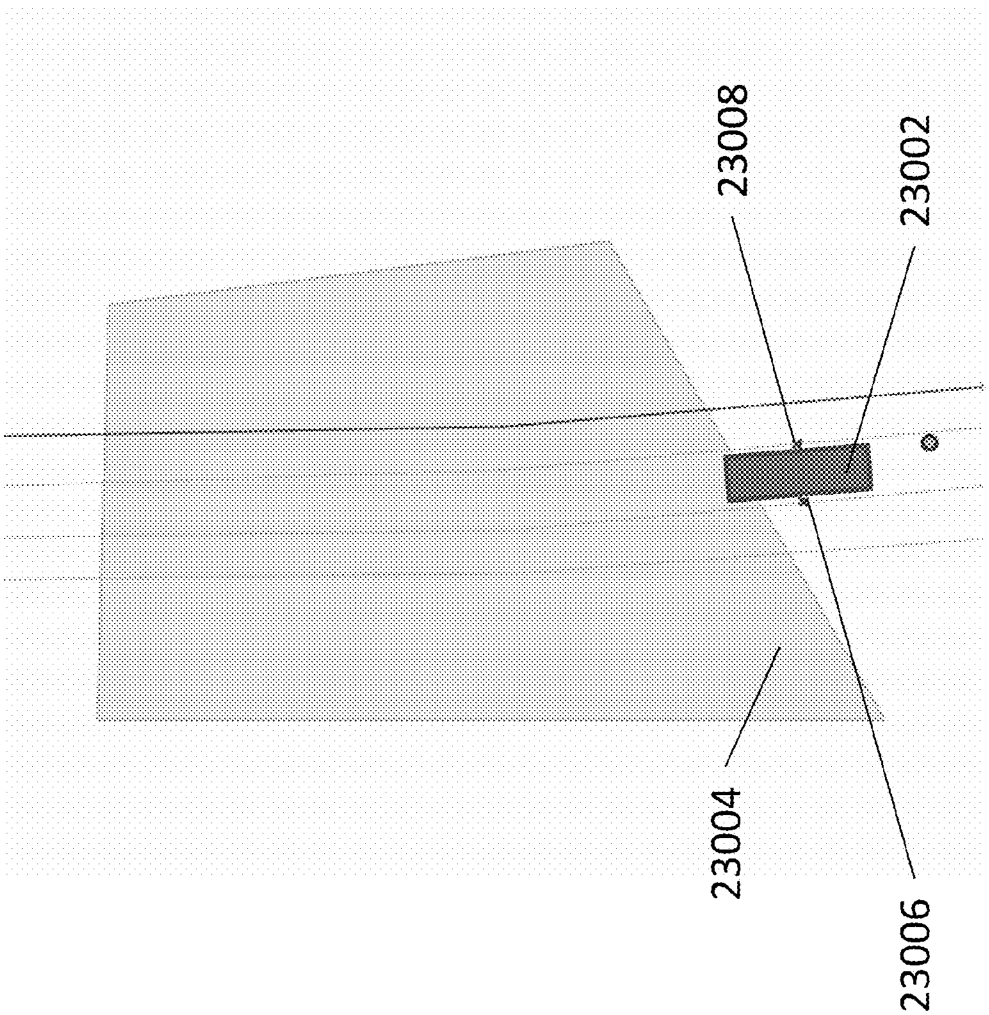

FIG. 23E shows an example embodiment of platform with two active sides.

Figure 24A:
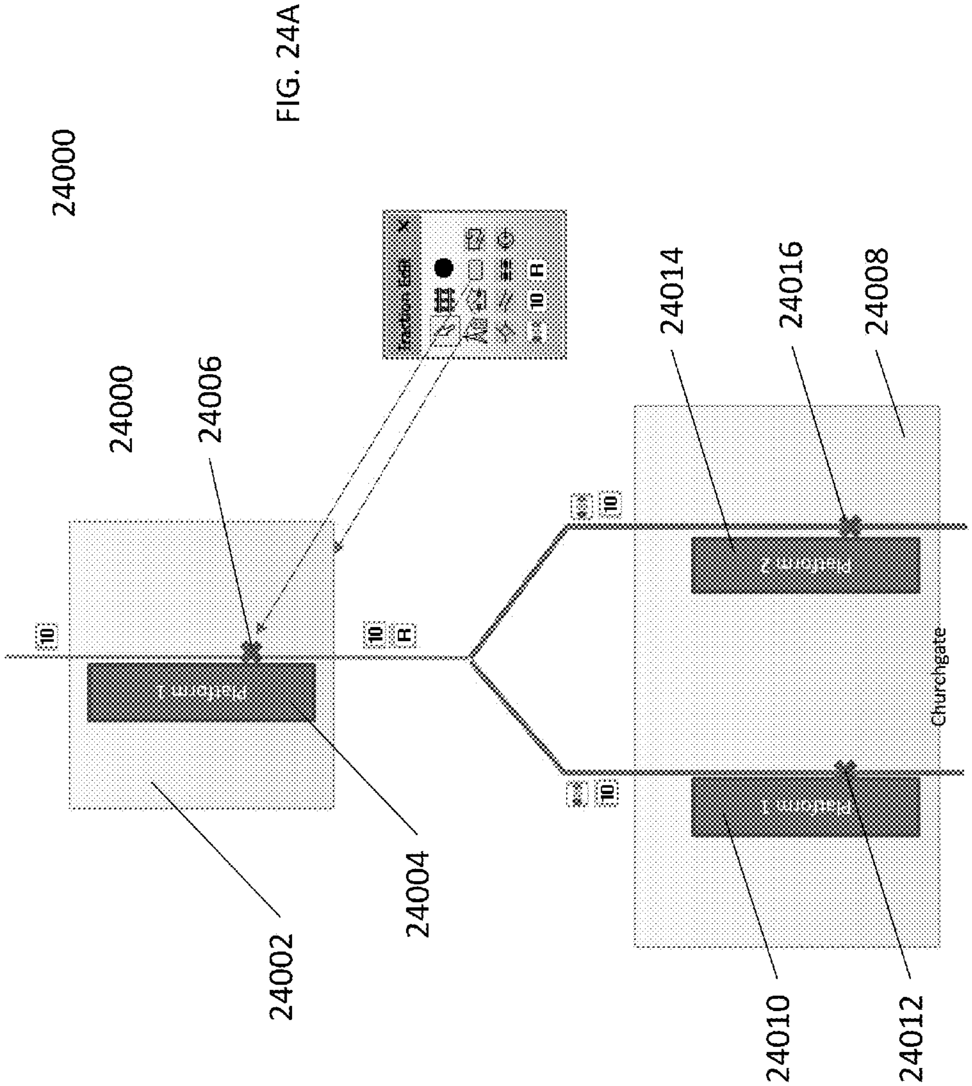

FIG. 24A shows an example embodiment of placing platform and/or station markers on GIS.

Figure 24B:
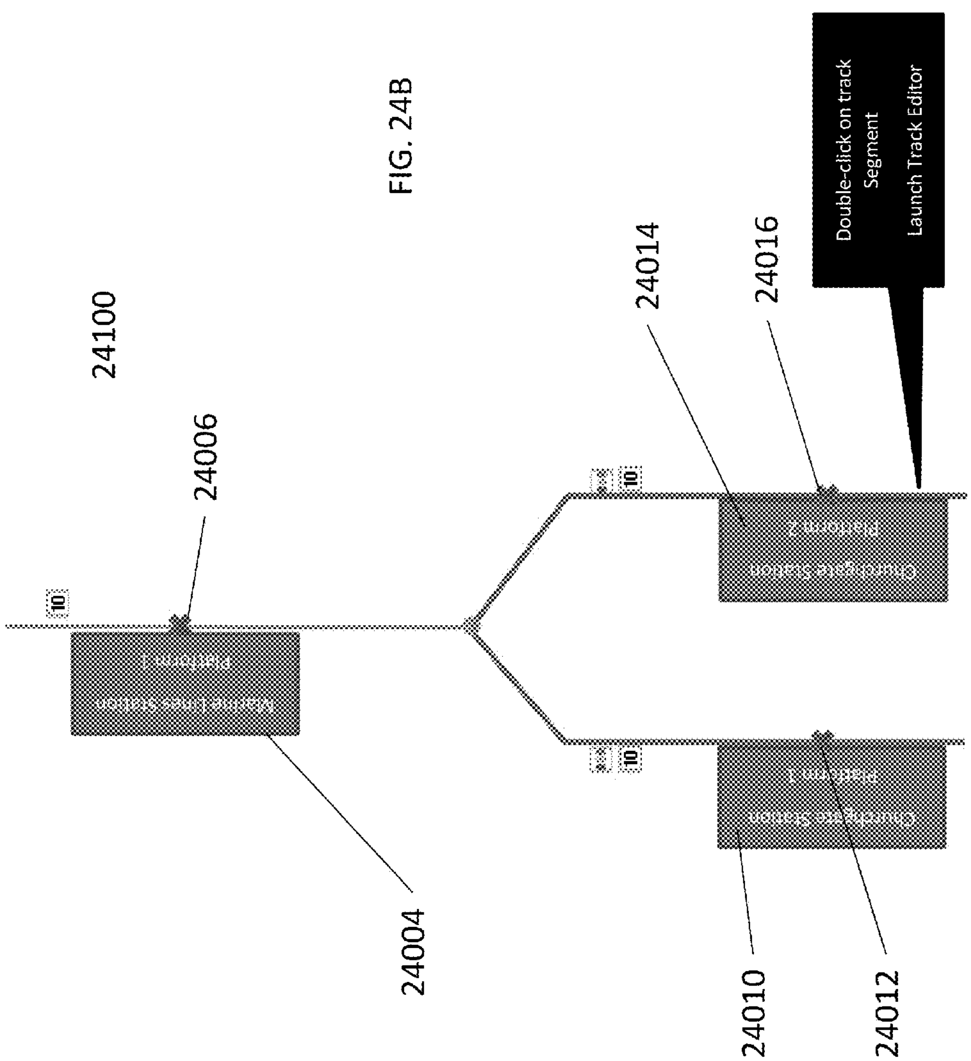

FIG. 24B shows an example embodiment of creating tracks on GIS between stations using combinations of track segments.

Figure 24C:
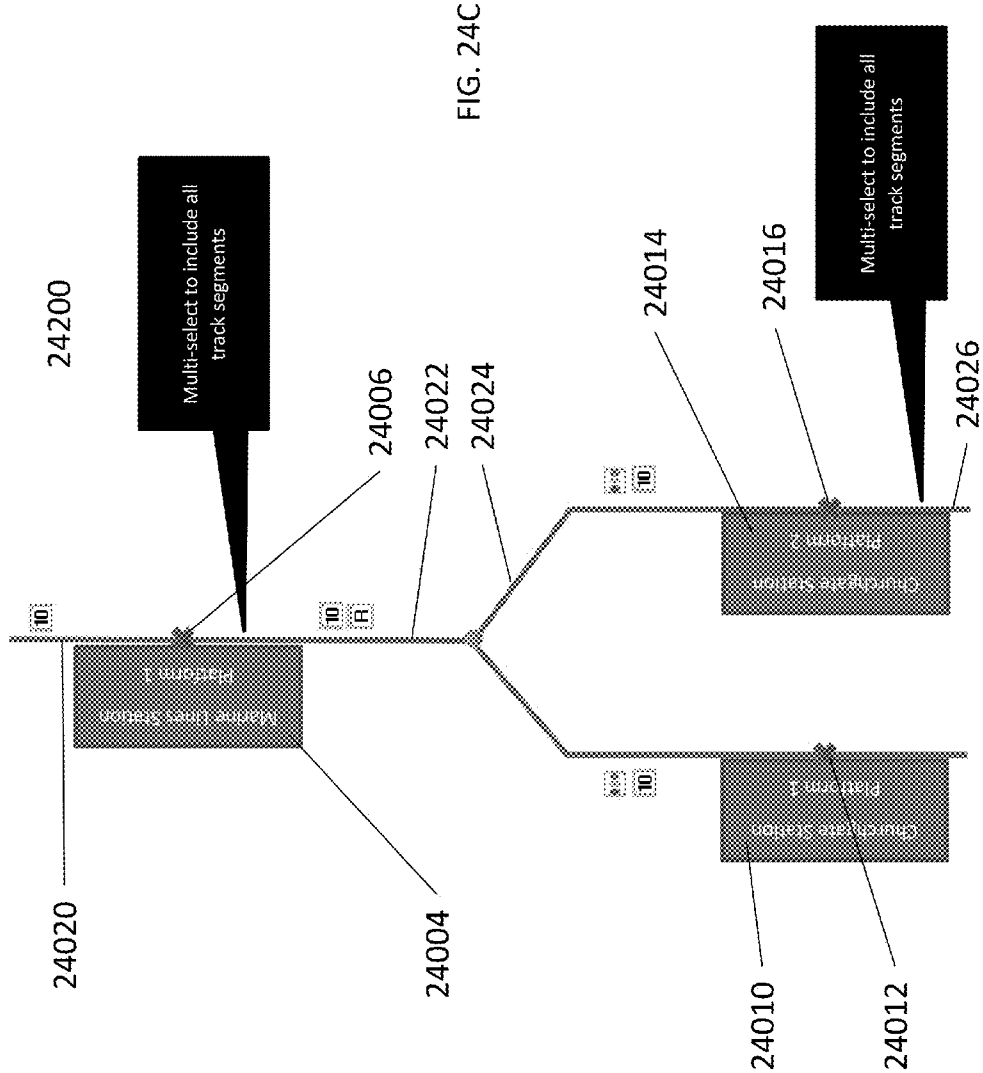

FIG. 24C shows an example embodiment of defining routes by designating start stations and end stations.

Figure 24D:
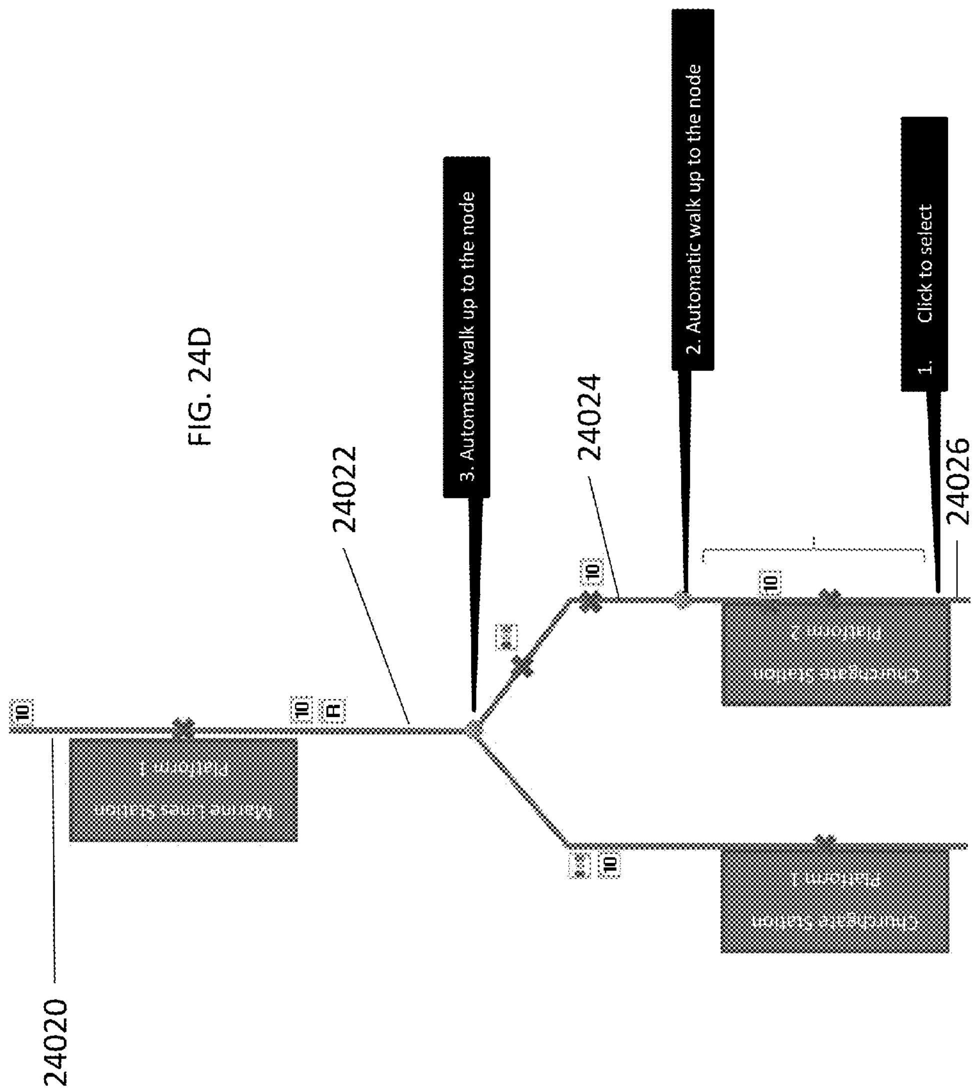

FIG. 24D shows an example embodiment of how track segments may be automatically selected.

Figure 24E:
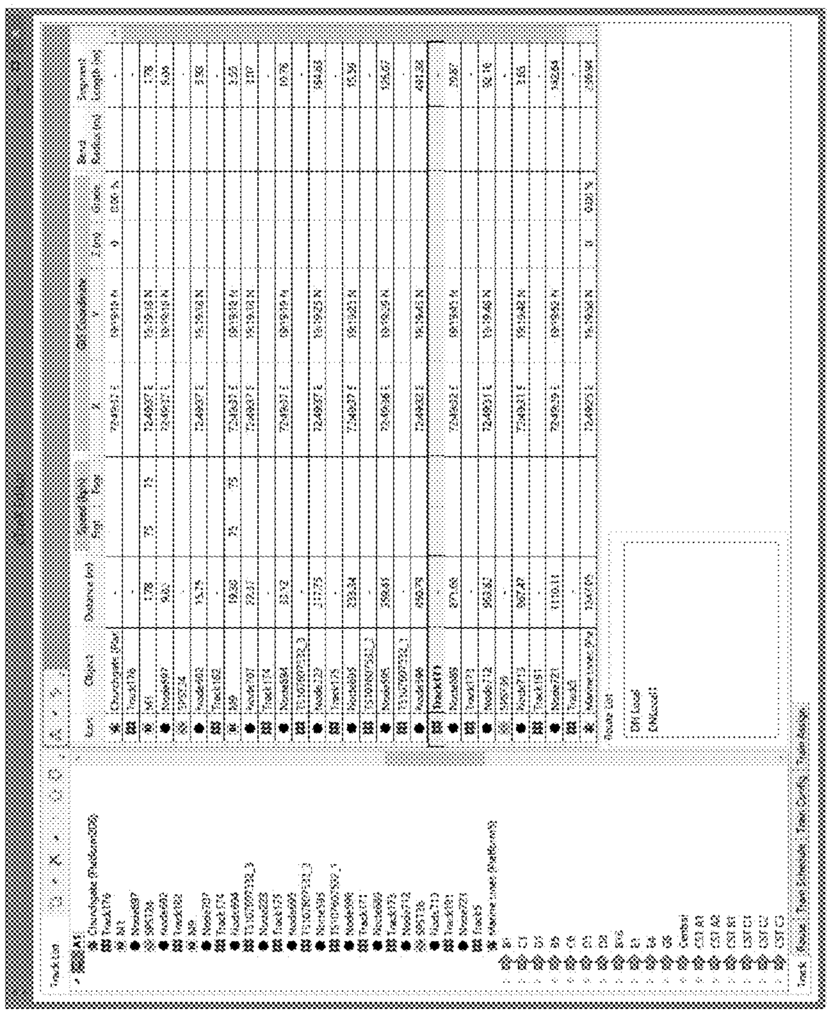

FIG. 24E shows an example embodiment of a track editing window of a user interface.

FIG. 24F shows an example embodiment of a table.

Figure 25A:
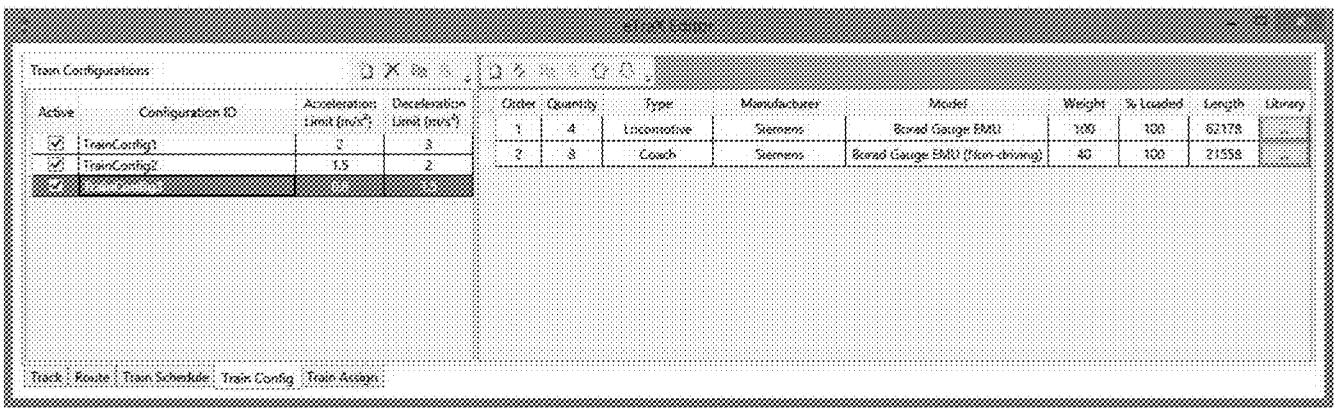

FIG. 25A shows an example embodiment of a train and consist editor.

Figure 25B:
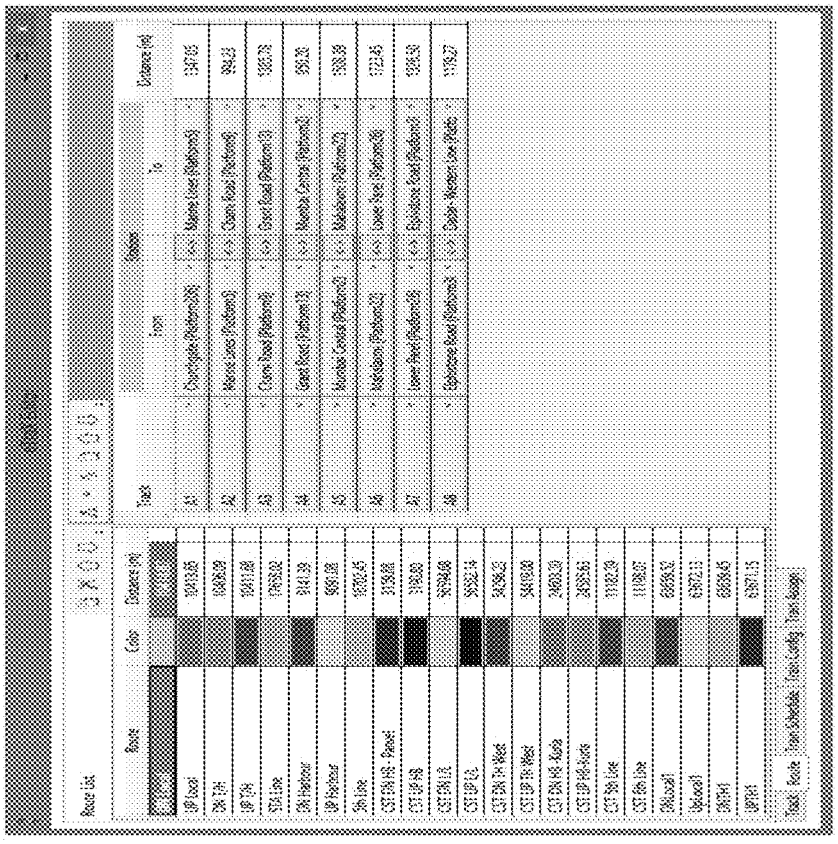

FIG. 25B shows an example embodiment of a Route Editor.

Figure 25C:
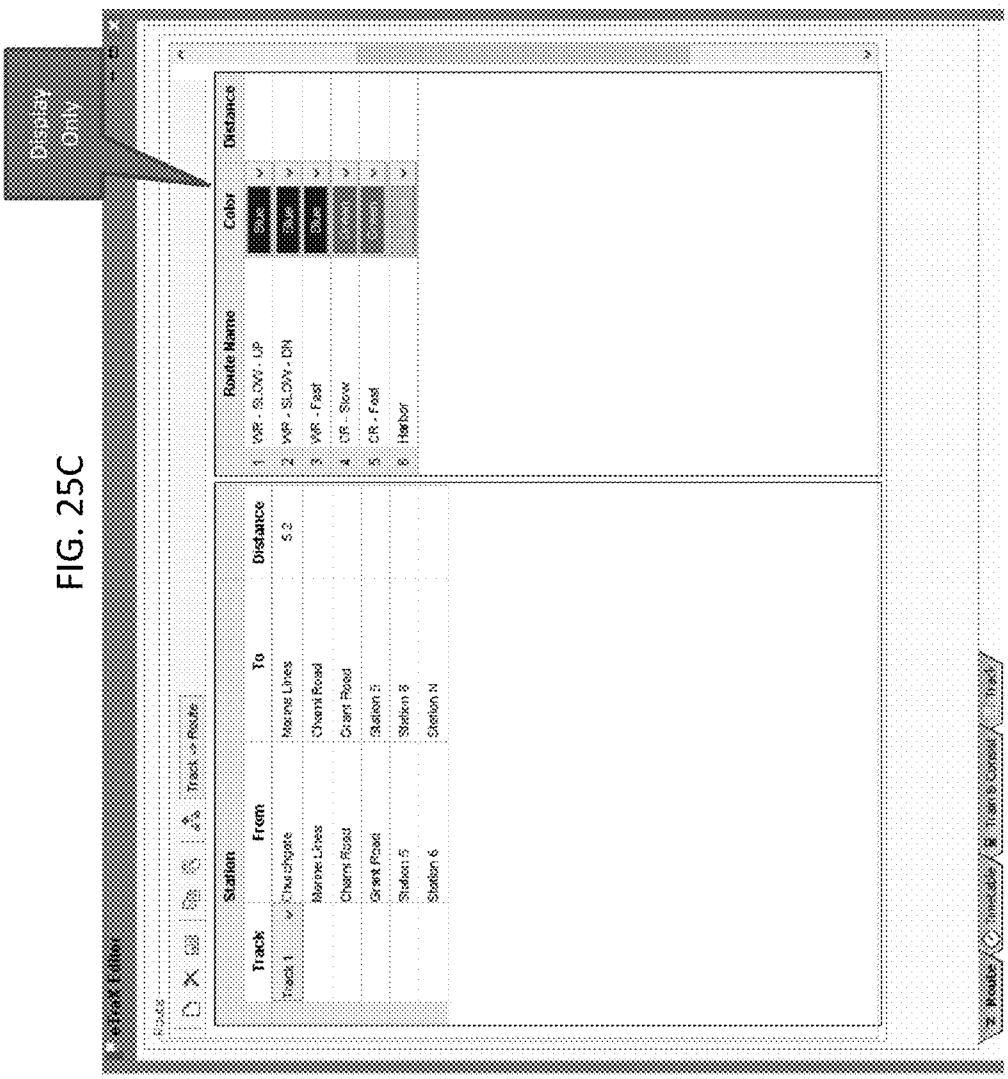

FIG. 25C shows an example embodiment of an editor.

Figure 25D:
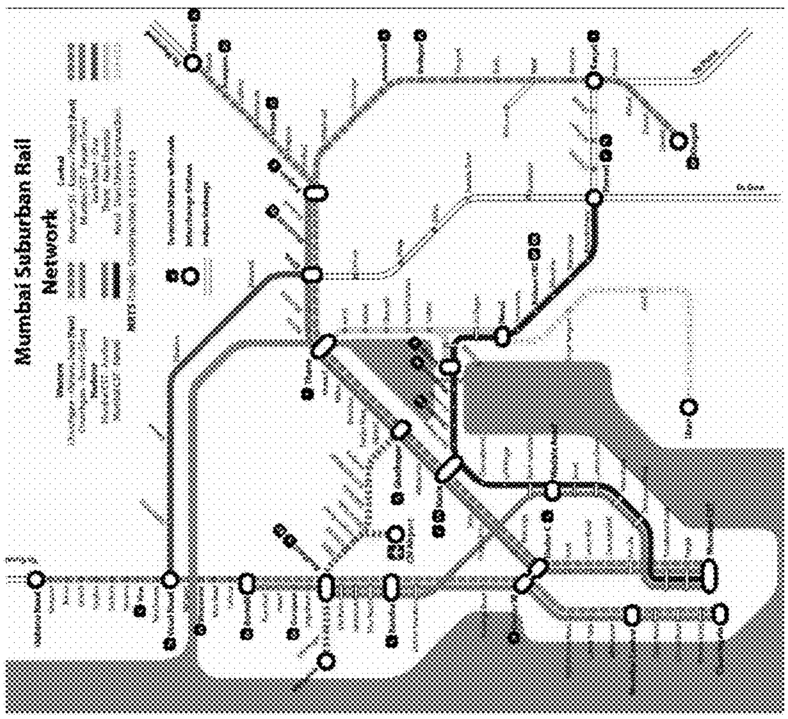

FIG. 25D shows an example embodiment of a track route display.

Figure 26:
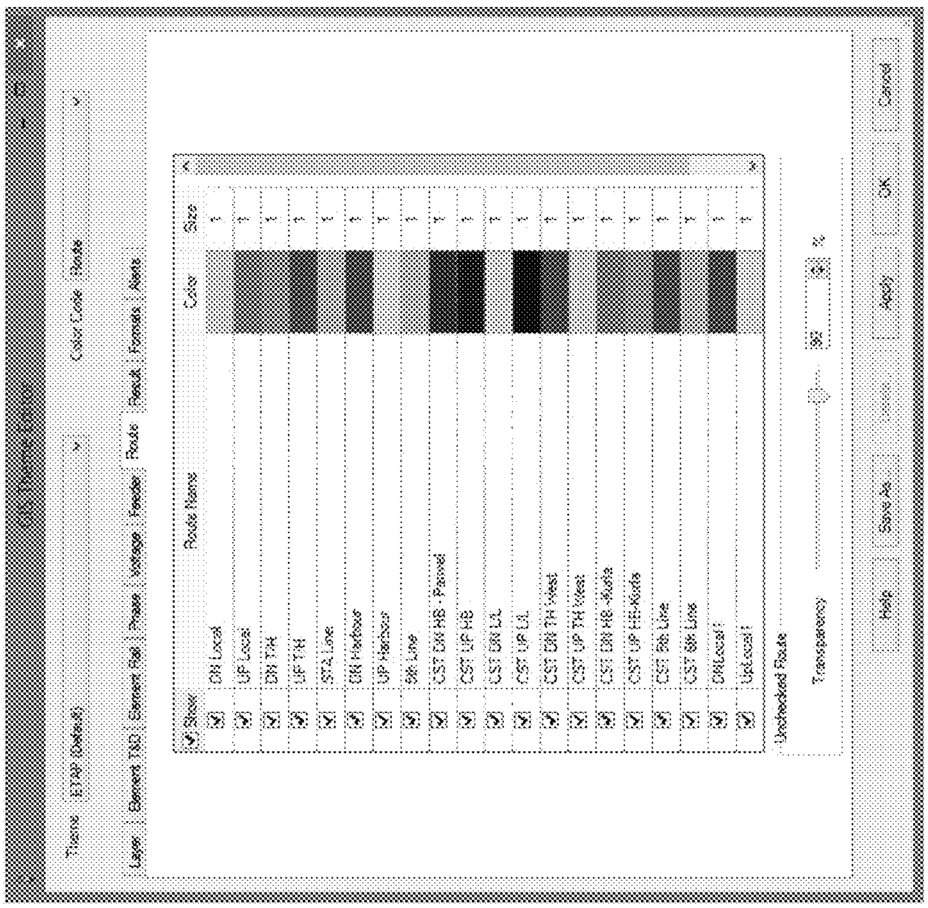

FIG. 26 shows an example embodiment of a Train Route theme manager.

Figure 27A:
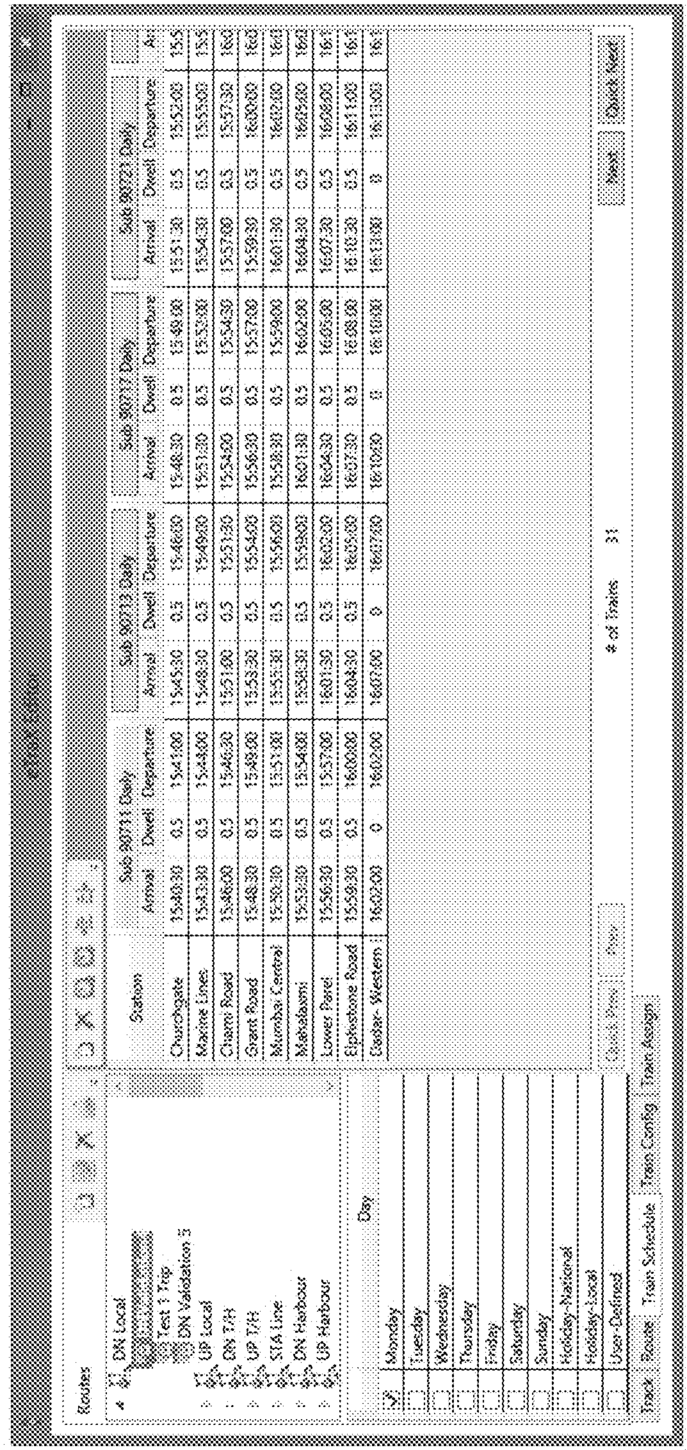

FIG. 27A shows an example embodiment of a train schedule editor.

Figure 27B:
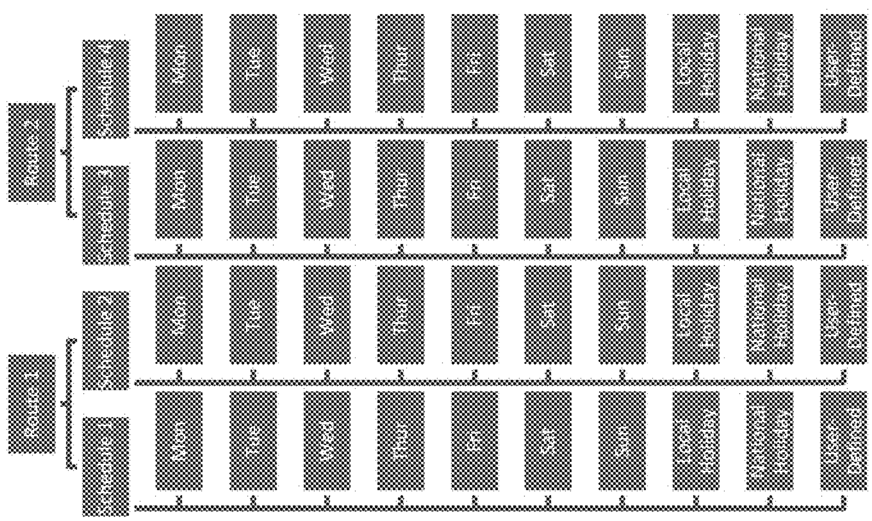

FIG. 27B shows an example embodiment of a train time table storage structure.

Figure 27C:
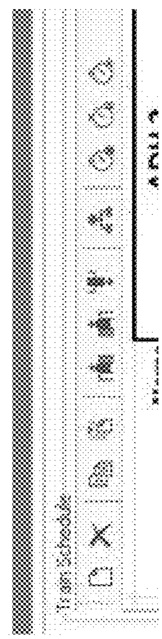

FIG. 27C shows an example embodiment of a toolbar for train schedules.

Figure 27D:
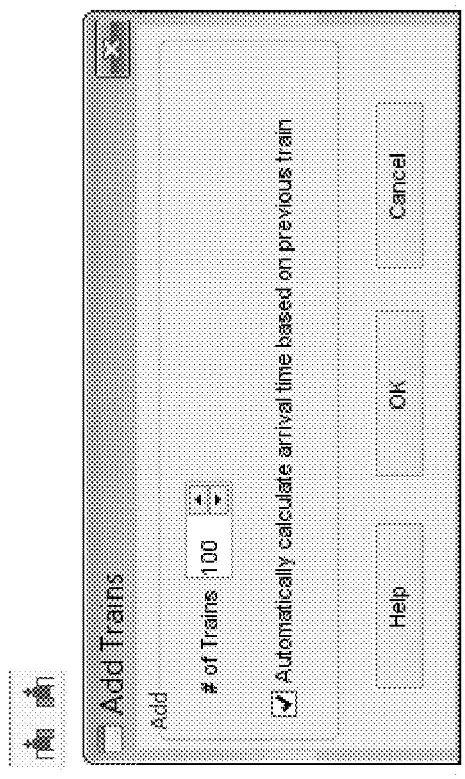

FIG. 27D shows an example embodiment of train adding buttons.

Figure 27E:
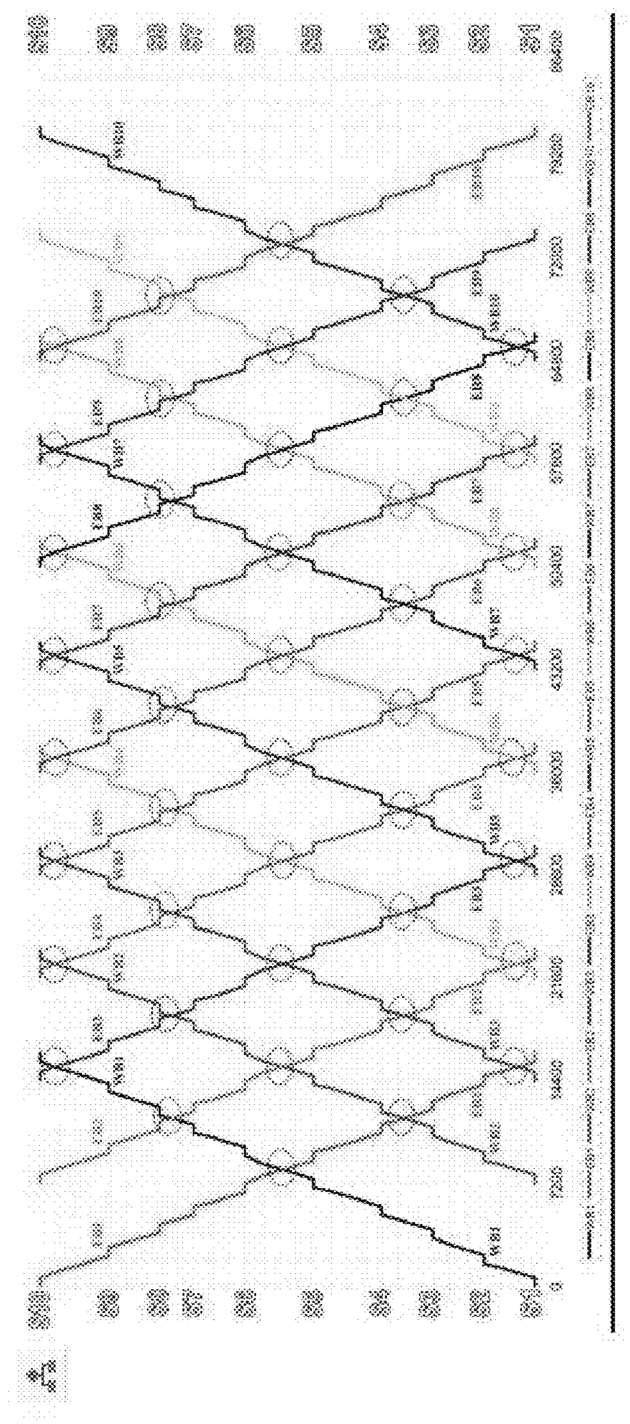

FIG. 27E shows an example embodiment of a train schedule diagram.

Figure 28A:
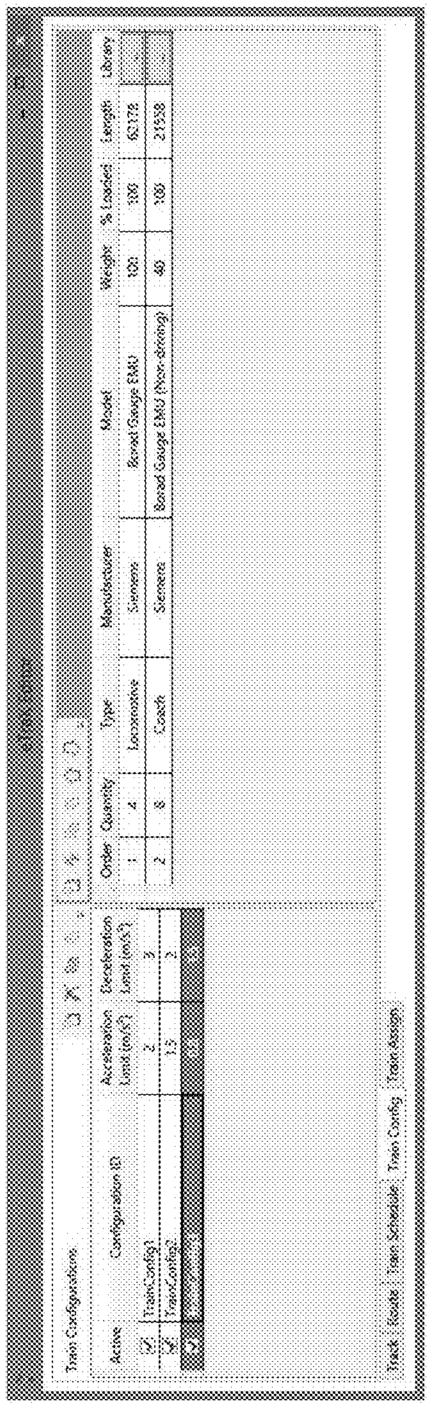
Figure 28B:
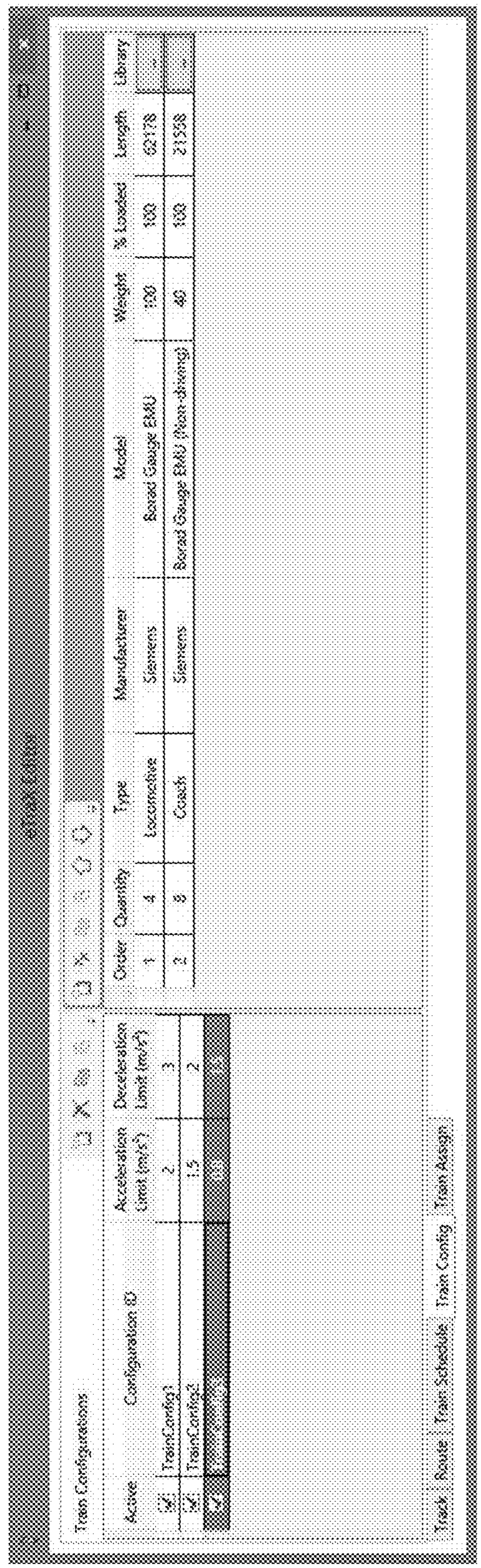

FIGS. 28A-28B show example embodiments of a train configuration editor.

Figure 29:
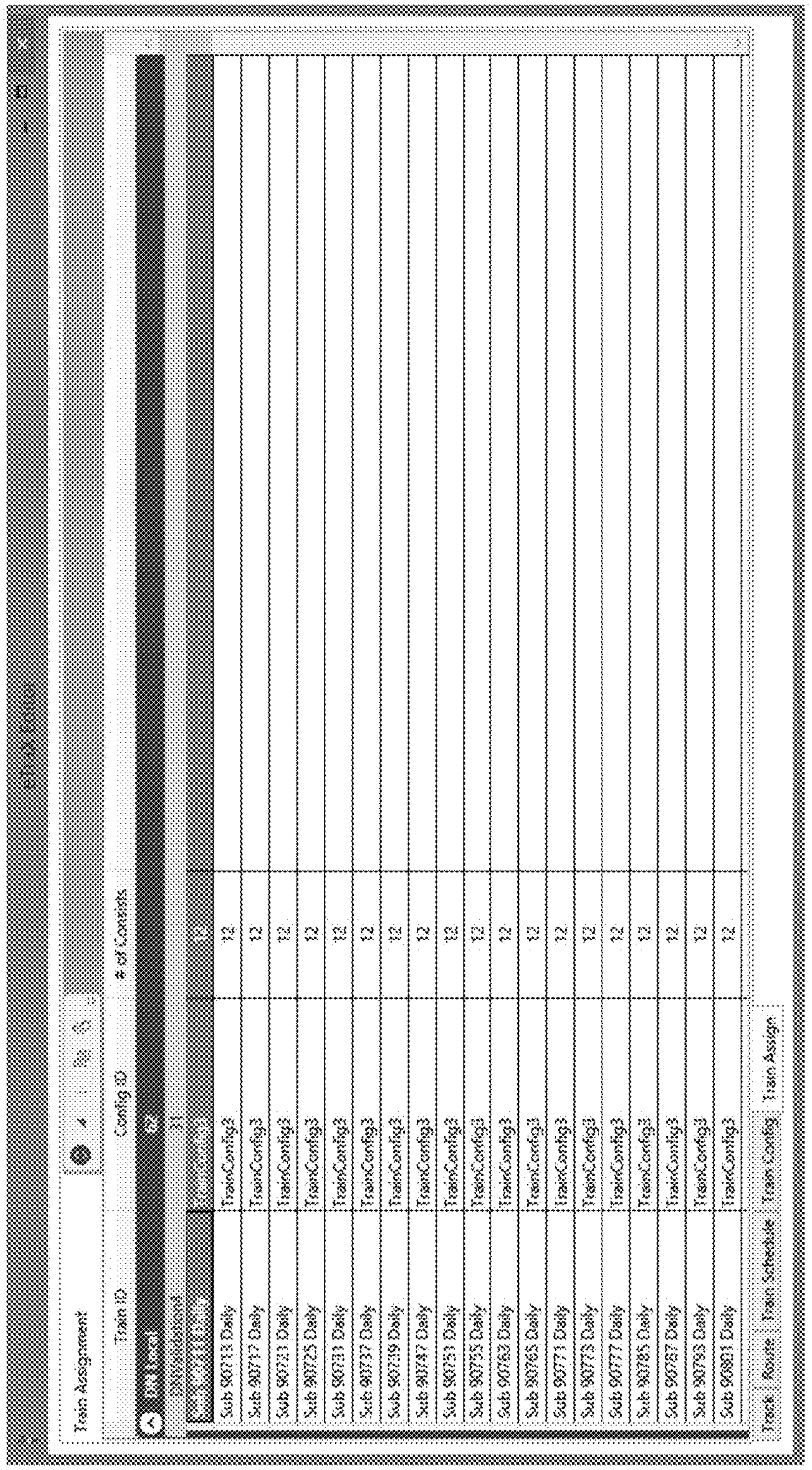

FIG. 29 shows an example embodiment of a Train Assign dialog box.

Figure 30A:
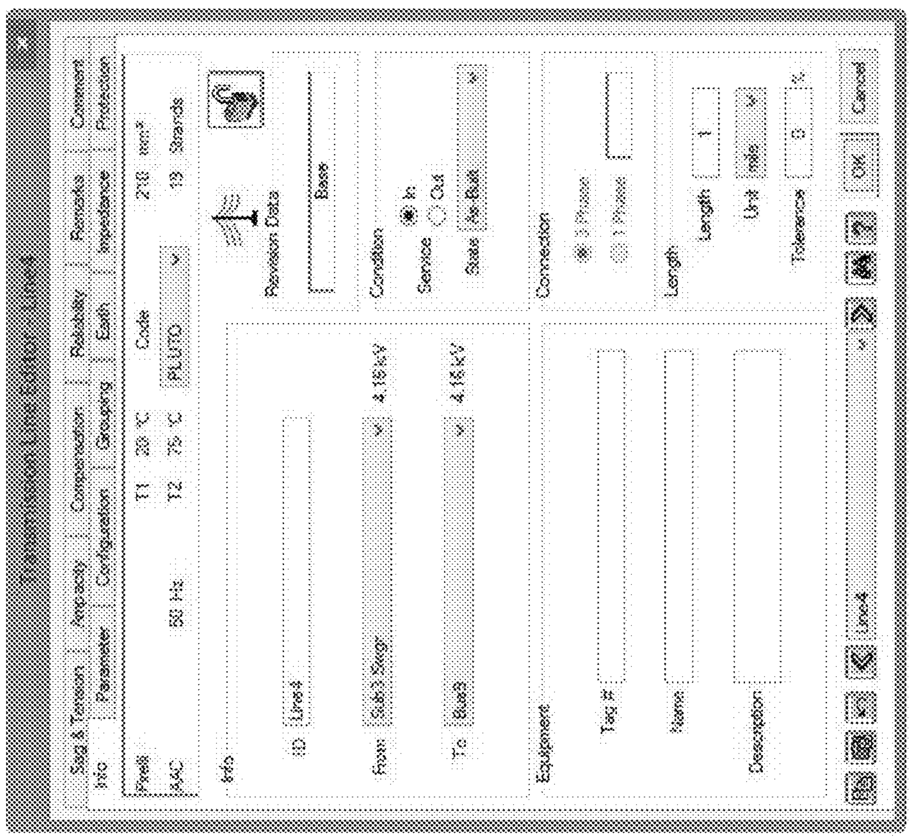

FIG. 30A shows an example embodiment of an info tab of a transmission line editor.

Figure 30B:
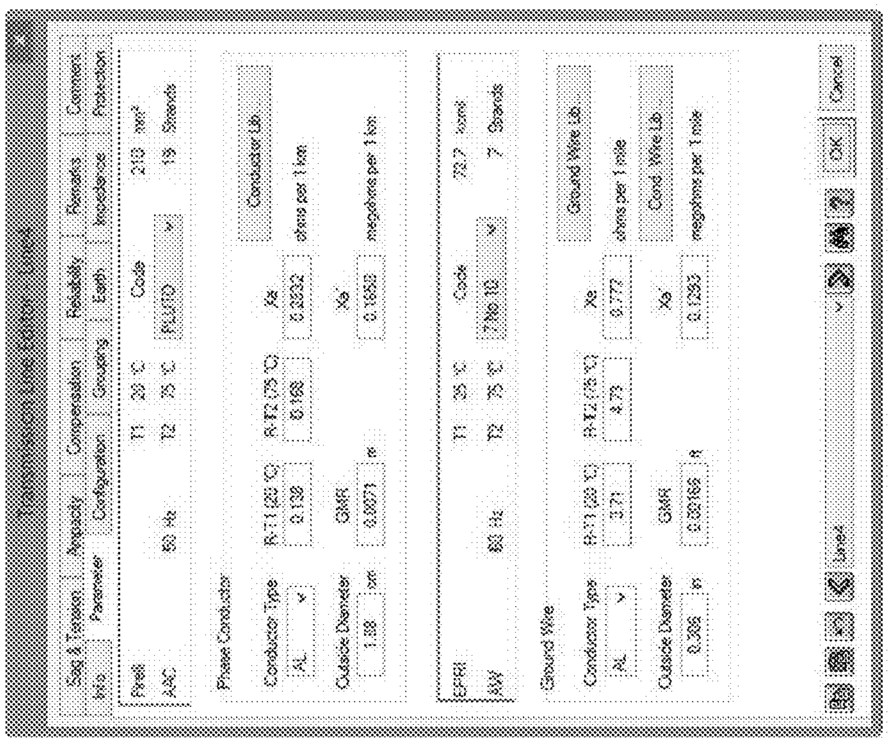

FIG. 30B shows an example embodiment of a parameter tab of a transmission line editor.

Figure 30C:
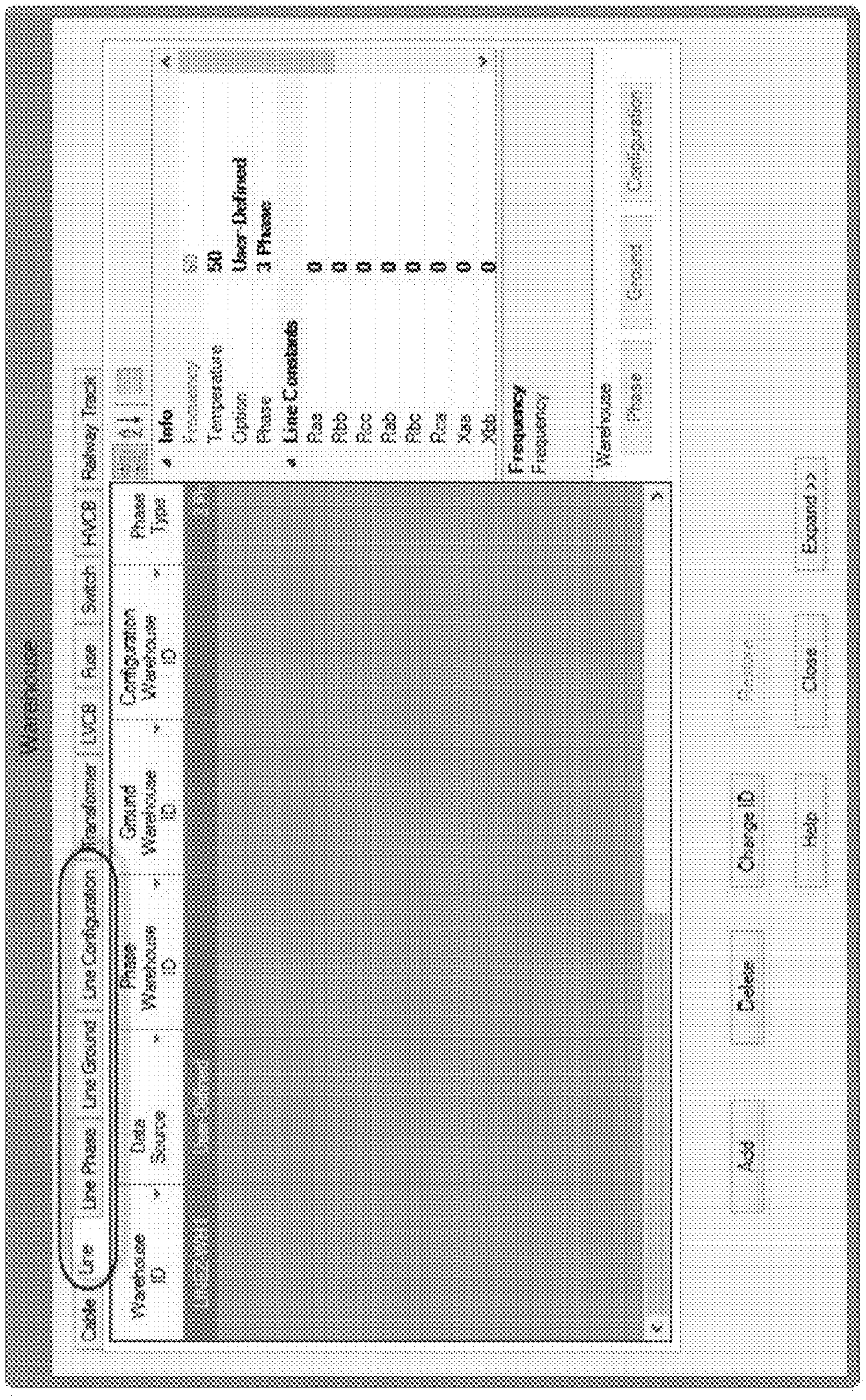
Figure 30D:
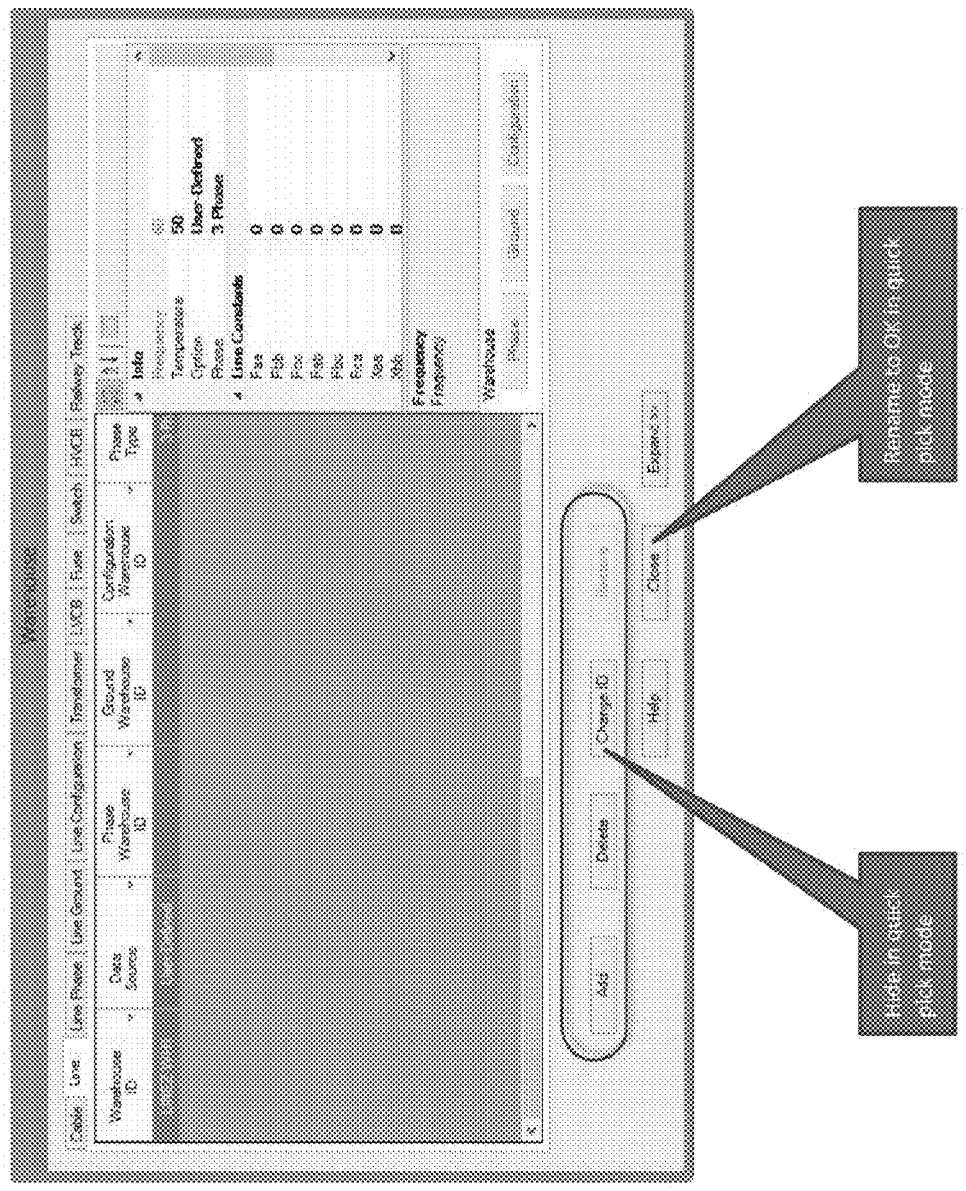

FIGS. 30C-30D show example embodiments of a warehouse structure screen.

Figure 30E:
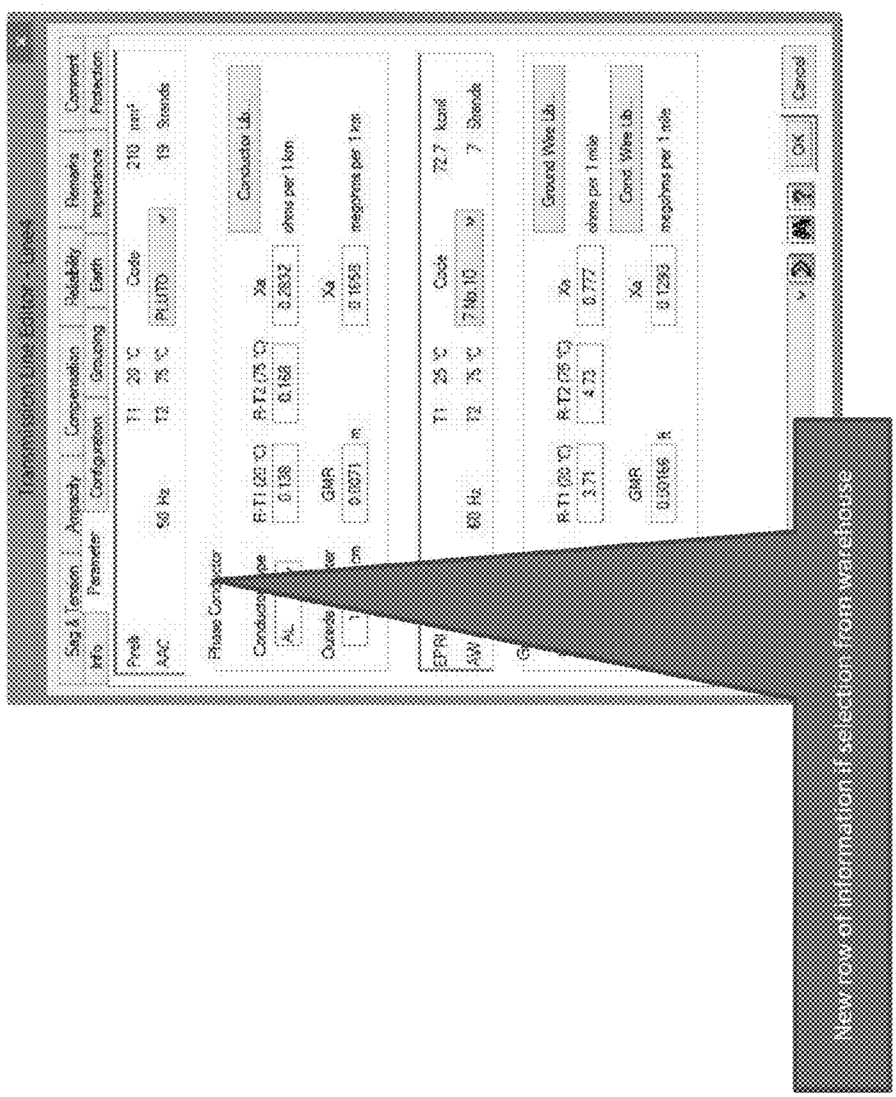

FIG. 30E shows an example embodiment of a transmission line editor for a line.

Figure 30F:
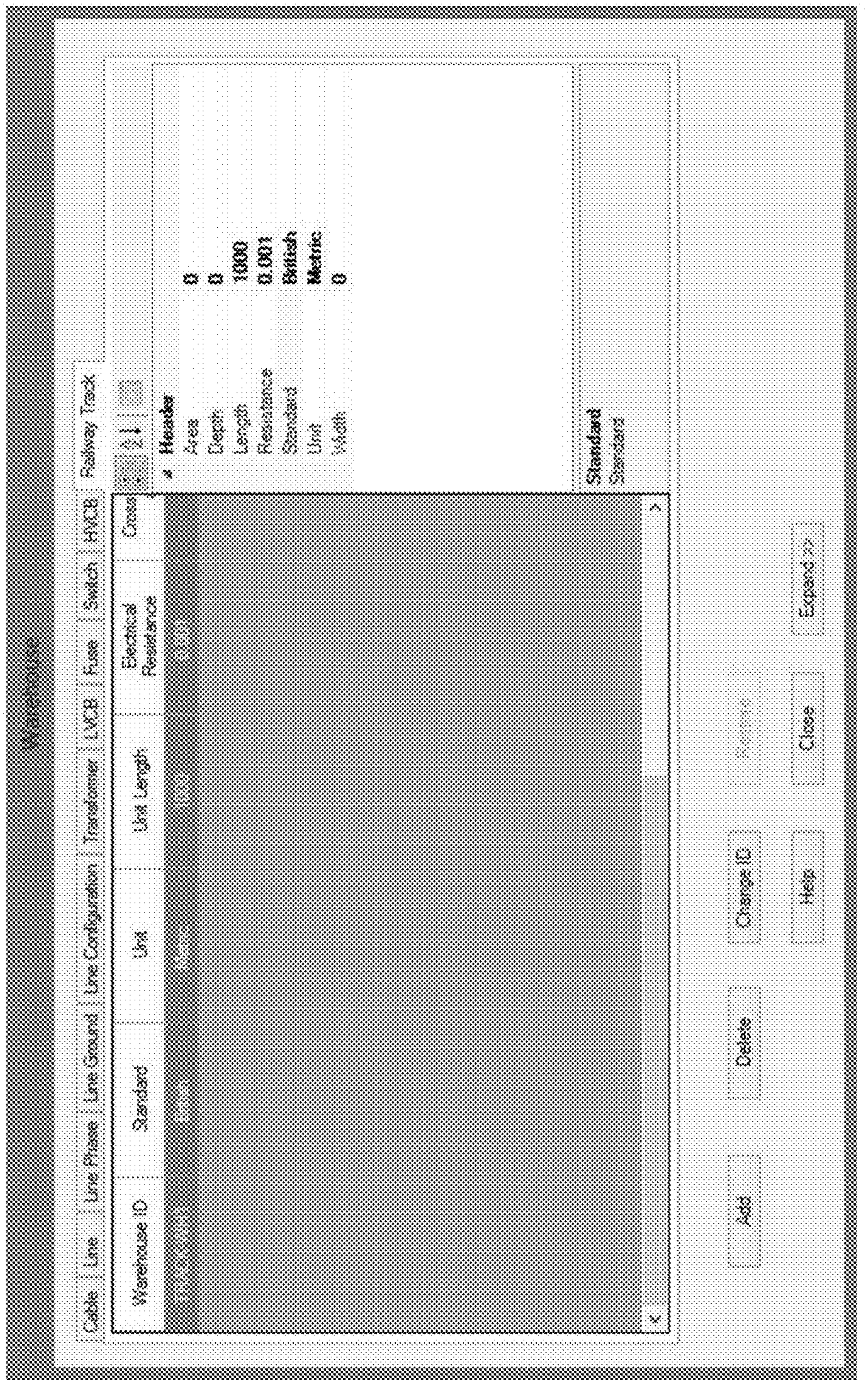

FIG. 30F shows an example embodiment of a warehouse editor.

FIG. 31A shows an example embodiment of an elevation marker.

FIG. 31B shows an example embodiment of a bend radius marker.

Figure 31C:
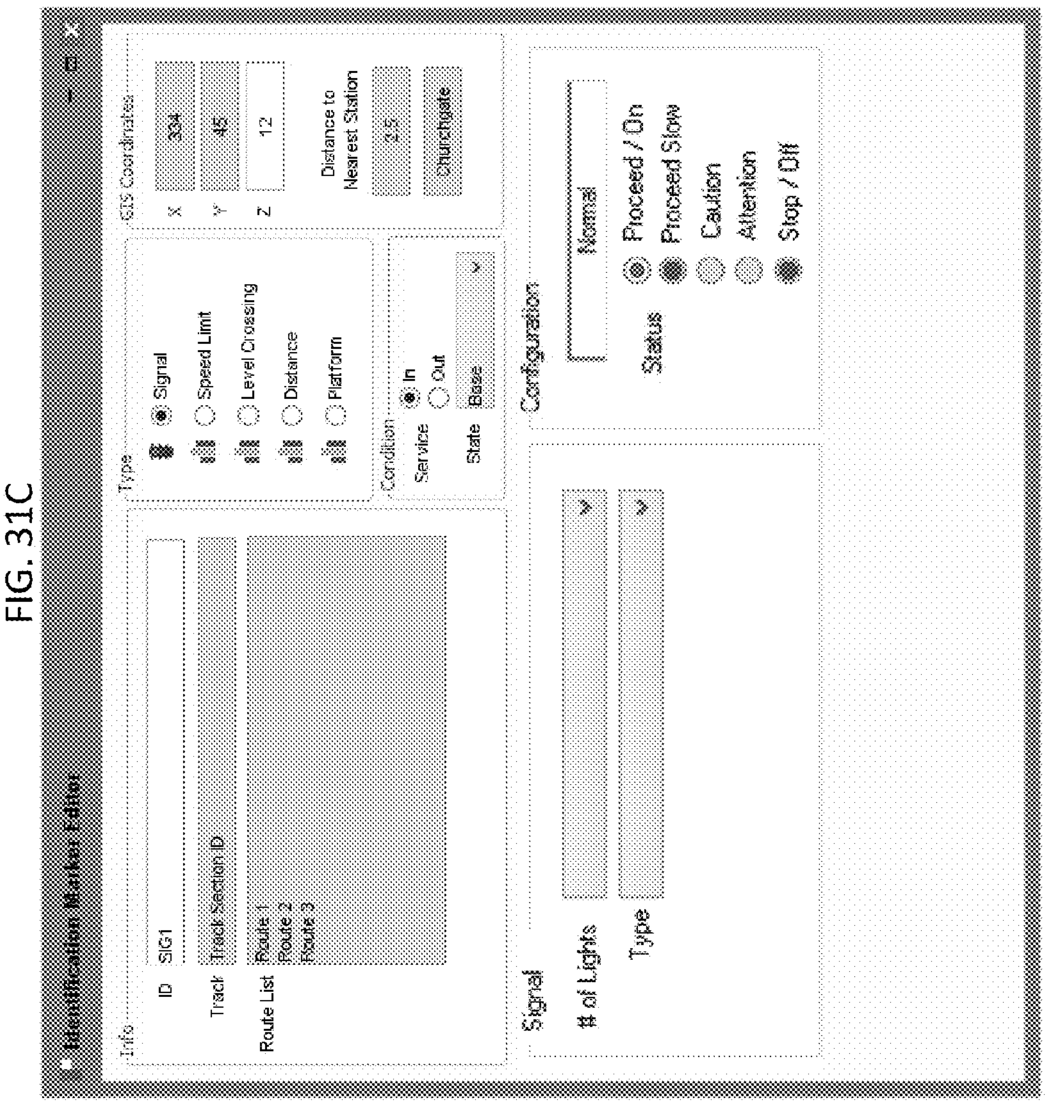

FIG. 31C shows an example embodiment is shown of an identification marker editor.

Figure 31D:
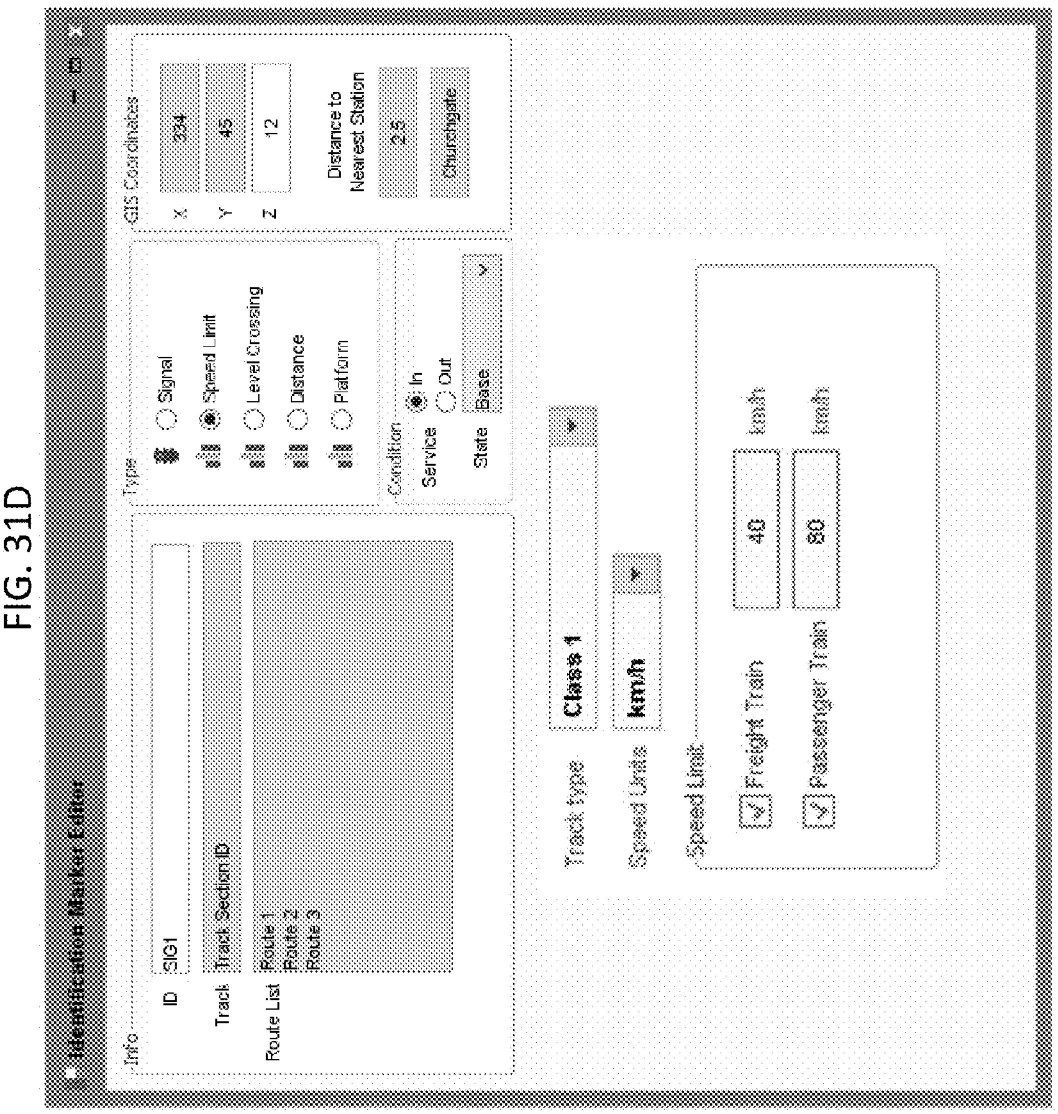

FIG. 31D shows an example embodiment is shown of an identification marker editor.

Figure 31E:
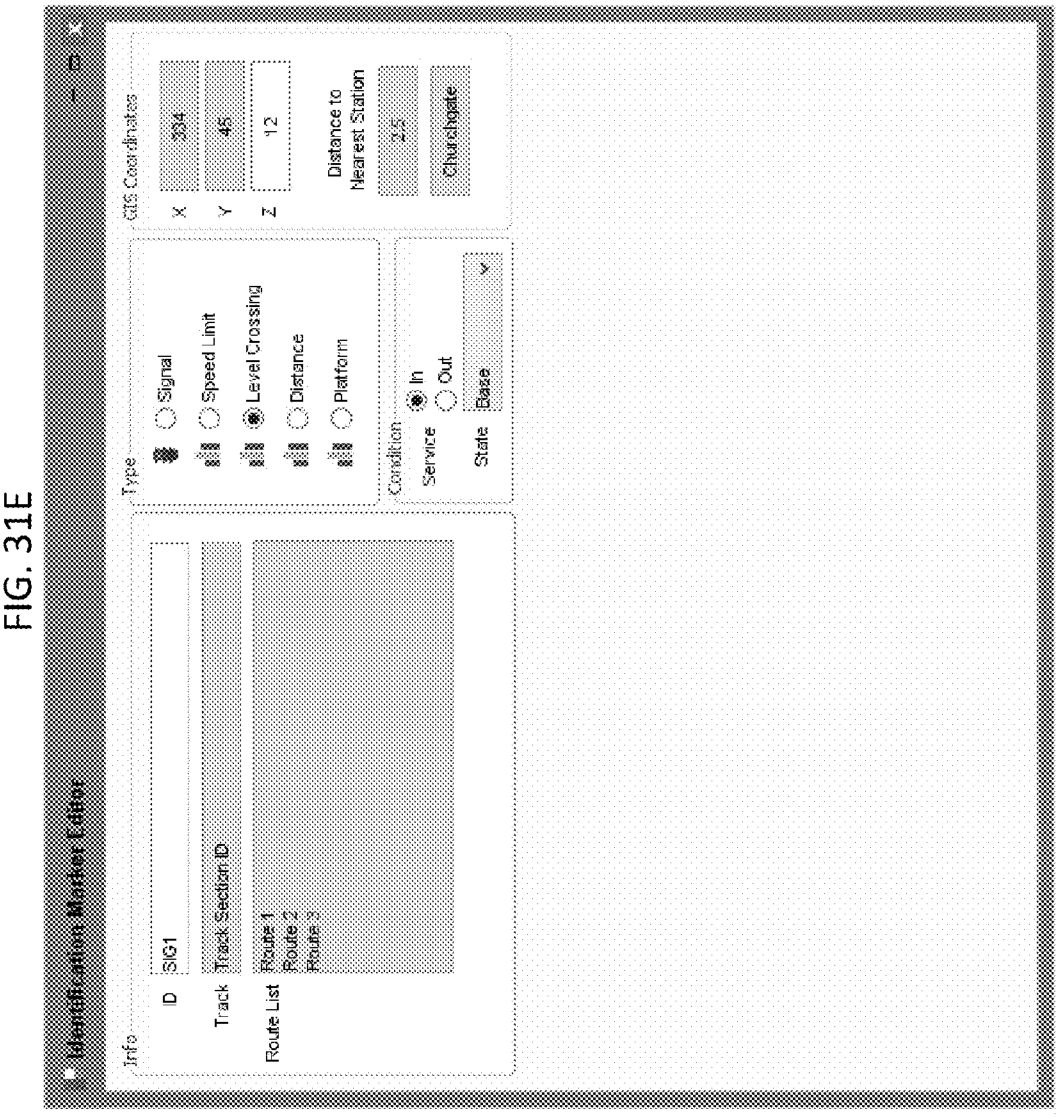

FIG. 31E shows an example embodiment is shown of an identification marker editor.

Figure 31F:
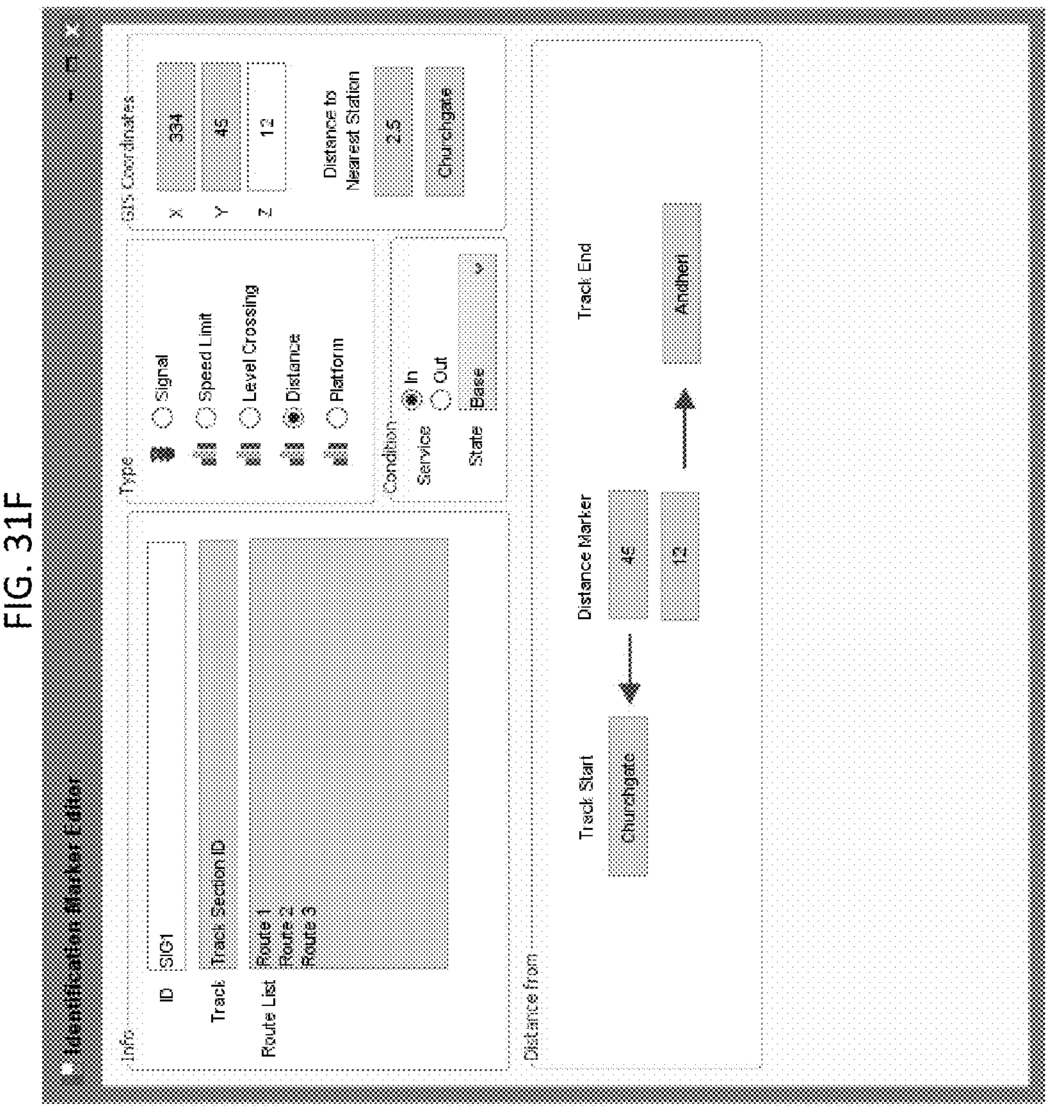

FIG. 31F shows an example embodiment is shown of an identification marker editor.

Figure 31G:
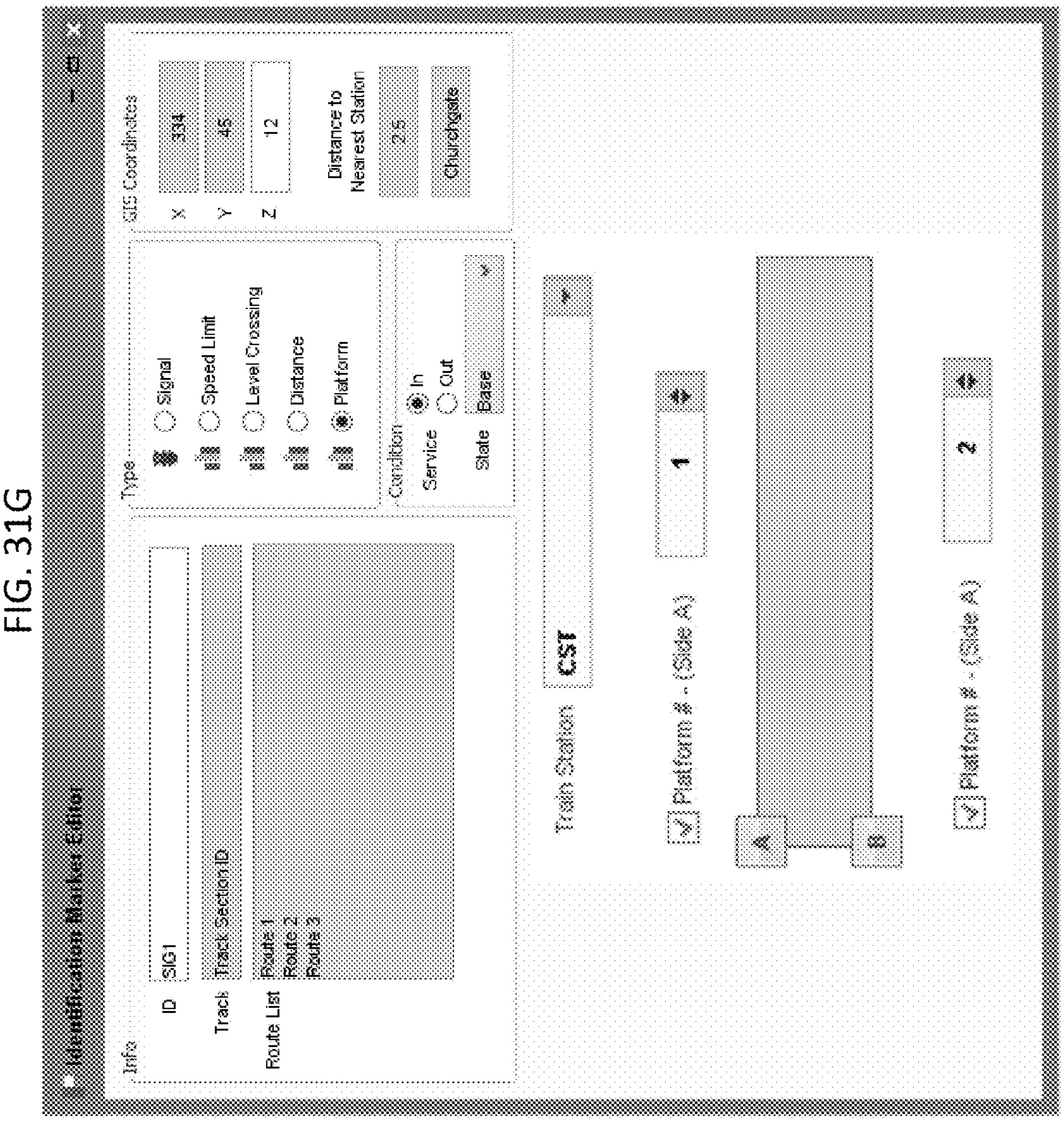

FIG. 31G shows an example embodiment is shown of an identification marker editor.

Figure 31H:
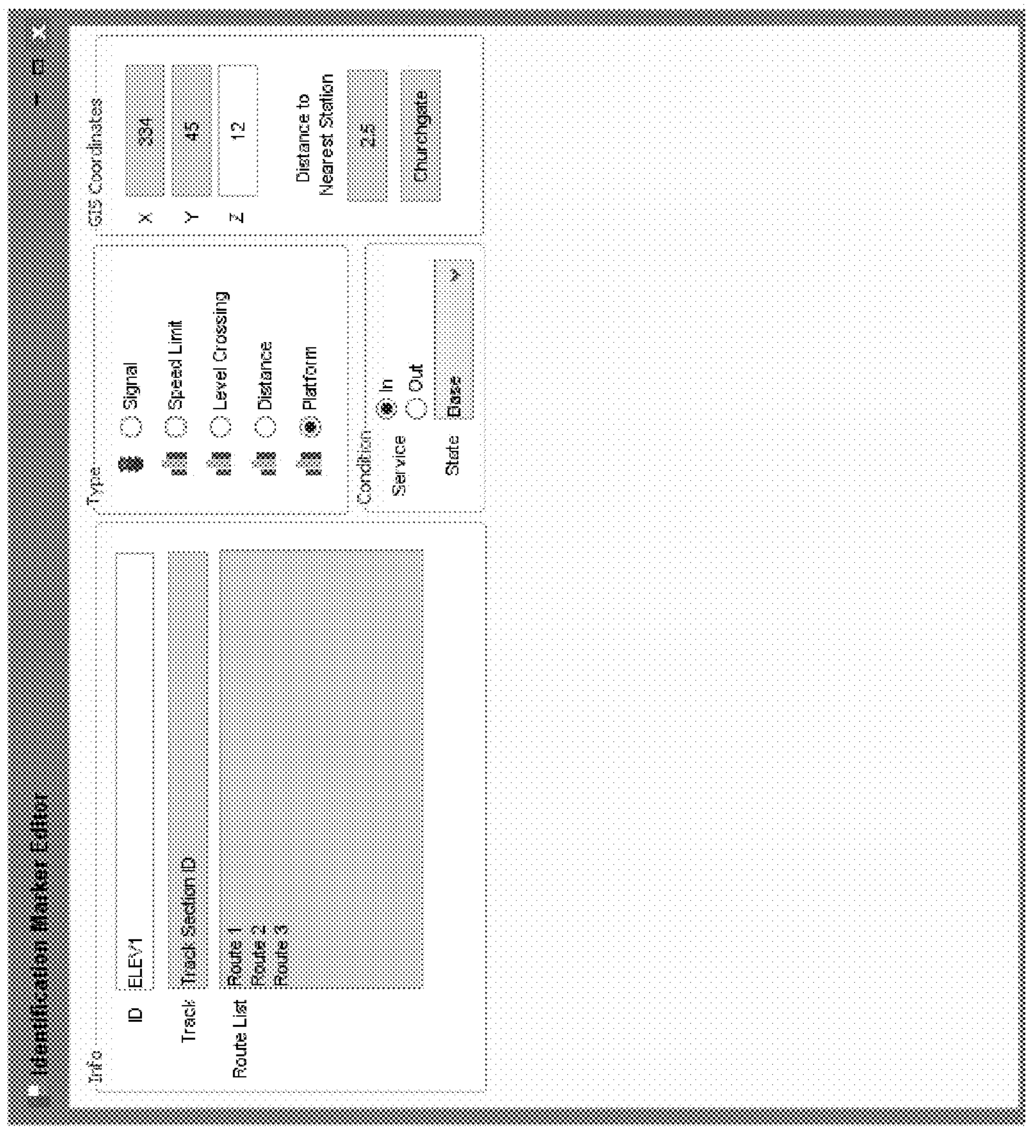

FIG. 31H shows an example embodiment is shown of an identification marker editor.

Figure 31I:
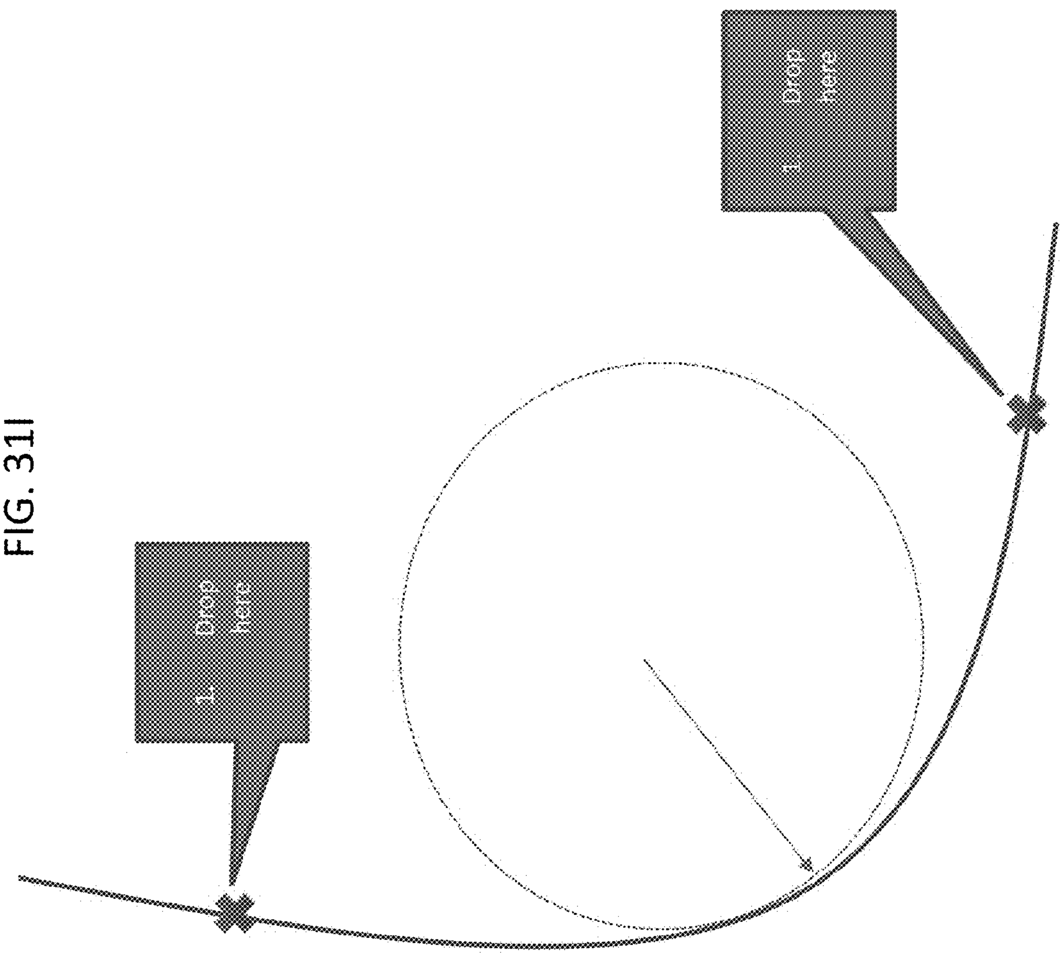

FIG. 31I shows an example embodiment is shown of a bend radius/curvature marker.

Figure 31J:
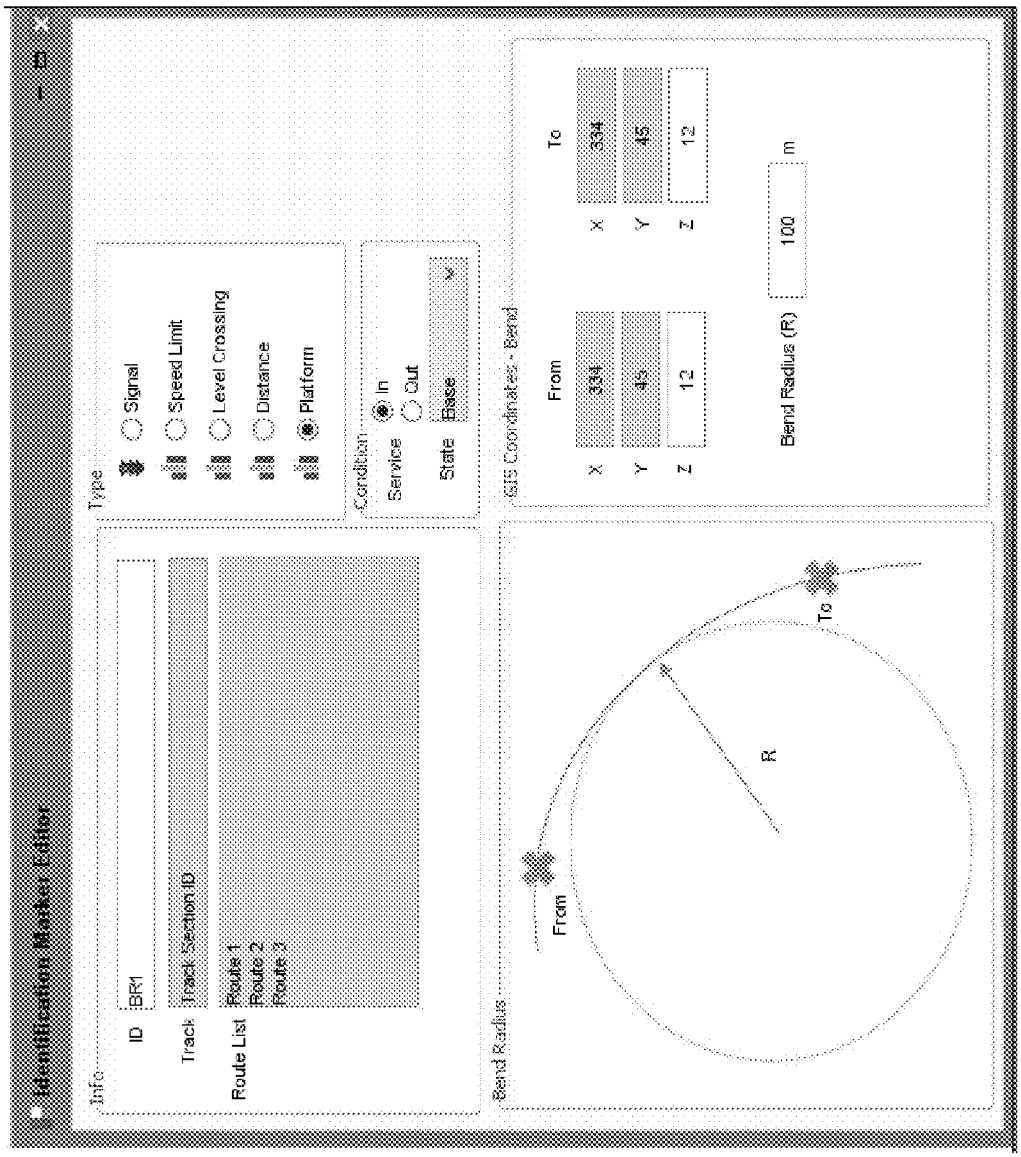

FIG. 31J shows an example embodiment of a bend radius/curvature marker editor.

Figures 1, 31K:
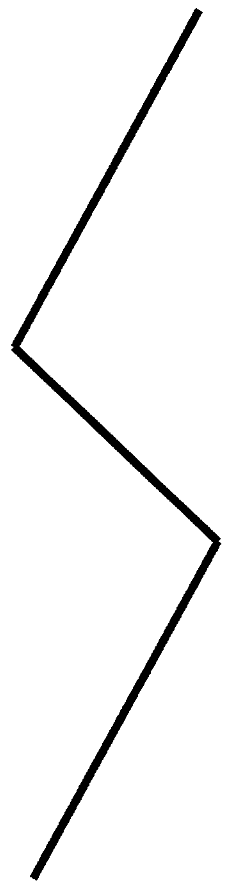
Figures 2, 31K:
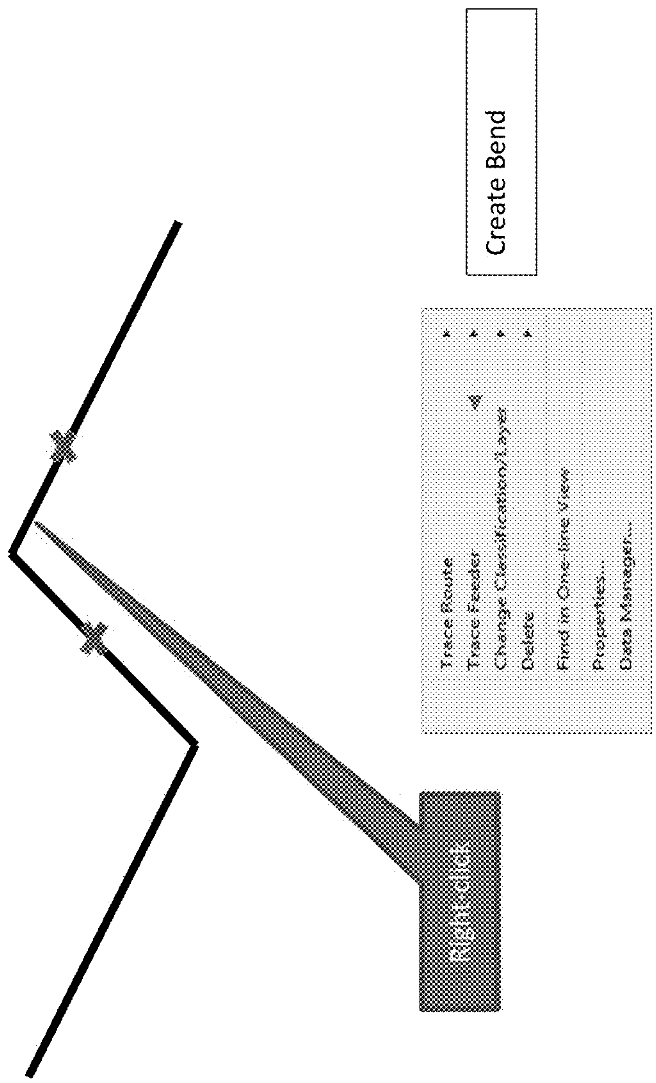
Figures 3, 31K:
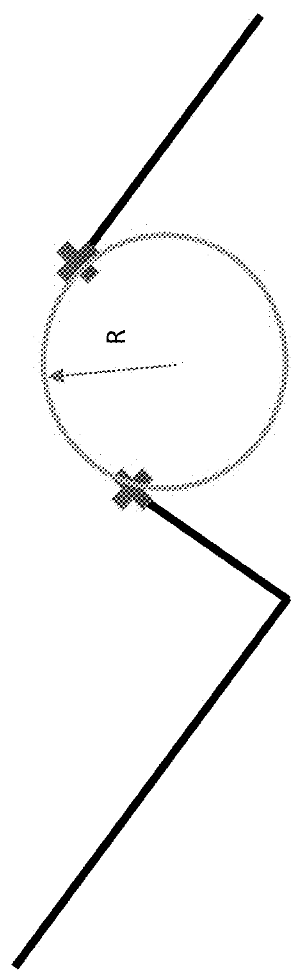

FIGS. 31K-1 to 31K-3 show an example embodiment of a creation process for track bends.

Figure 31L:
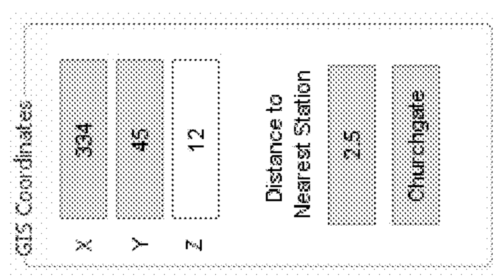

FIG. 31L shows an example embodiment of a GIS coordinates field which may be editable by users in a node editor.

Figure 32:
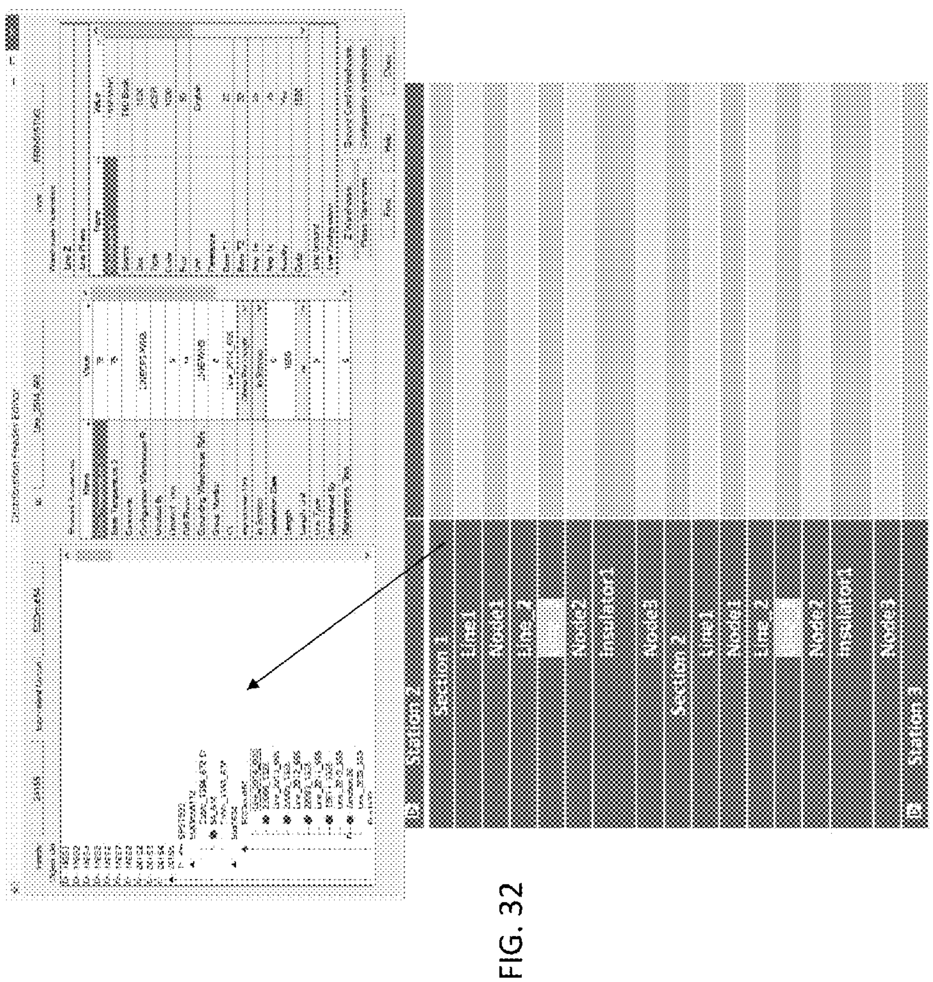

FIG. 32 shows an example embodiment of a line editor.

FIG. 33 shows an example embodiment of an SRS.

Figure 34A:
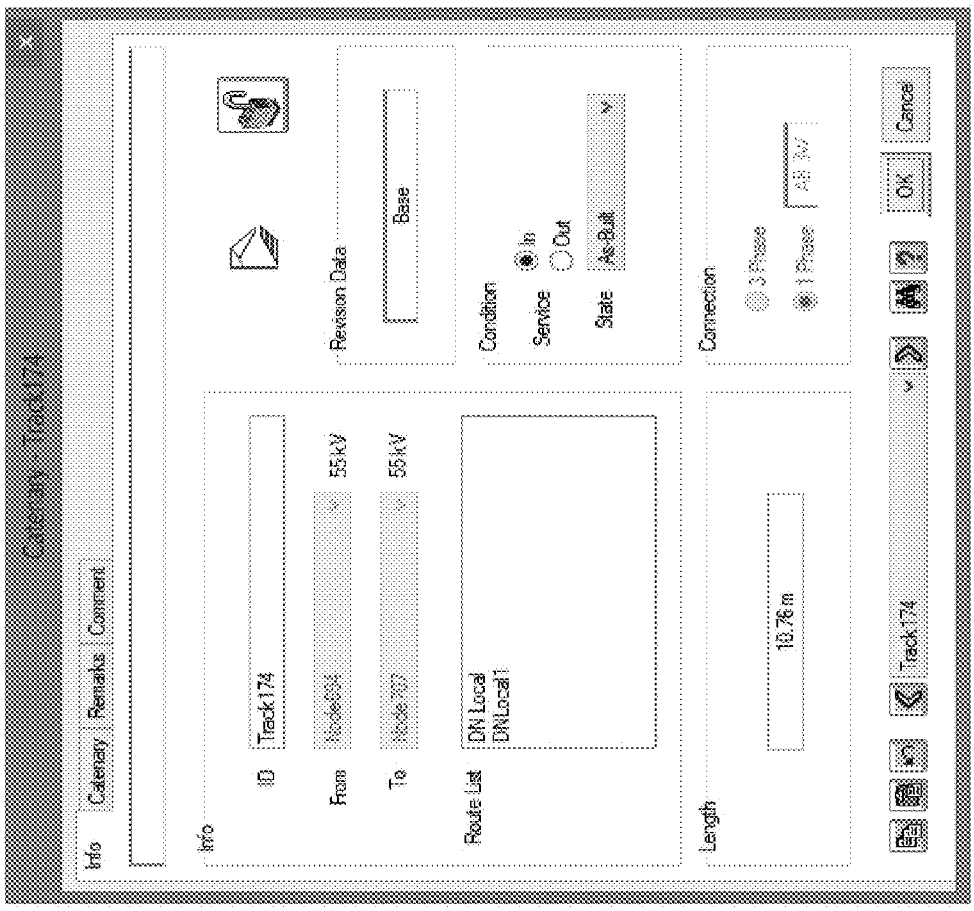

FIG. 34A shows an example embodiment of an overhead catenary editor.

Figure 34B:
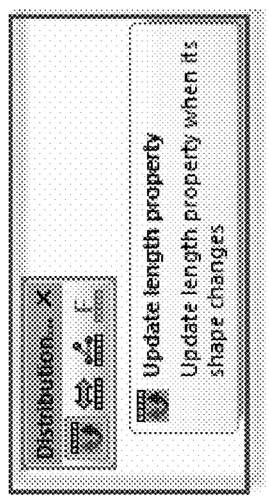

FIG. 34B shows an example embodiment of a user button allowing for updated measurements.

Figure 34C:
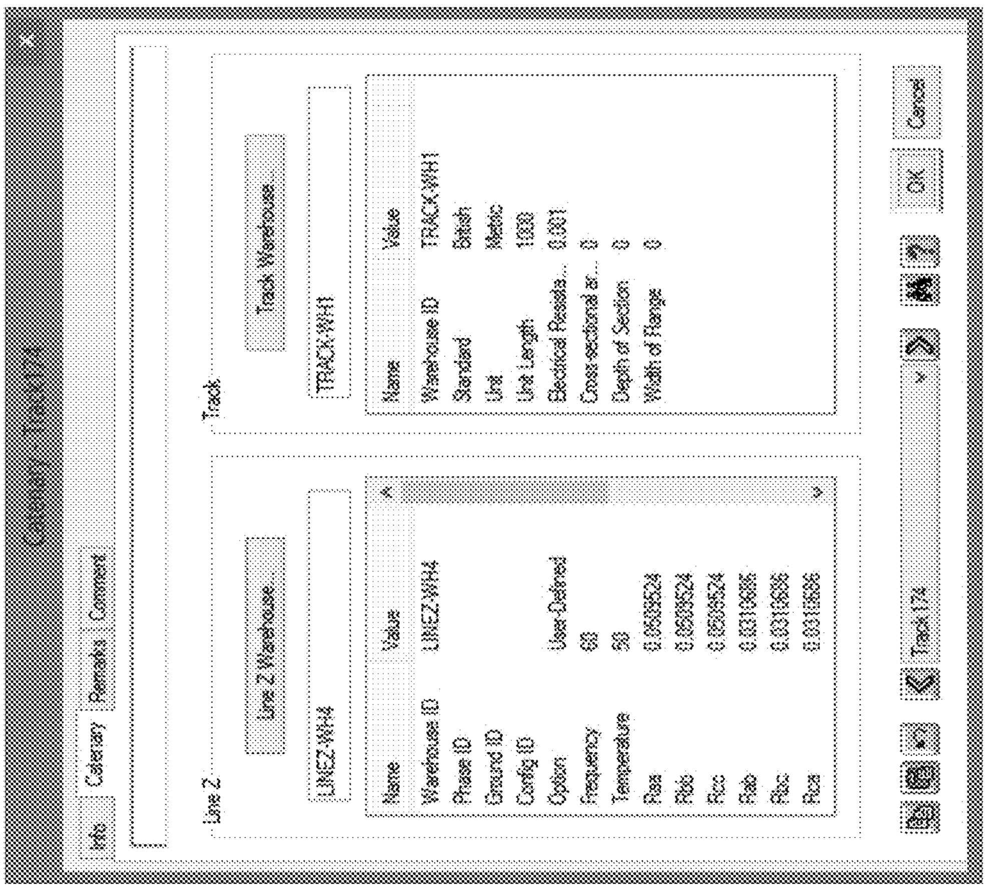

FIG. 34C shows an example embodiment of a catenary tab in the overhead catenary editor.

Figure 34D:
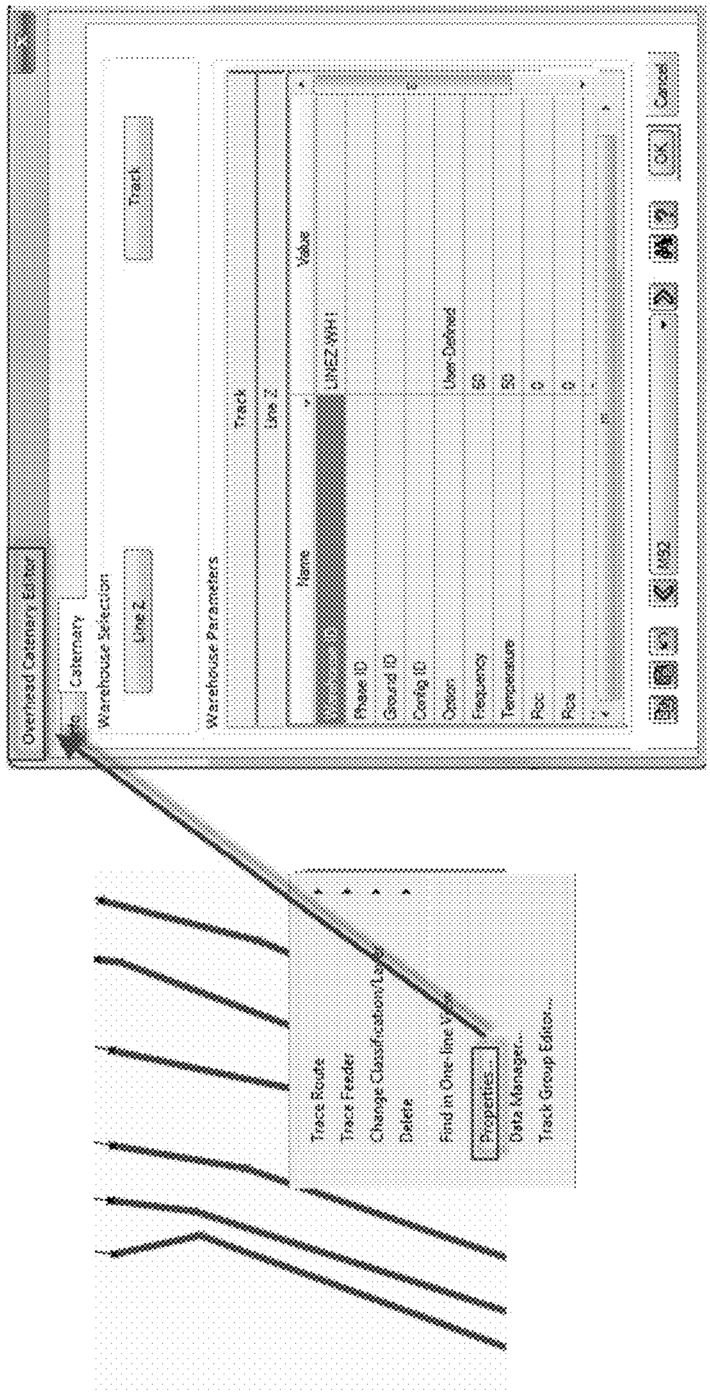

FIG. 34D shows an example embodiment illustrating an included capability to open properties for multiple tracks in the editor.

Figure 34E:
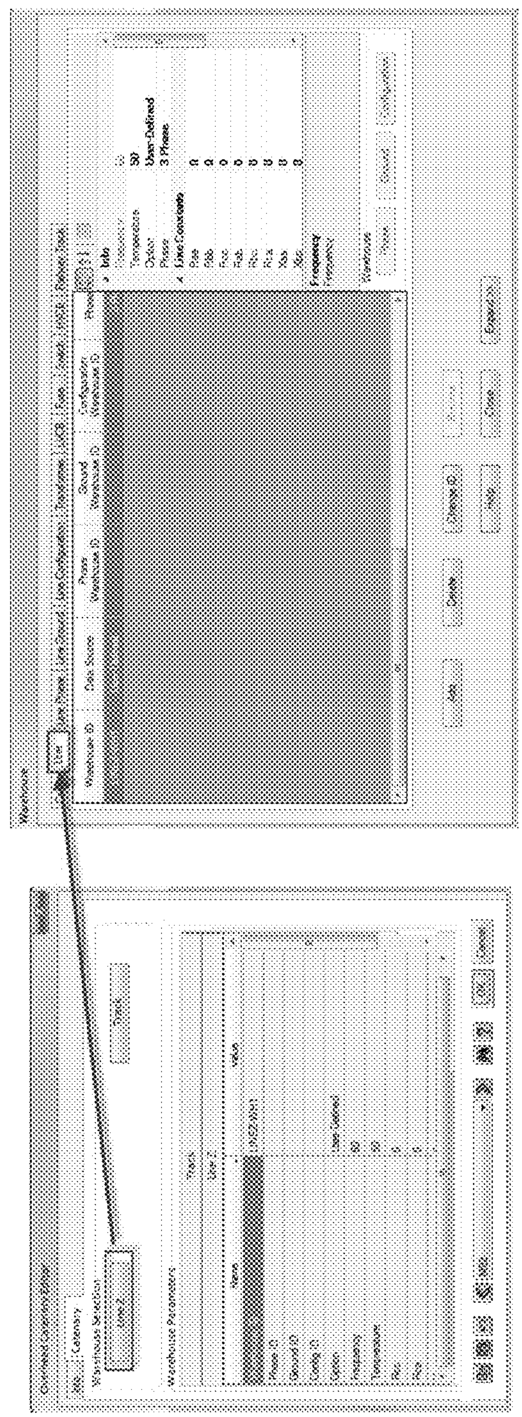

FIG. 34E shows an example embodiment of a warehouse selection screen.

Figure 34F:
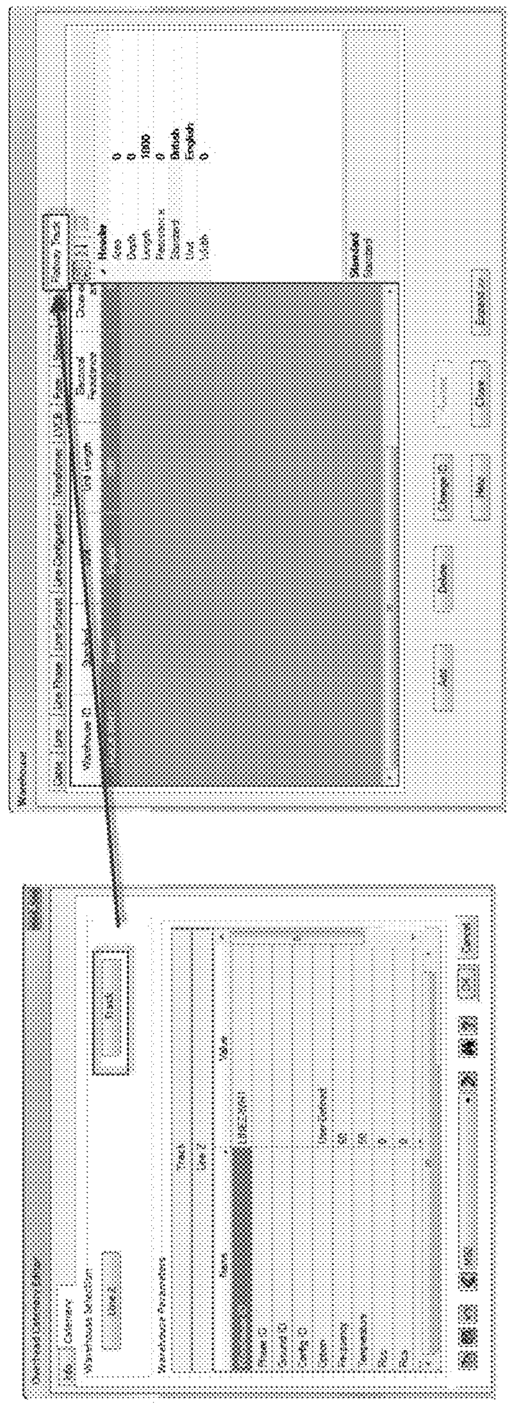

FIG. 34F shows an example embodiment of a track warehouse selection screen.

Figure 34G:
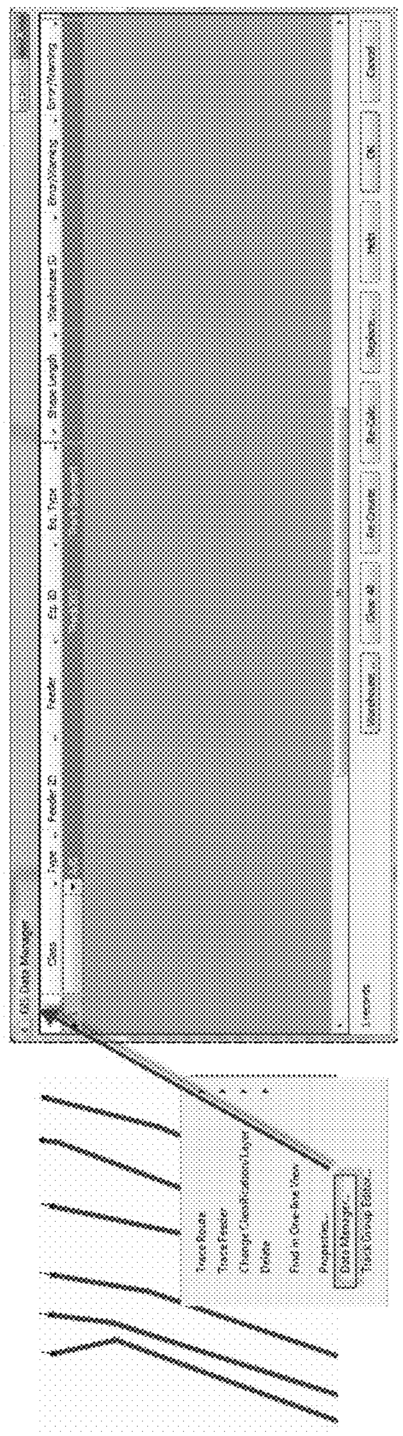

FIG. 34G shows an example embodiment of a data manager selection screen.

Figure 35:
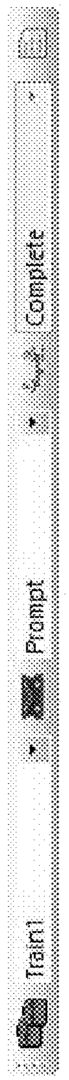

FIG. 35 shows an example embodiment of a study case toolbar.

Figure 36A:
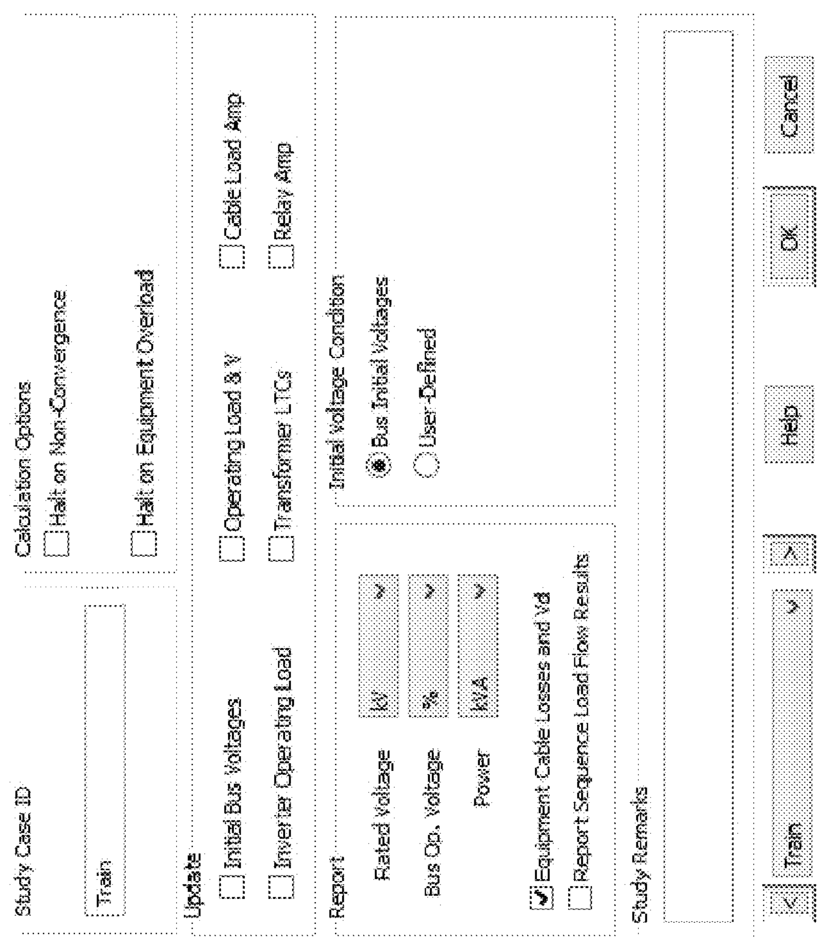

FIG. 36A shows an example embodiment of an information page for a study case.

Figure 36B:
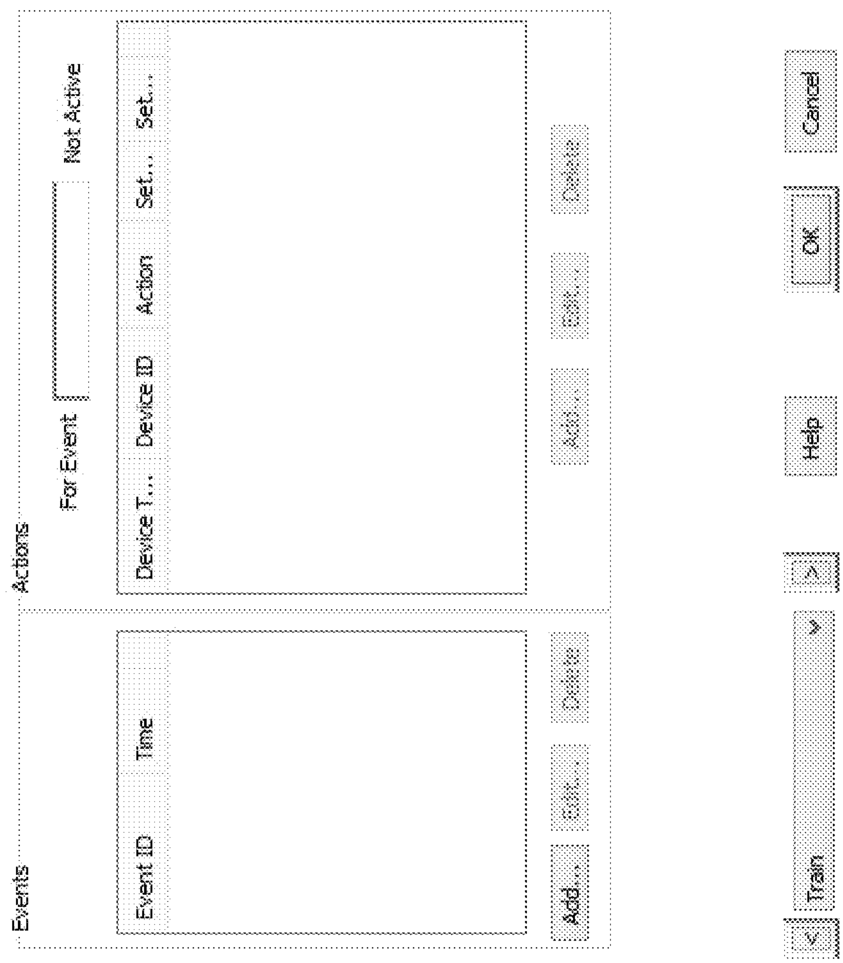

FIG. 36B shows an example embodiment of an events page.

Figure 36C:
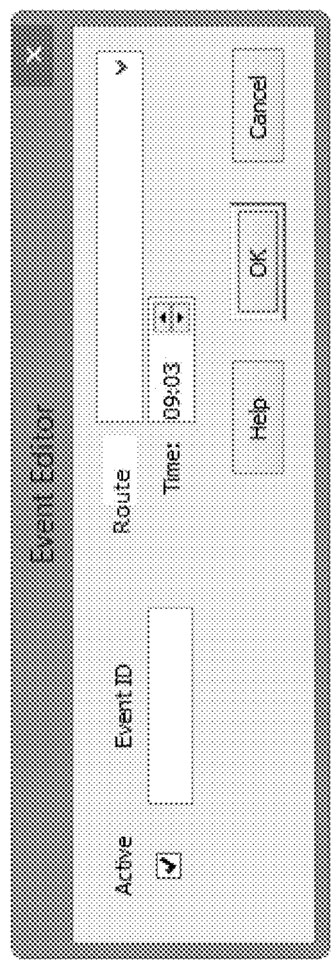

FIG. 36C shows an example embodiment event editor window.

Figure 36D:
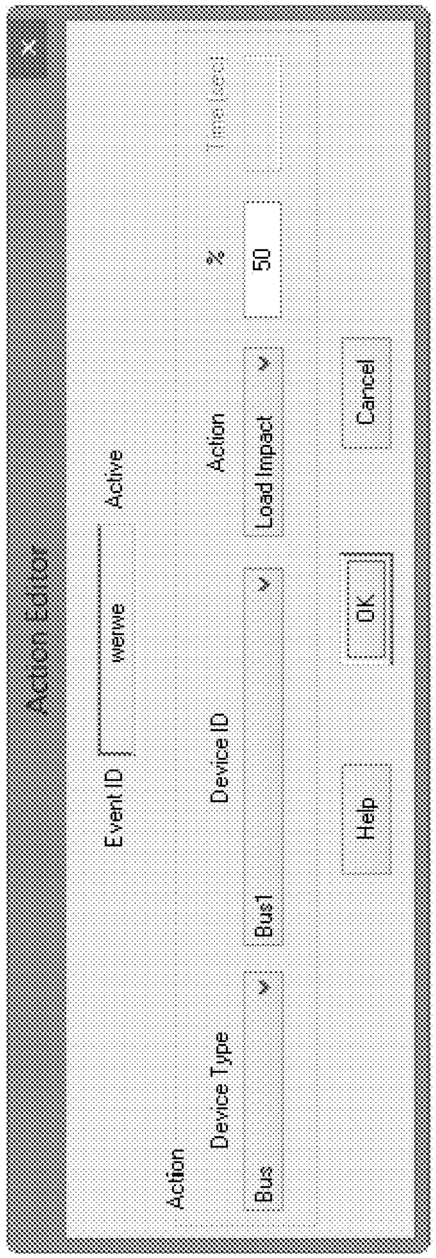

FIG. 36D shows an example embodiment of an action editor window.

FIG. 36E shows an example embodiment of many device types and actions.

Figure 36F:
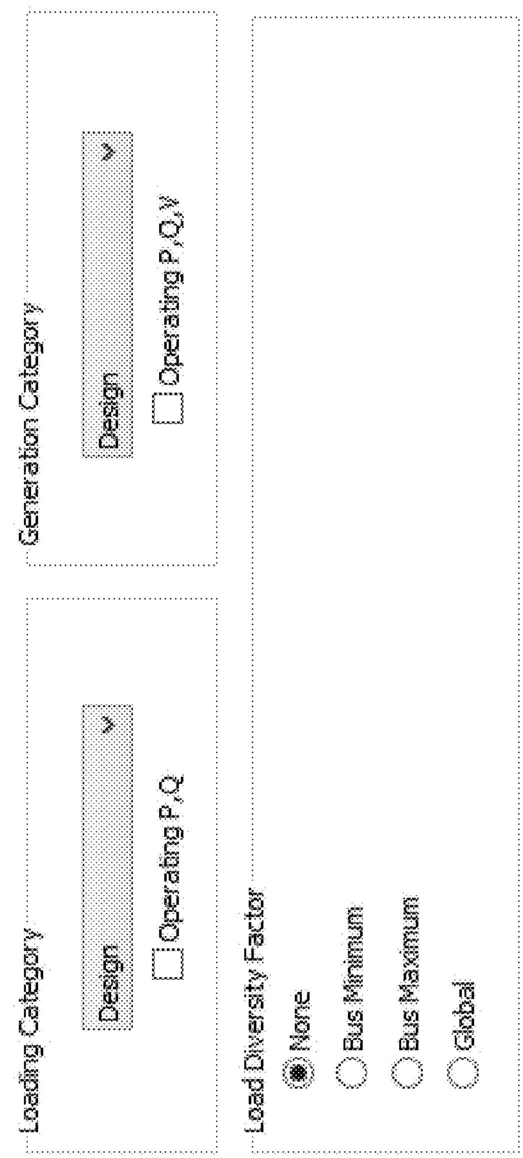

FIG. 36F shows an example embodiment of a loading page.

Figure 36G:
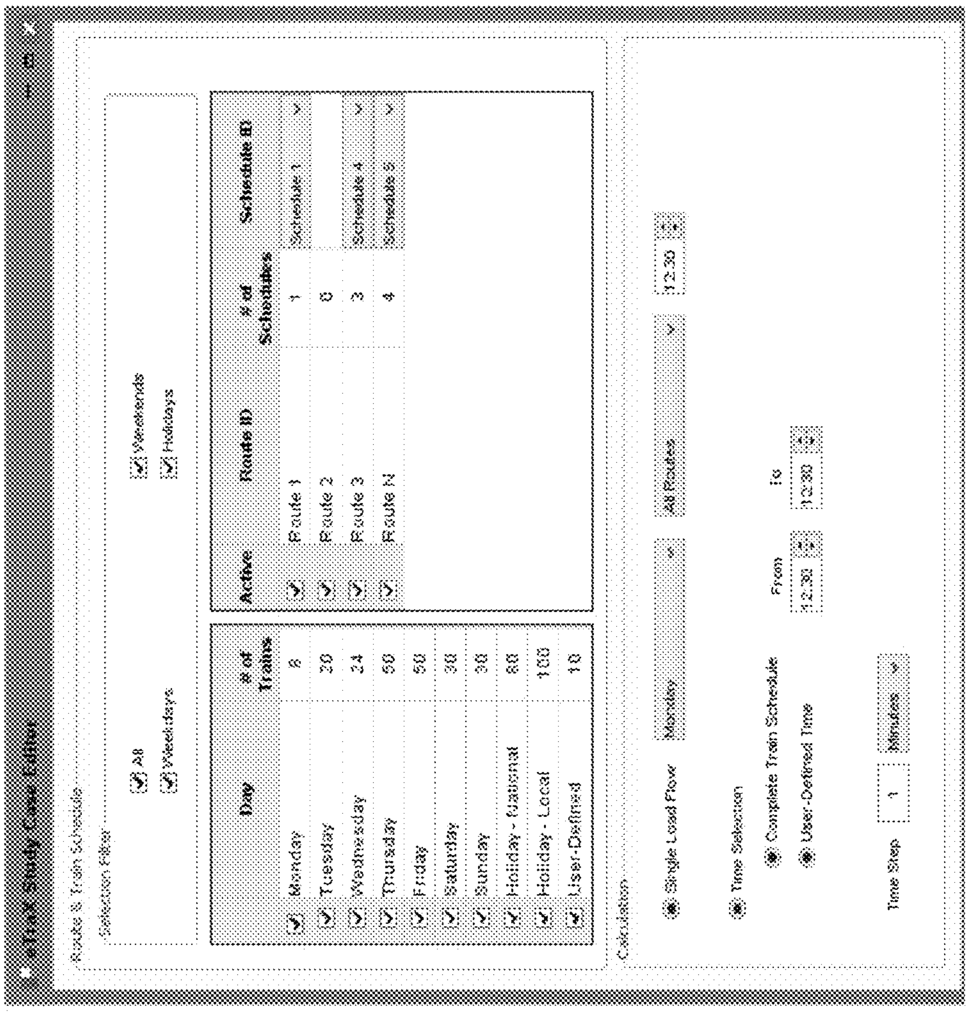

FIG. 36G shows an example embodiment of a train schedule page.

Figure 36H:
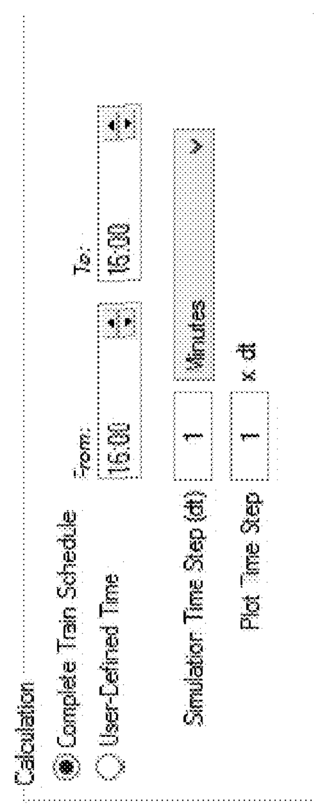

FIG. 36H shows an example embodiment of a calculation field.

Figure 36I:
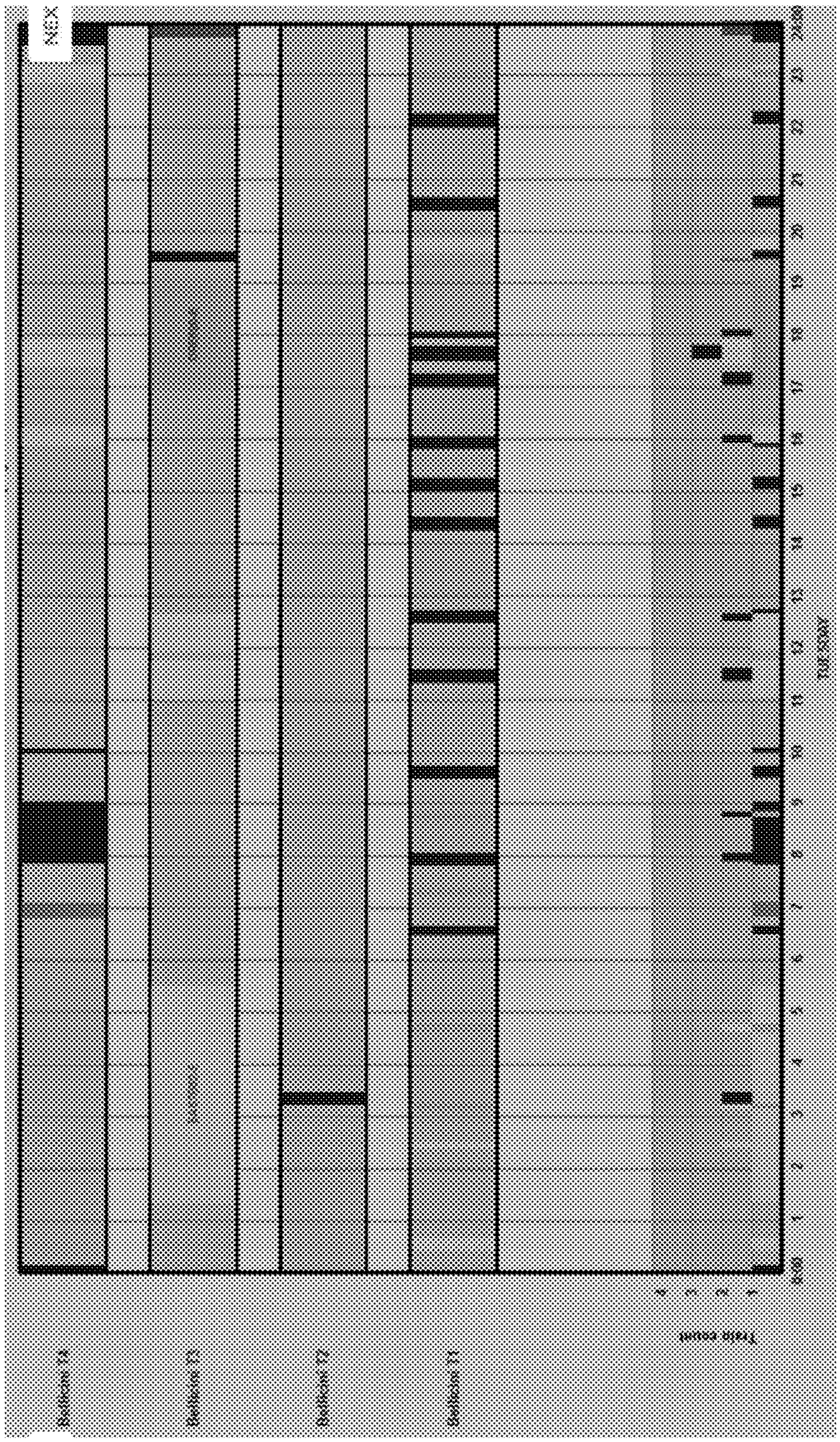

FIG. 36I shows an example embodiment of a route train schedule window with selection filters removed.

Figure 37:
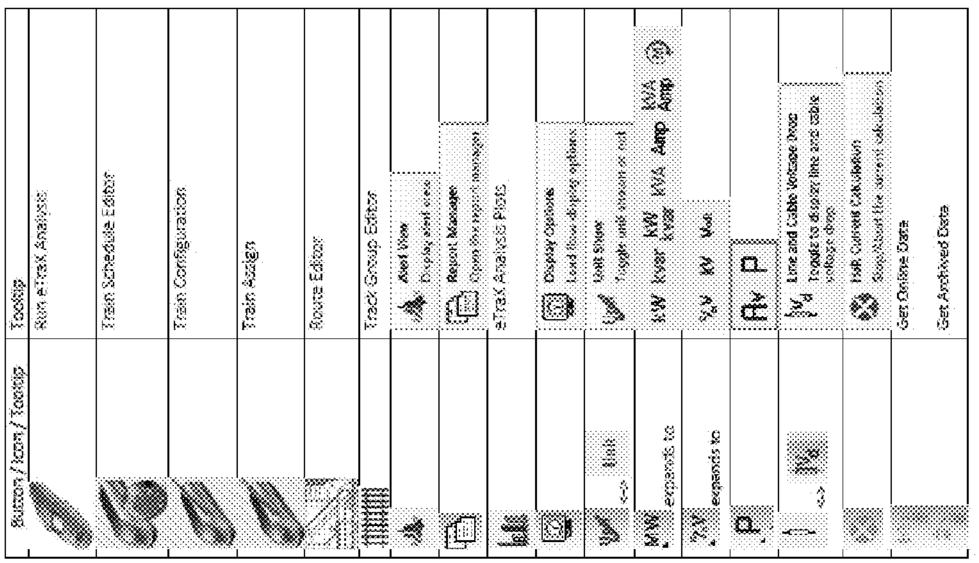

FIG. 37 shows an example embodiment of a study toolbar is shown with buttons and explanations.

Figure 38:
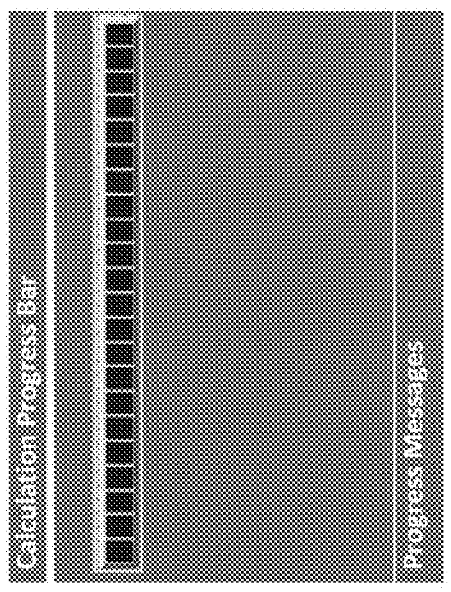

FIG. 38 shows an example embodiment of a calculation progress bar is shown which may also include progress messages to inform a user of operation progress.

Figure 39:
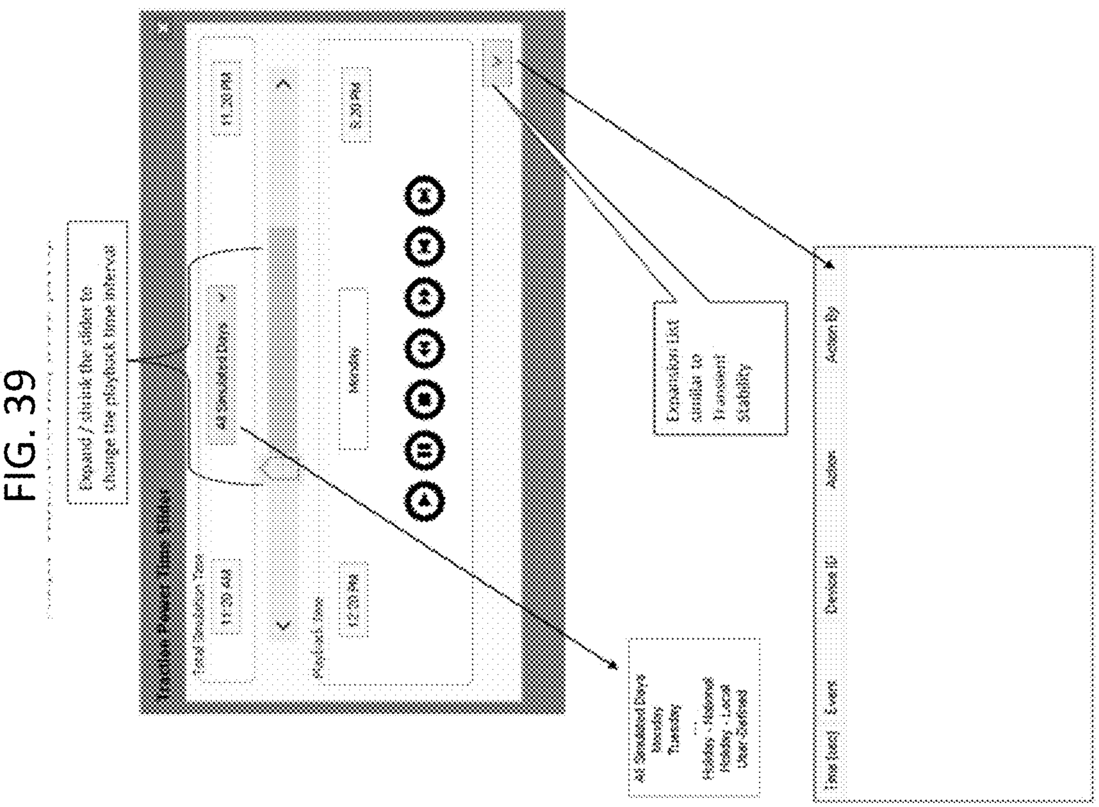

FIG. 39 shows an example embodiment of a traction power time slider.

Figure 40A:
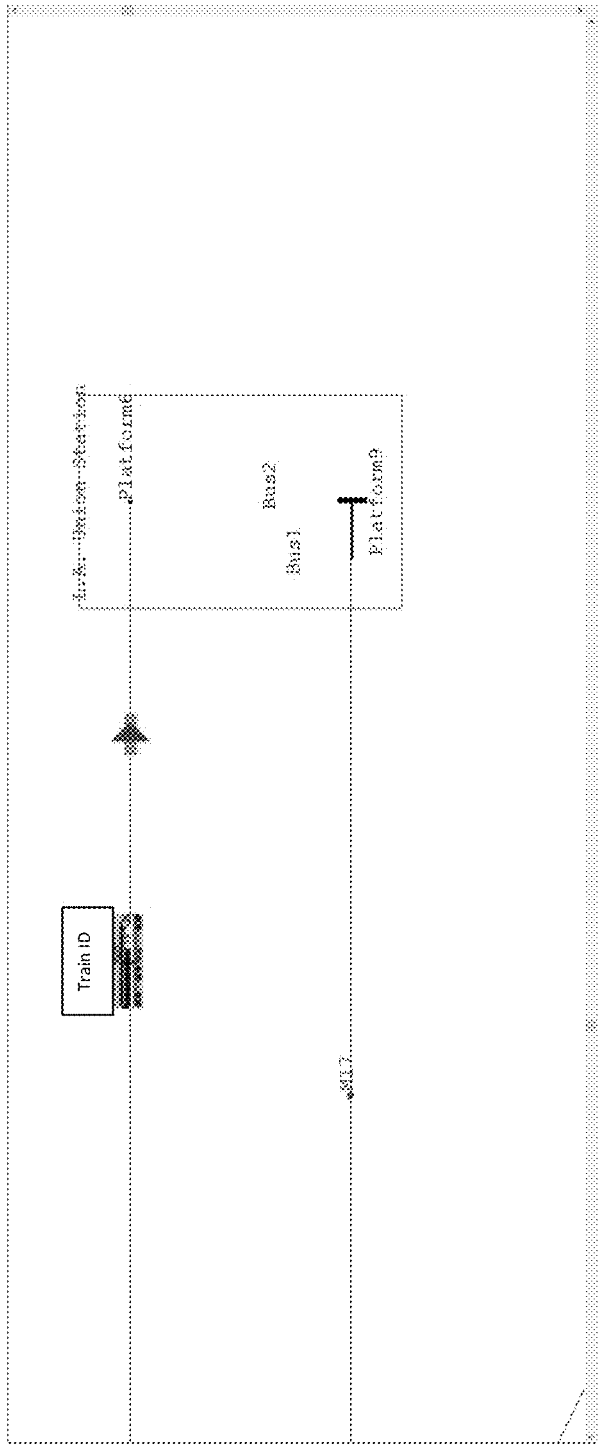

FIG. 40A shows an example embodiment of a train animation/dispatch animation.

Figure 40B:
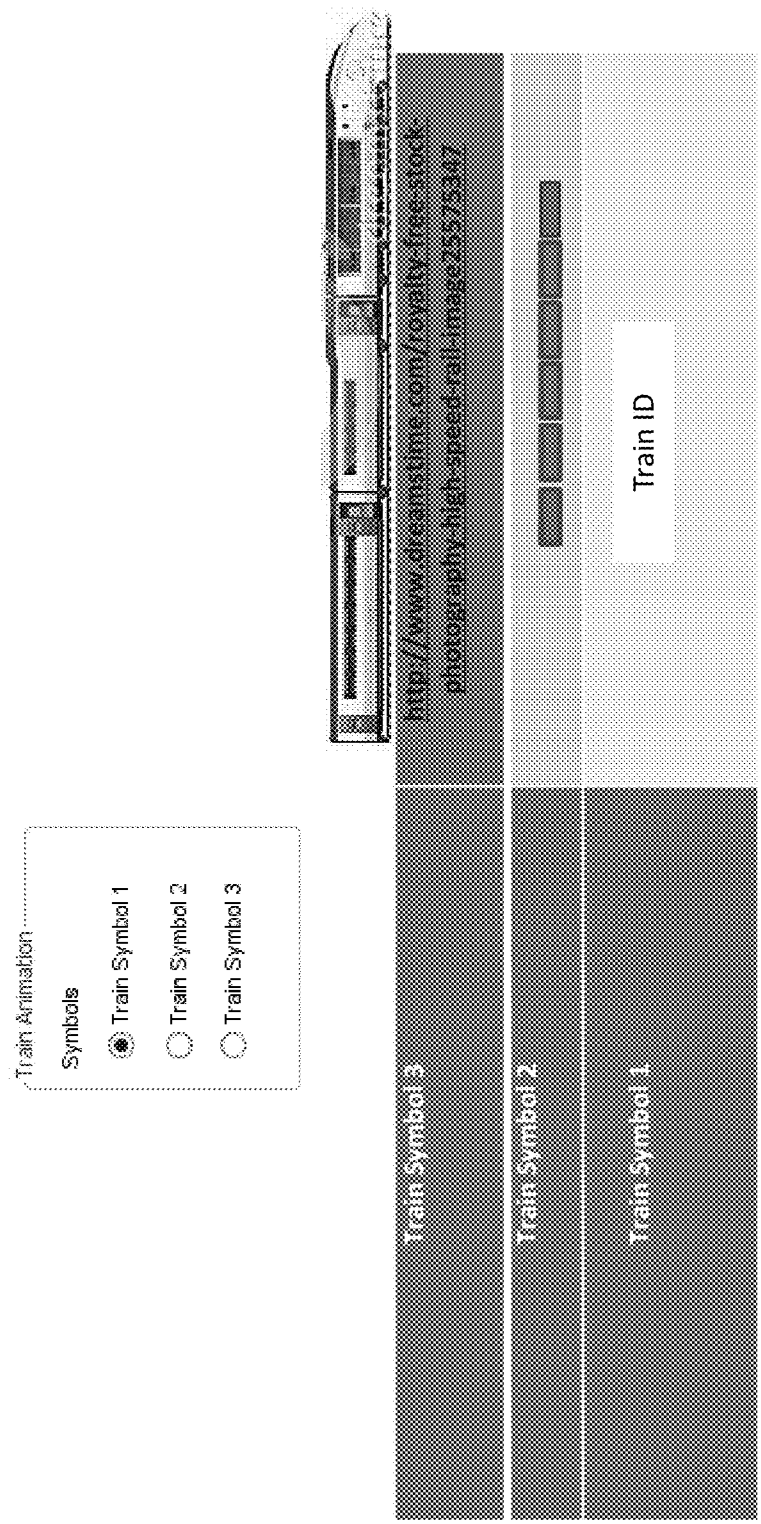

FIG. 40B shows an example embodiment of a train animation selection menu.

FIG. 40C shows an example embodiment of logic related to Train Symbol 2.

Figure 40E:
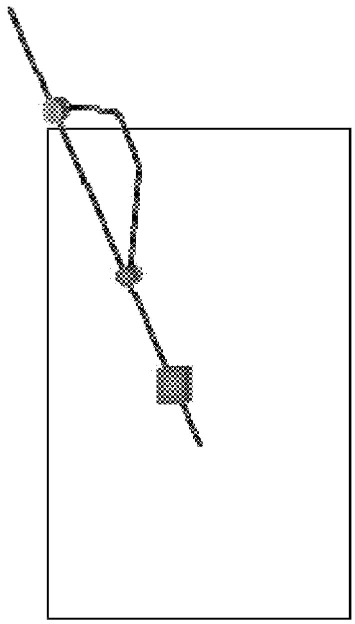
Figure 40D:
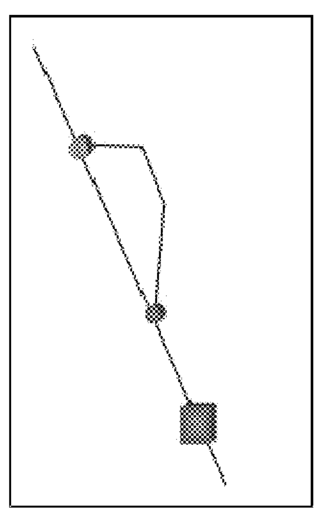

FIGS. 40D-40E shows an example embodiment of an animation diagram.

Figure 41A:
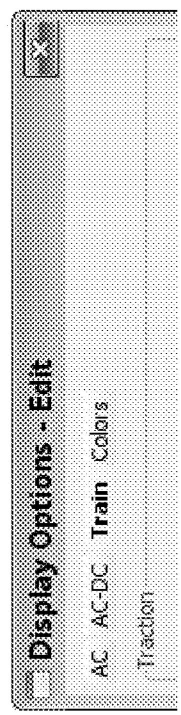

FIG. 41A shows an example embodiment of an OLV Display Options edit toolbar.

FIG. 41B shows an example embodiment of a display options matrix.

FIG. 41C shows an example embodiment of a study toolbar as shown in OLV.

Figure 41E:
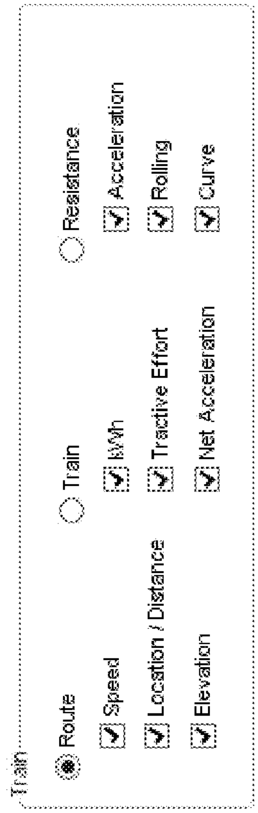
Figure 41D:
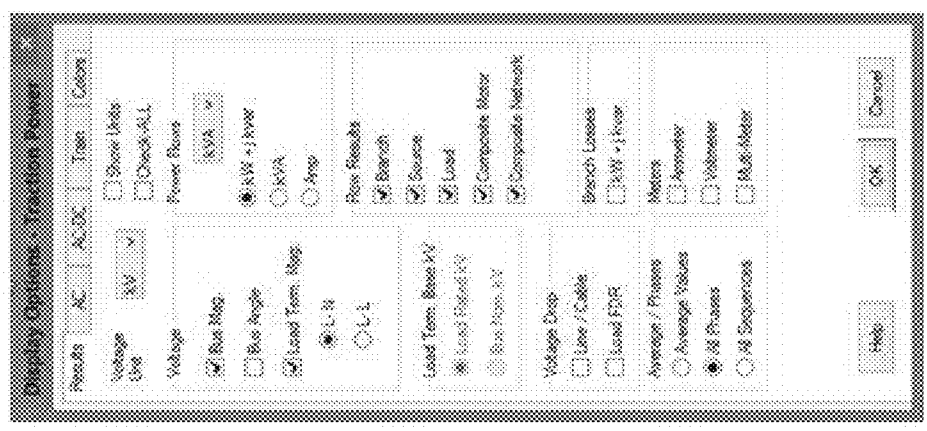

FIG. 41D shows an example embodiment of a Display Options—Traction Power window.

FIG. 41E shows an example embodiment of a Results page.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms “a”, “an”, and “the” include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

Figure 1A:
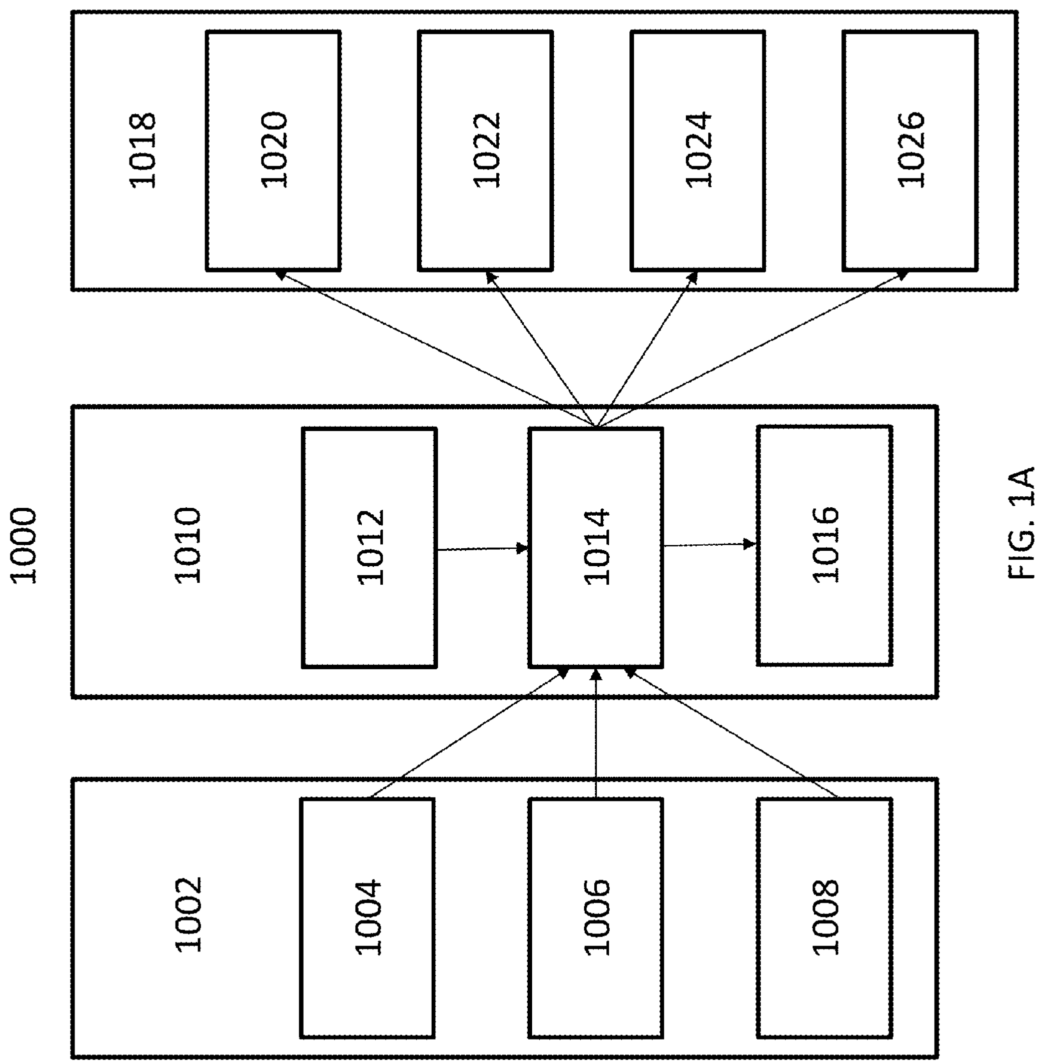
FIGS. 1A-1C show example embodiments of data flow diagrams in accordance with the present invention

Turning to FIG. 1A, an example embodiment of a data flow diagram in accordance with the present invention is shown.

FIG. 1A shows data flow diagram 1000 including input information 1002 regarding rolling stock 1004, infrastructure 1006, and timetable 1008*s*. Input information is then sent to a simulation section 1010. Simulation section 1010 includes interactivity 1012 which can include typical video and simulation interaction tools such as play, pause, stop, fast-forward, rewind and others including playback sliders (shown further in FIG. 39), simulation program 1014*s*, and animation 1016*s*. Simulation section 1010 may then create output information 1018. Output information 1018 may include reports including diagram 1020*s*, transportation graph 1022*s*, occupation 1024*s* (which can be graphs or other diagrams of which trains are located on which tracks and/or statistical representations of how many trains are on particular tracks and where at particular times), and statistic chart 1026*s*.

Figure 1B:
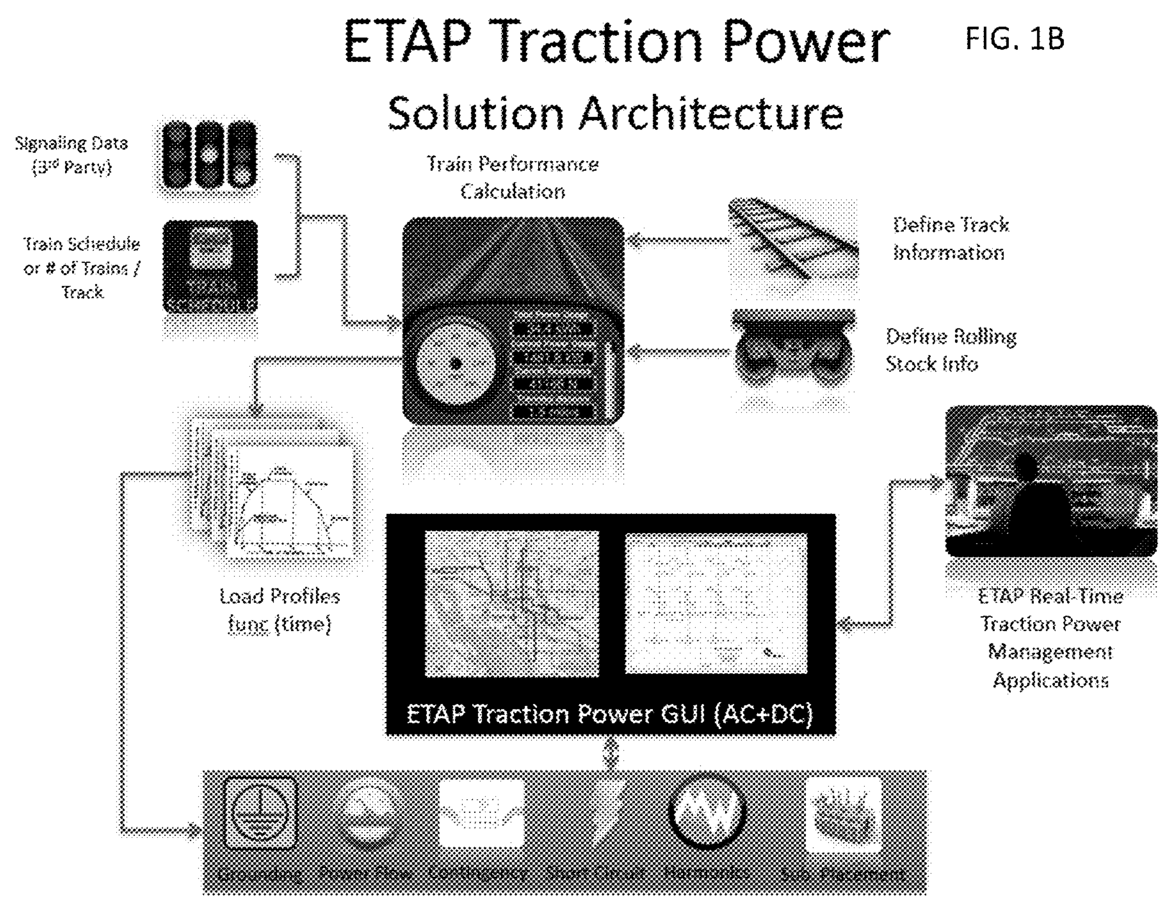

FIG. 1B shows another example embodiment of a system. In the example embodiment third party signaling data (such as speed limits and others), train schedule information, track definition information (such as elevation, bends, environmental conditions and others) and rolling stock information (such as weight, length, aerodynamics and other train specific information) can be inputs to train performance calculations. Train performance calculations can then output load profiles as a function of time. Load profiles can also be understood as mechanical profiles. Load profiles can be used by electrical calculation block to determine what demand exists on the electrical side to meet the mechanical demands of the system. Traction power GUI (for both AC and DC current) may exchange information with both electrical calculation block and Real-time fraction power management applications.

Figure 1C:
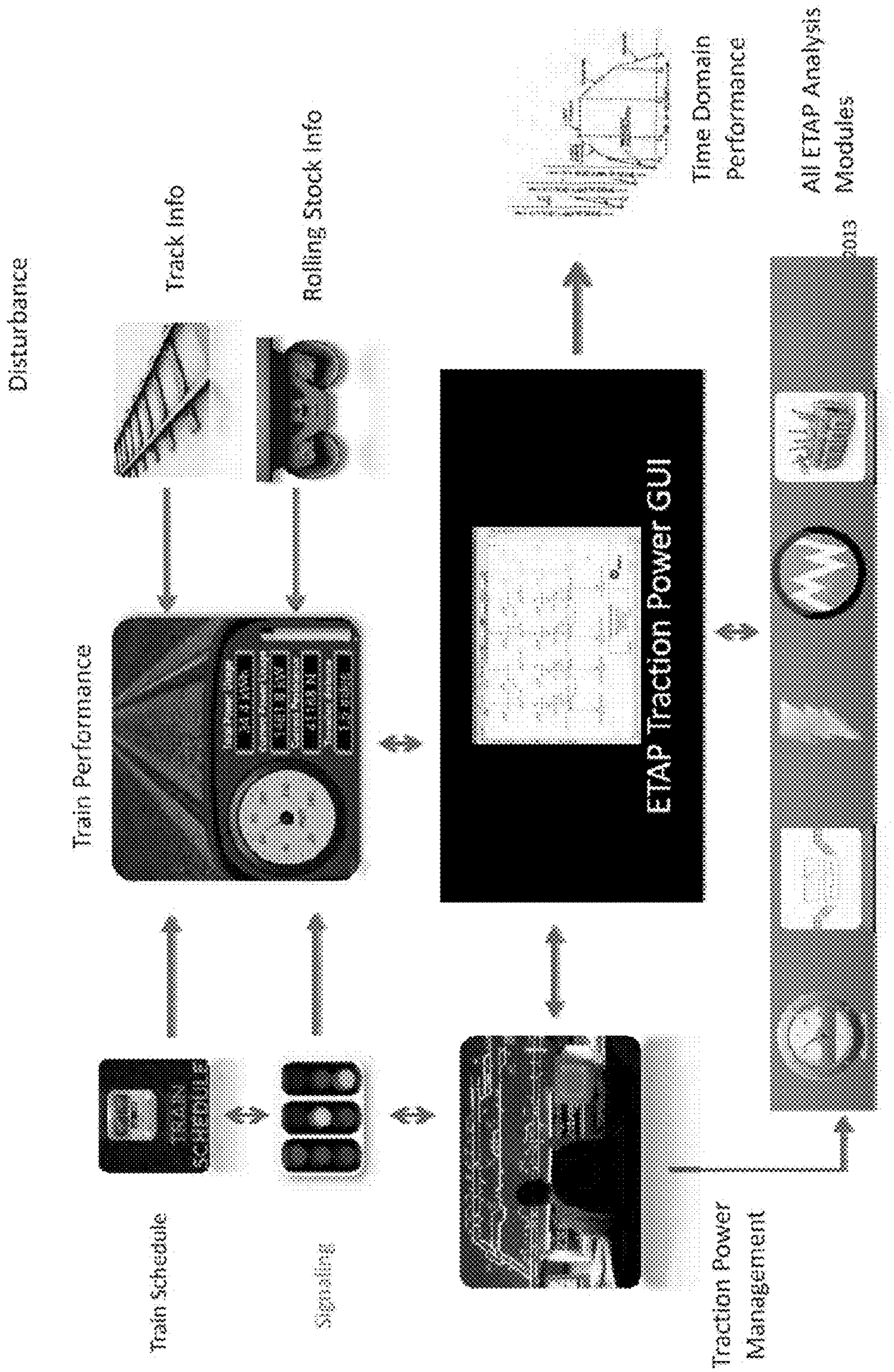

FIG. 1C shows another example embodiment of the system. In the example embodiment track information, rolling stock information, signaling and train schedule information as well as information from fraction power GUI can be inputs to train performance. Additionally, train schedule information and signaling can communicate with each other. Train performance may send information to fraction power GUI which can also exchange information from fraction power management and electrical calculation block. Traction power management block can send information to electrical calculation block. Traction power GUI can output time domain performance calculation information.

Figure 2:
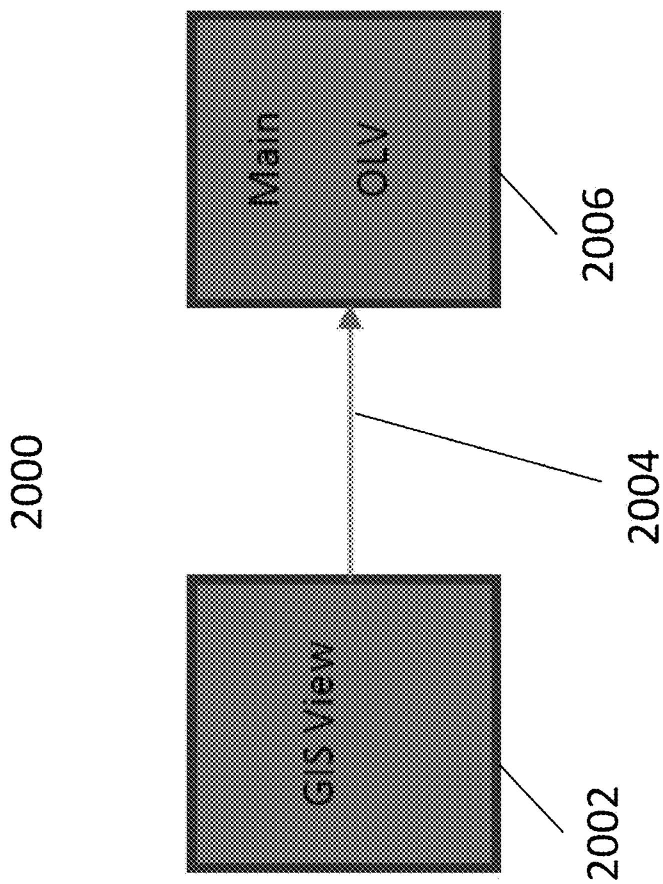
FIG. 2 shows an example embodiment of data created in GIS travelling to OLV to create an electrical circuit representation.

FIG. 2 shows an example embodiment of data flow in the system. In the example embodiment, data imported into Geographic Information Systems (GIS) View 2002 may be synchronized into an electrical circuit representation in One Line View (OLV) 2006. OLV typically does not require a distribution network composite to be created.

In some embodiments GIS View can be associated with only one Associated OLV at a time. In many embodiments associations can be changed since the only common component is the track and its included devices. Associated OLV’s can be changed in some embodiments. In some embodiments GIS View can be associated with a plurality of OLV’s at one time.

Figure 3A:
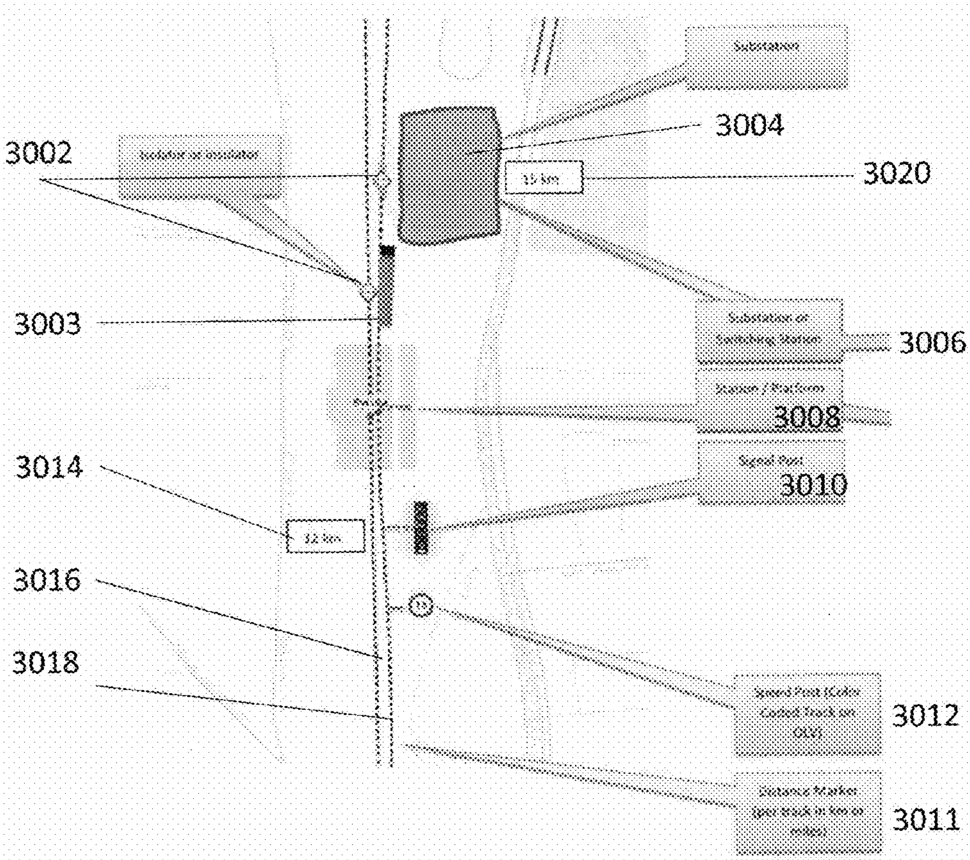
FIG. 3A shows an example embodiment of a GIS with associated components in accordance with the present invention.

FIG. 3A shows an example embodiment of a GIS View 3000 with associated components in accordance with the present invention. In the example embodiment various components are shown including Isolator or insulator 3002 (which can be a break in an overhead wire), train 3003, substation 3004, Substation or switching station 3006, Station/platform 3008, Signal post 3010, Distance marker 3011, Speed post 3012, first speed 3014, first track 3016, second track 3018, second speed 3020 and others. In the example embodiment additional geographic details are also shown such as roads, parks, and other topographical features. Speed post 3012 may appear as a color coded track in OLV. Distance marker 3011 may be included on a per track basis and may show different units of measurement based on local custom (such as kilometers or miles) and in some embodiments may be toggled or switched between units of measurement as appropriate.

Figure 3B:
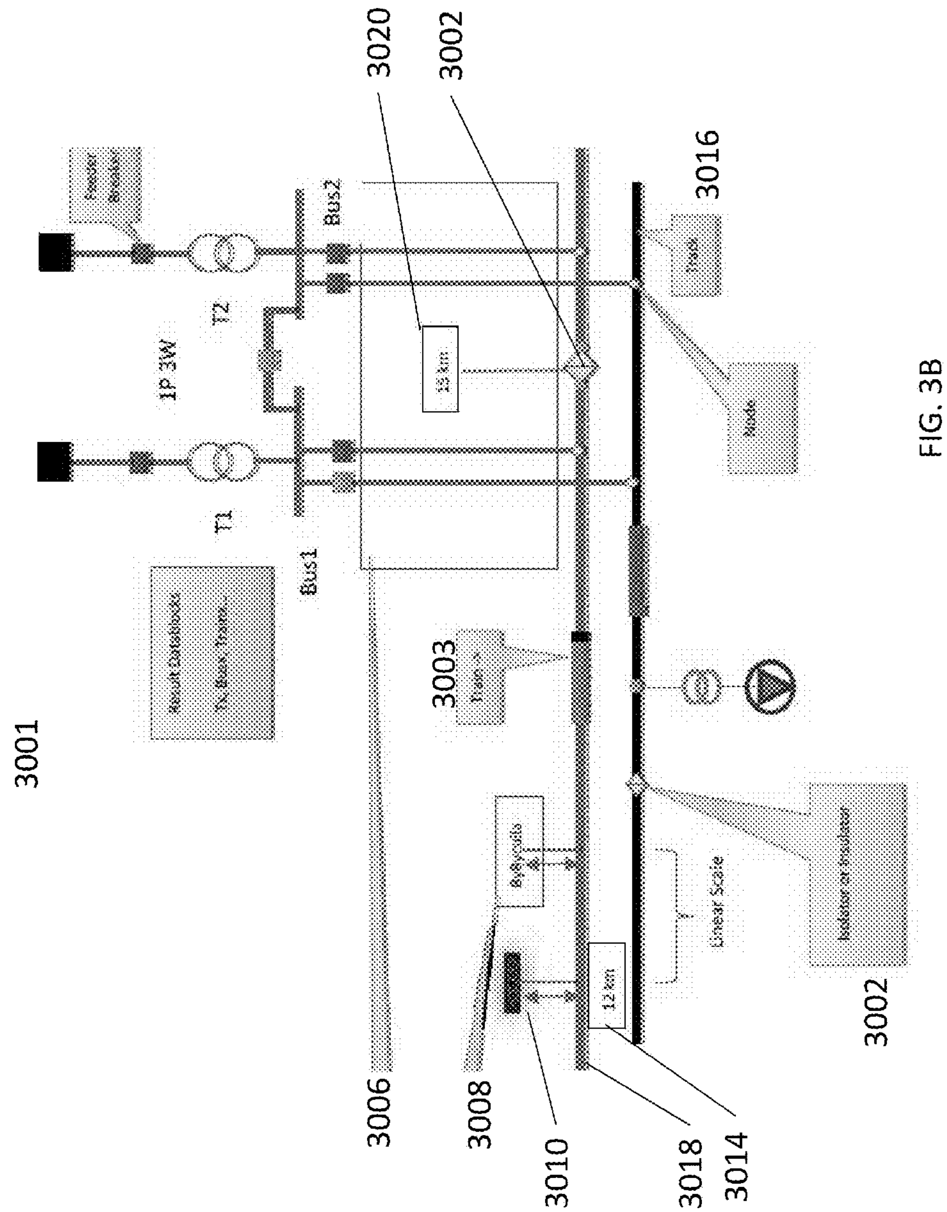
FIG. 3B shows an example embodiment of an OLV with the same associated components shown in FIG. 3A and how the components are represented in OLV in accordance with the present invention.

FIG. 3B shows an example embodiment of an OLV 3001 with the same associated components shown in FIG. 3A and how the components are represented when they appear in OLV in synchronization with FIG. 3A.

Figure 3C:
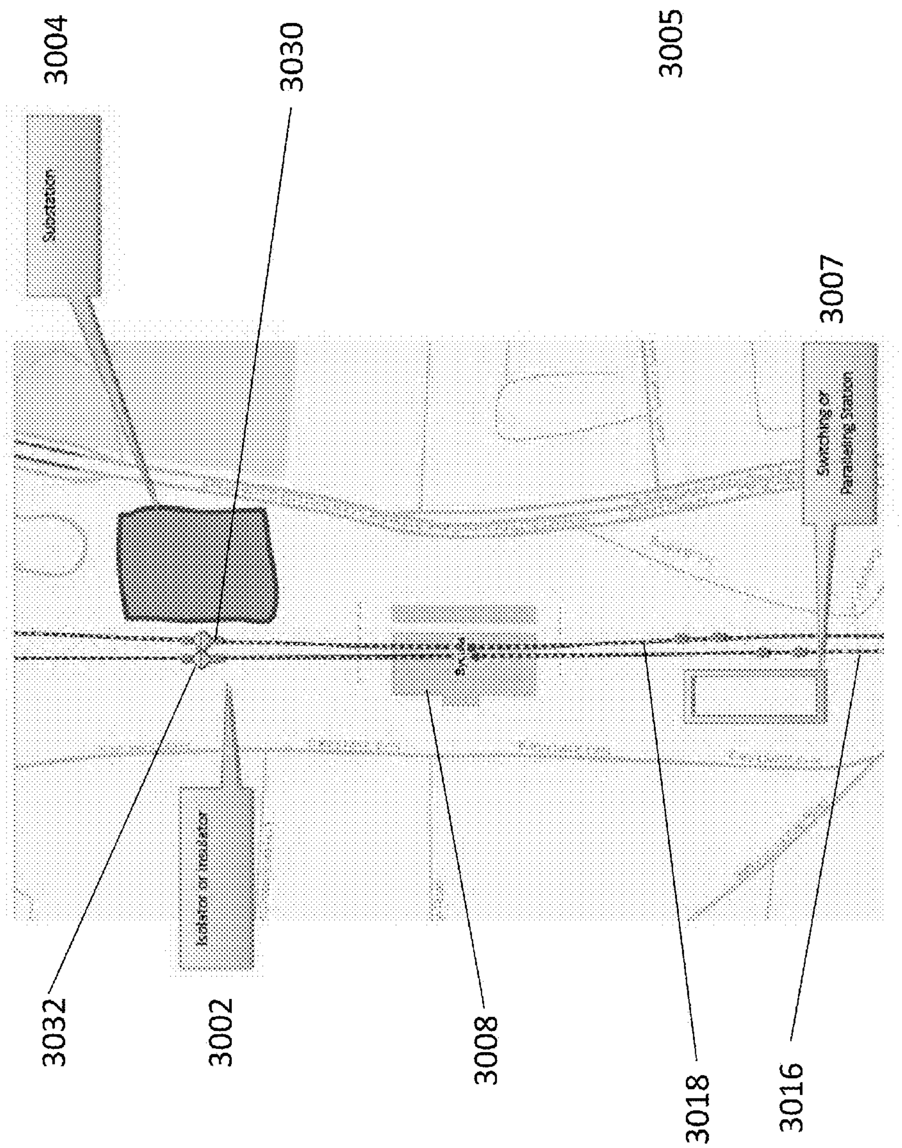
FIG. 3C shows an example embodiment of a GIS showing switching and other substations in accordance with the present invention.

FIG. 3C shows another example embodiment of a GIS 3005 showing switching and other substations in accordance with the present invention. In the example embodiment a GIS View 3005 with associated components. In the example embodiment various components are shown including Isolator or insulator 3030, 3032 (which can be a break in an overhead wire), substation 3004, Substation or paralleling station 3007, Station/platform 3008, first track 3016, second track 3018, and others. In the example embodiment additional geographic details are also shown such as roads, parks, and other topographical features.

Figure 3D:
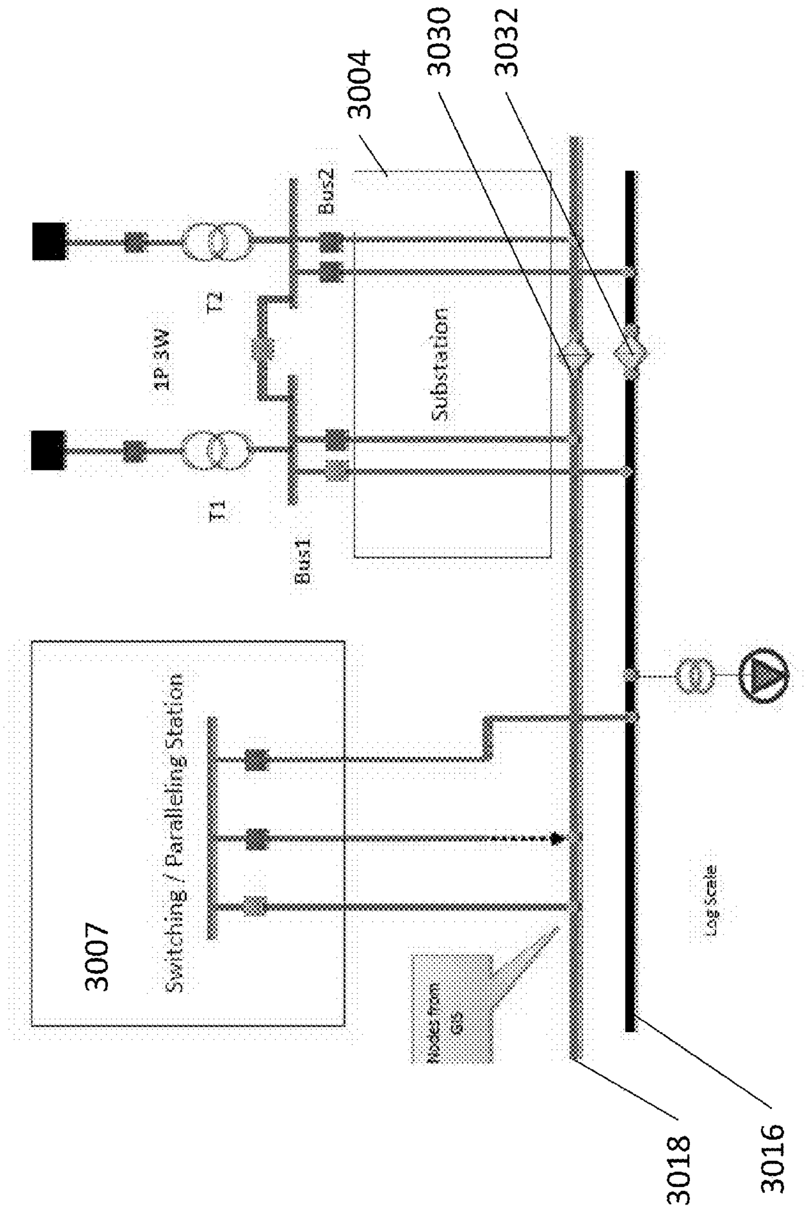
FIG. 3D shows an example embodiment of an OLV with the same associated components shown in FIG. 3C and how the components are represented in OLV in accordance with the present invention.

FIG. 3D shows an example embodiment of an OLV with the same associated components shown in FIG. 3C and how the components are represented in OLV.

Figure 3E:
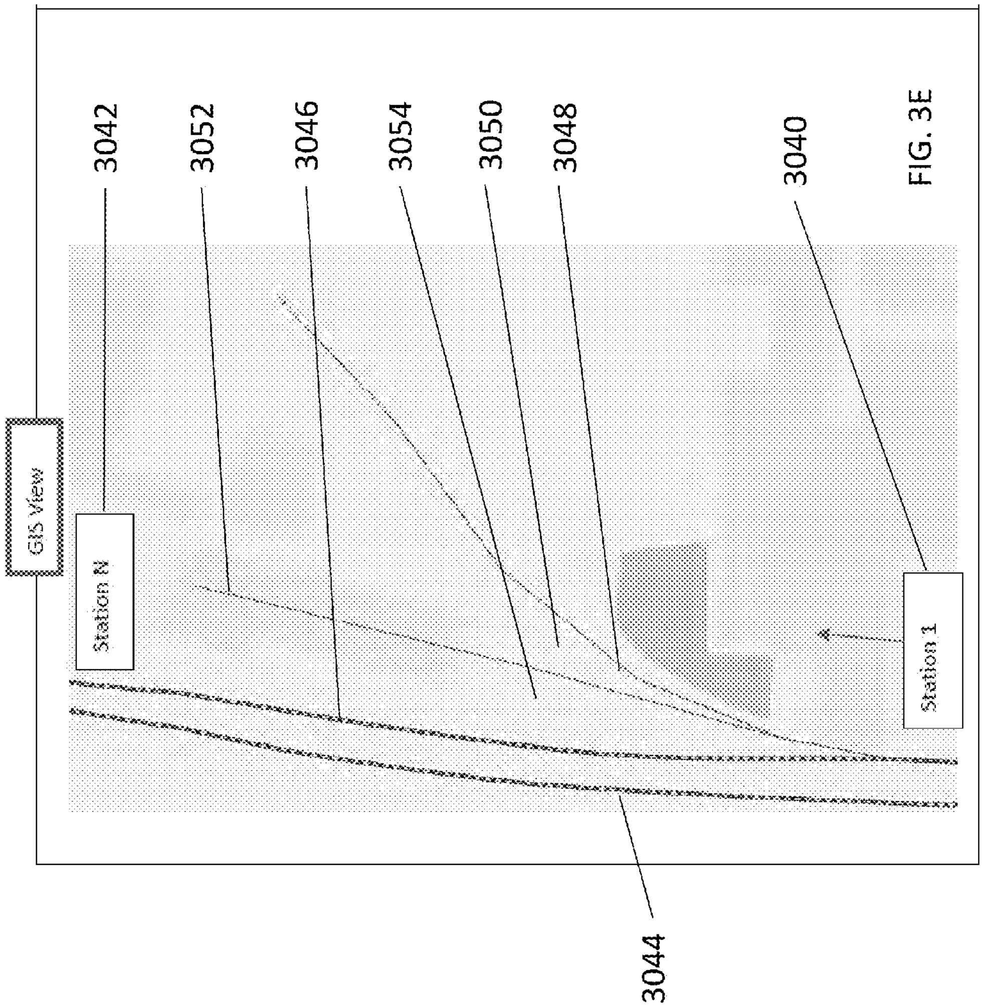
FIG. 3E shows an example embodiment of a GIS with a station and associated tracks in accordance with the present invention.

FIG. 3E shows an example embodiment of a geospatial GIS View with a station and associated tracks in accordance with the present invention. In the example embodiment track 3044 is shown with no branches. Track 3046 is shown with Station-1 040 at one end and Station-N 3042 at the other end. Track 3046 branches into subtrack 3052 with angle 3054 between track 3046 and subtrack 3052. Subtrack 3052 further branches into subtrack 3048 with angle 3050 between subtrack 3052 and subtrack 3048.

Figure 3F:
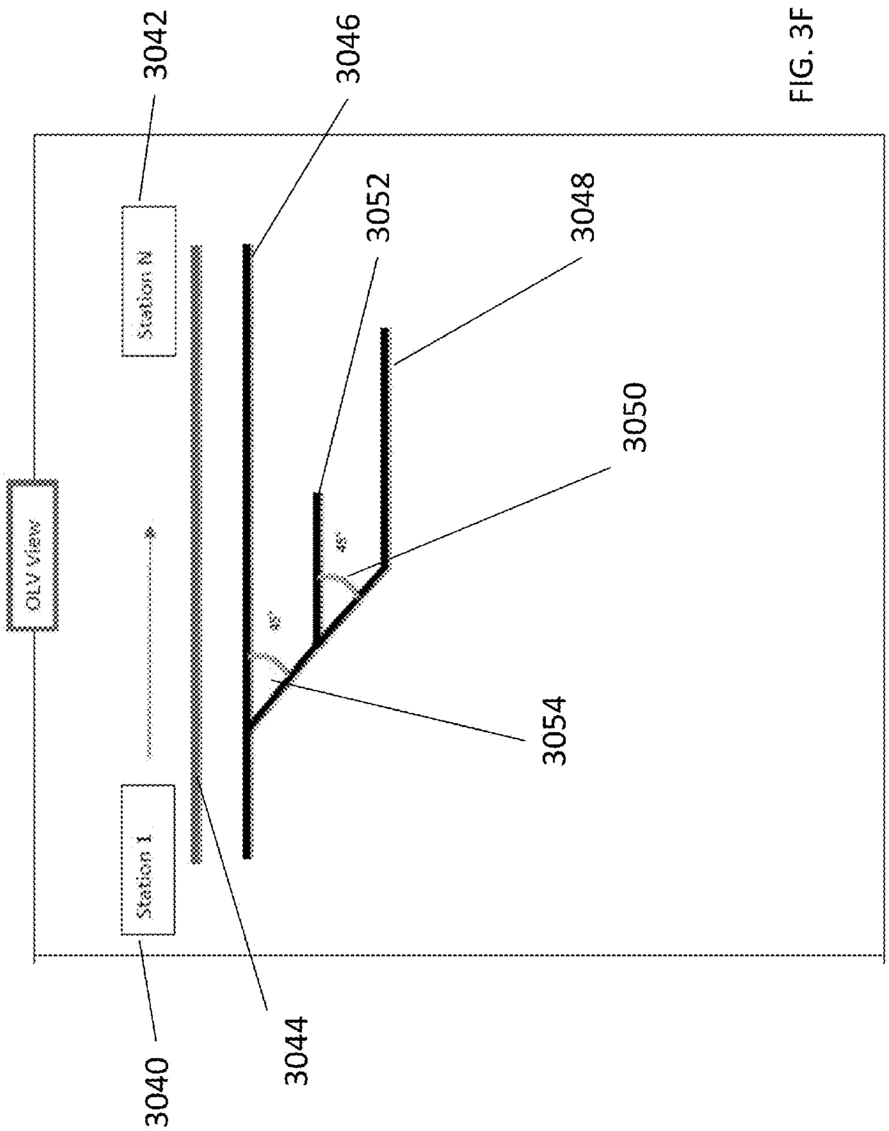
FIG. 3F shows an example embodiment of an OLV with the same associated components shown in FIG. 3E and how the components are represented in OLV in accordance with the present invention.

FIG. 3F shows an example embodiment of an OLV with the same associated track, subtrack, and angle components shown in FIG. 3E and how the components are represented in. In the example embodiment angles shown in OLV may not match exactly with those from GIS view, as shown in the example embodiment in FIG. 3E. Standardized angles such as the forty-five degree angles of 3054, 3050 can help user readability in OLV.

Figure 3G:
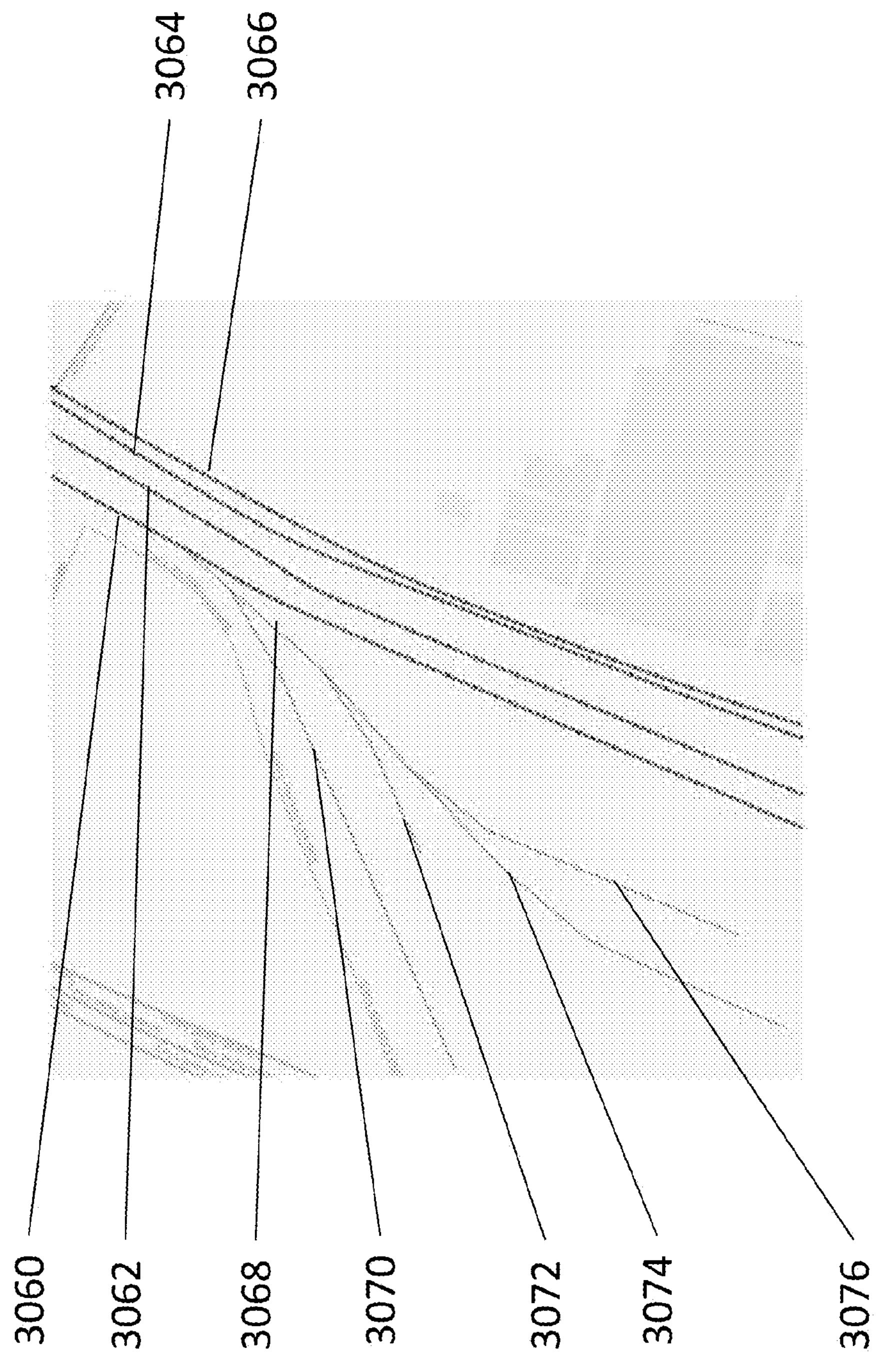
FIGS. 3G and 3H show an example embodiment of a side-by-side view of diagrams of tracks in GIS and OLV respectively.
Figure 3H:
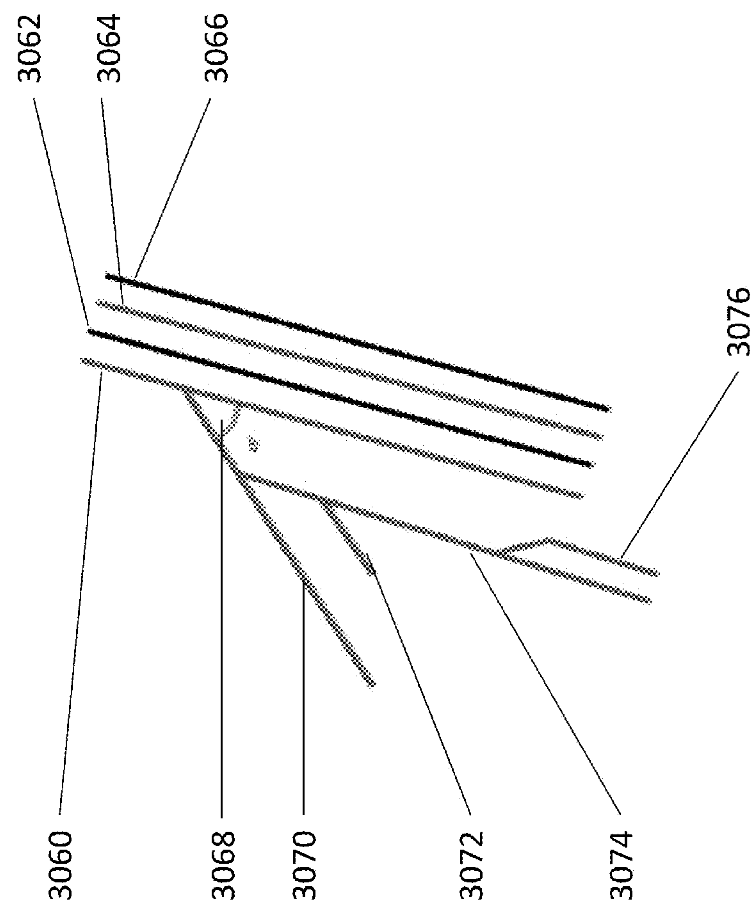

FIGS. 3G and 3H show an example embodiment of a side-by-side view of diagrams of tracks in GIS View and OLV respectively. FIGS. 3G and 3H are more complicated track branching areas than those shown in FIGS. 3E and 3F. Parallel tracks 3066, 3064, 3062, and 3060 are shown in each figure. Also shown are angle 3068 which represents the branching angle of track 3070. 3072 branches off 3074 which branches off 3070 and 3076 branches off 3074.

Figure 3I:
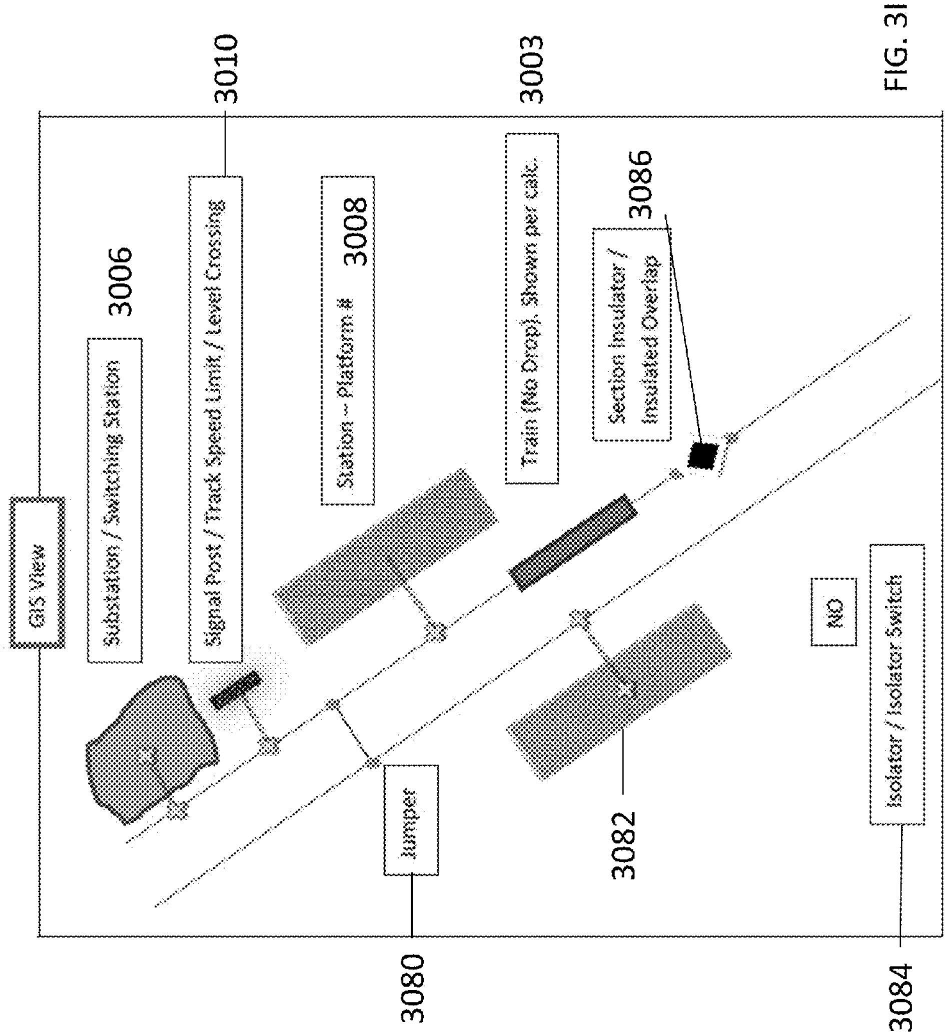
FIGS. 3I and 3J show an example embodiment of diagrams of components in GIS and OLV respectively.
Figure 3J:
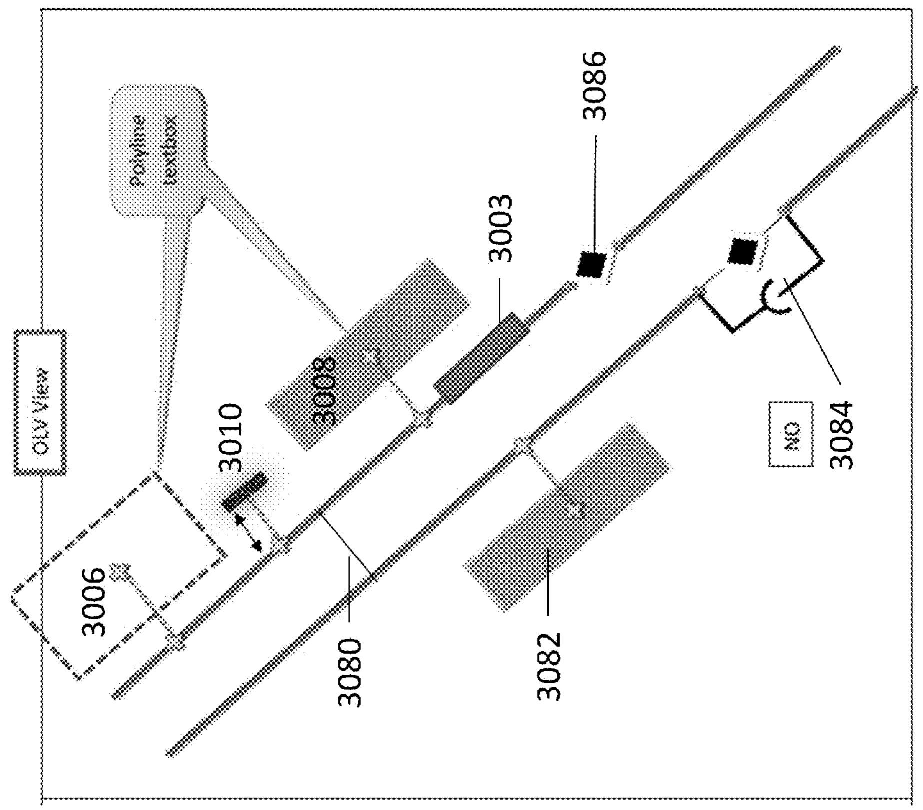

FIGS. 3I and 3J show an example embodiment of diagrams of components in GIS and OLV respectively. FIG. 31 includes substation/switching station 3006, signal post/track speed limit/level crossing 3010, station platform 3008, jumper 3080, train 3003, section insulator/insulated overlap 3086. In some embodiments trains can show up after calculations in both GIS and OLV views.

Figure 3K:
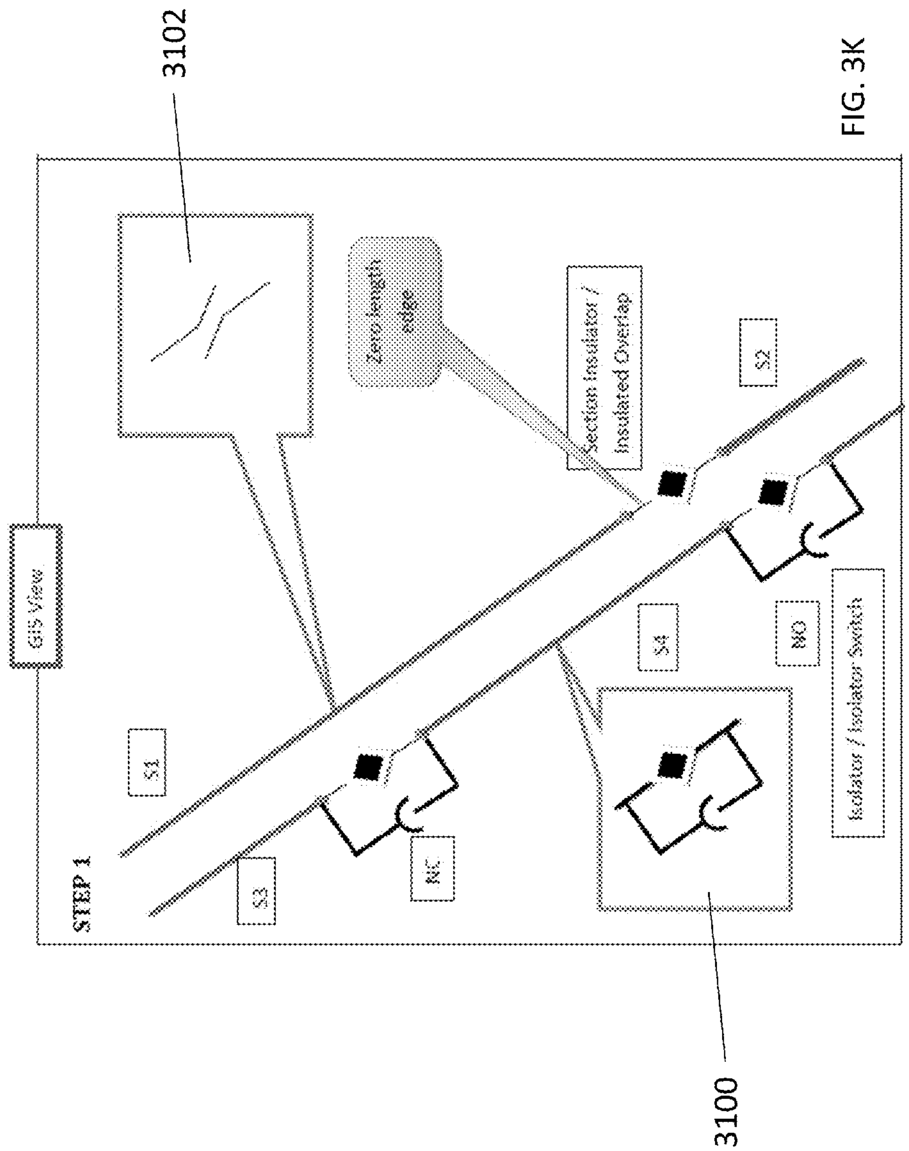
FIGS. 3K and 3L show an example embodiment of diagrams of components in GIS and OLV respectively.
Figure 3L:
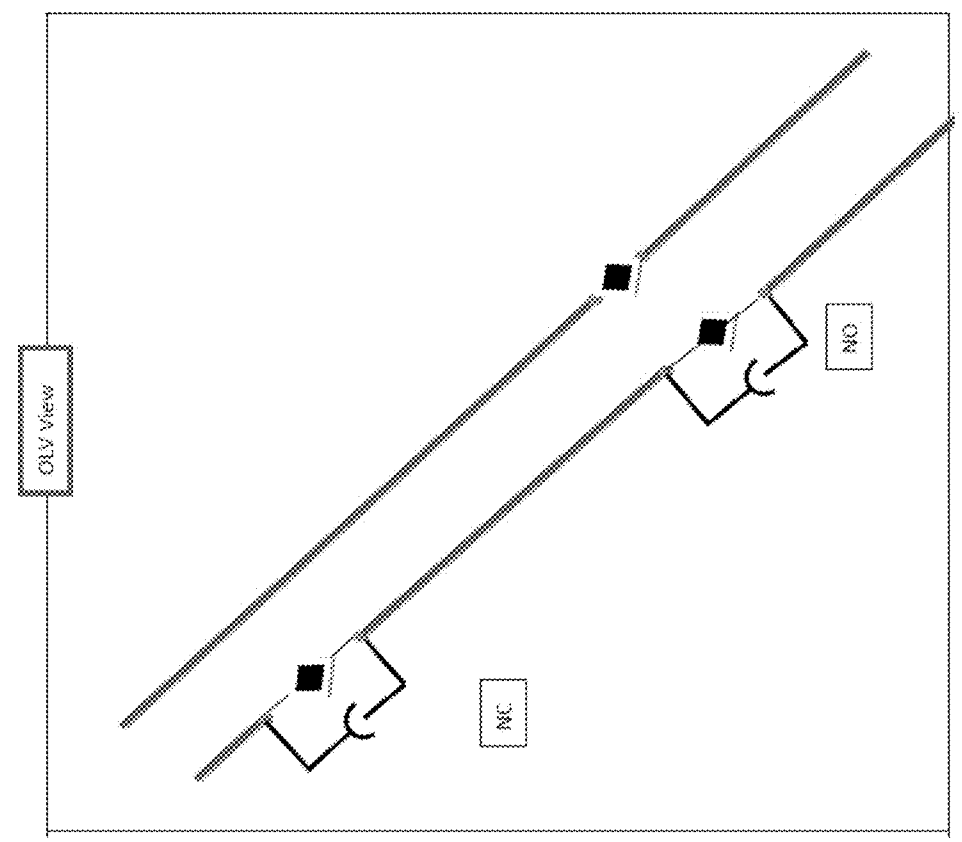

FIGS. 3K and 3L show an example embodiment of diagrams of components in GIS and OLV respectively. "NO" can mean normally open and "NC" can mean normally closed in many of the embodiments herein for switches and may be set by users. Boxes 3100 and 3102 show that components can be seamlessly dropped onto tracks in many embodiments without needing to have termination points to attach the dropped components to. Boxes with the form SX (S1, S2, S3, S4) represent segment numbers for the associated tracks.

Figure 3M:
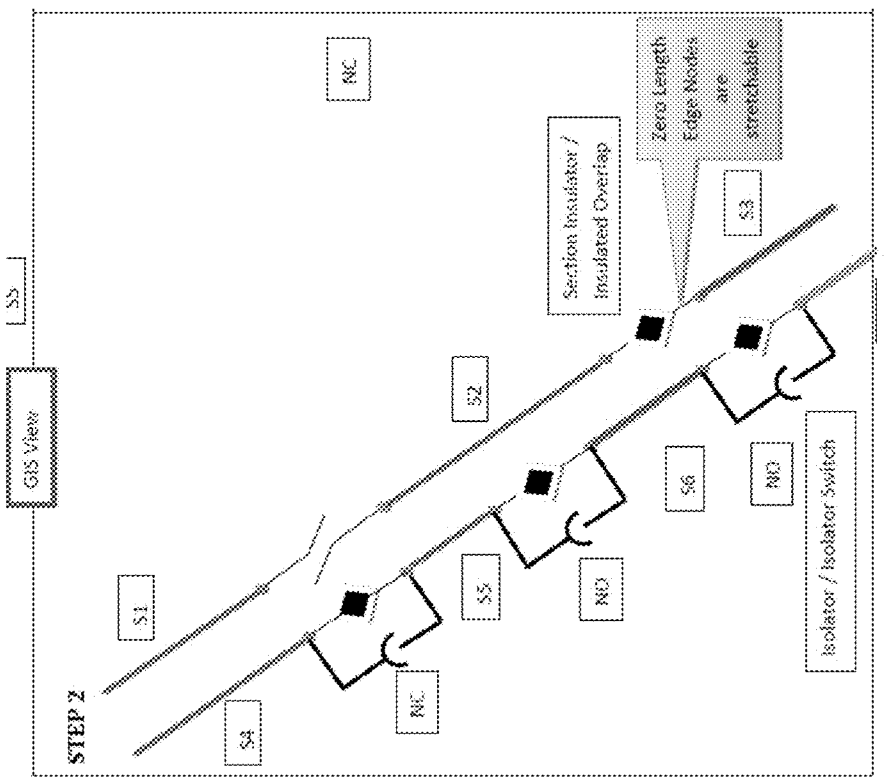
FIGS. 3M and 3N show an example embodiment of diagrams of components in GIS and OLV respectively
Figure 3N:
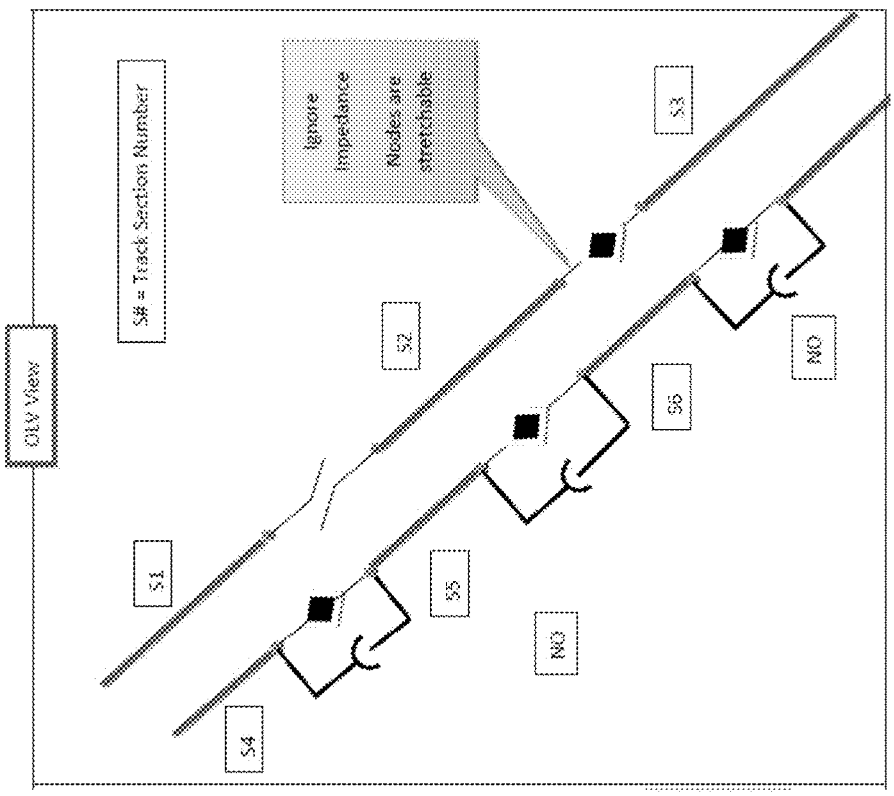

FIGS. 3M and 3N show an example embodiment of diagrams of components in GIS and OLV respectively. FIG. 3M shows an example of segments S1-S7, NC, NO, and isolator/isolator switch NO. In FIG. 3M an example of how zero length edge nodes are stretchable in GIS view is shown. FIG. 3N shows an example of how impedance may be ignored and nodes are stretchable in OLV.

Figure 3O:
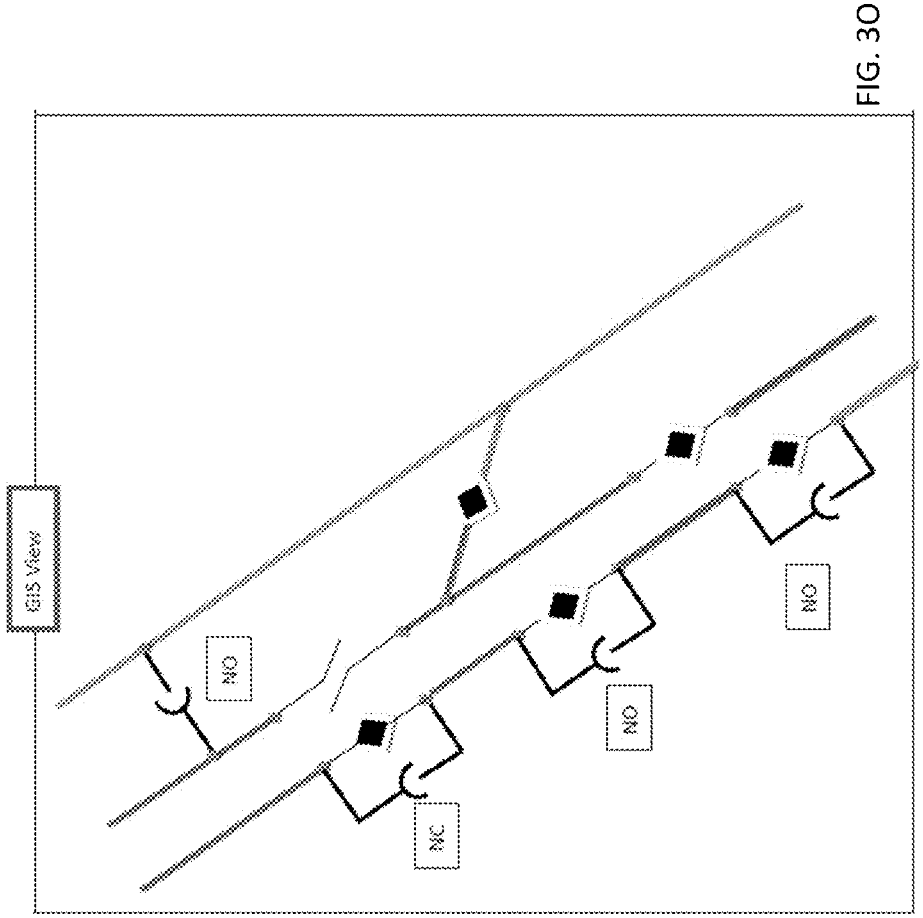
FIGS. 3O and 3P show an example embodiment of diagrams of components in GIS and OLV respectively.
Figure 3P:
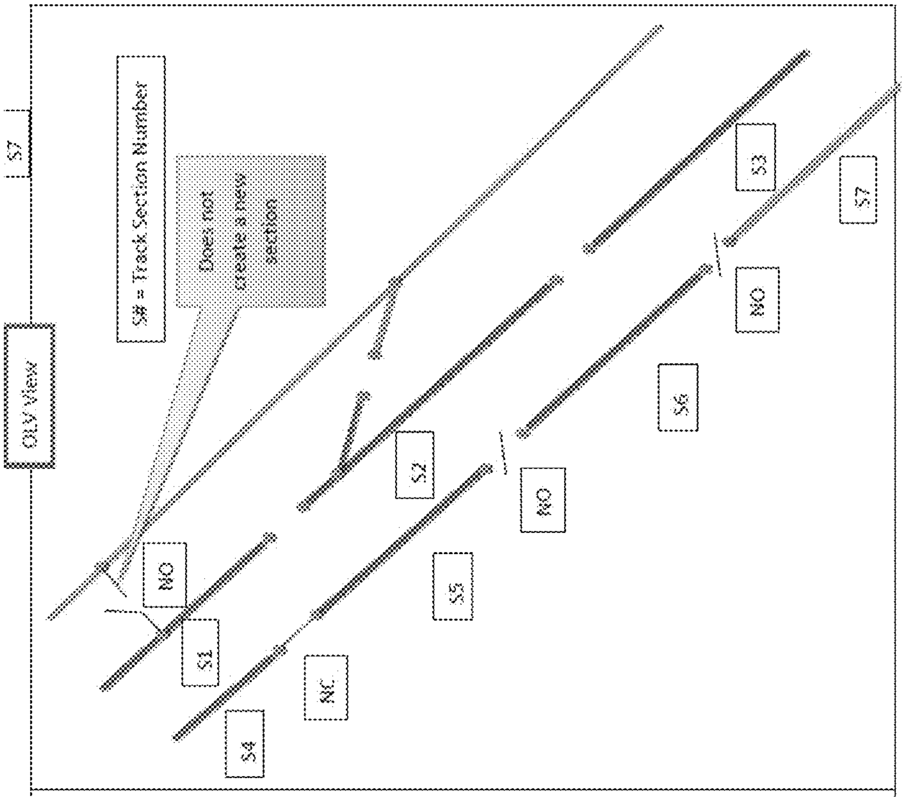

FIGS. 3O and 3P show an example embodiment of diagrams of components in GIS and OLV respectively. FIG. 3P shows an example of how OLV view may look in a different embodiment than many of the previously shown OLV views.

Figure 3Q:
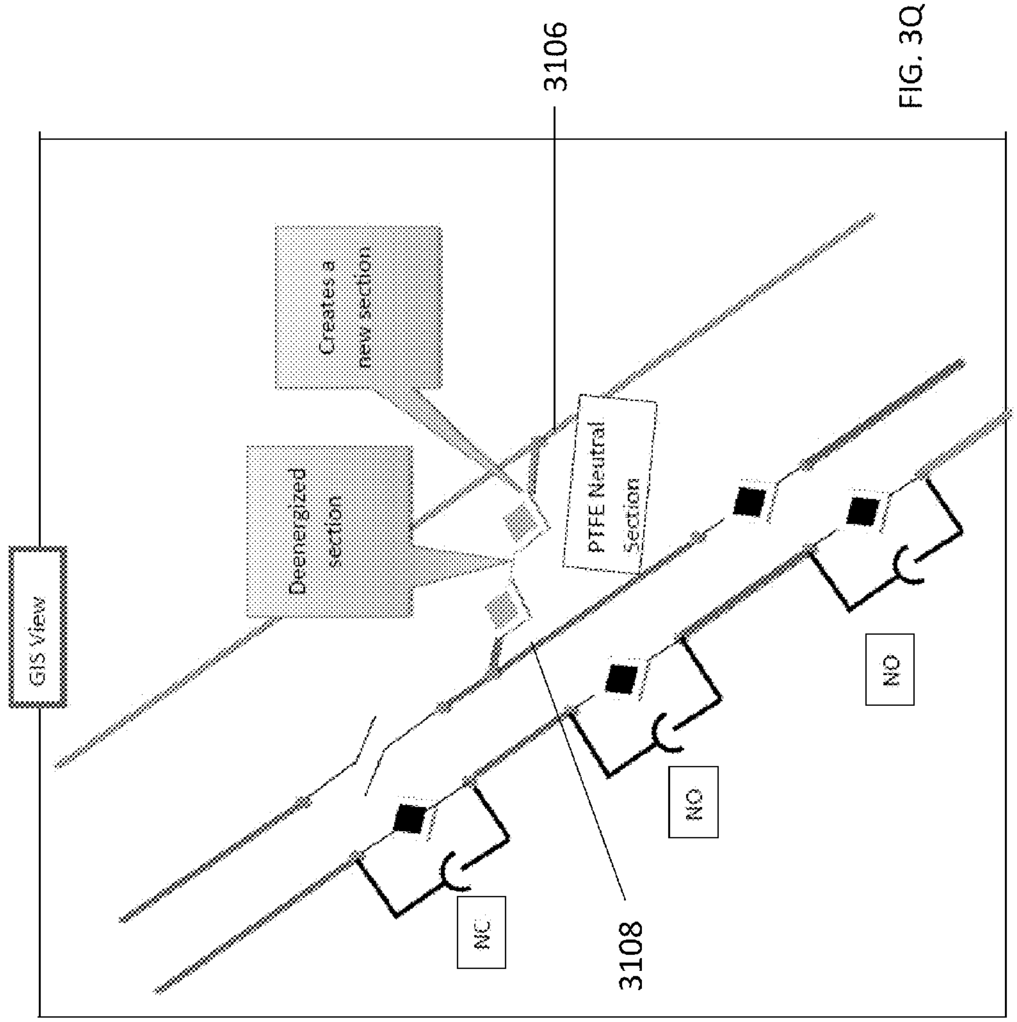
FIGS. 3Q and 3R show an example embodiment of diagrams of components in GIS and OLV respectively.
Figure 3R:
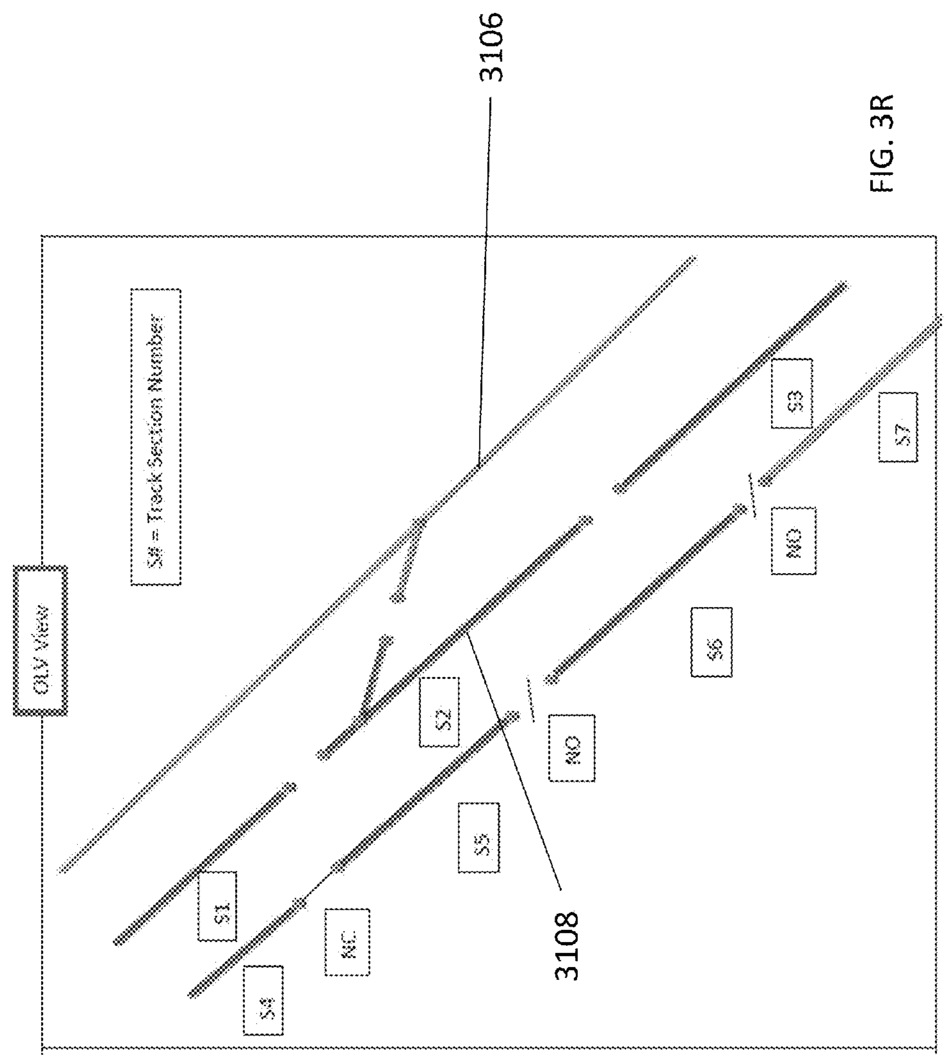

FIGS. 3Q and 3R show an example embodiment of diagrams of components in GIS and OLV respectively. FIG. 3Q shows an example embodiment of a PTFE neutral section with a de-energized section and creation of a new section. So, even though no section existed between track section 3106 and 3108, dropping PTFE neutral section between and connecting 3106 and 3108 creates a new section. As discussed previously, changes in GIS can also appear in OLV, as shown here in FIG. 3R.

Figure 4A:
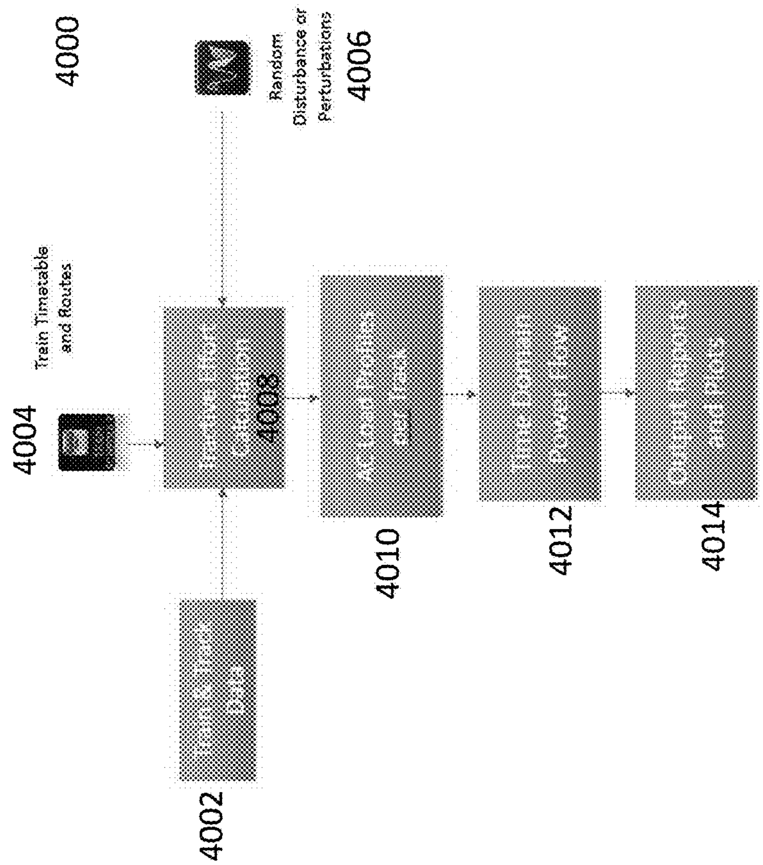
FIG. 4A shows an example embodiment of a calculation methodology in accordance with the present invention.

FIG. 4A shows an example embodiment of a calculation methodology 4000 in accordance with the present invention. In the example embodiment train and track data 4002, train timetables 4004 and routes (which can be specific number of trains per track), and random disturbance or perturbations 4006 are used as inputs for a tractive effort calculation 4008. Tractive effort calculations can be used to create AC load profiles 4010 which are then outputted on a per track basis and which can be used to calculate time domain power flow 4012. Time domain power flow 4012 can be used to create additional output reports and plots 4014.

Figure 4B:
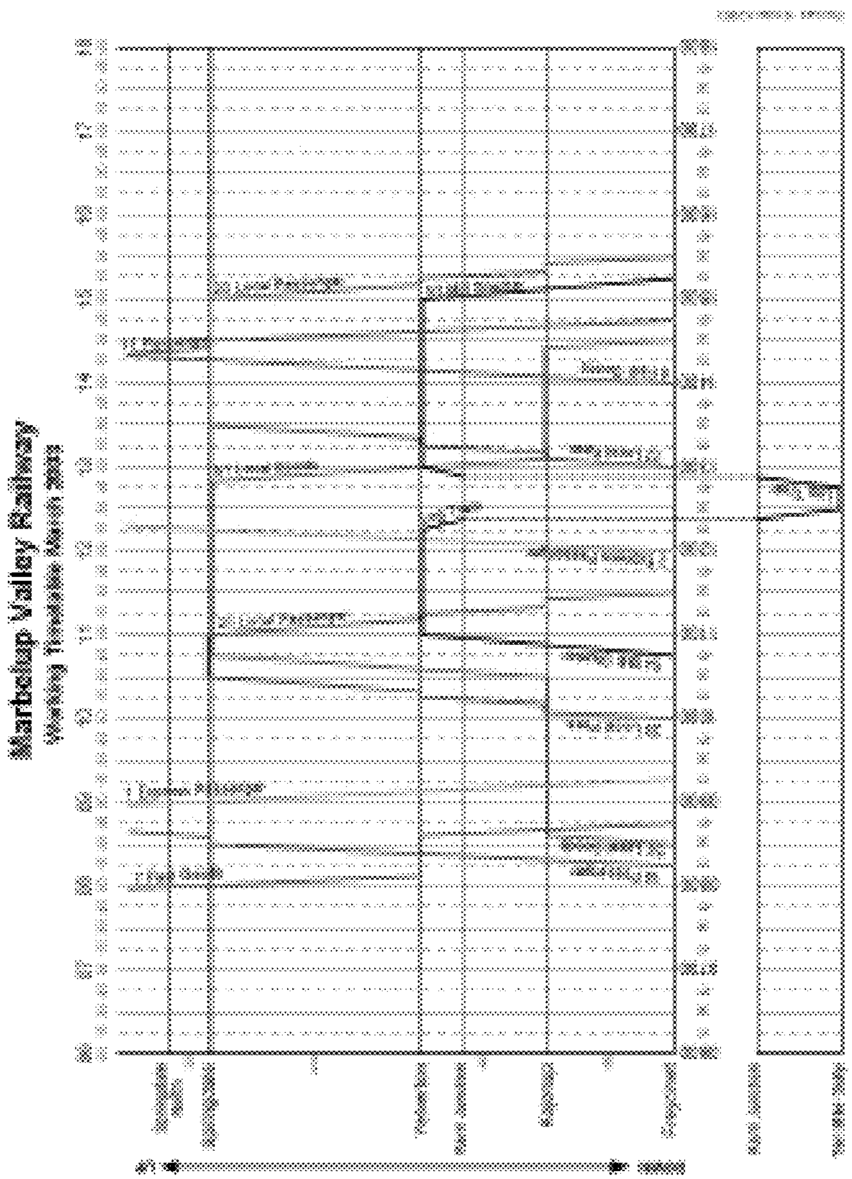
FIG. 4B shows an example embodiment of a graphical output in accordance with the present invention.

For the calculation methodology of FIG. 4A, Inputs may specifically include train ID, start station, start platform number, arrival time, dwell time, departure time (calculated), operable days of the week, description, and others. Outputs may include train timetable output in a graphical display, as shown in FIG. 4B. Conflict checkers may be used in some embodiments in order to resolve time table conflicts before proceeding to any calculation steps. Additionally, an output may be a series of train movements on various tracks as functions of distance (time).

Track input may include track ID, track type, track distance, track speed limit, track gradient in percent, track curvature in meters, overhead line impedance (R+jX) in ohms and rail impedance (R+jX) in ohms. Track outputs may include track gradient resistance in kgf and track curve resistance in kgf.

Train input may include train ID, train weight in Mgf, weight of wagons in Mgf, number of wagons, coefficient of rolling and frictional resistance of the axles in kgf, coefficient of frictional resistance of the drive in kgf, resistance to motion in kgf, drag coefficient of leading vehicle, drag coefficient of following vehicle, train area of cross section in m^2, frictional force, and adhesion coefficient. Train output may be rolling resistance in kgf and acceleration resistance in kgf.

Tractive effort input (for train performance calculations) may be rolling resistance in kgf, acceleration resistance in kgf, track gradient resistance in kgf, track curve resistance in kgf, train acceleration in m/(s^2), train start time, train stop time, track maximum speed, and random disturbance or perturbation (as described below). Track output may be current demand as a function of time f(t).

Random disturbance or perturbation input may be change signal status (proceed, caution, stop), change track speed limit (kmph), and change switching device position (isolator, TSS breaker, etc.) open or closed. Output may be modified current demand as a function of time f(t).

Time domain power flow input (for traction power simulation reports and plots) may include current demand as a function of time f(t), network topology, network impedances, and autotransformer/voltage regulator settings. Results (outputs) may include the following as functions of time and/or distance. The following results may be saved per feeder based on a selected plot step in a study case and then summarized in terms of hourly, daily, weekly, monthly, yearly, or other quantifiable values. The values may be saved for only those devices selected to be plotted and/or tabulated. Output may include MegaWatt (MW) (real power) (both sides, load/source on one side), Mvar (reactive power) (both sides, load/source on one side), current (I (magnitude) and Angle (Ang)), loading (MW and Mvar), tap position/SW (switched/switchable) Cap Bank value, voltage (V (magnitude) and Ang), voltage drop, energy consumption, energy losses, total losses (in OLV), FDR (feeder/line) losses (in GIS), MW losses, average losses, average demand kilowatt hour (kWh)=total energy kWh/Total period (hours), average voltage drop, average MW, average Mvar, maximum demand (kWh-15 min, 30 min, 1 hour), maximum losses, maximum voltage drop, maximum MW, maximum Mvar, minimum voltage (by hour, month), yield (kWh) for specified period, consumption (kWh for specified period, demand factor=max demand/total connected load, diversity factor, utilization factor (UF)=max demand/rated capacity, load factor (LDF)=average demand over period/peak load during the period, diversity factor (DF)=sum (individual max demands)/max demand of the system, coincident factor (CF)=1/DF or 0.5(1+5/(2n+3)) where n=number of loads, load diversity=sum (individual max demands)−(max demand), loss factor (LSF)=Avg(load)^2/maximum (load^2) or average loss/peak loss, cost of annual copper loss, percent of peak=demand (kW)/Peak (kW)*100%, loss equivalent hours=square of all actual demands/square of peak demand, equivalent peak loss time (ELPT)=loss factor*hours in period, peak responsibility factor (PRF)sub (distribution)=component load at time of referred component peak load/component peak load, and peak responsibility factor (PRF)sub(system)=component load at time of system peak load/system peak load.

For FIGS. 4A-4E it should be understood that components known in the art and developed in the future such as power supplies, processors, memory, computer executable instructions causing execution of programs and processes, buses, networks, networking components, databases, servers, user interfaces including monitor, keyboard, touchscreen, mouse, various sensors, and others may be used to implement modules by operatively coupling necessary components and provide communication abilities between listed elements as appropriate and as would be understood by one of ordinary skill in the art.

FIG. 4B shows an example embodiment of a graphical output.

Figure 4C:
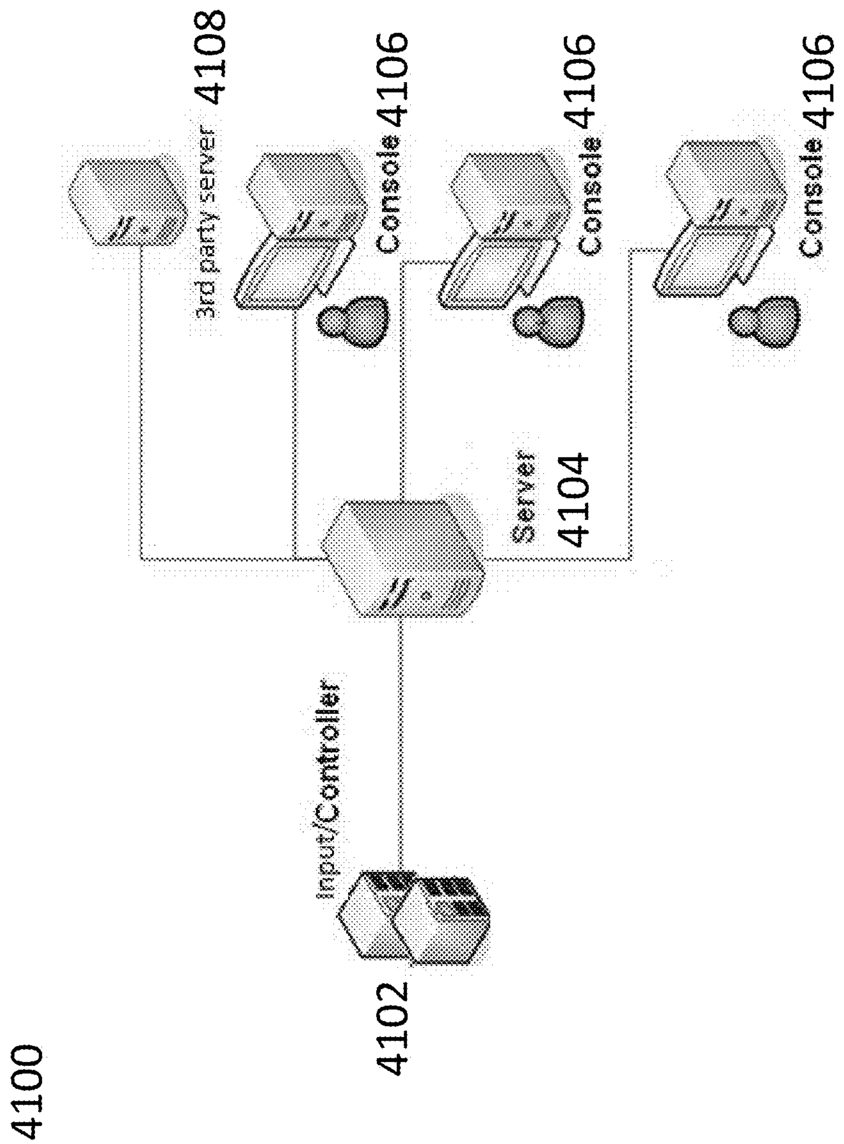
FIG. 4C shows an example embodiment of a system architecture in accordance with the present invention.

FIG. 4C shows an example embodiment of a system architecture 4100 for implementing the systems and methods described herein. In the example embodiment one or more inputs/controllers 4102 can provide information to one or more servers 4104, accessible and updatable by one or more user consoles 4106 and third party servers 4108. In some embodiments real-time data can be captured by one or more inputs/controllers 4102 and sent to server 4104 for processing.

Figure 4D:
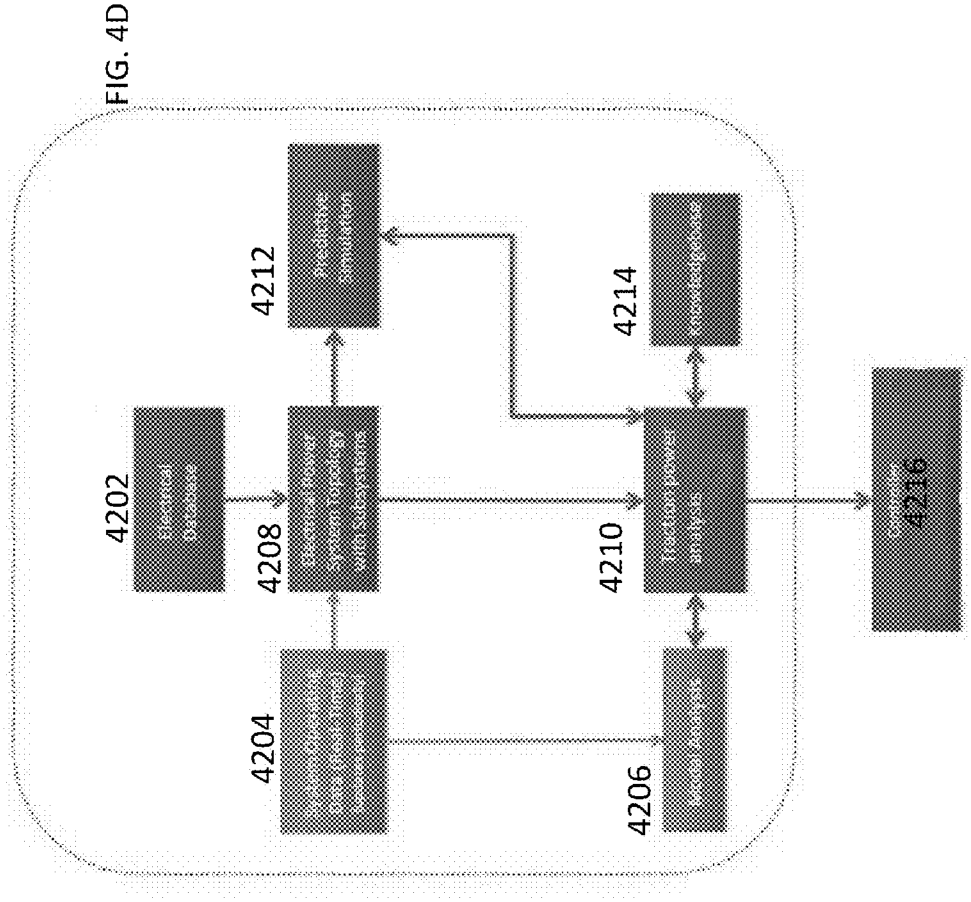
FIG. 4D shows an example embodiment of a system component blocks and their interaction in accordance with the present invention.

FIG. 4D shows an example embodiment of system component blocks and their interaction 4200. In the example embodiment system operating data 4204 (which can include real time data) is sent to modal analysis 4206 and electrical power system topology with subsystems 4208. Electrical database also sends data to 4208. 4208 sends data to predictive simulation 4212 and fraction power analysis 4210. Traction power analysis 4210 exchanges data with 4212 and 4206 and receives data from 4208 in addition to exchanging information with knowledgebase 4214. Controller 4216 receives data from 4210.

Figure 4E:
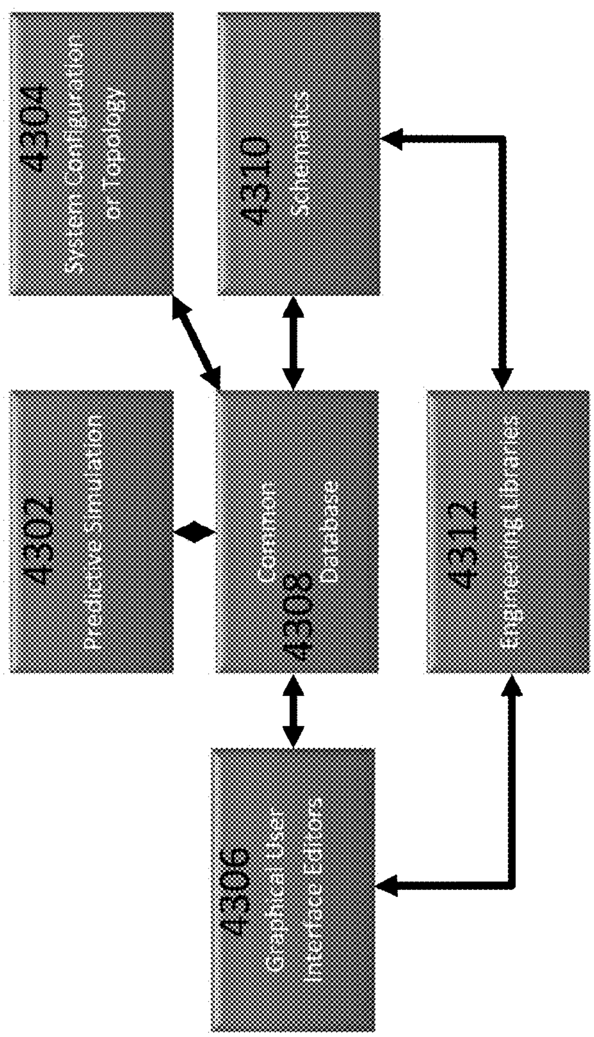
FIG. 4E shows an example embodiment of a system component diagram in accordance with the present invention.

Turning to FIG. 4E, a system component diagram 4300 is shown. In the example embodiment common database 4308 exchanges information with graphical user interface editors 4306, predictive simulation 4302, system configuration or topology 4304, and schematics 4310. Engineering libraries 4312 exchange data with graphical user interface editors 4306 and schematics 4310.

In the example embodiment computer models of electrical power systems are developed and maintained in a common data base. Computer systems are used to develop these operating virtual models of electrical systems via graphical editors and engineering libraries of common components. Separate data editors for Bus, Branch, and Machine data allow the user to model the system in a common database. User-edited libraries provide typical data which can be substituted into the database upon request. When predictive studies are to be performed, the system automatically extracts the necessary parameters from the common database.

Figure 5A:
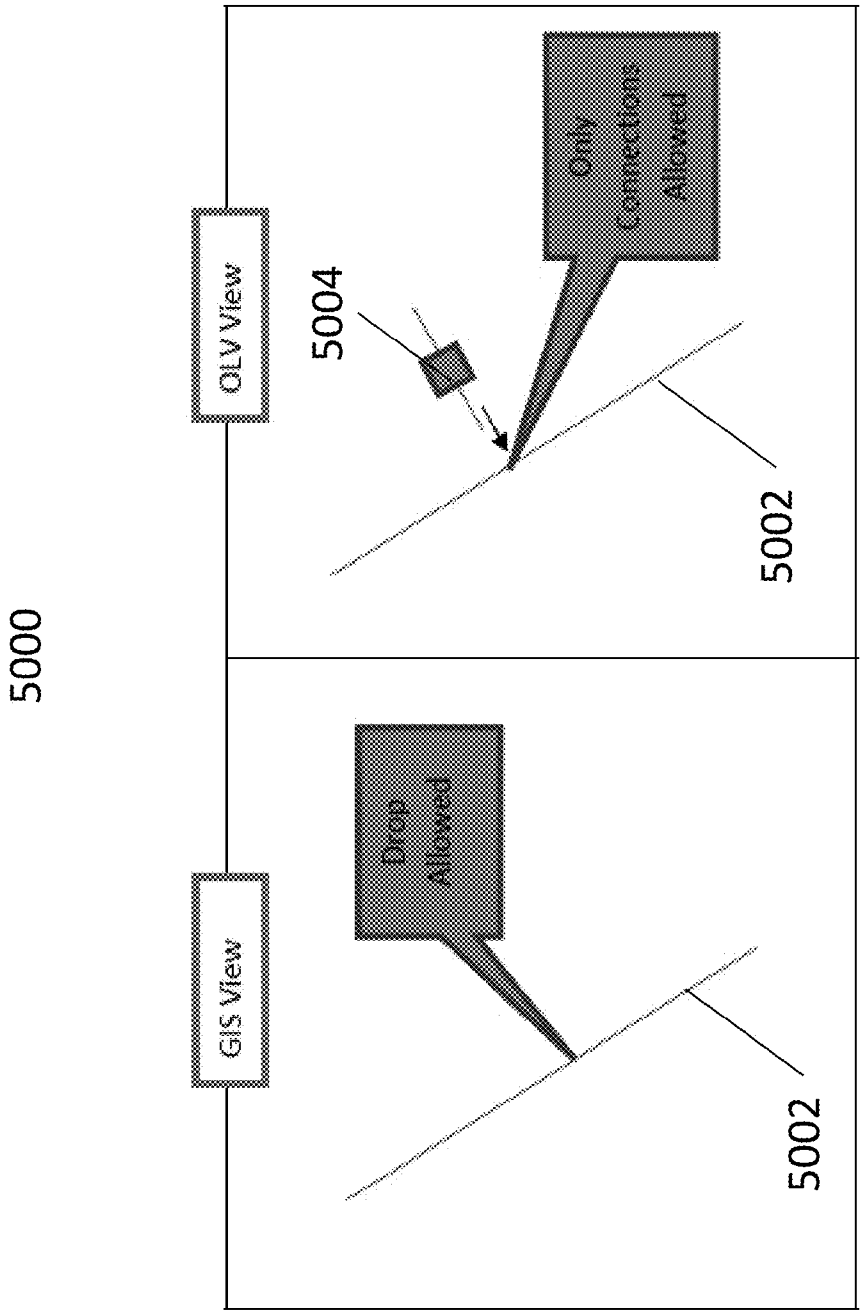
FIG. 5A shows an example embodiment of a differences between OLV and GIS in accordance with the present invention.

FIG. 5A shows an example embodiment of a difference between GIS View and OLV in accordance with the present invention. In the example embodiment a user may not be able to add any components on a track 5002 in OLV. In many embodiments this will only be allowed in GIS View. In some embodiments in OLV connection of component 5004*s* may only be allowed. In numerous embodiments drops may be allowed in both GIS and OLV. Likewise, in numerous embodiments connections may be allowed in both GIS and OLV.

Figure 5B:
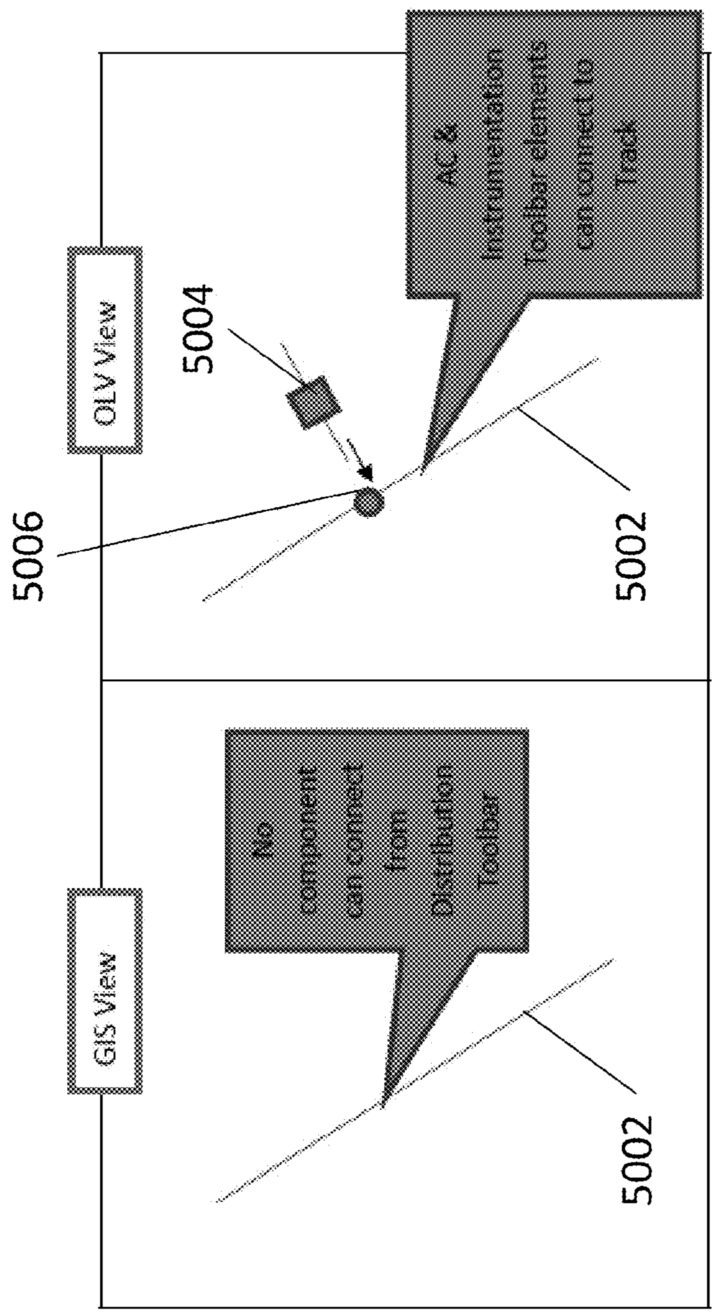
FIG. 5B shows an example embodiment of a difference between OLV and GIS in accordance with the present invention.

FIG. 5B shows an example embodiment of a difference between OLV and GIS in accordance with the present invention. In the example embodiment no components may be connected from a distribution toolbar. However, in OLV, AC and Instrumentation Toolbar component 5004*s* can be connected to a track 5002 at connection point 5006*s*. In some embodiments components may be connected from distribution toolbar. In some embodiments AC and Instrumentation Toolbar components may be connected to track by dropping them on the track.

Figure 5C:
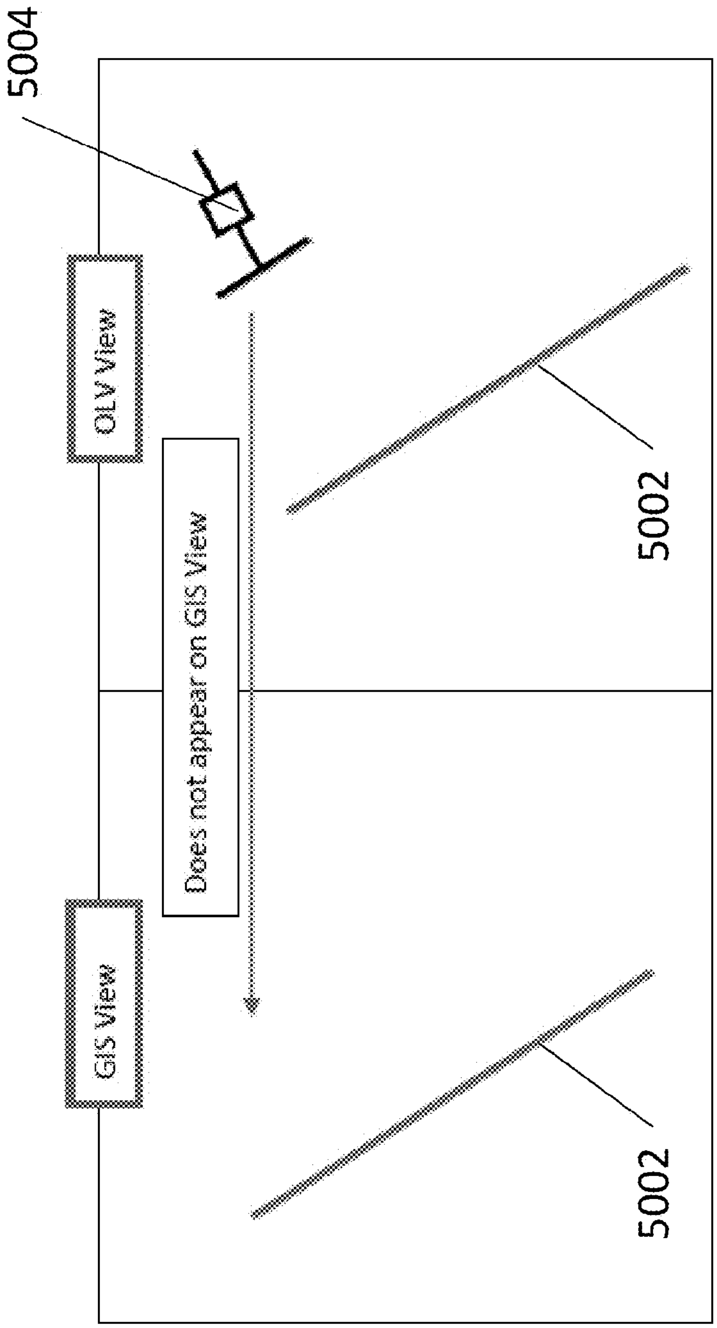
FIG. 5C shows an example embodiment of a use case where components added in OLV may not be visible in GIS.

FIG. 5C shows an example embodiment of how components added in OLV may not be visible in GIS. In the example embodiment when a user adds a component 5004 to a track 5002 in OLV the component will not appear on GIS view. In many embodiments addition of components in GIS or OLV will cause them to appear in the other of GIS or OLV as well.

In many embodiments substations will appear as polyline objects in GIS View. In OLV a corresponding polyline object will be available. In many embodiments all detailed electrical connections will be completed in OLV. In applications where bend radius of a track needs to be calculated, the calculation will occur in GIS View. Track editor in GIS View will allow definition of terrain information. At least one similarity exists between GIS View and OLV is that train animation will be displayed in each. In Line/Rail Warehouse track/line impedances will be included for tracks. The user can define information included in this embodiment in various embodiments. Information in GIS and OLV in many embodiments only needs to be inputted into the system once, as GIS and OLV share databases and the information stored in them.

In many embodiments GIS View will have interoperability allowing users to import track layout from GIS sources like OpenStreetMap owned by the OpenStreetMap Community and supported by the OpenStreetMap Foundation. In some embodiments this may be achieved through Extensible Markup Language (XML) and the imported track layout may also bring the background layer. In the system described herein, numerous layers may be used and the background layer may be the bottom layer. In many embodiments this background or bottom layer is the map. In GIS View a track components can appear graphically similar to an edge and can be a unique component class. In OLV a track component can depict bends and can be a pinless component. In many embodiments, all components dropped on the track component in OLV will be pinless such that they seamlessly connect with the track and show no visible connection points. In alternative embodiments pins can be seen and used by users, for instance in manipulating components.

Figure 6A:
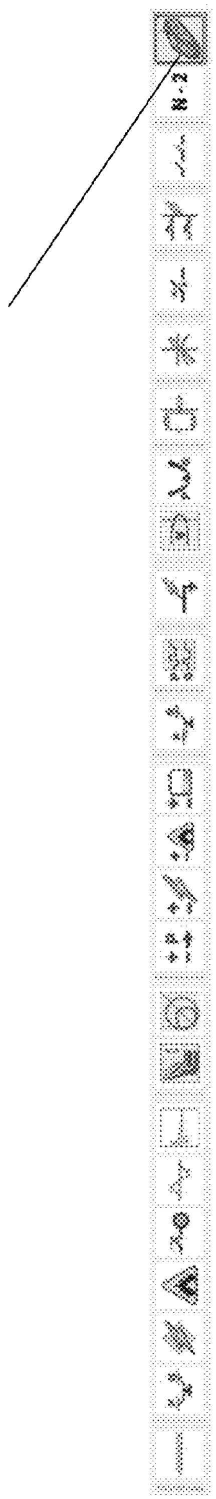
FIG. 6A shows an example of a toolbar including traction/power mode button in accordance with the present invention.

FIG. 6A shows an example of a toolbar including traction/power mode button in accordance with the present invention. In the example embodiment a traction/power mode button may be located for convenient user access.

Figure 6B:
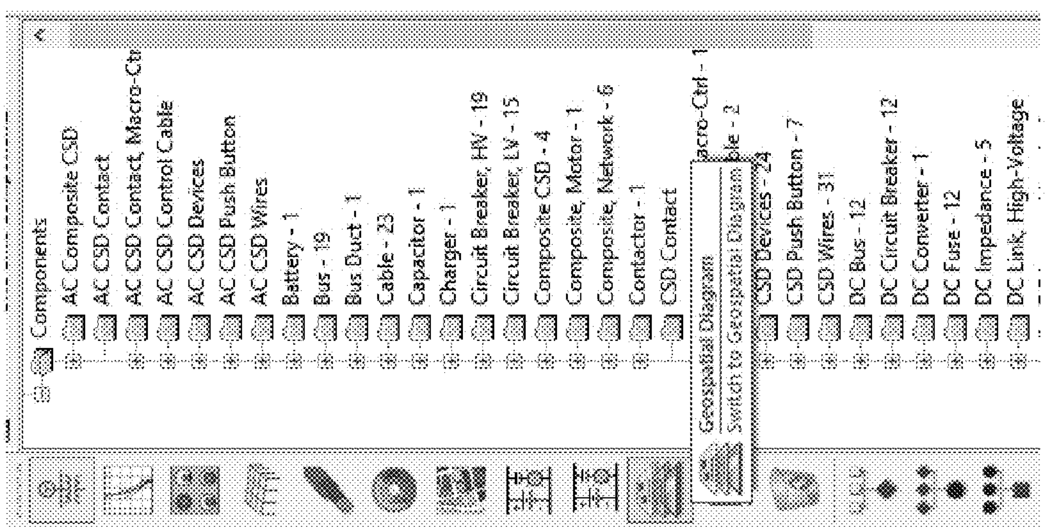
FIG. 6B shows an example embodiment of a menu name "Geospatial diagram" on a menu in accordance with the present invention.

FIG. 6B shows an example embodiment of a menu name "Geospatial diagram" on a menu in accordance with the present invention. In the example embodiment a "Geospatial diagram" button provides convenient access to GIS View.

Figure 6C:
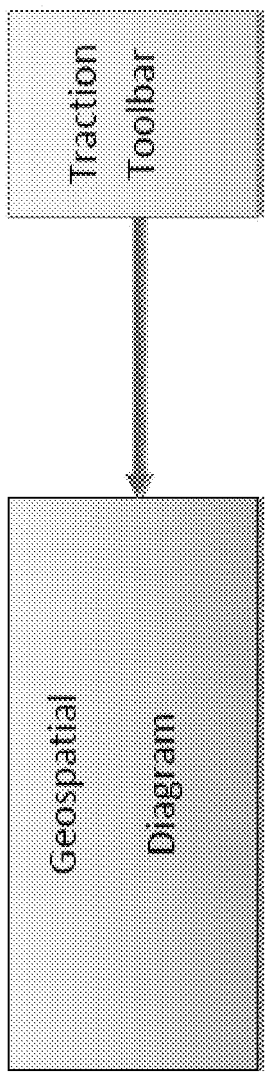
FIG. 6C shows an example of GIS's geospatial diagram now having a traction toolbar.

FIG. 6C shows an example of a GIS view geospatial diagram having a traction toolbar.

Figure 6D:
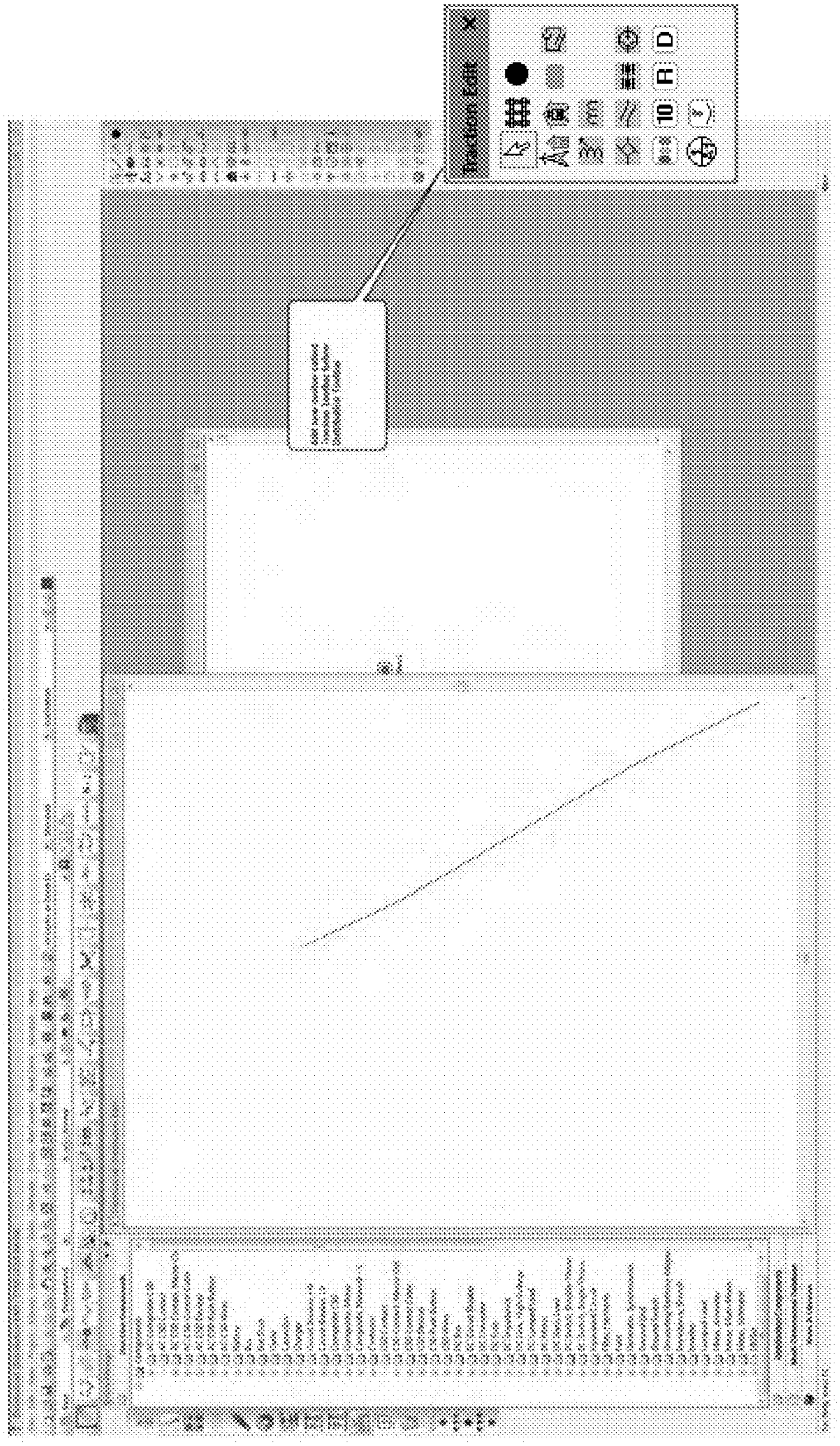
FIG. 6D shows a location of a geospatial diagram button in a user interface in accordance with the present invention.

FIG. 6D shows a location of a geospatial diagram button in a user interface in accordance with the present invention.

Figure 6E:
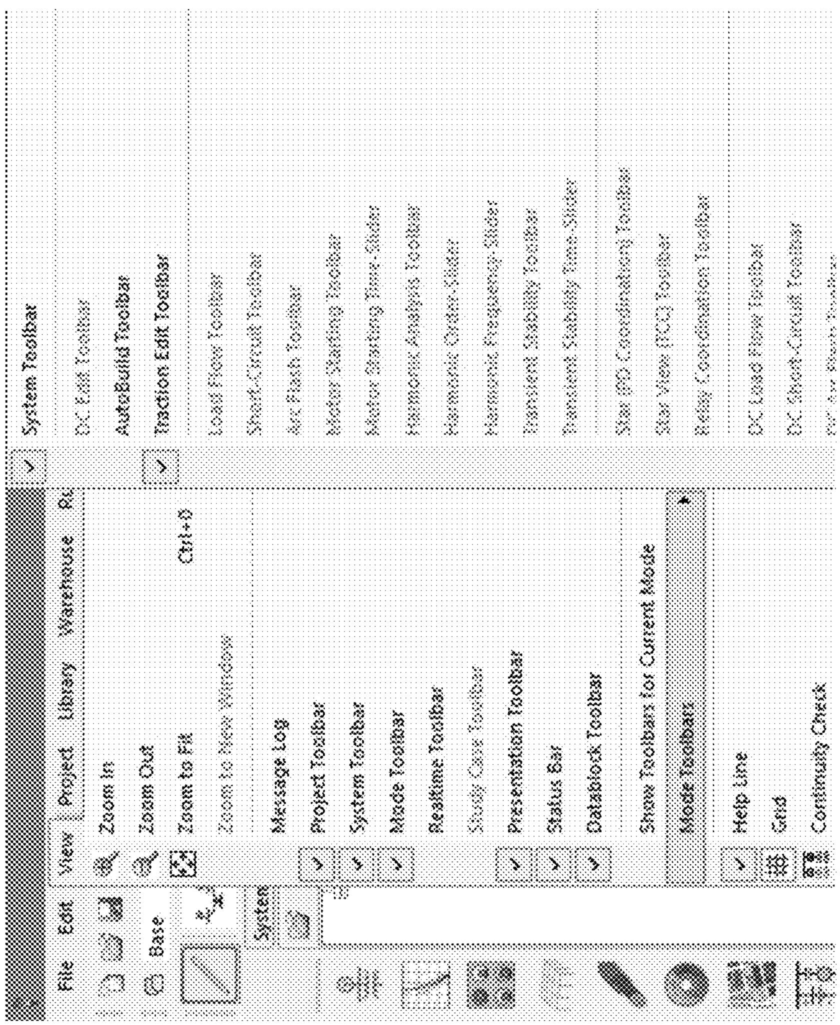
FIG. 6E shows an ability to turn a traction toolbar on/off in a user interface in accordance with the present invention.

FIG. 6E shows an ability to turn a fraction toolbar on/off in a user interface in accordance with the present invention. In the example embodiment a user may open a "View" menu, select "Mode Toolbars" and then select/deselect "Traction Edit Toolbar" which can be signified by a check or lack thereof.

Figure 6F:
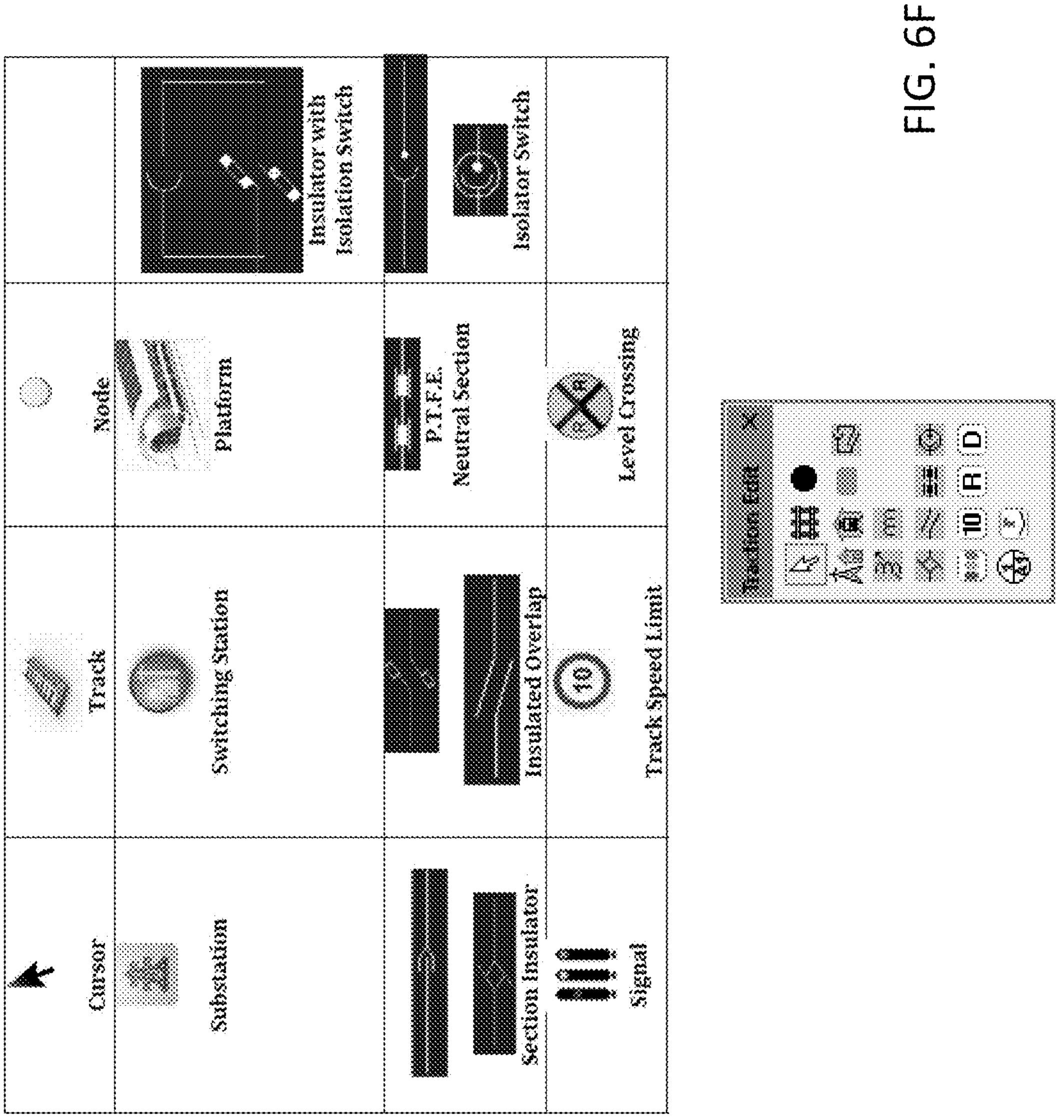
FIG. 6F shows an example of a toolbar including icons in accordance with the present invention.

FIG. 6F shows an example of a toolbar including icons in accordance with the present invention. In the example embodiment the toolbar has numerous icons including a cursor, track, node, substation, switching station, platform, insulator with isolation switch, section insulator, insulated overlap, P.T.F.E. Neutral Section, Isolator Switch, Signal, Track Speed Limit, and Level Crossing. In an example embodiment this toolbar may not be shown by default but rather may be shown when a user has a fraction or moving train module activated.

Figure 7A:
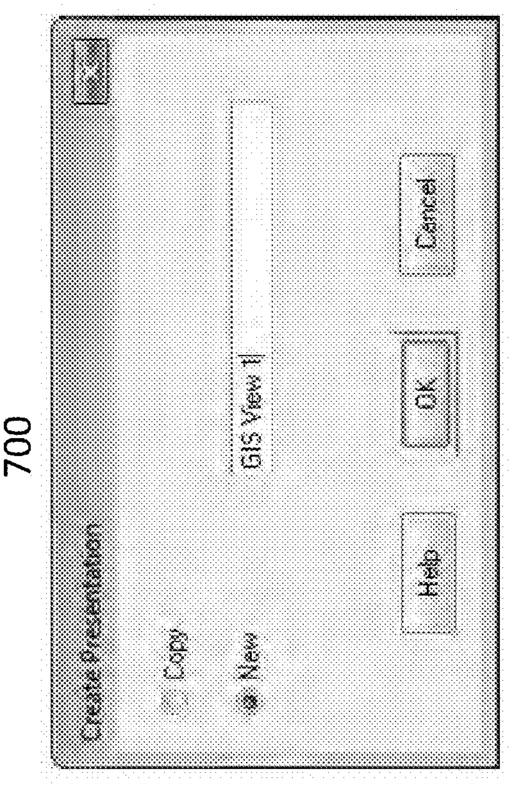
FIG. 7A shows an example of the system prompting a user for a name in GIS if none exists.

FIG. 7A shows an example of the system prompting a user for a name in GIS if none exists (i.e. a new project or OLV exists but GIS has not yet been created) in accordance with the present invention. FIG. 7A shows an example of the system providing an input box 700 if the user chooses to create a GIS presentation in accordance with the present invention. In the example embodiment a "Create Presentation" box is shown with two radio button options, "Copy" and "New" allowing a user to duplicate a previous GIS diagram or create a new one. If the user elects to create a "New" presentation the user is prompted to input a name for the GIS View of the new presentation in a text input box.

Figure 7B:
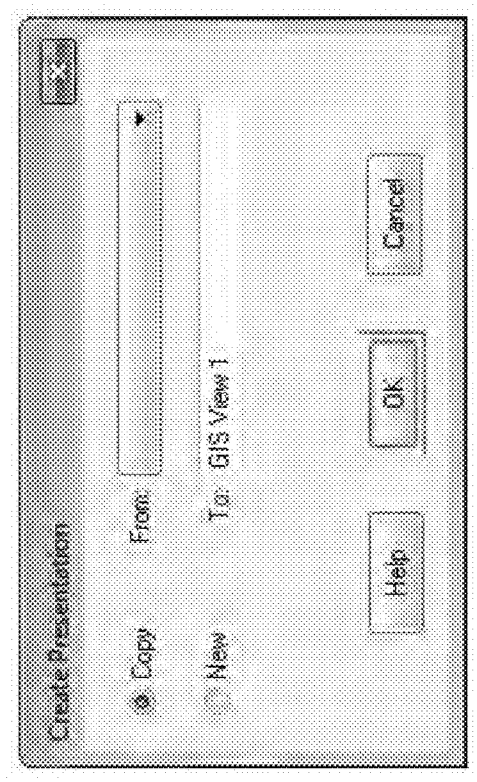
FIG. 7B shows an example embodiment of an input box.

FIG. 7B shows an example embodiment of an input box 750 if the user chooses to create a GIS presentation in accordance with the present invention. In the example embodiment if a user elects to duplicate a presentation by selecting the "Copy" radio button. Upon choosing this button the user is presented with a "From:" dropdown menu. In cases where no previous presentations have been created then the list is left blank. In cases where previous presentations have been created then the list is populated with presentation names.

Figure 8:
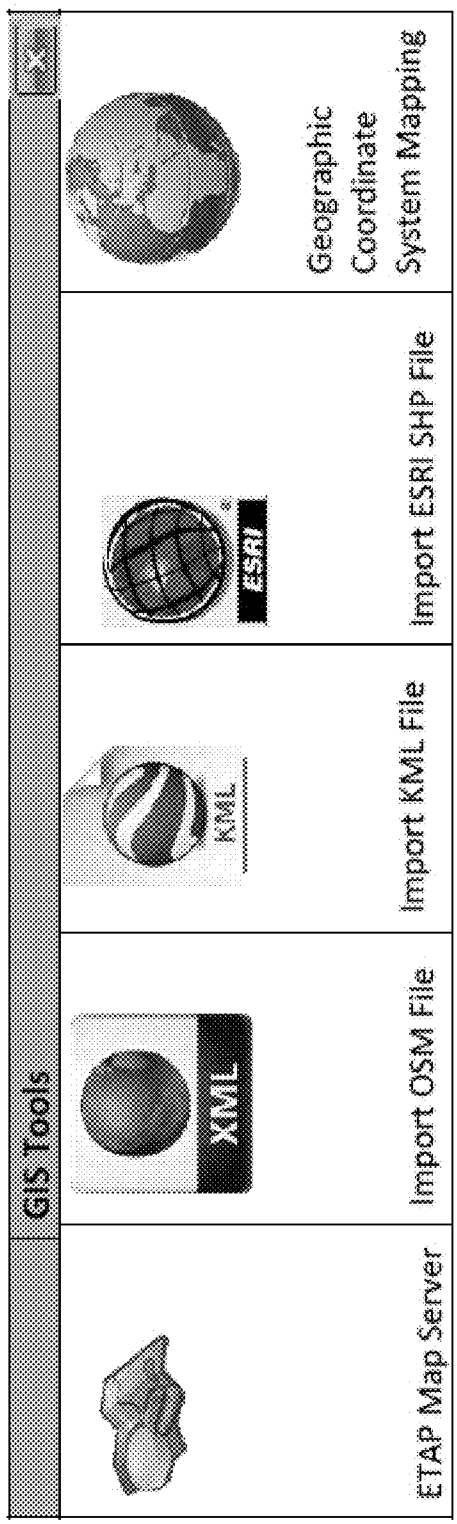
FIG. 8 shows an example embodiment of an importing toolbar for importing track information from a mapping server in accordance with the present invention.

FIG. 8 shows an example embodiment of an importing toolbar 800 for importing track information from a mapping server in accordance with the present invention. In the example embodiment importing toolbar 800 may be available in active GIS View while in edit mode. Provided in the toolbar are options for accessing ETAP Map Server 802, Import OSM File 804, Import KML File 806, Import ESRI SHP File 808, and Geographic Coordinate System Mapping 810.

Figure 9A:
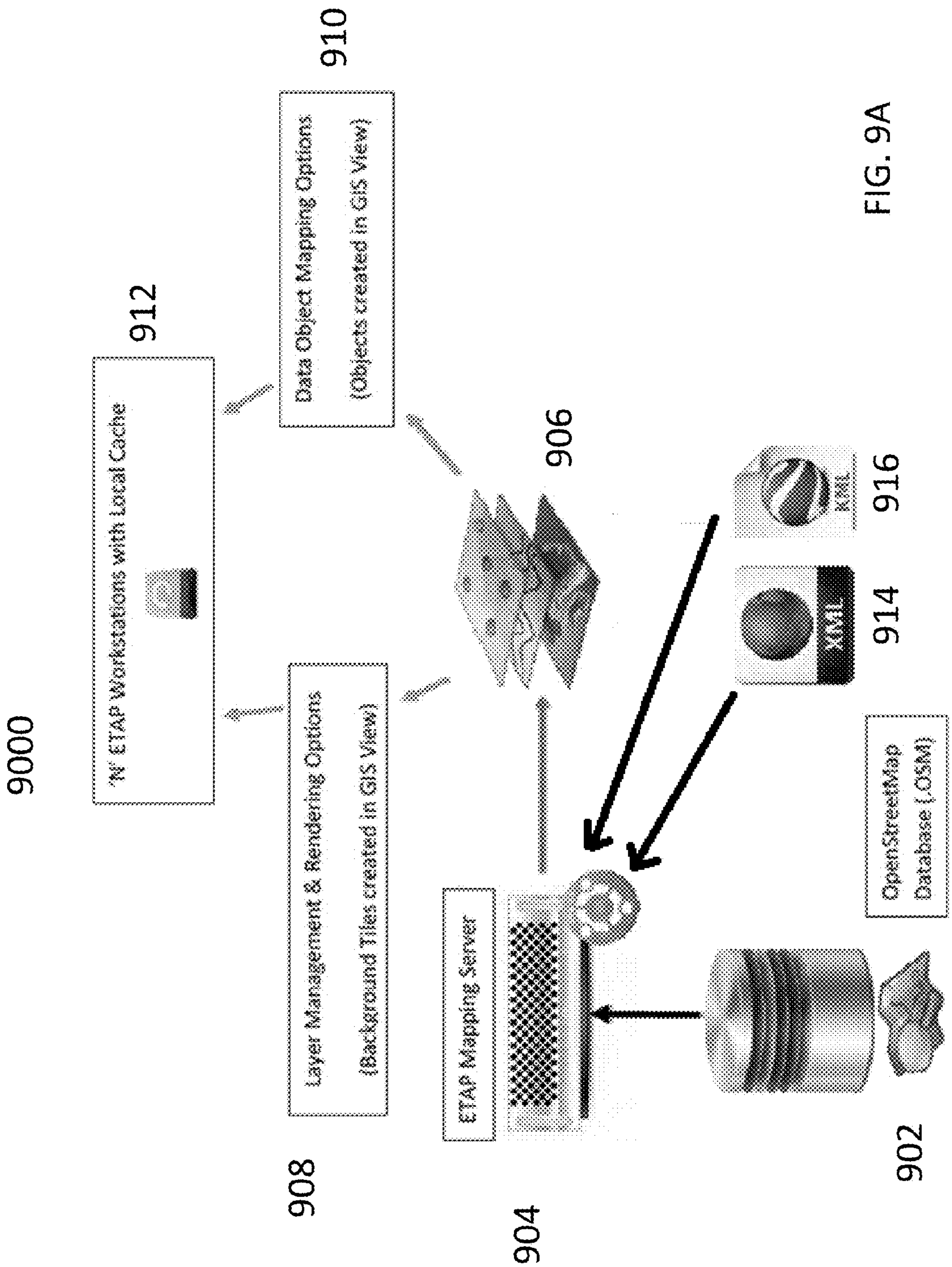
FIG. 9A shows an example embodiment of a process diagram for importing track information from a mapping server such as a Mapping Server.

FIG. 9A shows an example embodiment of a process diagram 9000 for importing track information from a mapping server such as a Mapping Server. In the example embodiment an OpenStreetMap Database (.OSM) may send a map file to a mapping server 904 such as an ETAP mapping server, for instance by selecting a button 802 shown in FIG. 8 above. Mapping server 904 may then send the map file to one or more servers 906. Likewise, files such as XML files 914 (corresponding to 804), KML files 916 (corresponding to 806) and others may be sent to 904. 904 can use inputs to map a source layer and then send it from 904 to 906. From 906 a user may manipulate the files using layer management and rendering options 908 (as shown further in FIG. 9G) and data object mapping options 910. Layer management and rendering options 908 may include background tiles created in GIS View and Data object and mapping options 910 may include objects created in GIS View. After selecting layer management and rendering options 908 and data object mapping options 910 the files may be sent to a workstation with local cache such as 'N' ETAP workstations 912.

Figure 9B:
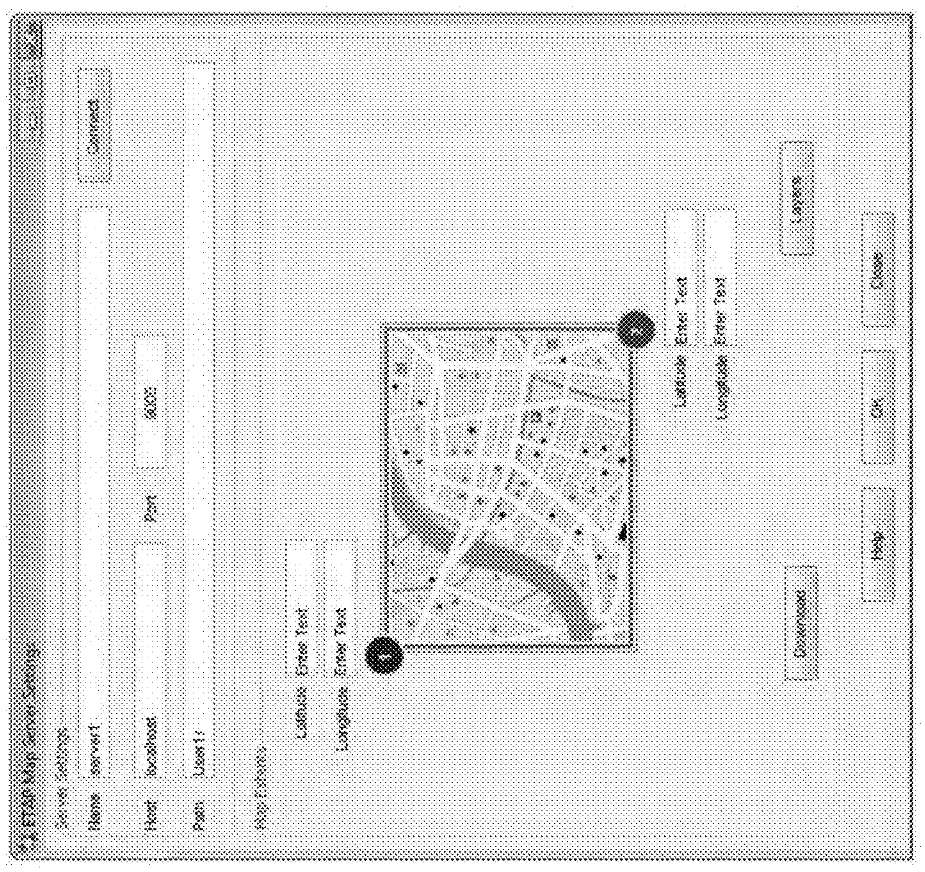
FIG. 9B shows an example embodiment of a selection screen for selecting boundaries of a map in accordance with the present invention.

FIG. 9B shows an example embodiment of a selection screen for selecting boundaries of a map in accordance with the present invention. In the example embodiment a user may select a map server button. After selection of the map server button the editor shown in FIG. 9B may be displayed. In the example embodiment two fields are shown. First is a Server Settings fields and second is a Map Extents field. The Server settings field allows a user to type in a server name, host, port, and/or path and then connect by selecting a "Connect" button. The Map Extents field allows a user to input a first latitude and longitude for a first corner of a map and a second latitude and longitude in order to define two diagonal corners of the map. The user may then select a download button to download a map from the selected server of the selected dimensions. After a successful download the layers button is selectable by the user. As with many user interface boxes there are Help, Ok, and Close buttons.

Figure 9C:
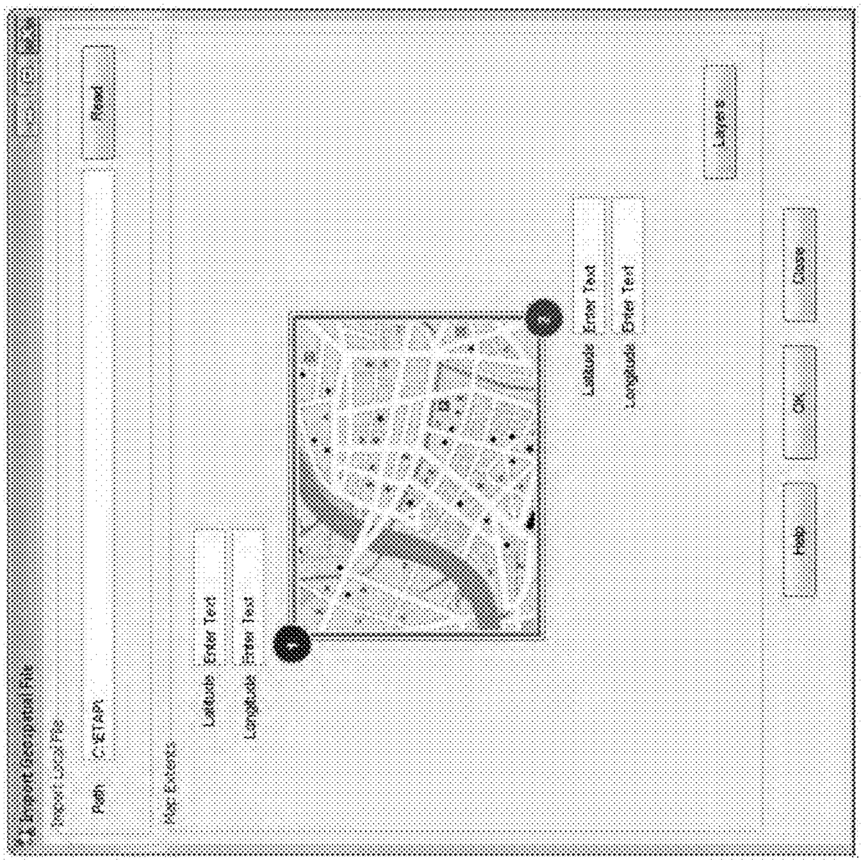
FIG. 9C shows an example embodiment of how to import an OSM file by selecting the location of the .OSM file and entering a first and second latitude and longitude.

FIG. 9C shows an example embodiment of how to import an OSM file by selecting the location of the .OSM file and entering a first and second latitude and longitude. In some embodiments the latitude and longitude fields may be automatically populated based on the extents available in the .OSM file. After the fields are populated a user may enter any number greater or less than the maximum extents calculated. As an example, a user may originally select an initial size, such as the size of "Orange County, CA". Then a user may wish to decrease the size by selecting a size such as "Newport Beach, Calif." which is a city in Orange County. This is typically done with longitude and latitude coordinates in the system, however, it can be done differently in different embodiments such as by using county and city names.

After selecting an import button the program can display "File Selection" dialog with a pre-defined filter for the .OSM file. In some embodiments similar editors to that shown in FIG. 9C may be applicable for KML, SHP and other file formats. Selecting an import button may cause the pre-defined filters to be .KML, .SHP, or others, respectively. Once a file is successfully read the layers button can become active.

Figure 9D:
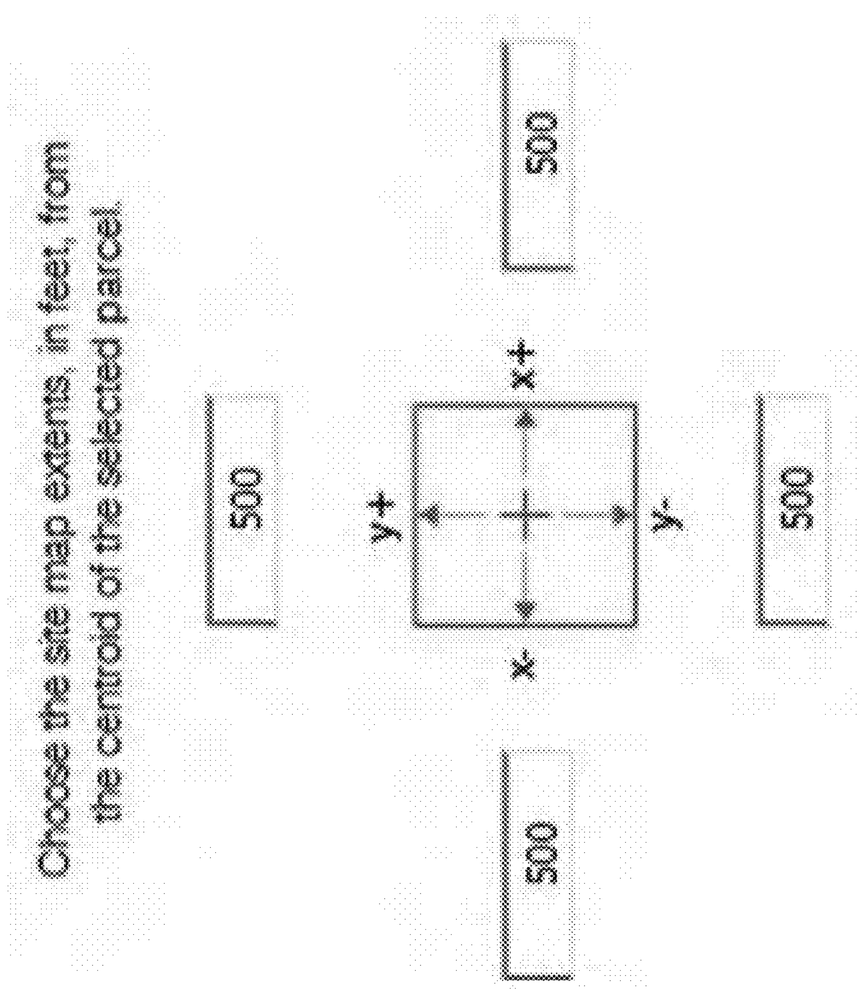
FIG. 9D shows an example embodiment of map boundary setting using a central point and distance fields from the center point in accordance with the present invention.

FIG. 9D shows an example embodiment of map boundary setting using a central point and distance fields from the center point in accordance with the present invention. In the example embodiment a user may be prompted to choose the boundary distances in a particular unit of measure from the central geographic location ("Choose the site map extents, in feet, from the centroid of the selected parcel").

SHP files may be downloaded from websites such as http://www.diva-gis.org/gdata and http://www.maperuzin- .com/free-world-country-arcgis-maps-shapefiles.htm. SHP file viewers and source code may be found at websites such as http://www.qarah.com/shapeviewer. Open source GIS software may be accessed at http://www.qgis.org/.

Figure 9E:
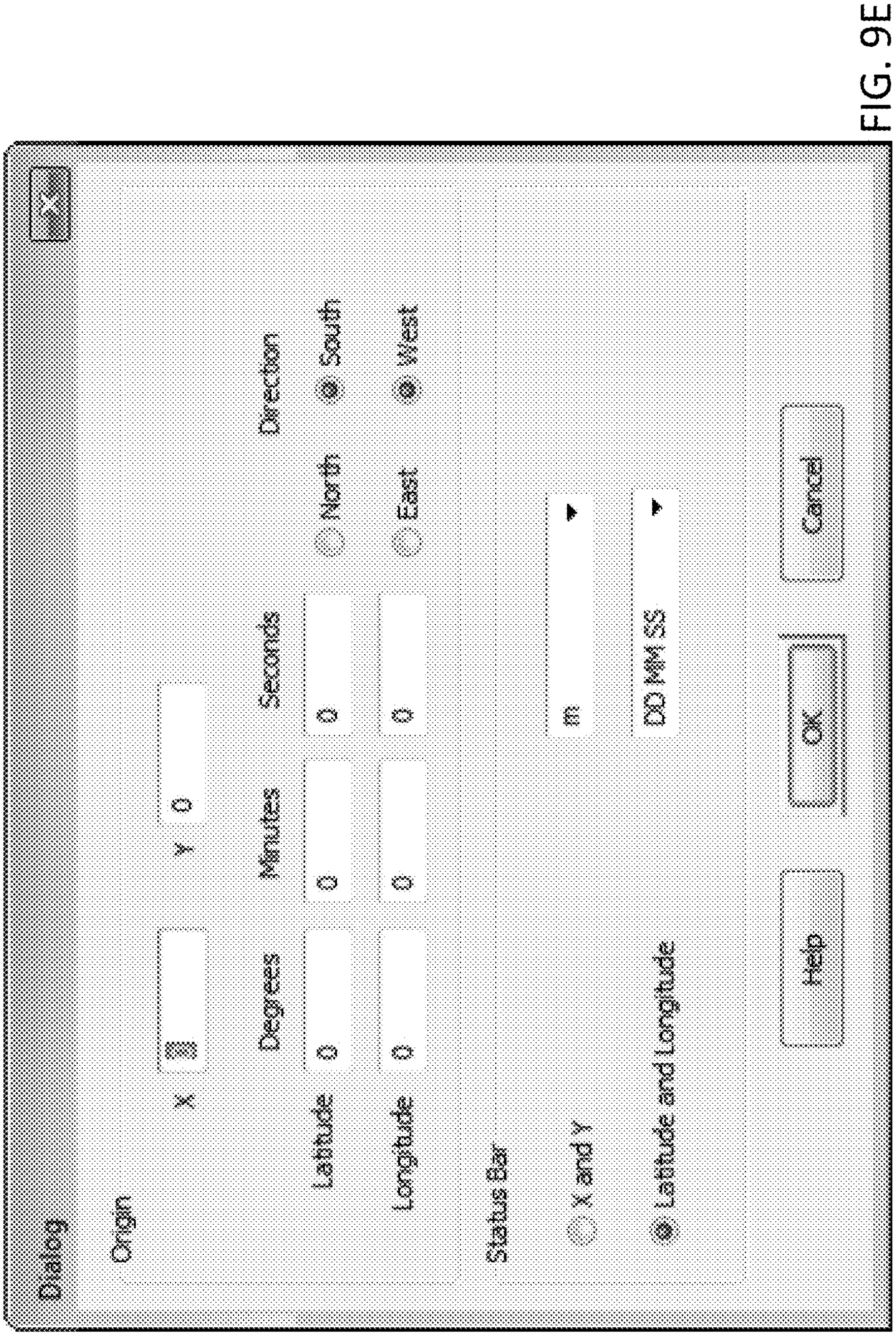
FIG. 9E shows an example embodiment of a geographic coordinate system mapping display with input fields in accordance with the present invention.

FIG. 9E shows an example embodiment of a geographic coordinate system mapping display with input fields in accordance with the present invention. In the example embodiment an origin may be set using X and Y coordinates as well as latitude coordinates including degrees, minutes and seconds and direction of North or South and longitude coordinates including degrees, minutes and seconds and direction of East or West.

Figure 9F:
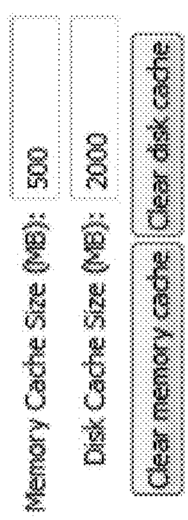
FIG. 9F shows an example embodiment of a user's ability to change cache size in accordance with the present invention.

FIG. 9F shows an example embodiment of a user's ability to change cache size in accordance with the present invention. In the example embodiment a user may clear a local cache when rendering tiles using a clear memory cache button. In an example embodiment a disk cache size may be up to 2000 MB although in other embodiments this may be greater or less.

Figure 9G:
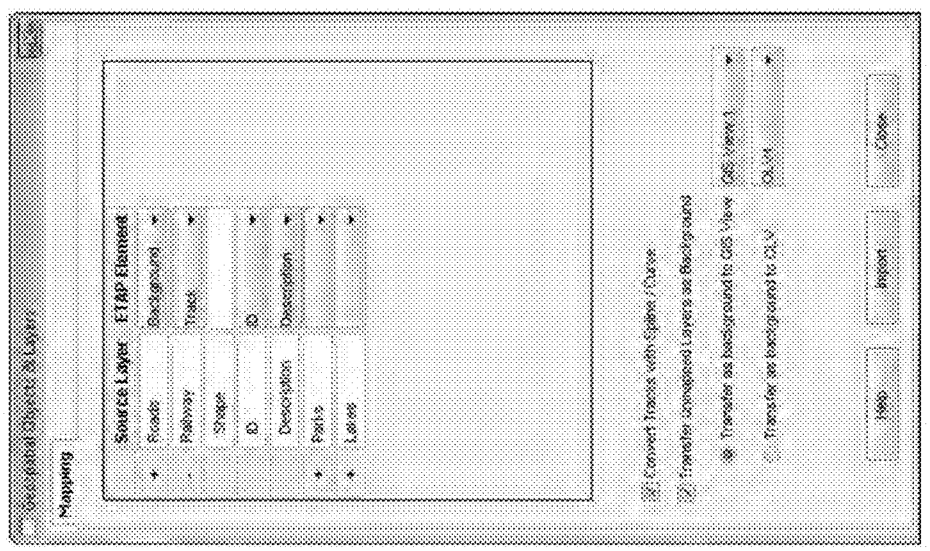
FIG. 9G shows an example embodiment of a layer inputting window in accordance with the present invention.

FIG. 9G shows an example embodiment of a layer inputting window in accordance with the present invention. In the example embodiment the editor shown may be displayed for a user when a user selects a layers button. Included in the mapping tab may be fields for source layer and element. Source layer may include roads, railway, shape, ID, description, parks and lakes. Elements may include dropdown menus. Users may also select or unselect an option to convert tracks with spline/curve. Users may also select or unselect an option to transfer unmapped layers as background and use radio buttons to select options to transfer as background to a GIS view or transfer as background to OLV.

Figure 10A:
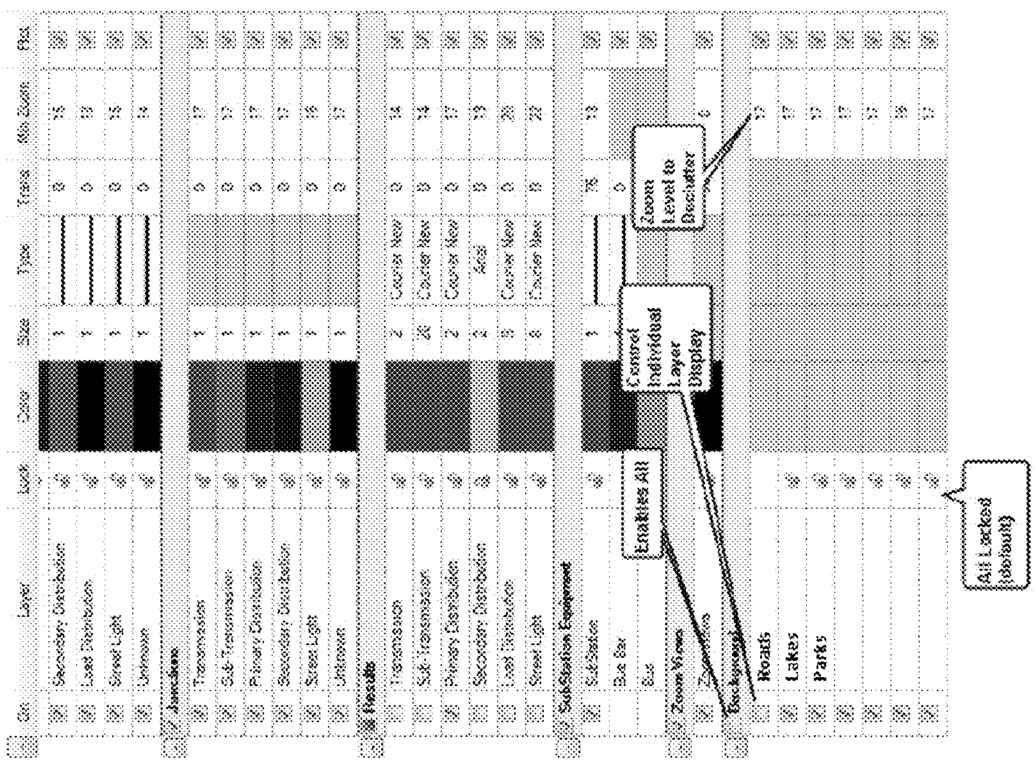
FIG. 10A shows an example embodiment of a background map theme manager including numerous selectable fields with headings in groups in accordance with the present invention.

FIG. 10A shows an example embodiment of a background map theme manager including numerous selectable fields with headings in groups in accordance with the present invention. When an import button is selected by a user a GIS View may display imported data objects and background map layers. In an example embodiment four layers were read from a map file: railway, roads, parks, and lakes. For a background map a theme manager may be modified in an example embodiment as shown in FIG. 10A.

Figure 10B:
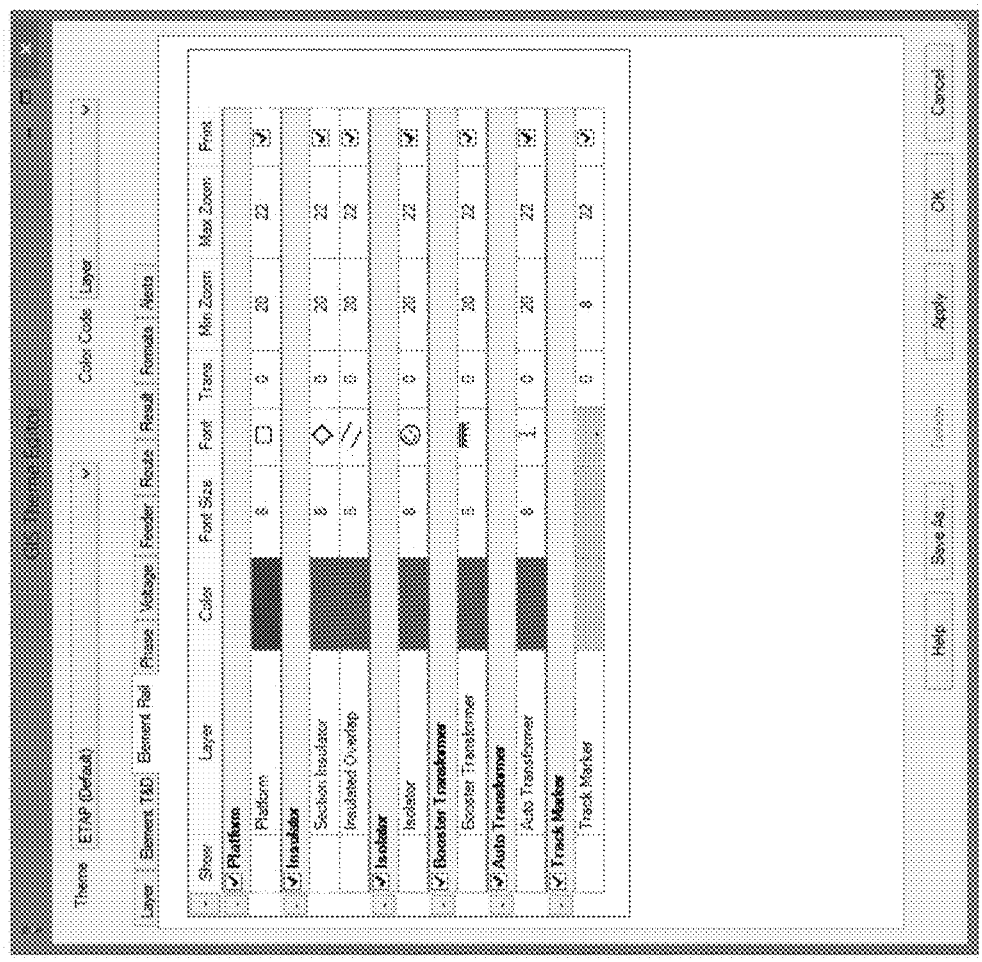
FIG. 10B shows an example embodiment of a theme manager for data objects placed on a track in accordance with the present invention.

FIG. 10B shows an example embodiment of a theme manager for data objects placed on a track in accordance with the present invention. In the example embodiment an equipment page is added to a theme manager and may be titled accordingly, such as "Equipment-railway". On standard pages track edges may be included in a segments group and be named simply track rather than track edge. Track junctions may be added to a junction group and be titled simply track rather than track junctions. Traction station may also be a group name.

Turning to FIG. 10C, an example embodiment of a group under rail devices is shown and includes track/route, platform, train, section insulator/insulated overlap, isolator/isolator switch/isolater switch with Earth heel, PTFE neutral station, signal, level crossing, speed limits, and distance markers.

Similar to FIG. 10C, FIG. 10D includes a group under the heading substation with group members including traction substation, switching/paralleling station, and nodes.

Figure 11A:
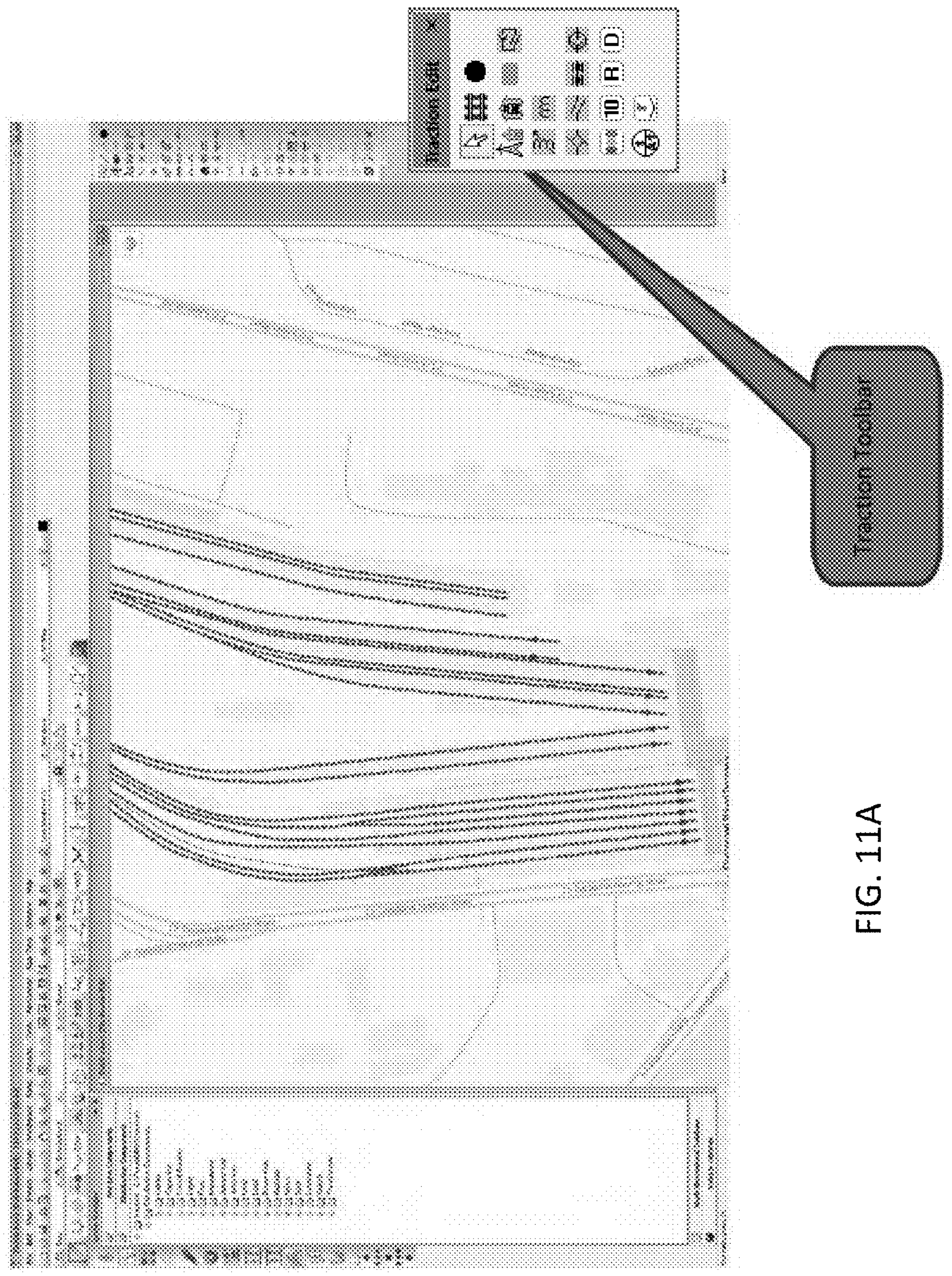
FIG. 11A shows an example embodiment of a GIS representation of an electrical system in accordance with the present invention.

FIG. 11A shows an example embodiment of a GIS representation of an electrical system in accordance with the present invention. In the example embodiment tracks/railway lines are mapped to track object from OSM or SHP files. Also included is a traction toolbar for interaction with track elements.

Figures 11B, 11C, 11D:
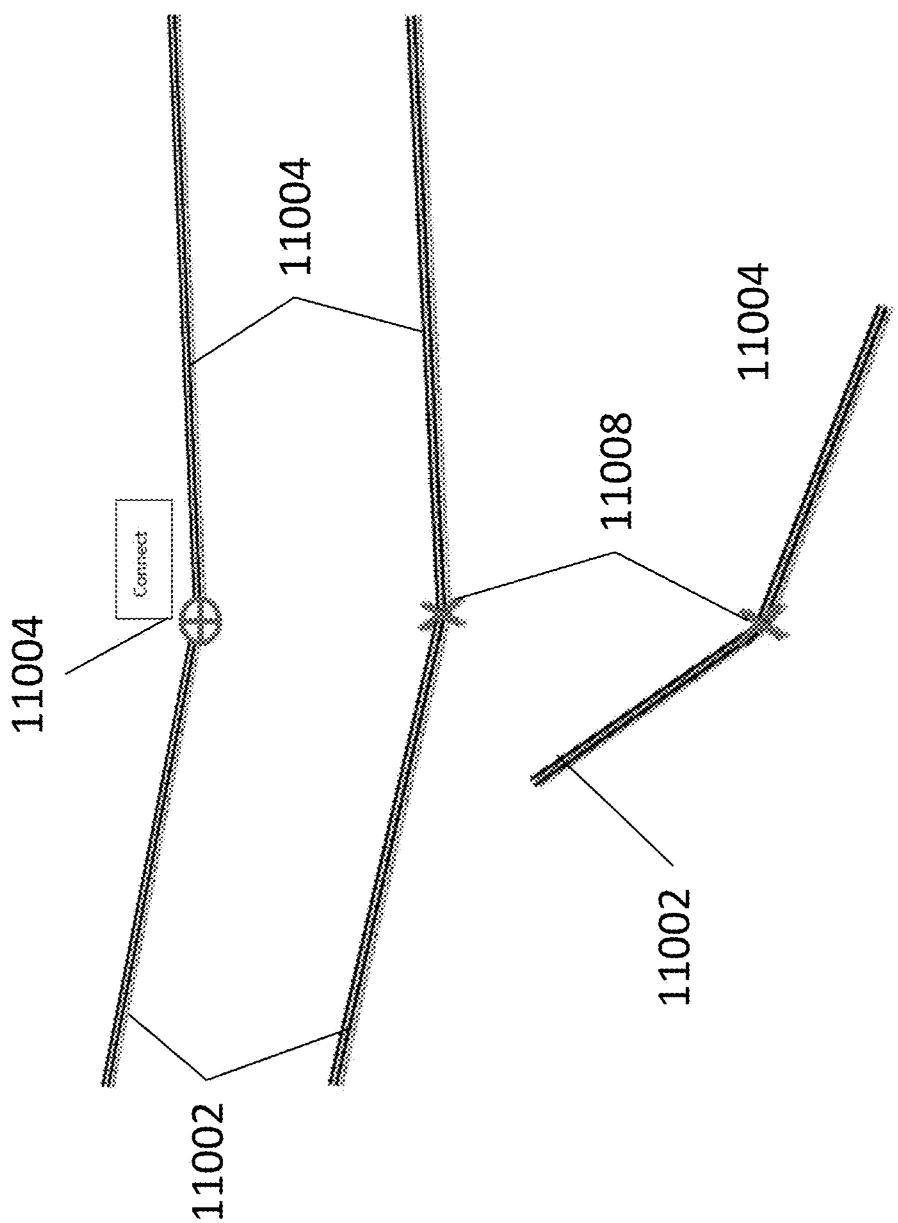
FIGS. 11B-11D show an example embodiment of a connector-less track connectable at a junction or node, connecting the track at the junction or node, and then moving the track around the junction or node respectively in accordance with the present invention.

FIGS. 11B-11D show an example embodiment of a connector-less track connectable at a junction or node, connecting the track at the junction or node, and then moving the track around the junction or node respectively in accordance with the present invention. In the example embodiment shown in FIG. 11B, track 11002 and track 11004 have endpoints which are in close proximity to each other. When two segments of track are in close proximity the program may display possible connection available element 11004 to signify to a user that the track segments may be joined at a location. FIG. 11C shows an example embodiment of how a connection may appear when a user touches track 11002 and track 11004 in the program and the program makes a connection at location 11008. In some embodiments where track 11002 and 11004 are straight, aligned or nearly aligned the tracks will join seamlessly. In some embodiments where track 11002 and 11004 form an angle when connected at location 11008 then a bend point may be created in the track. FIG. 11D shows an example embodiment of how tracks may be rotated about a bend point after being connected. In some embodiments users may delete bend points using a simple process such as a keyboard shortcut or point and click option. Similarly, in some embodiments bend points may be easily added using a simple process such as a keyboard shortcut or a point and click option.

Figure 11E:
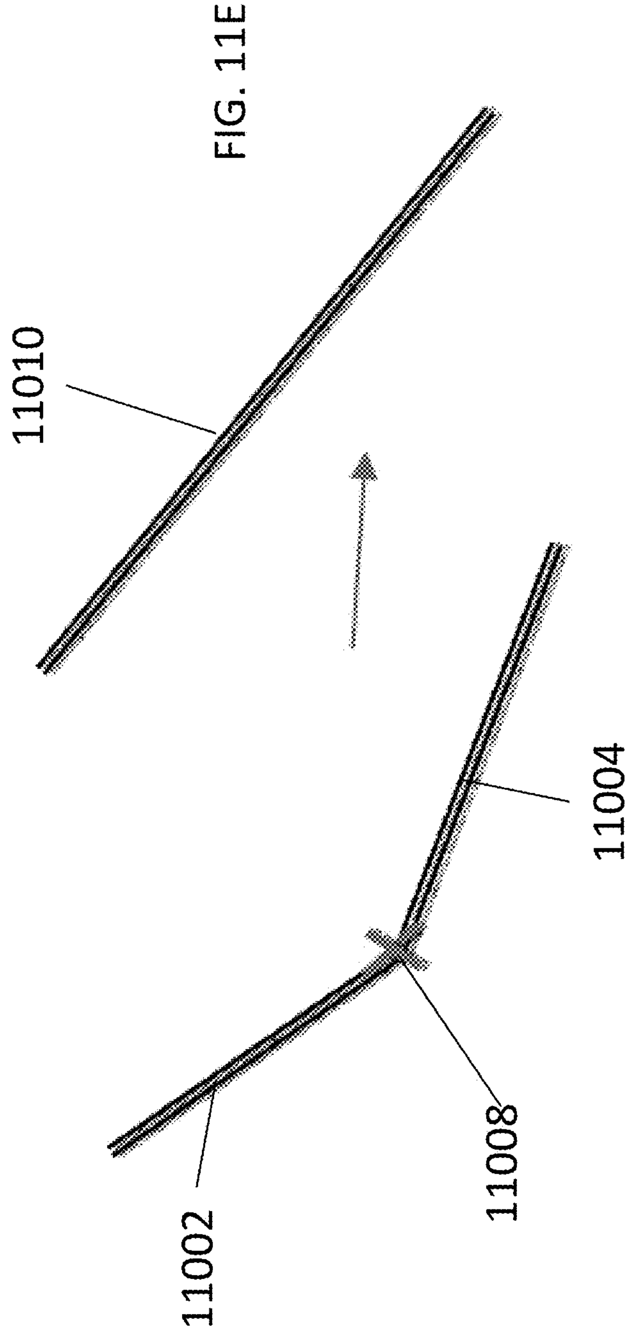
FIG. 11E shows an example embodiment of a user deleting or otherwise removing a bend point and the tracks being automatically merged in accordance with the present invention.

FIG. 11E shows an example embodiment of a user deleting or otherwise removing a bend point and the tracks being automatically merged in accordance with the present invention. In the example embodiment track 11002 and 11004 are connected at bend point 11008. Upon deletion of bend point 11008, tracks 11002 and 11004 may be merged and create a single track line segment 11010.

Figures 11F, 11G, 11H:
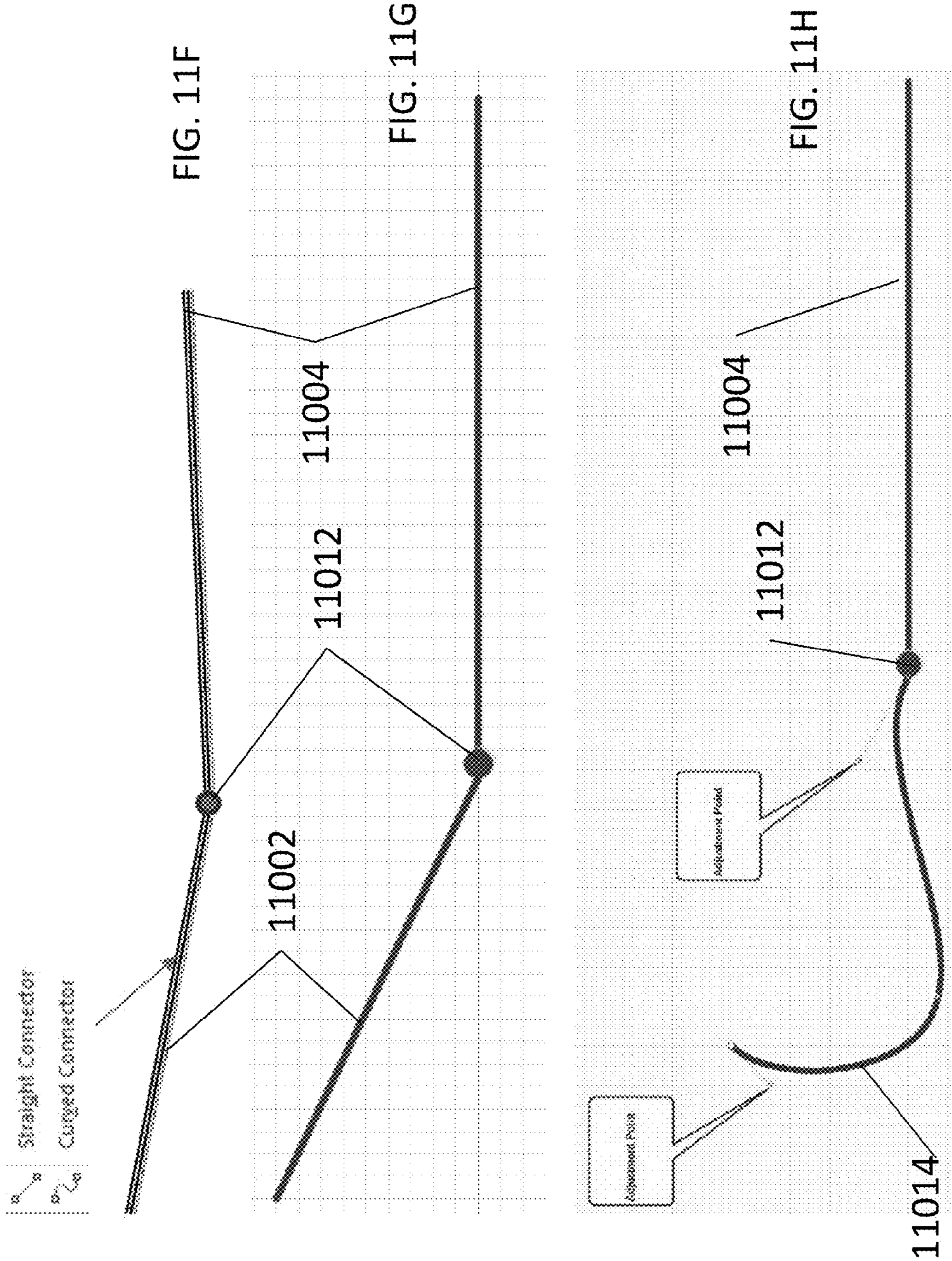
FIGS. 11F-H shows an example embodiment of changing a track from straight or bent to subsequently being curved/arced in accordance with the present invention.

FIGS. 11F-H shows an example embodiment of changing a track from straight or bent to subsequently being curved/arced in accordance with the present invention. In the example embodiment a user may change orientation from straight or bent to curved using simple keystroke commands or opening menus and selecting an option. In the example embodiment segment 11002 is converted to segment 11014 using two adjustment points. For example, a first adjustment point 11012 may be connected to segment 11004. A second adjustment point may be located at the terminus of segment 11014. Once the adjustment points are placed a user can bend and curve segment 11014 between the adjustment points in order to achieve a desired curve.

FIG. 11I shows an example embodiment of node properties in accordance with the present invention. In the example embodiment properties such as identifiers, services, connections, groundings, bonds to rails, and coordinates may each have the listed associated properties.

Figure 11J:
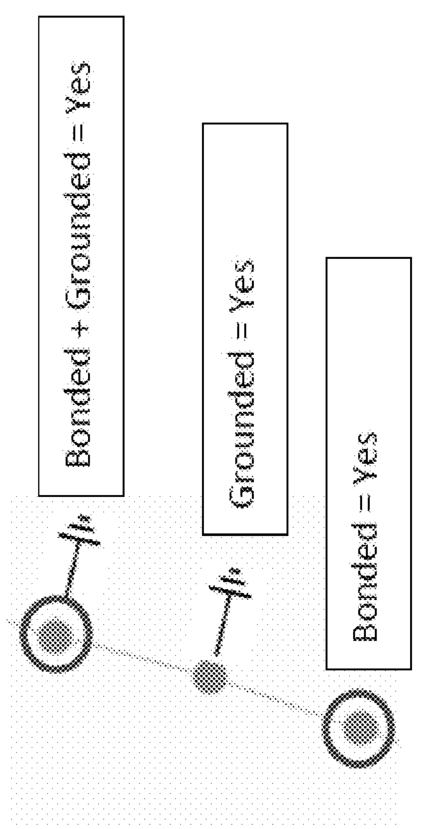
FIG. 11J shows an example embodiment of three different node types.

Turning to FIG. 11J, an example of three different node types is shown. In the example embodiment a node with a circular halo and grounding symbol signifies that the node is bonded and grounded. A node with a grounding symbol means that the node is grounded. A node with a circular halo means that the node is bonded.

Figure 11K:
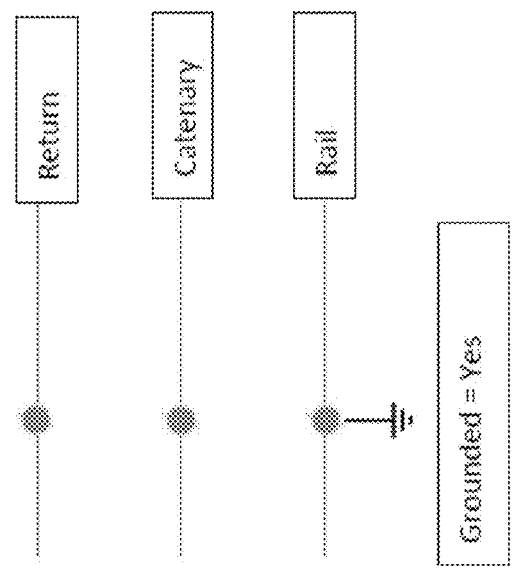
FIG. 11K shows an example embodiment of a three rail system is shown with grounding for a rail while a return and catenary rail not grounded or bonded.

Turning to FIG. 11K, an example of a three rail system is shown with grounding for a rail while a return and catenary rail not grounded or bonded.

Figure 11M:
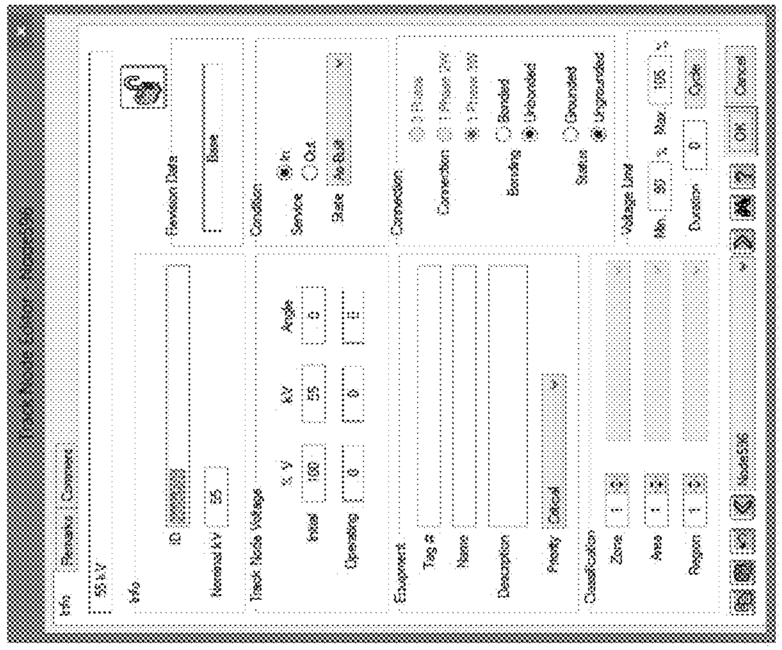
FIG. 11M shows an example embodiment of a track node editor.
Figure 11L:
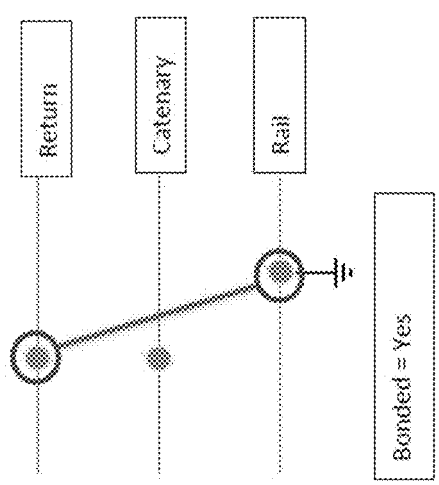
FIG. 11L shows an example embodiment of a three rail system is shown with a rail grounded and a return bonded to the rail.

Turning to FIG. 11L, an example embodiment of a three rail system is shown with a rail grounded and a return bonded to the rail.

Turning to FIG. 11M, an example embodiment of a track node editor is shown. In the example embodiment a user may name the node with an identifier and include Nominal kV in an info field. In a voltage field a user may include % V, kV and angle for both initial and operating conditions. Also included is an equipment field including a tag number (#), name, description and priority (such as critical). Nodes may be classified in a classification field including by zone, area, and region. Revision data and condition are discussed elsewhere herein and will not be repeated here to save space. Node connection may include radio buttons allowing users to choose between options. Subfields include connection with "1 phase 2 W" and "1 phase 3 W", bonding with bonded or unbonded and status with grounded or ungrounded. Also included is a voltage limit field with minimum, maximum and duration as well as a button for cycling.

Figure 11N:
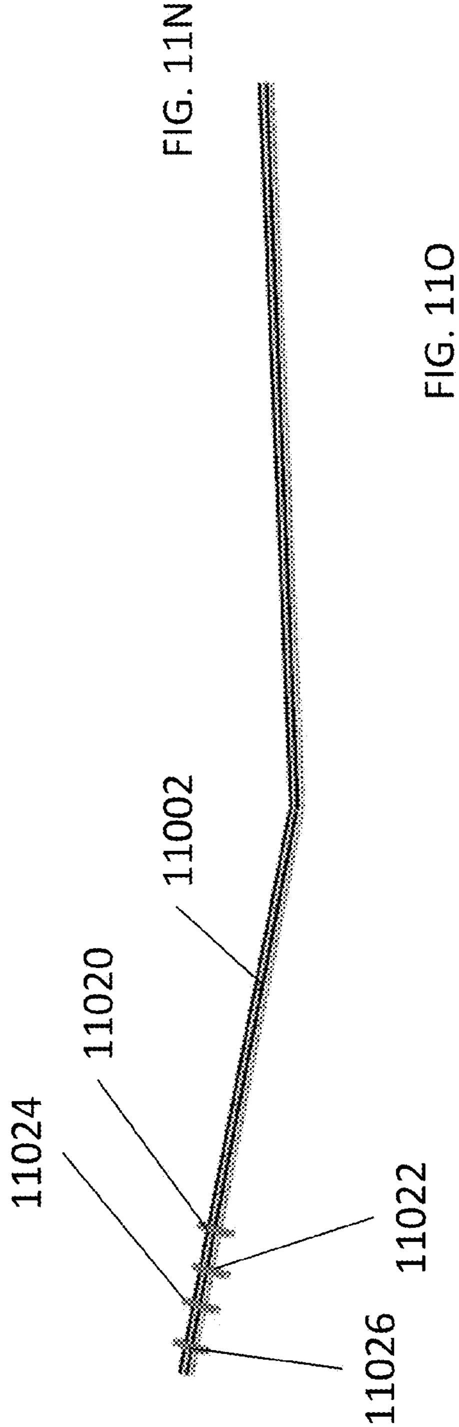
FIG. 11N shows an example embodiment of distance markers displayed on a track.

Turning to FIG. 11N, an example embodiment of distance markers displayed on a track is shown. In the example embodiment distance markers may be turned on or off in a theme manager screen. Generally, distance markers are shown at fixed distances selected in a track editor. In some embodiments distance markers may be set at a default of every 0.25 km. In the example embodiment distance markers 11020, 11022, 11024, 11026 are shown on track 11002.

Figure 11O:
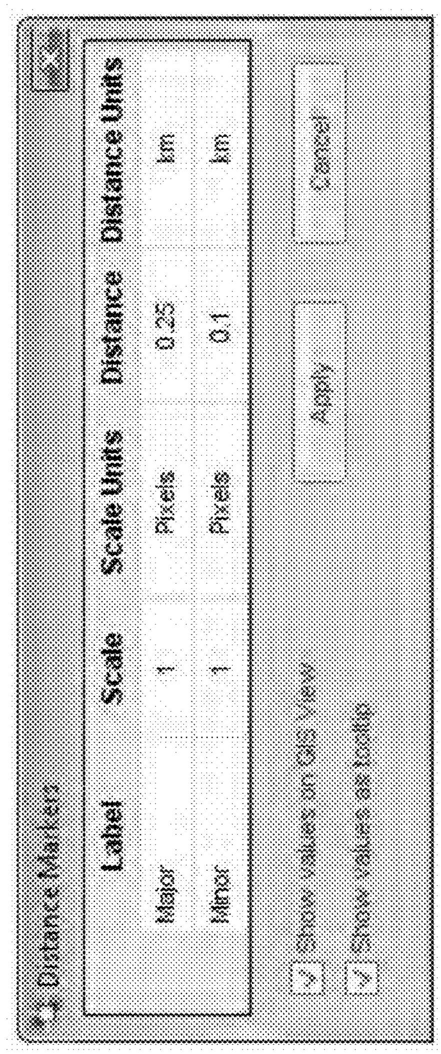
FIG. 11O shows an example embodiment of a distance marker editor is shown which may be displayed when a user opens it by first selecting a distance marker.

Turning to FIG. 11O, an example embodiment of a distance marker editor is shown which may be displayed when a user opens it by first selecting a distance marker. In the example embodiment the distance marker editor allows users to edit labels, scale, scale units, distance, and distance units in addition to choosing whether to show values in GIS View and/or as a tooltip. In the example embodiment scale and scale units are limited to 1 and pixels respectively. Distance may be a number from 0.1 to 999 with units of feet, meters, km, or miles. In the example embodiment distance markers are not adjustable, meaning that the distances set in the distance marker editor scale directly to distances shown in GIS and OLV. In other embodiments distance markers can be adjustable and moved by users to help with readability. In the example embodiment GIS View may show distance values as annotations. In some embodiments when a user hovers a cursor or other tool over a distance marker a distance value of the marker may be shown as a tooltip.

Regarding nodes, junctions and bend points, users may drop them anywhere on tracks. If a user has not selected a track then junctions may be dropped on any location on a track or within a close, predefined range near the track. When users select tracks prior to selecting junction point buttons on a toolbar then a "snap and glue" or "magnetic" behavior may be enabled. In these modes a cursor may automatically lock on to a selected track element. These modes may be used for other components that may be dropped on tracks as well. In connection modes information may be displayed at the tooltip. This information may include x, y location; latitude and longitude; distance from nearest station and station name with associated units of measure; distance from track end 1 including station name; and distance from track end 2 including station name.

Figures 11P, 11Q:
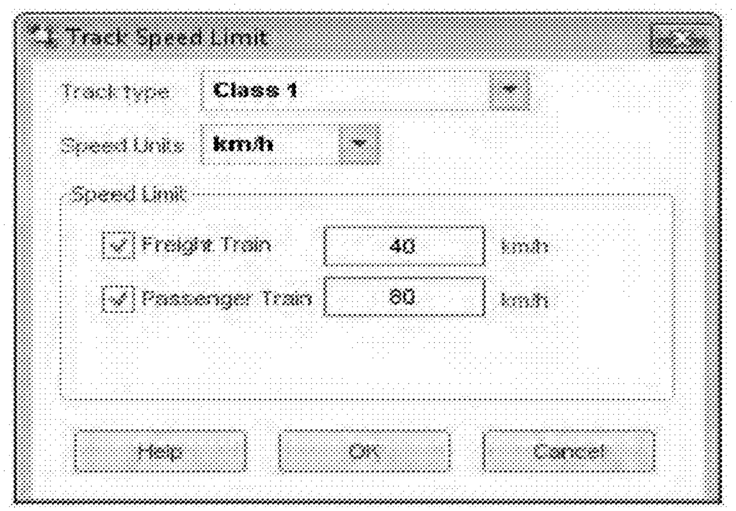

Turning to FIG. 11P, an example embodiment of a track speed limit editor is shown. In the example embodiment track speed limits may exhibit magnetic behavior as described above. When a speed limit component is placed on a track the editor may be displayed for the user such that the user may edit many of the options. Track type and speed units may be dropdown menus with selectable options. Freight train and passenger train options may be turned on or off as appropriate and the value may also be changed for each.

Turning to FIGS. 11Q-R, an example of numerous class types and ANSI standard speed limits are shown for freight and passenger trains. Additionally or alternatively when IEC standard is used FIG. 11R may apply. Speed units may be a non-editable dropdown list of km/h or mph.

Figure 11S:
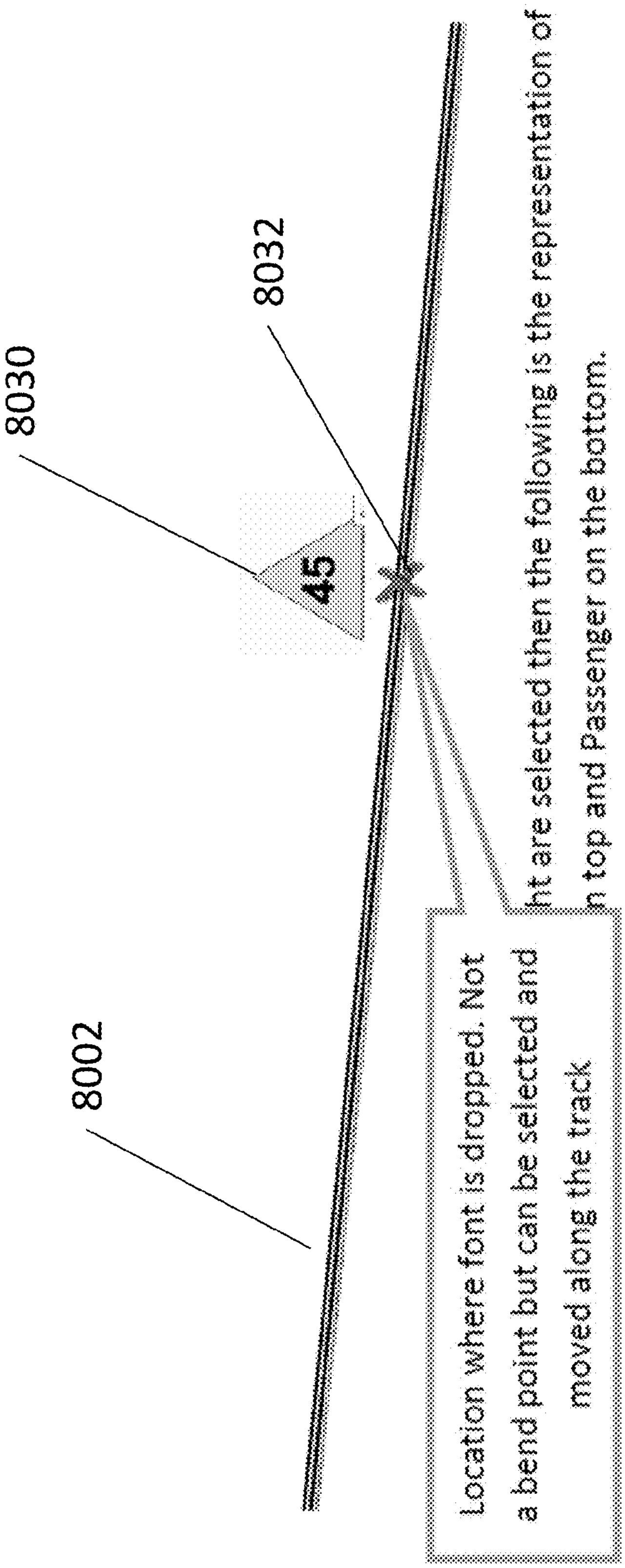
FIG. 11S shows an example embodiment of a checkbox may be selected for displaying a track speed limit for passenger trains.

In some embodiments a checkbox may be selected for displaying a track speed limit for passenger trains as shown in FIG. 11S. In an example embodiment a location may be shown which is not a bend point but rather is the location of the speed limit. This point may be moved along the track as appropriate.

Figure 11T:
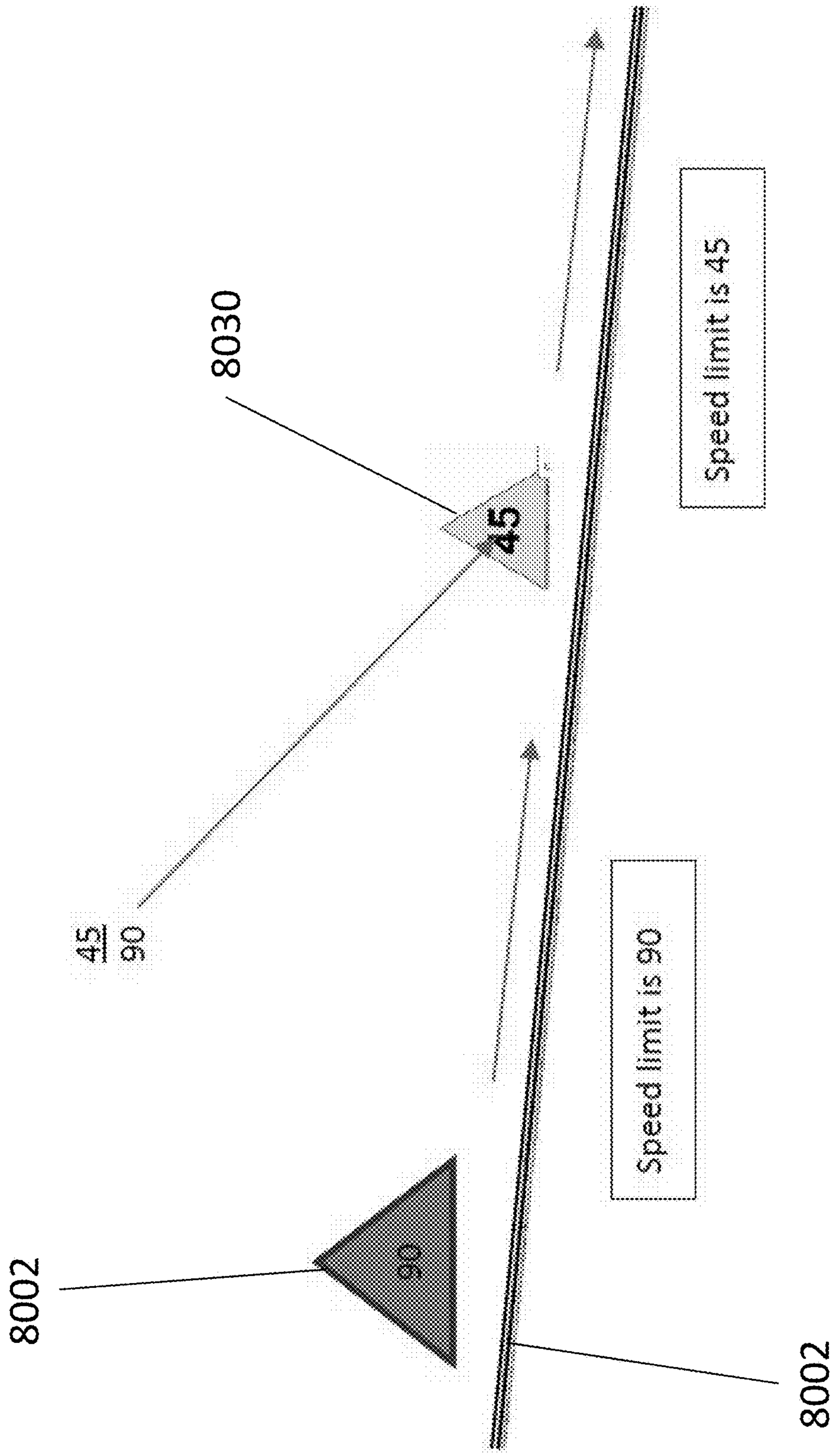
FIG. 11T shows an example embodiment of how passenger and freight trains speed limits may be displayed.

In some embodiments both passenger and freight trains speed limits may be displayed as shown in FIG. 11T. In FIG. 11T, passenger train speed limit 8002 may be displayed for track 8002 near freight train speed limit 8030. Also included may be a display of freight train speed limit over passenger train speed limit or its inverse (45/90 in the example embodiment). In many embodiments speed limit markers may indicate the beginning of a speed limit section while if no other speed limit markers are placed then a placed speed limit marker may be enforced along the length of an associated track and/or segment.

Figure 11U:
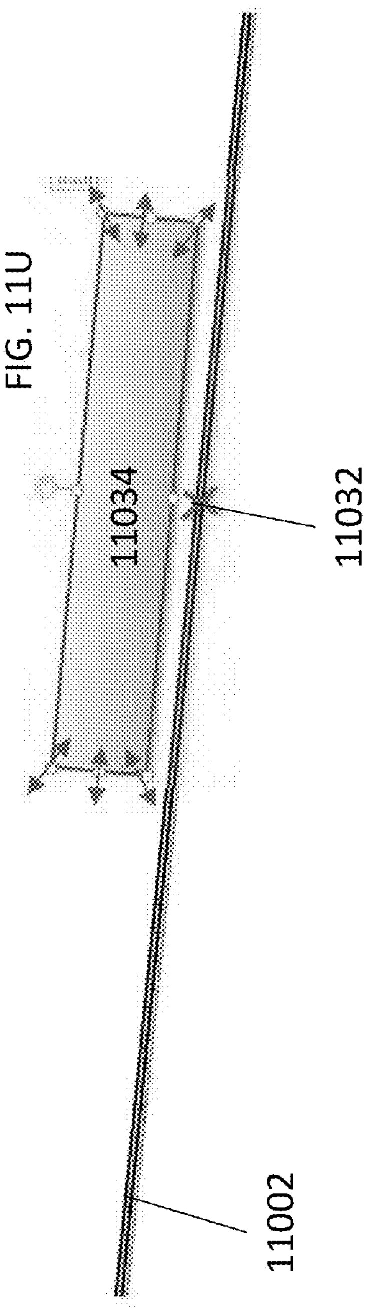
FIG. 11U shows an example embodiment of platform sizing and manipulating.

FIG. 11U shows an example embodiment of a platform 11034 that can be sized and scaled and even dragged along a track 11002 at a point 11032 in accordance with the present invention. In the example embodiment transparency, color, de-cluttering, and other options may be controlled by the platform layer in a GIS theme manager. Selecting a platform and opening a platform editor may result in a screen showing such as the example embodiment in FIG. 11V.

Figure 11V:
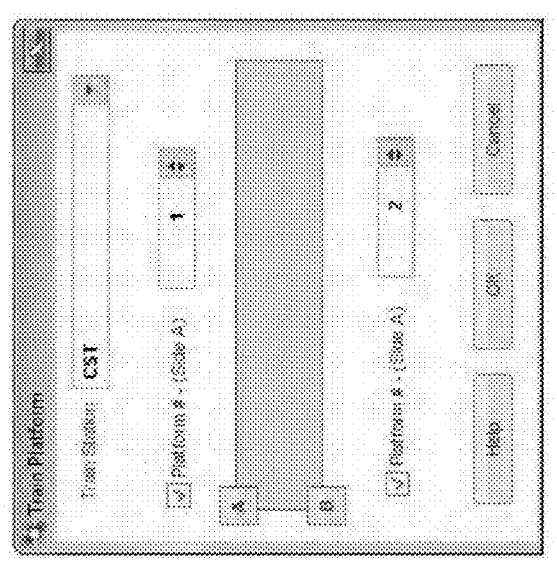
FIG. 11V shows an example embodiment of a display editor for a platform in accordance with the present invention.

Turning to FIG. 11V, an example embodiment of a display editor for a platform in accordance with the present invention is shown. In the example embodiment a train station associated with the platform being edited is selectable from a dropdown menu. While train stations may have two platforms (A & B), if only one side is selected then the display shown in FIG. 11W is shown.

Figure 11W:
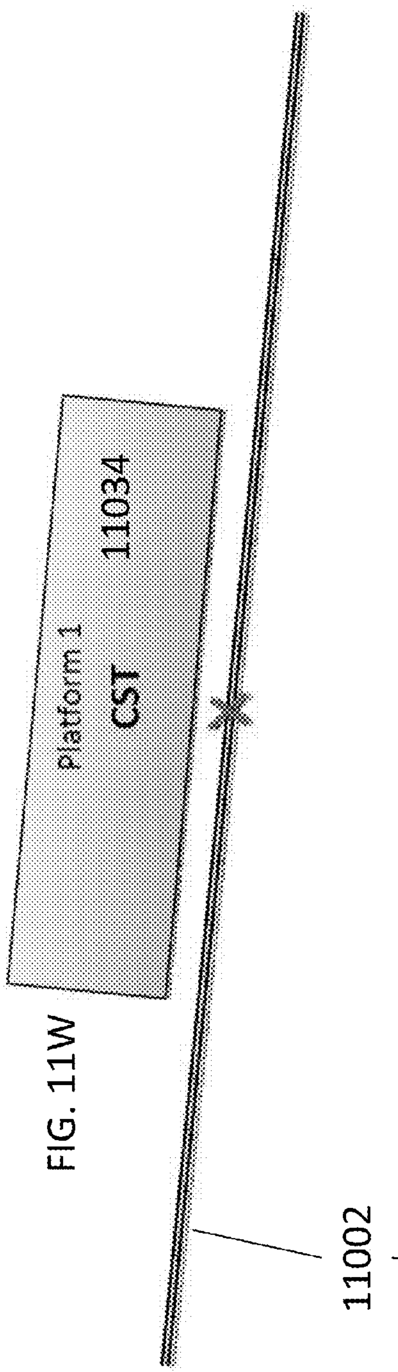
FIG. 11W shows an example embodiment of a representation of a train station with a single platform.

FIG. 11W shows a train station 11034 and associated track with a single platform configuration.

Figure 11X:
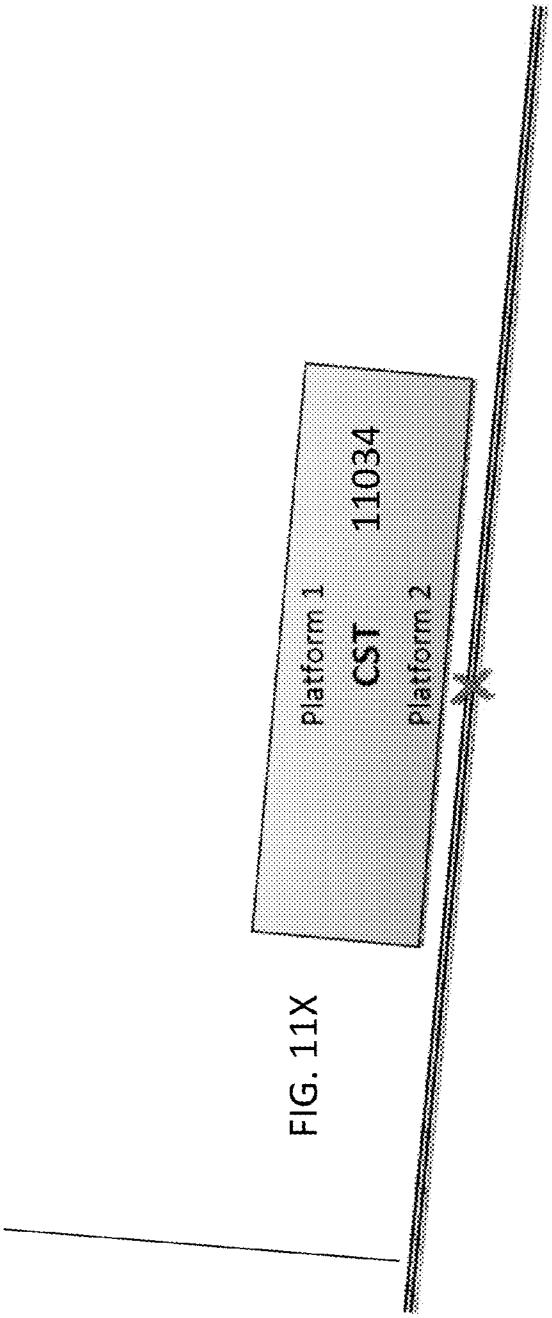
FIG. 11X shows an example embodiment of a representation of a train station with a single platform.

FIG. 11X shows a train station 11034 and associated track 11002 with a dual platform configuration.

Figure 11Y:
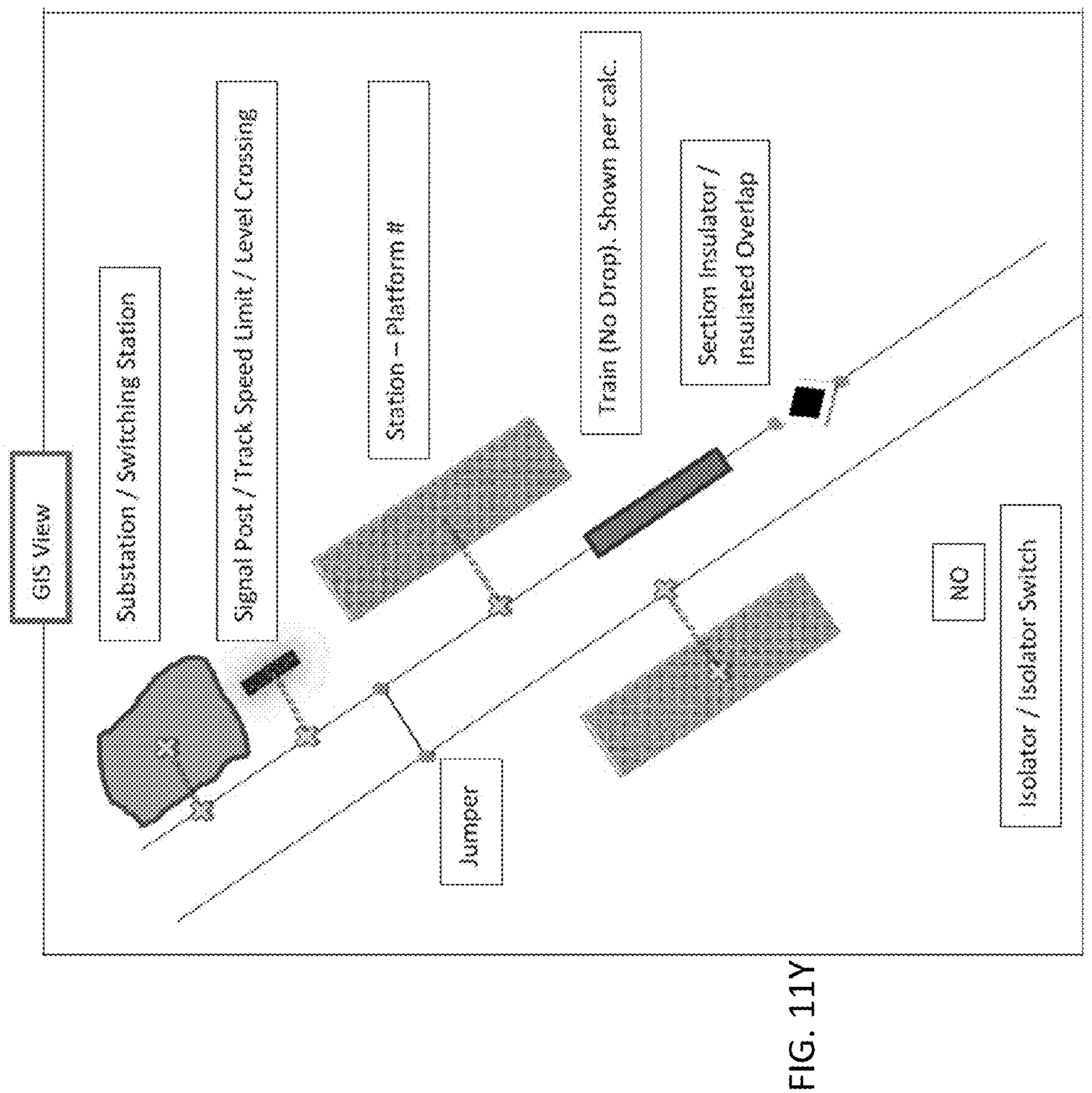
FIGS. 11Y-Z show example embodiments of a fraction substation/switching station in accordance with the present invention.
Figure 11Z:
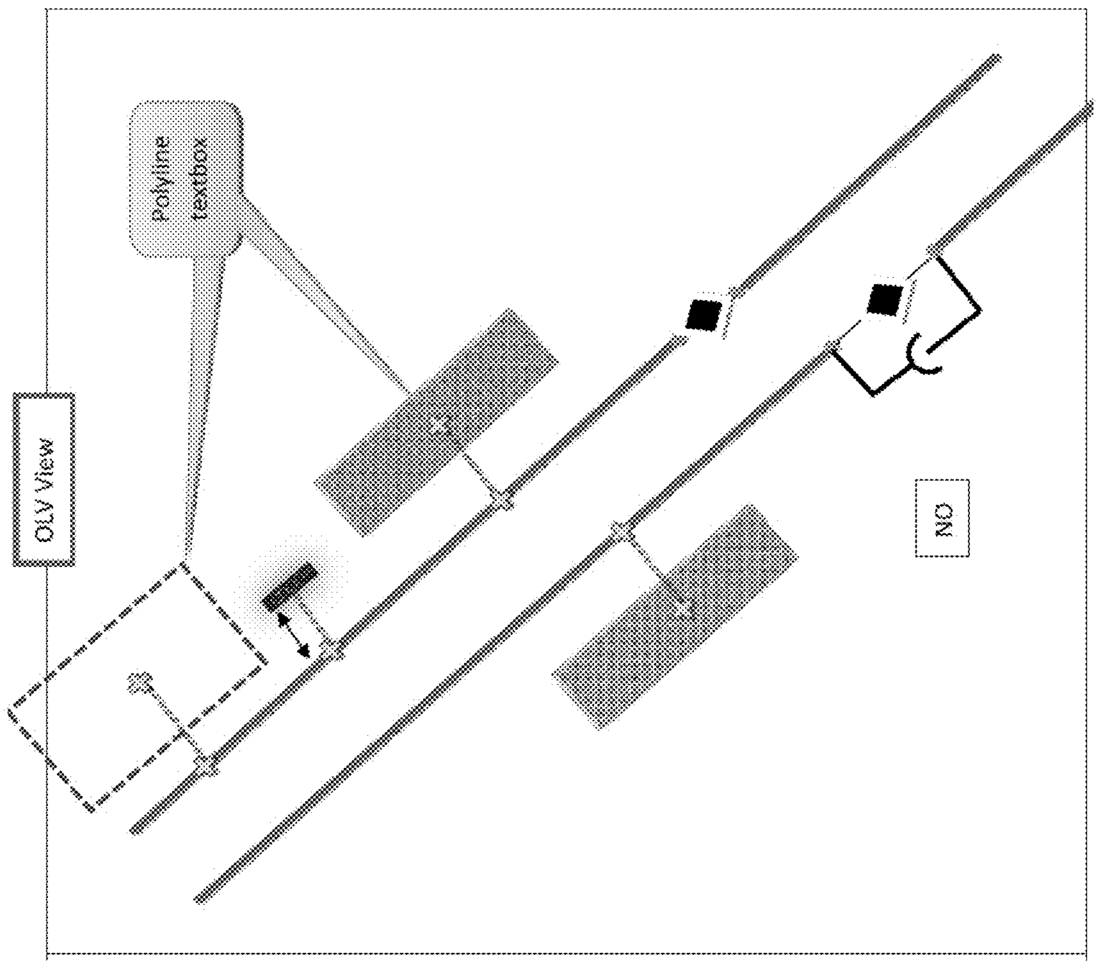
Figure 11A:
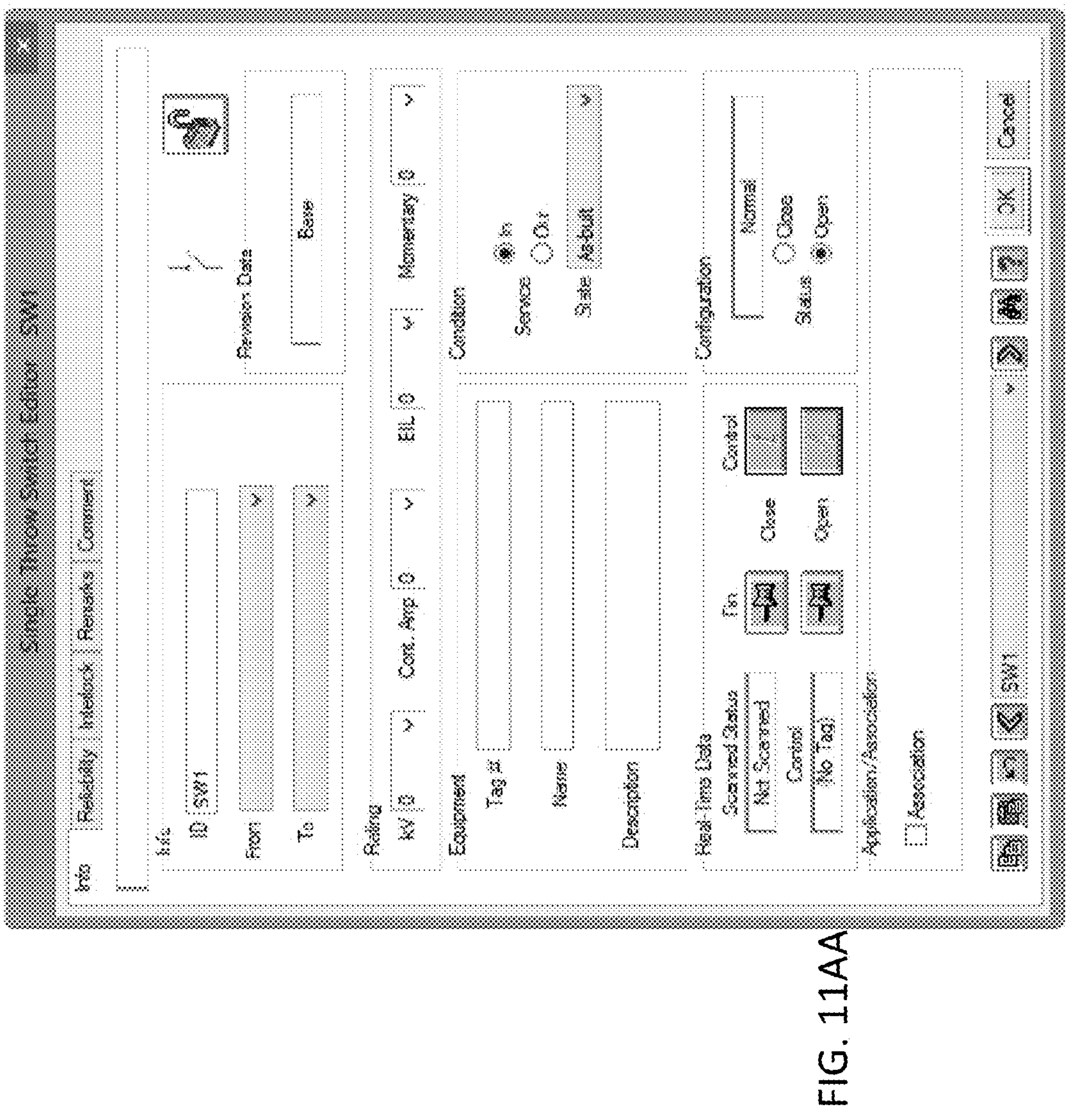
Figure 11A:
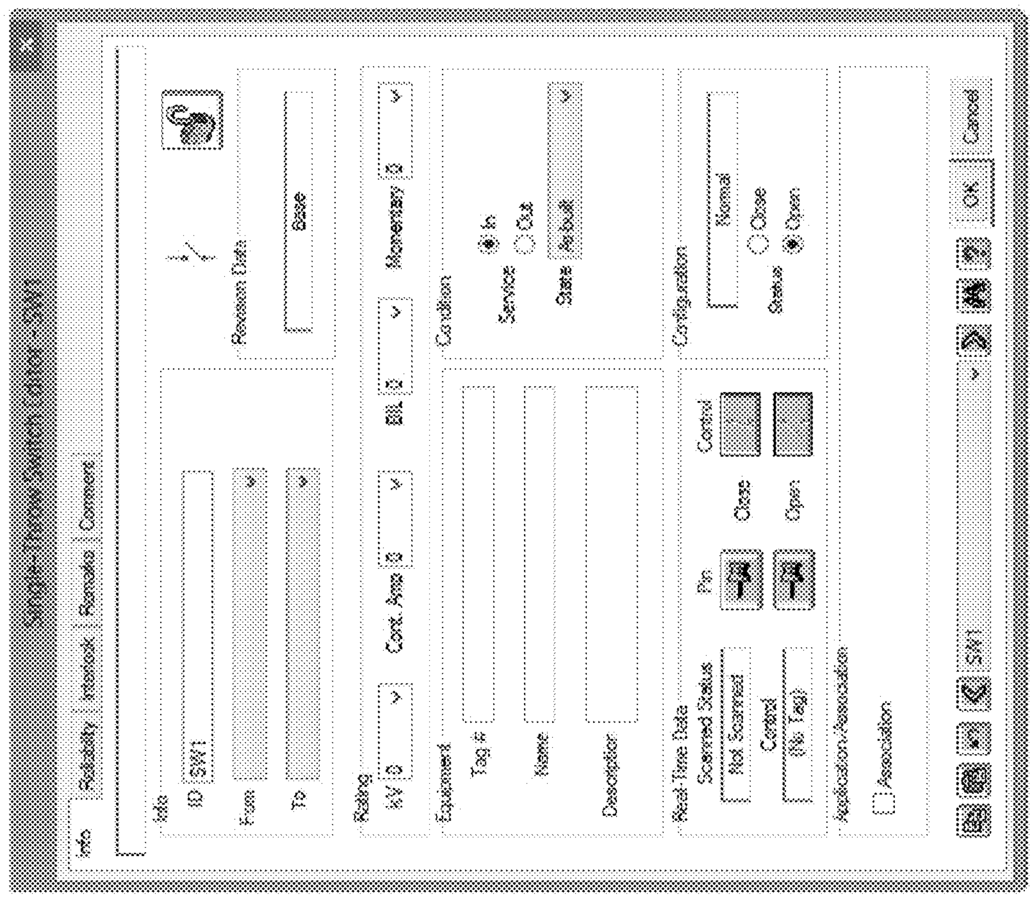
Figure 11A:
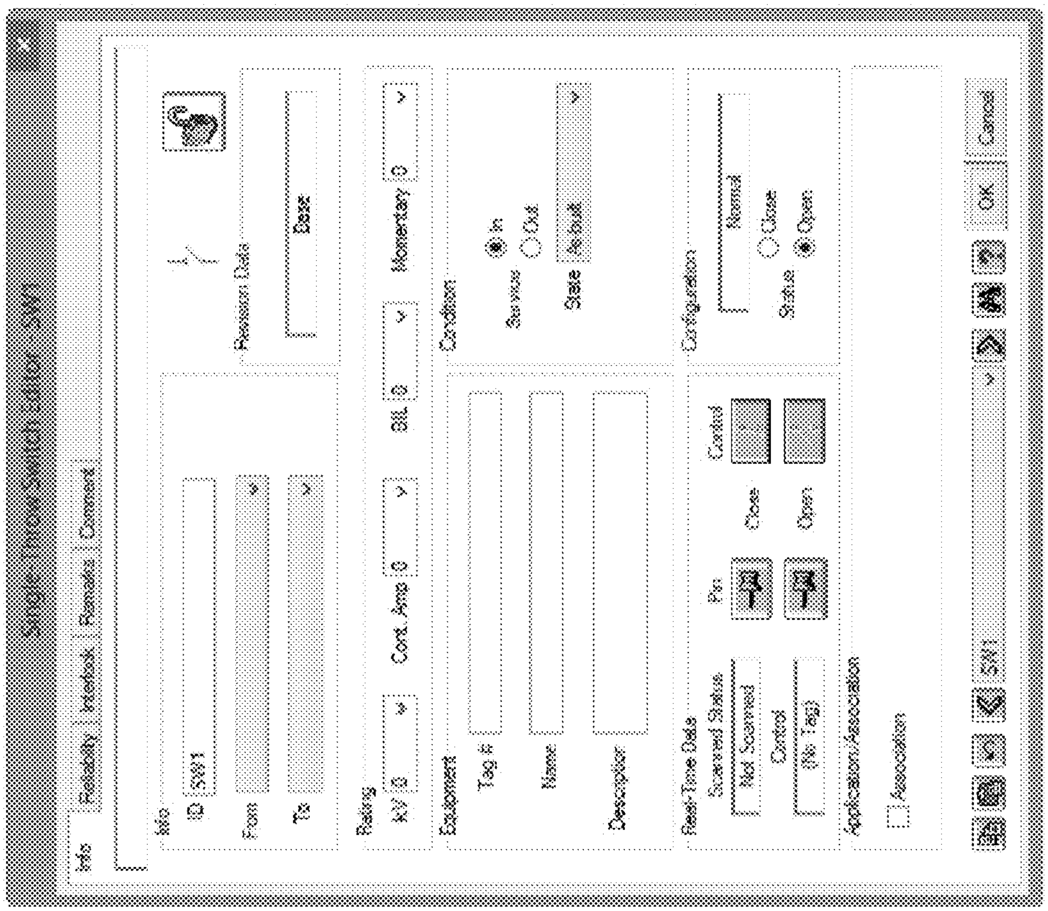
Figure 11A:
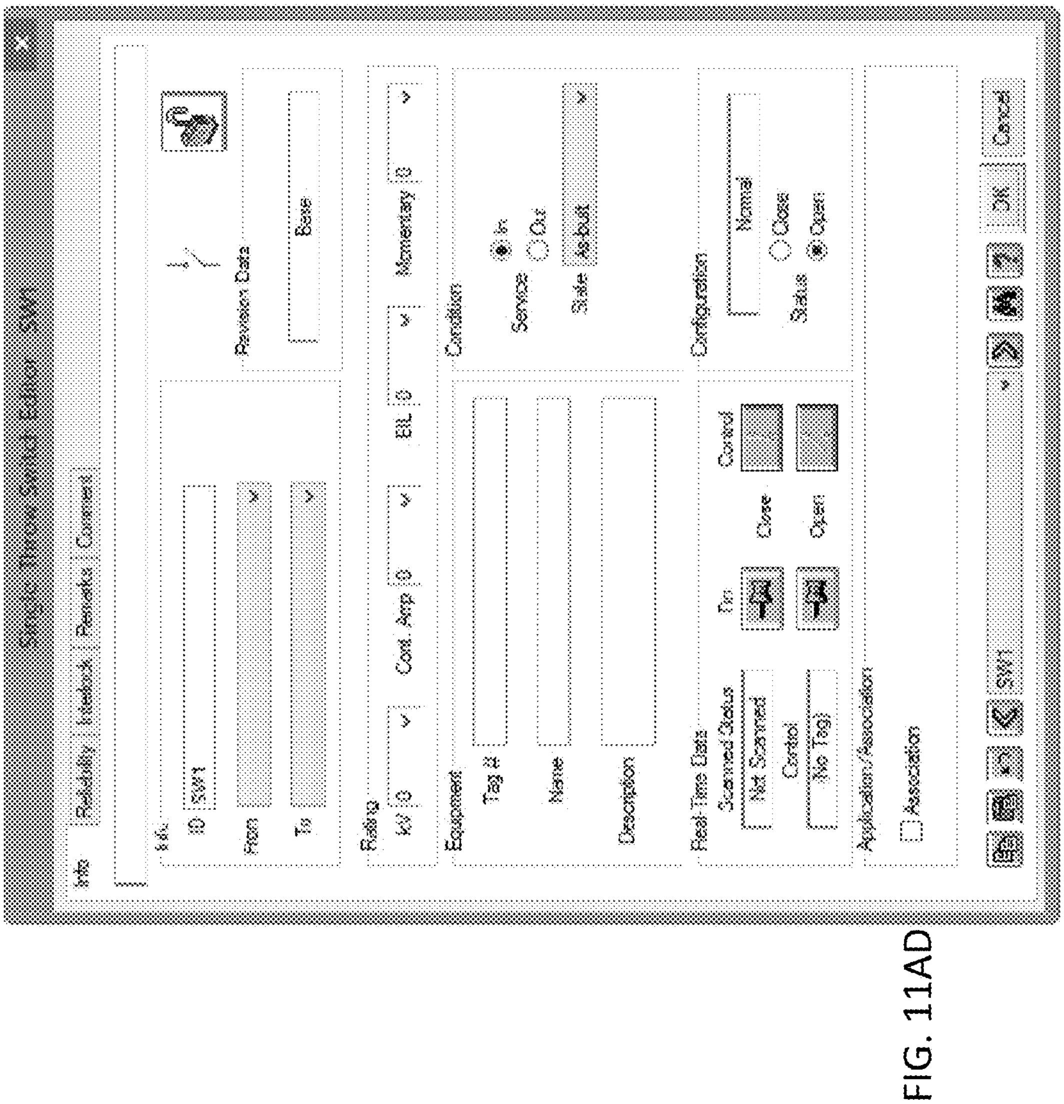
Figure 11A:
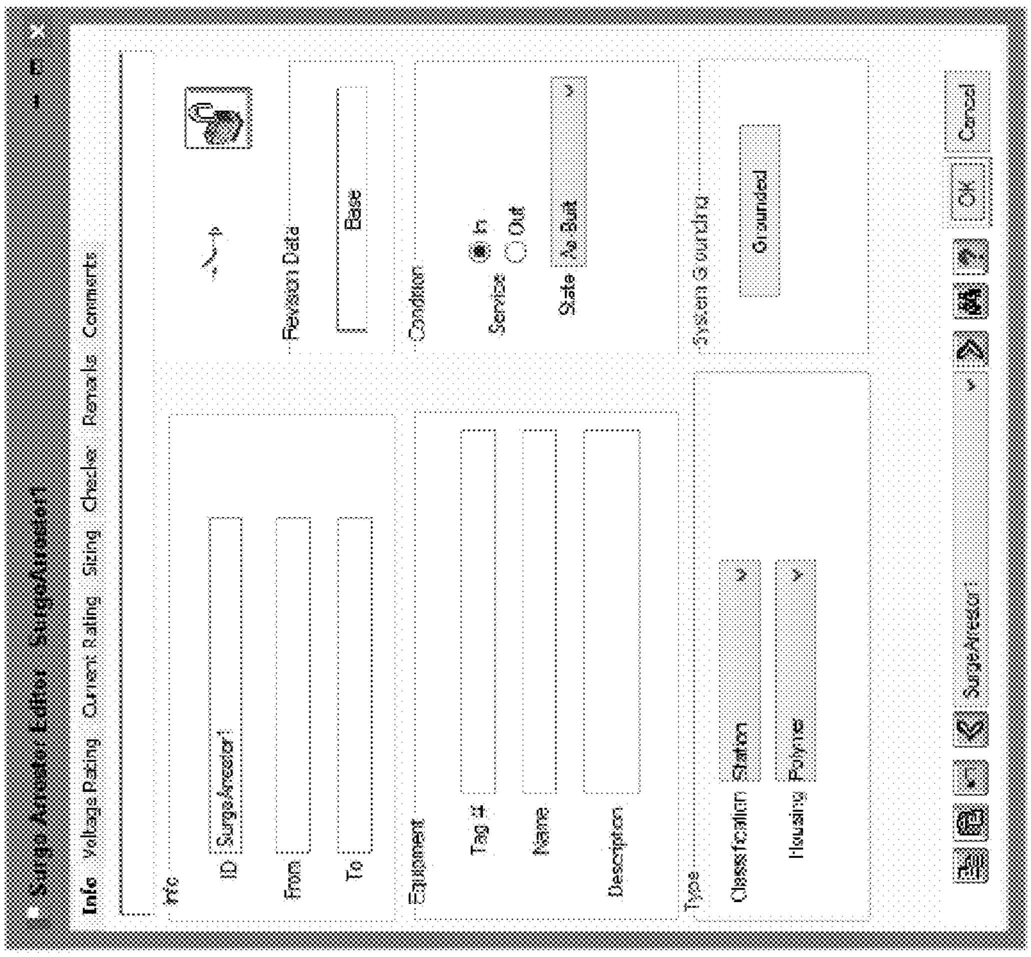
Figure 11A:
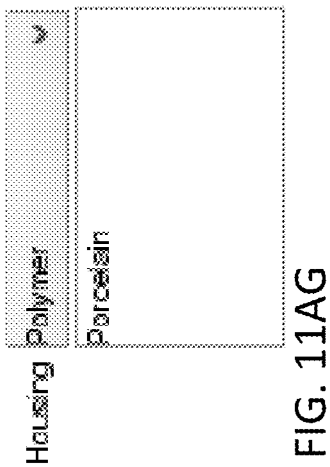
Figure 11A:
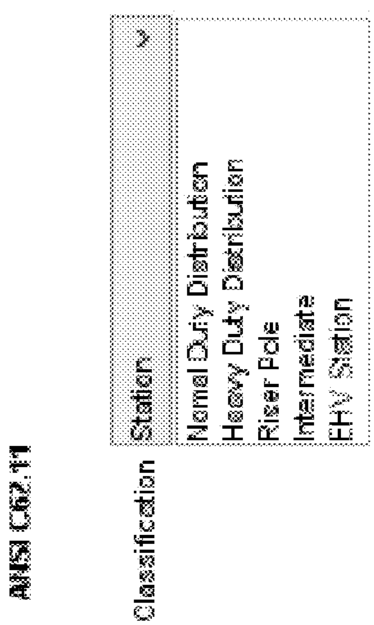
Figure 11A:
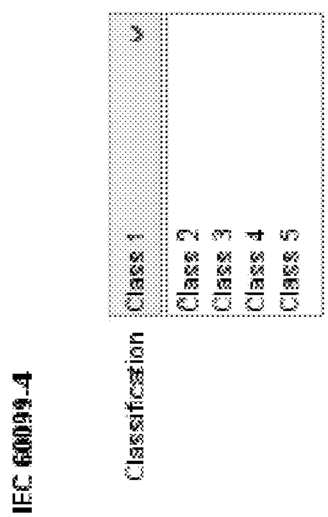
Figure 11A:
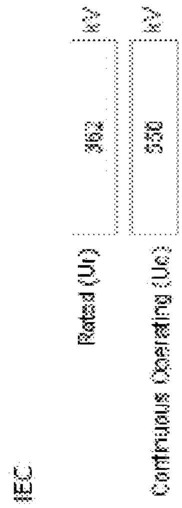
Figure 11A:
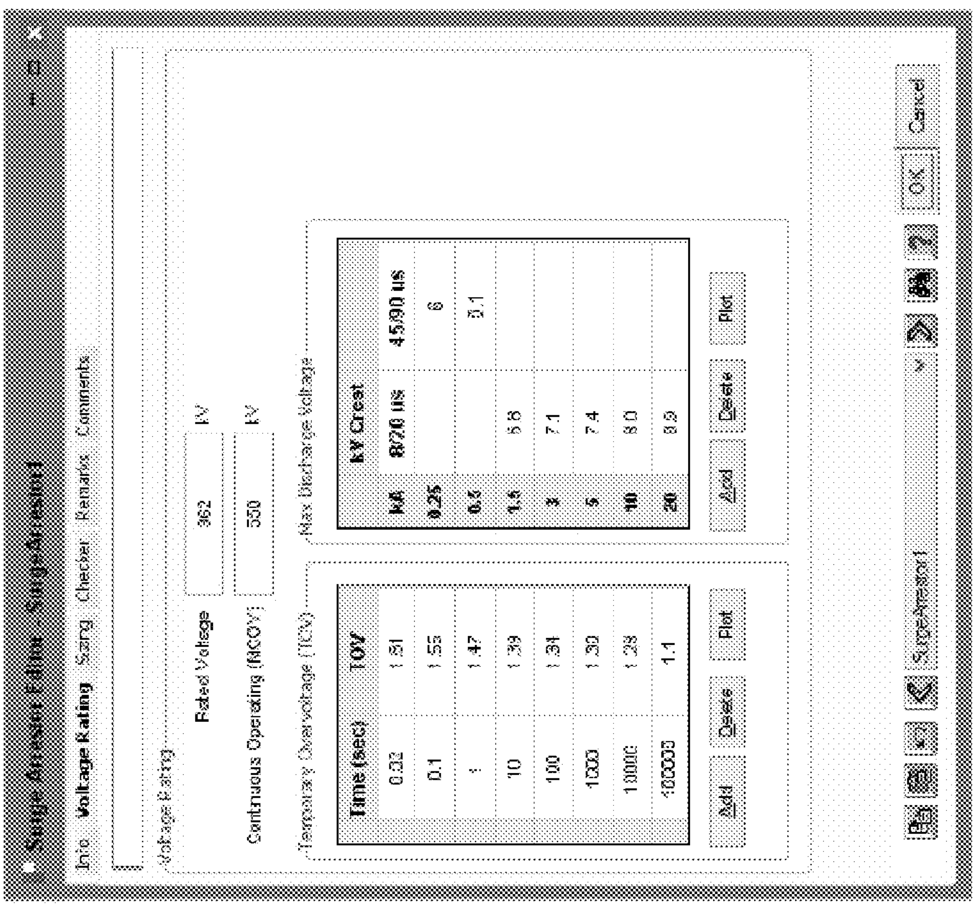
Figure 11A:
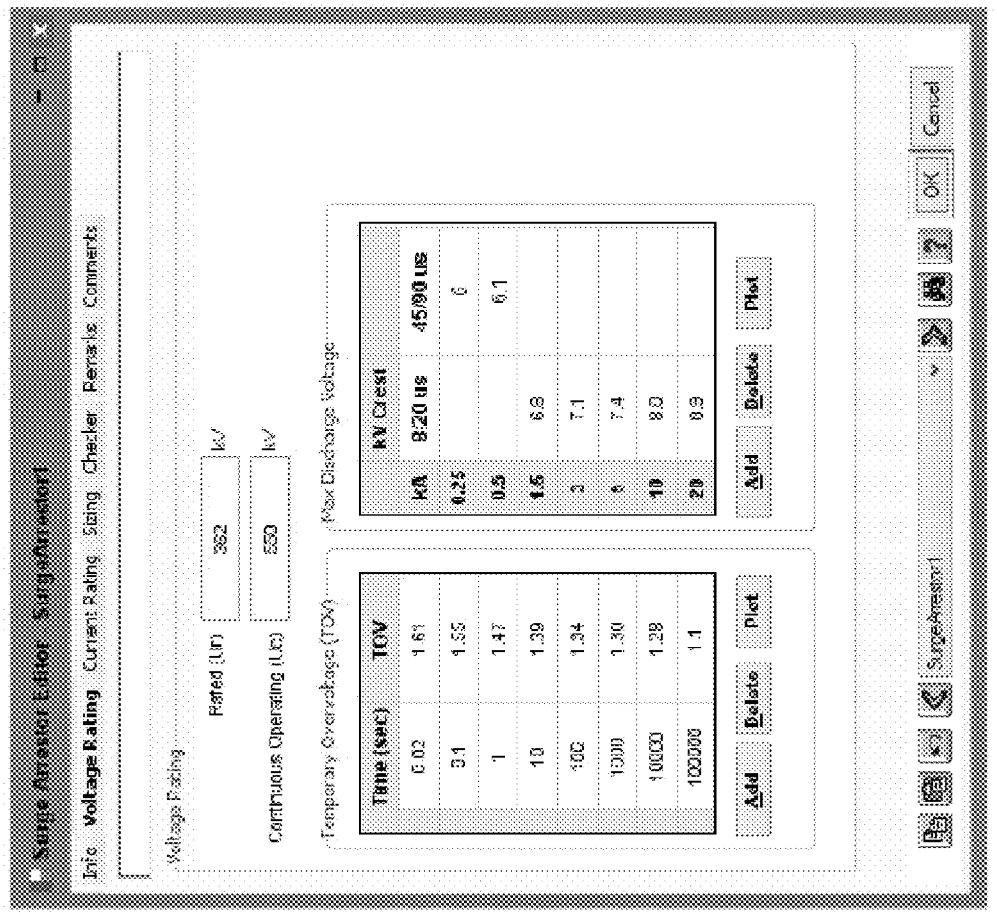
Figure 11A:
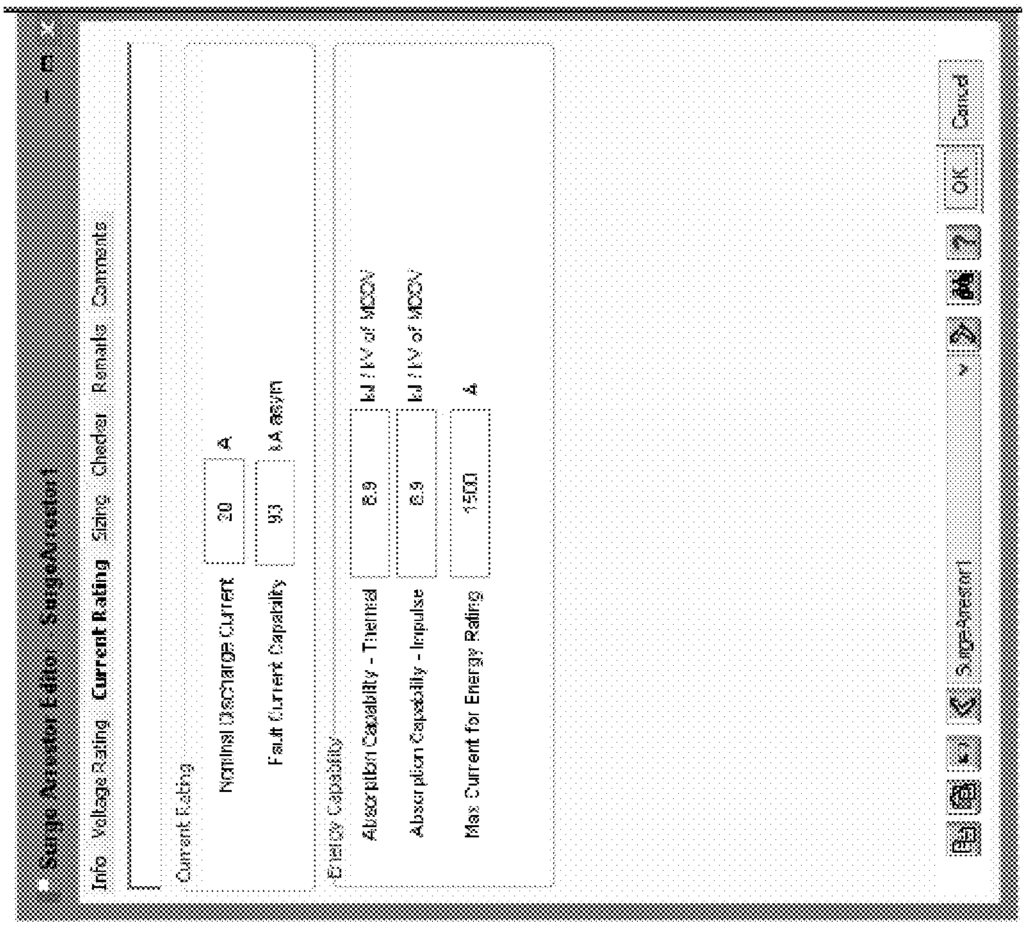
Figure 11A:
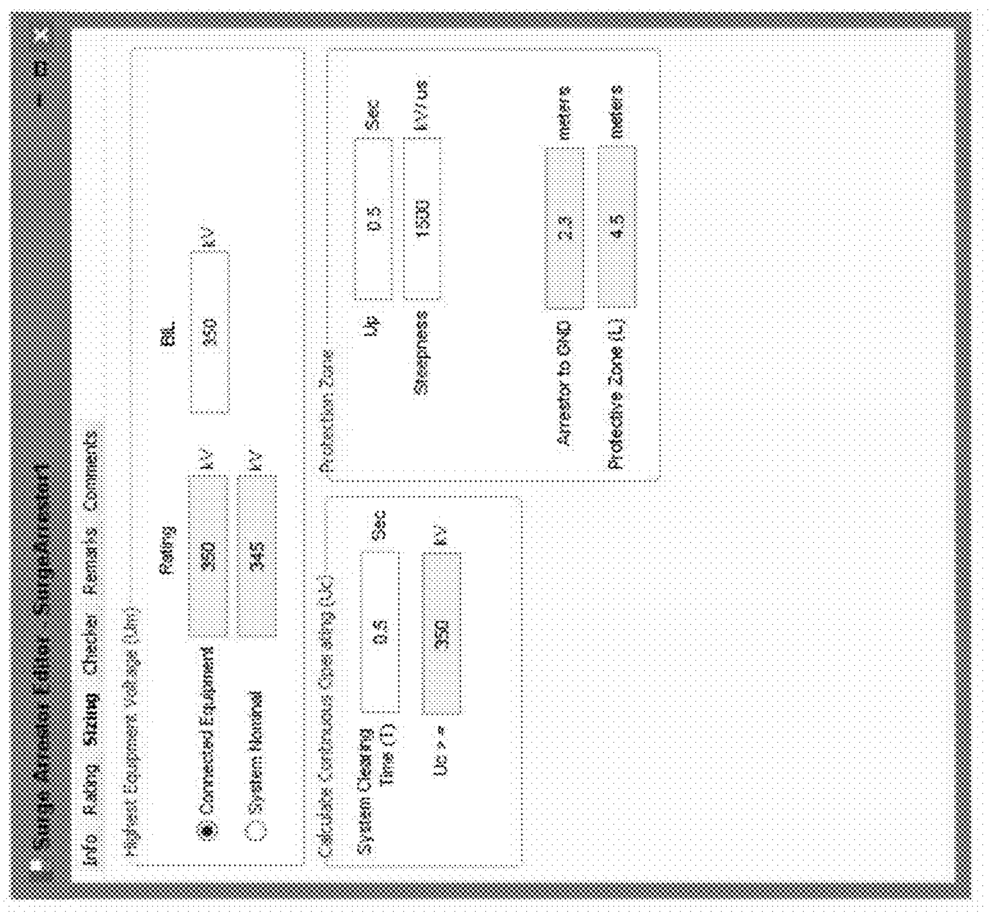
Figure 11A:
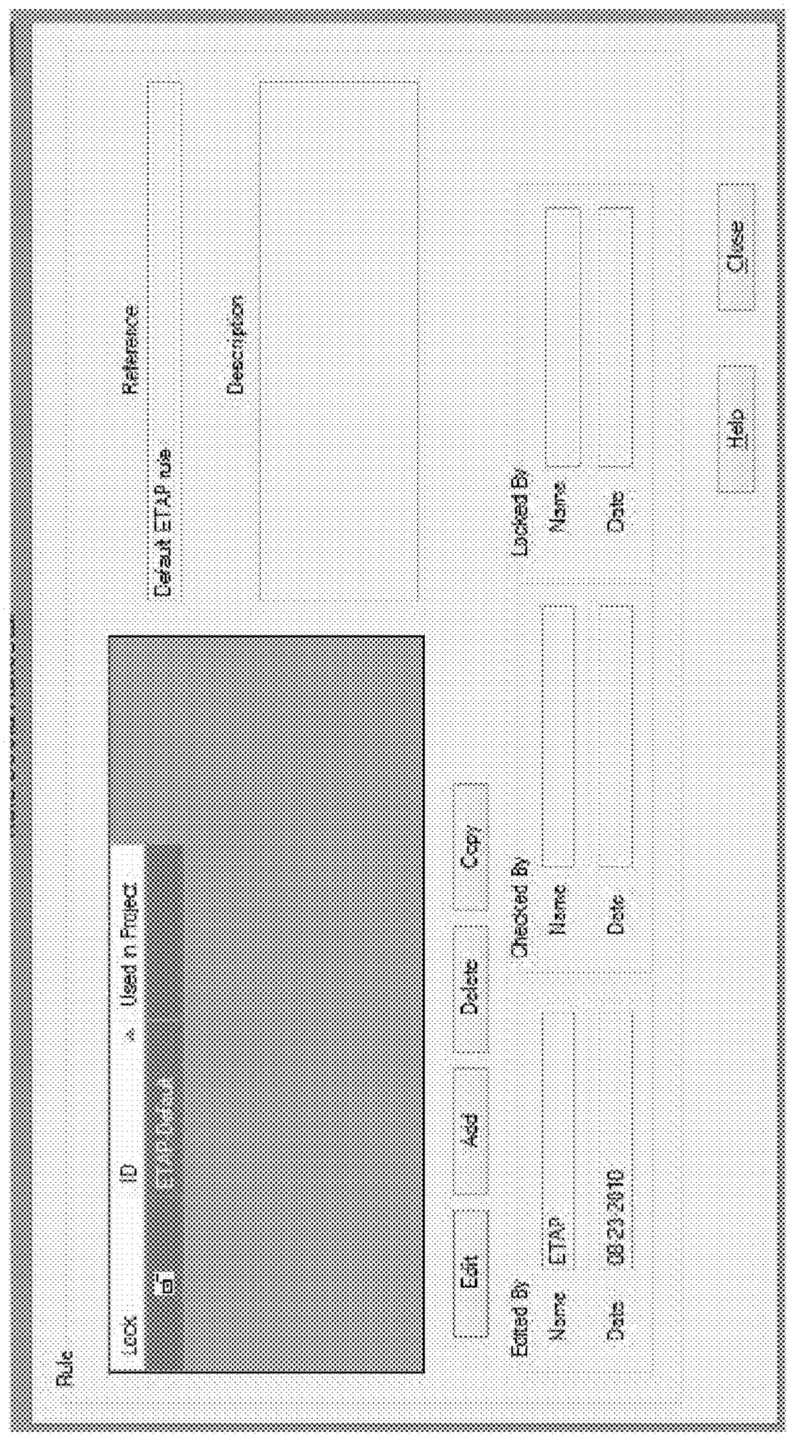
Figure 11A:
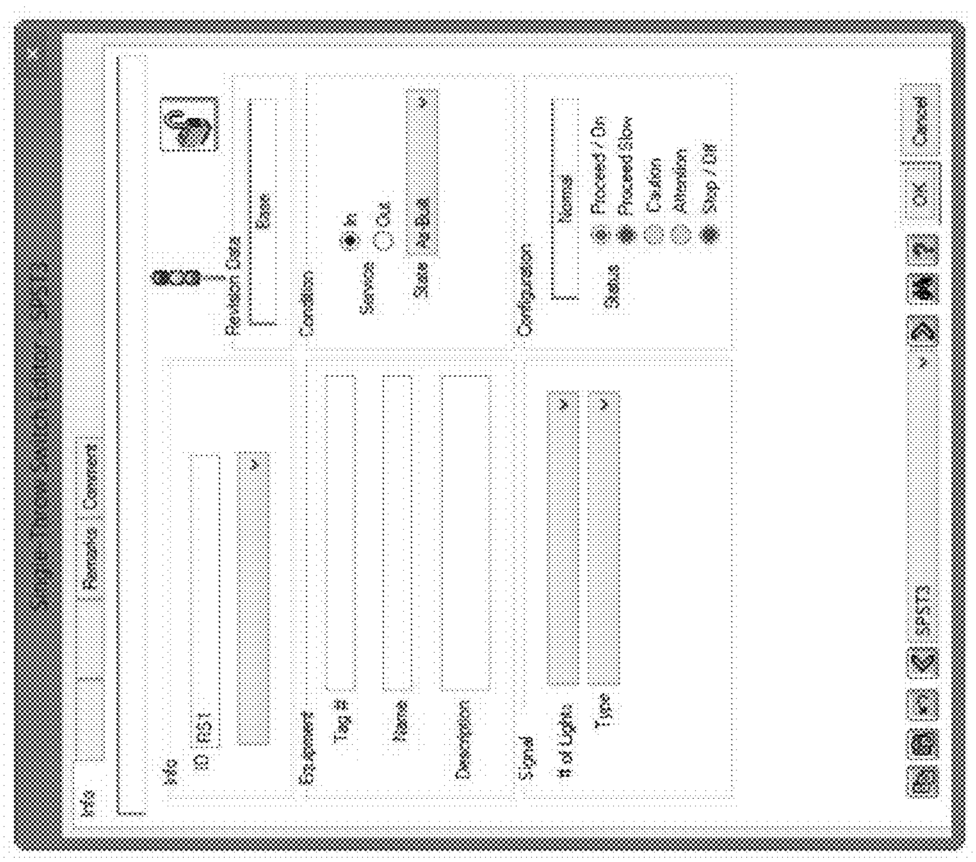
Figure 11A:
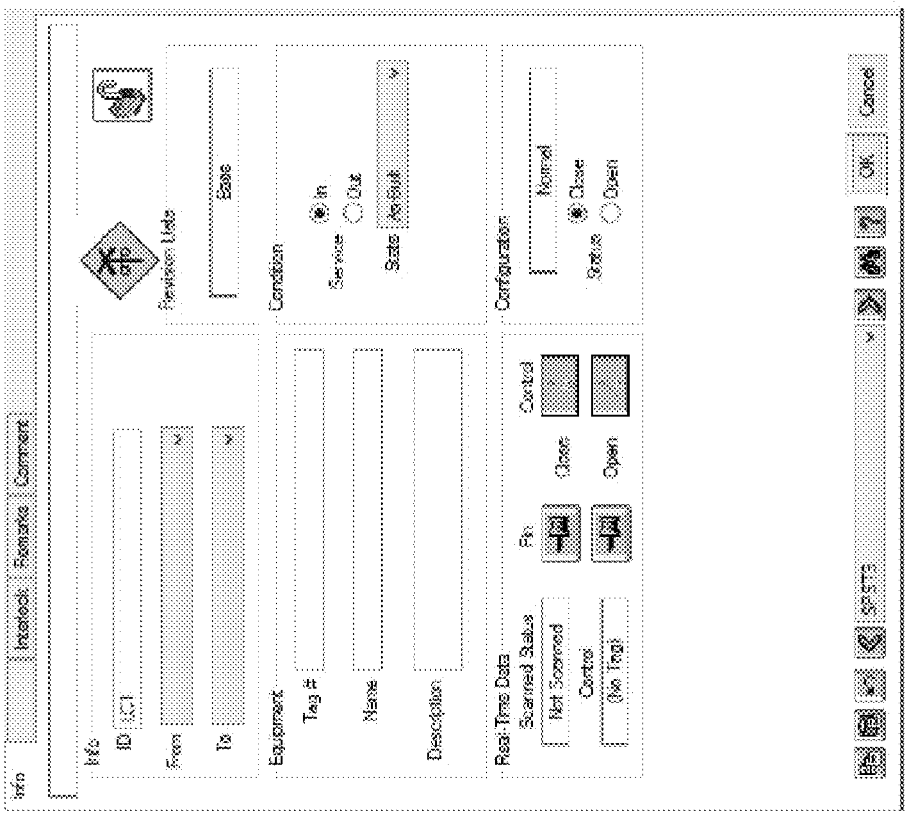

Turning to FIG. 11Y-Z, an example embodiment of a traction substation/switching station is shown in accordance with the present invention in GIS View and OLV view respectively. In the example embodiment, when a traction substation is dropped anywhere on a GIS view it becomes associated with the nearest track. In many embodiments a traction substation/switching station is a polyline object that may be sized, scaled, and dragged along a track. Traction substation/switching stations may be converted to polyline textboxes in OLV and paced near tracks based on a scale used to convert objects from GIS View to OLV.

FIG. 11AA shows an example embodiment of an editor for a single throw switch in accordance with the present invention in OLV or GIS. In the example embodiment this may be a section insulator with a switch in the open position and when added in OLV will have the same or similar properties to a switch in the open position. It should be understood that editors including but not limited to that shown in FIG. 11AA can apply changes to all user views including GIS, OLV, three-line views, and other views. This aids in simplifying user interaction with the system, as it allows users to apply updates and changes to each view simultaneously across all views. The chance for human error and other inconsistencies is significantly reduced since numerous individual editors are not required for each view to perform the same operations as applied to each view.

FIG. 11AB is an example embodiment of an editor for a single throw switch in accordance with the present invention. In the example embodiment an insulated overlap may be a switch in an open position, which may also be a default position, and when added in OLV will have the same or similar properties to a switch in the open position. Insulated overlaps can occur at substations while overlaps can occur along track lines not at substations.

FIG. 11AC is an example embodiment of an isolator switch editor in accordance with the present invention. In the example embodiment an isolator switch is a switch with open and closed position options. In OLV an isolator may have the same properties as a switch in closed position as a default configuration. Isolator switches are not meant to break current but rather to break a circuit when no current is passing through. If an attempt is made to open a switch when current is being carried then severe arcing may occur at the switch contacts and could result in serious consequences including danger to the operator.

In the example embodiment numerous fields are shown including info, revision data, condition data, and configuration which are similar to in other screens and will not be described here in depth in order to save space. A rating field includes subfields for kV, Cont. Amp, BIL, and Momentary. An Equipment field includes a Tag number (#), Name, and Description. A Real-Time Data field includes sub-fields including Scanned status and control, each with Pins and control buttons allowing for opening/closing the isolator. In a dropdown list a Vertical Break, Horizontal two rotating post/center break, Horizontal break center rotating double break, and Extra HV column option may be included.

FIG. 11AD shows an example embodiment of a PTFE Neutral Section editor in accordance with the present invention. In the example embodiment a PTFE Neutral Section may include a set of switches in an open configuration. In many embodiments the PTFE neutral section may be added to OLV with the same or similar properties to a switch in an open position.

FIG. 11AE shows an example embodiment of a surge arrestor editor in accordance with the present invention. In an example embodiment a lighting arrestor may be added to OLV only and typically may be added only at a fraction substation. In an example embodiment a lighting arrestor element may be added to an AC elements toolbar. Also in an example embodiment a drop-down list with various subtypes including rod gap, sphere gap, horn gap, expulsion, impulse protective gap, electrolytic, lead oxide, pellet, thyrite, and valve may be added. In the example embodiment a field for type including classification and housing are included as is a field for system grounding.

FIGS. 11AF-11AH show example embodiments of classification and housing menus with numerous buttons based on standards in accordance with the present invention.

FIG. 11AI shows an example embodiment of a surge arrestor editor in accordance with the present invention. In the example embodiment fields for voltage rating include subfields for rated voltage, continuous operating (MCOV), temporary overvoltage (TOV), and Max discharge voltage. Temporary overvoltage includes time and TOV subfields while Max discharge voltage includes kV create and subfields.

FIG. 11AJ shows an example embodiment of an IEC standard rating and continuous operating voltage.

FIG. 11AK shows an example embodiment of a surge arrestor editor screen with current rating options in accordance with the present invention. In the example embodiment fields for current rating and energy capability are shown. Current rating field further includes sub-fields for nominal discharge current in amps and fault current capability in kA asym. Energy capability field includes sub-fields for absorption capability thermal in kJ/kV of MCOV, Absorption capability impulse in kJ/kV of MCOV, and max current for energy rating in amps.

FIG. 11AL shows an example embodiment of a surge arrestor editor screen with sizing options in accordance with the present invention. In the example embodiment fields for highest equipment voltage (Um), Calculate continuous operating (Uc), and protection zone are included. Highest equipment voltage includes subfields for connected equipment and system nominal in terms of Rating and BIL in kV. Calculate continuous operating includes subfields for system clearing time in seconds and Uc>=in kV. Protection Zone includes subfields for Up in seconds, steepness in kV/us, arrestor to GND in meters, and protective zone (L) in meters.

FIG. 11AM shows another example embodiment of a surge arrestor, similar to the one shown in FIG. 11AL.

FIG. 11AN shows an example embodiment of a signal editor. In an example embodiment a signal editor may be brought up when a signal marker is selected and then an editor option is chosen. Remarks and comments page may be the same as in OLV. Signaling information can be created as an applicable rule such as a national standard (e.g. a standard used in a country such as the United States, United Kingdom, or others or in some instances a region).

FIG. 11AO shows an example embodiment of a single throw switch editor.

FIG. 11AP shows an example of the correspondence between a number of lights and a type of signal which may be displayed. In the example embodiment each row may correspond between the top and bottom charts. FIG. 11AP can be an example embodiment of a creation of a user, for example by using the light switch editor example embodiment of FIG. 11AO FIG. 11AQ shows an example embodiment of a level crossing editor. In an example embodiment a level crossing may be dropped in GIS View as a marker and then appear in OLV. Level crossing may have remarks and comments appear the same in OLV. Fields including Info, Equipment, Real-Time Data, Revision data, condition, and configuration are similar to those described elsewhere herein and will not be repeated here to save space. An interlock page may be the same as a SPST switch in some embodiments except that pre-switching and post-switching logic may include type being only a signal and ID/Tag being only a signal marker ID.

FIG. 11AQ shows an example embodiment of a track editor.

Figure 12:
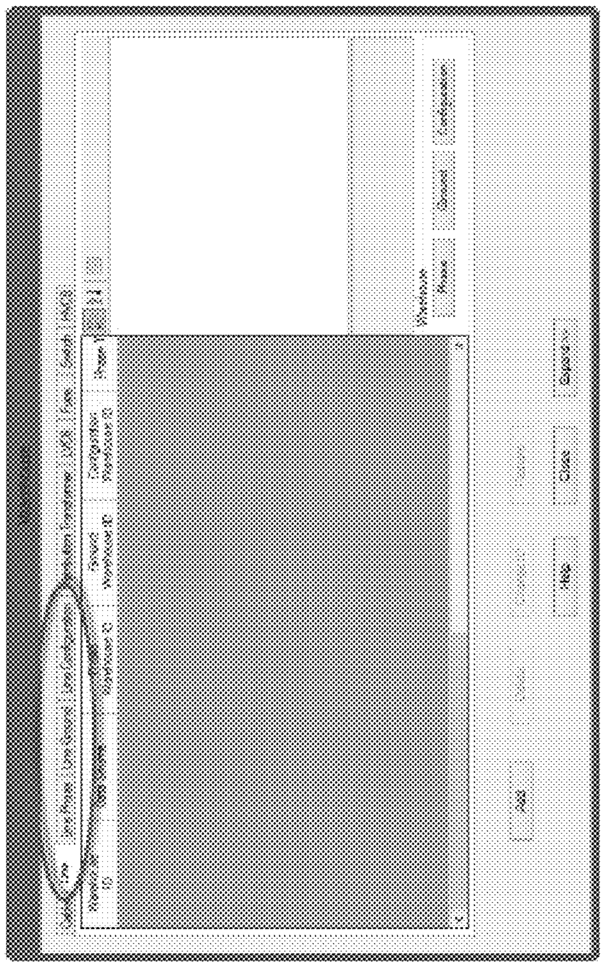
FIG. 12 shows an example embodiment of a catenary warehouse in accordance with the present invention.

FIG. 12 shows an example embodiment of a catenary warehouse in accordance with the present invention. In the example embodiment a catenary or overhead wire section may use an existing line, line phase, line ground and line configuration warehouse.

Figure 13A:
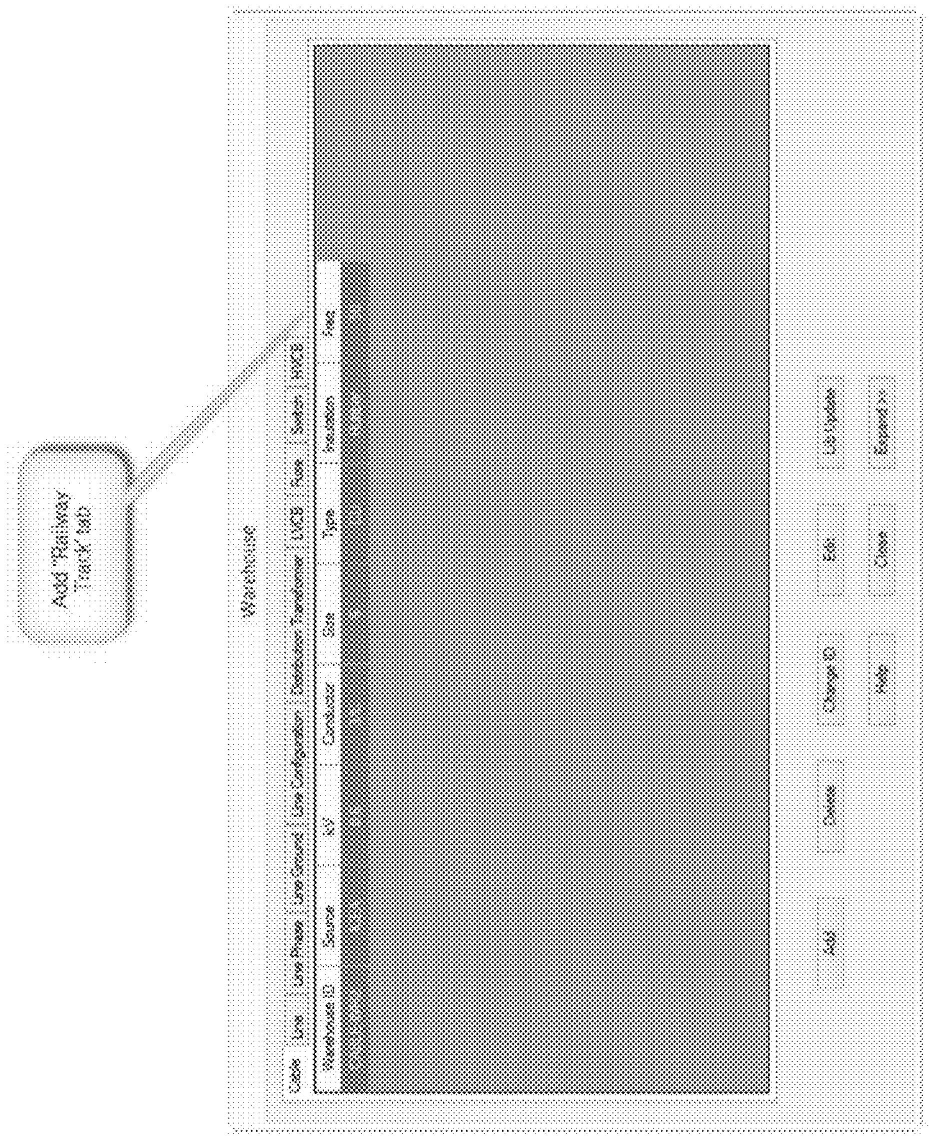
FIG. 13A shows an example embodiment of a railway track warehouse.

FIG. 13A shows an example embodiment of a railway track warehouse. In the example embodiment a railway track tab may be added to a warehouse editor in accordance with the present invention. An add and delete button may be included in order to append or delete rows and a warehouse ID column may be automatically resorted once editing of a new entry is complete. In an example embodiment the rows shown in FIG. 13B may be included in a railway track warehouse.

FIG. 13B shows an example embodiment of a chart displaying all defined characteristics of a warehouse including warehouse id, standard, unit, unit length, electrical resistance in (ohms/length), cross sectional area, depth of section, width of flange and others.

Figure 13C:
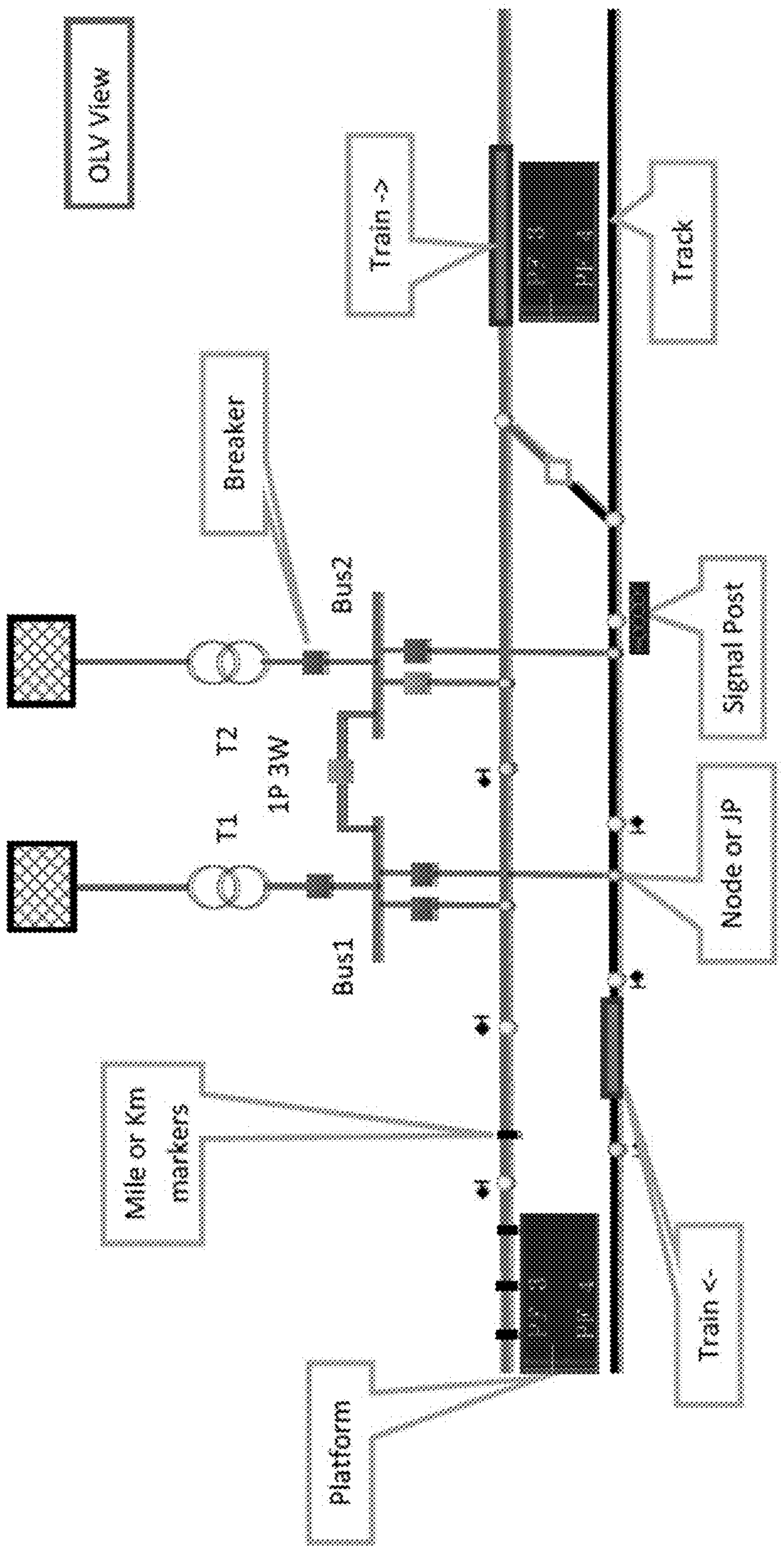
FIG. 13C shows an example embodiment of an OLV representation of an electrical system in accordance with the present invention.

FIG. 13C shows an example embodiment of an OLV representation of an electrical system in accordance with the present invention.

Figure 14A:
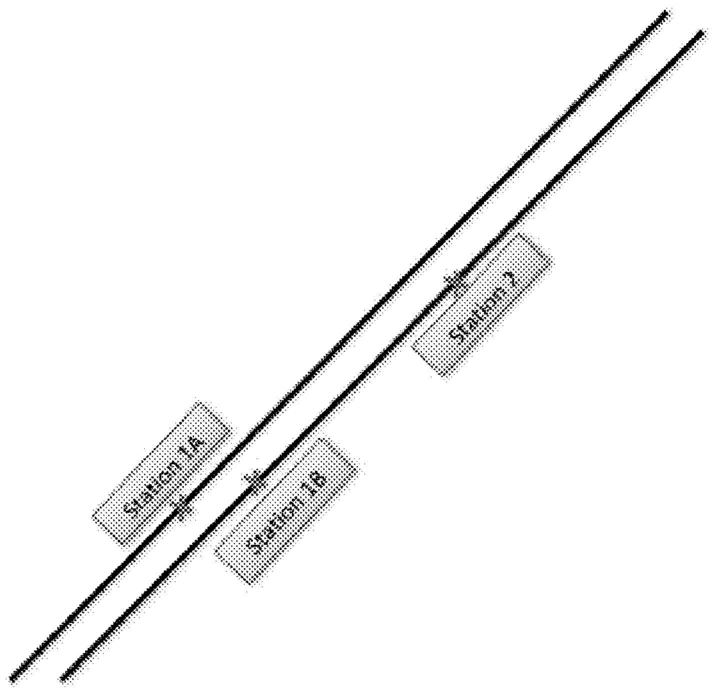
FIG. 14A shows an example embodiment of a parallel tracks with multiple stations shown in a route view and editor.

FIG. 14A shows an example embodiment of a parallel tracks with multiple stations shown in a route view and editor. In an example embodiment a user may click a route viewer and editor button from a study toolbar if an OLV or GIS View presentation is selected and/or at least two unique railway stations have been added to a GIS View. Station and platform editors have been previously described herein.

Figure 14B:
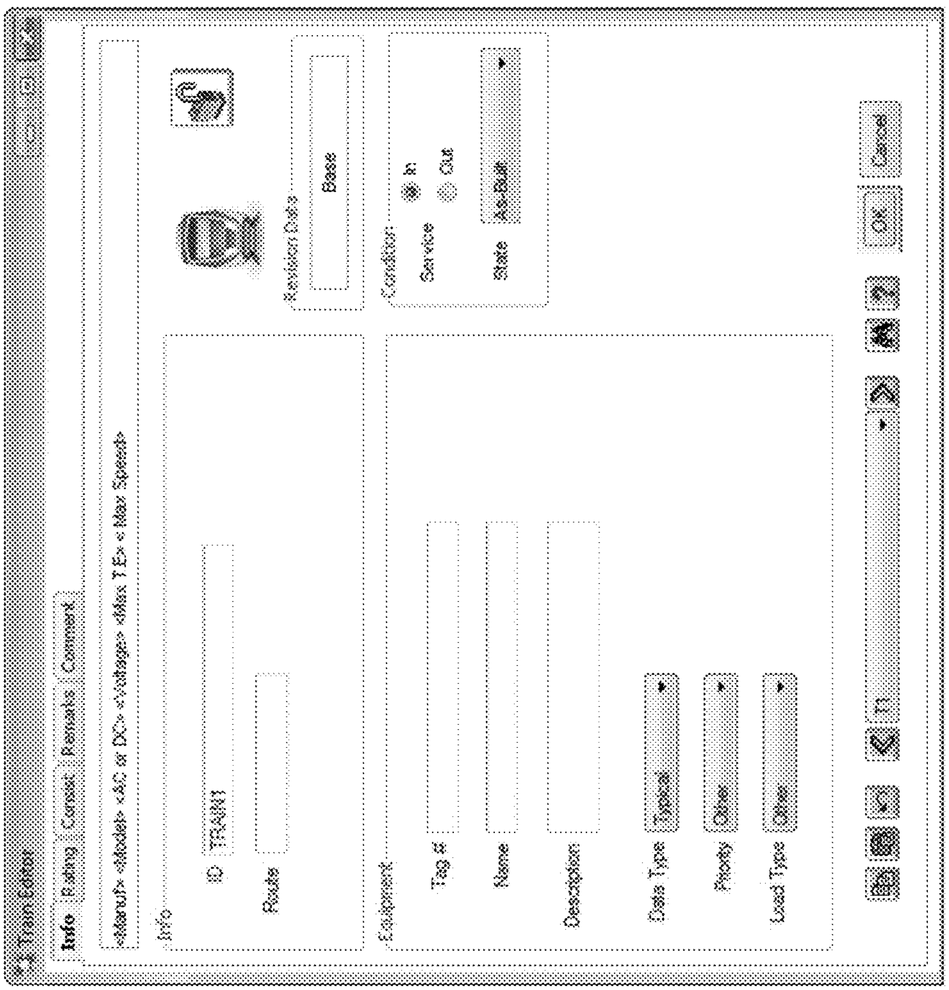
FIG. 14B shows an example embodiment of a train editor.

FIG. 14B shows an example embodiment of a train editor. In the example embodiment tabs include info, rating, consist, remarks, and comments.

Figure 14C:
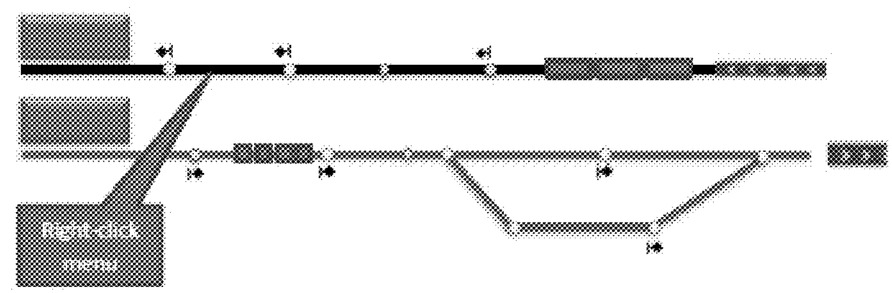
FIG. 14C shows an example embodiment of a train track is shown.

Turning to FIG. 14C, an example embodiment of a train track is shown. In an example embodiment a user may select a portion of track and double click or right click to open a schematic editor or menu respectively. If a menu is brought up it may include options to cut, copy, add to template, size, bend point track properties, group, ungroup, and others. Also included is a key in the figure.

Figure 14D:
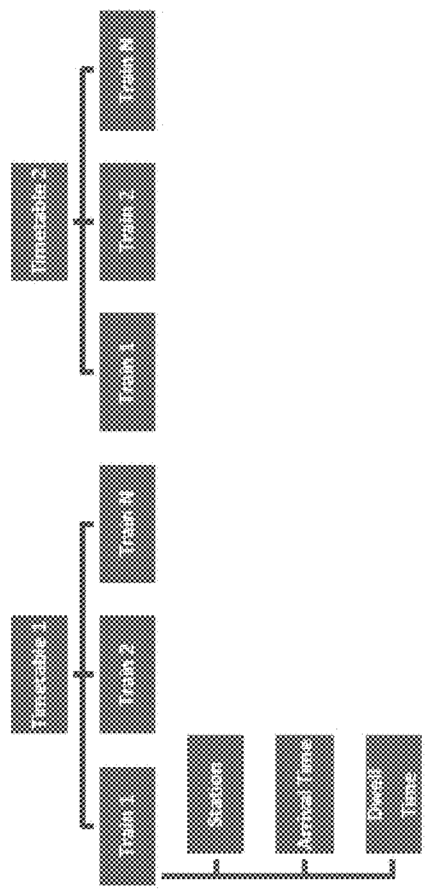
FIG. 14D shows an example embodiment of a timetable editor.

FIG. 14D shows an example embodiment of a timetable editor. In an example embodiment a timetable ID, timetable start time (00:00 default), timetable end time (24:00 default), and description are included. For each timetable ID, information such as train ID, start station and platform #, departure time, days of the week operable, and description may be included. For each train ID information such as station ID, Arrival time, Dwell time, Departure time (calculated), description, and others may be included.

Figure 15A:
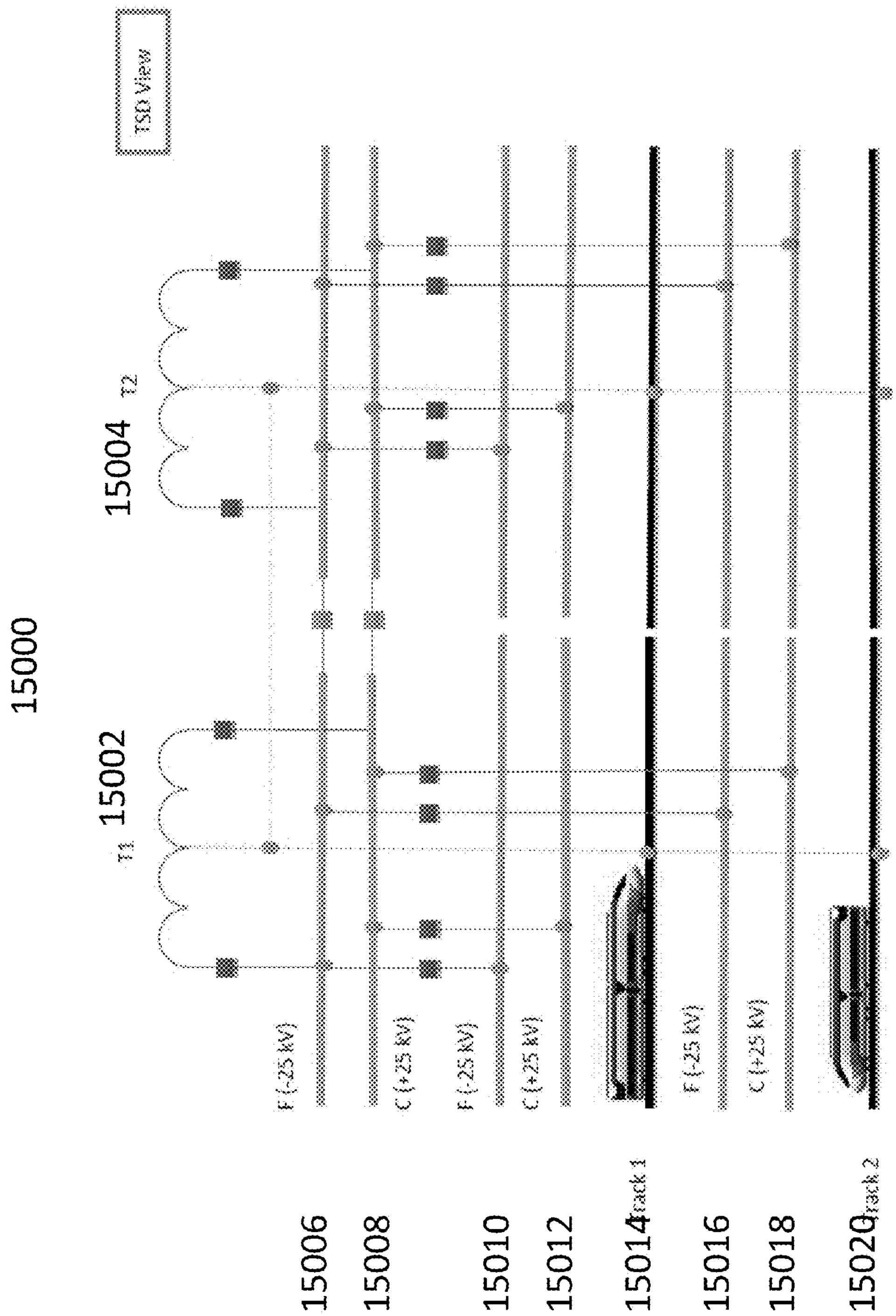
FIG. 15A shows an example embodiment of a TSD view of track drawings in accordance with the present invention.

FIG. 15A shows an example embodiment of a TSD view of track drawings in accordance with the present invention. In the example embodiment TSD view may be another view with which the system presents an interface to the user. In some embodiments this view is used in addition to GIS and OLV view, while in some embodiments this view may replace one or the other.

Figure 15B:
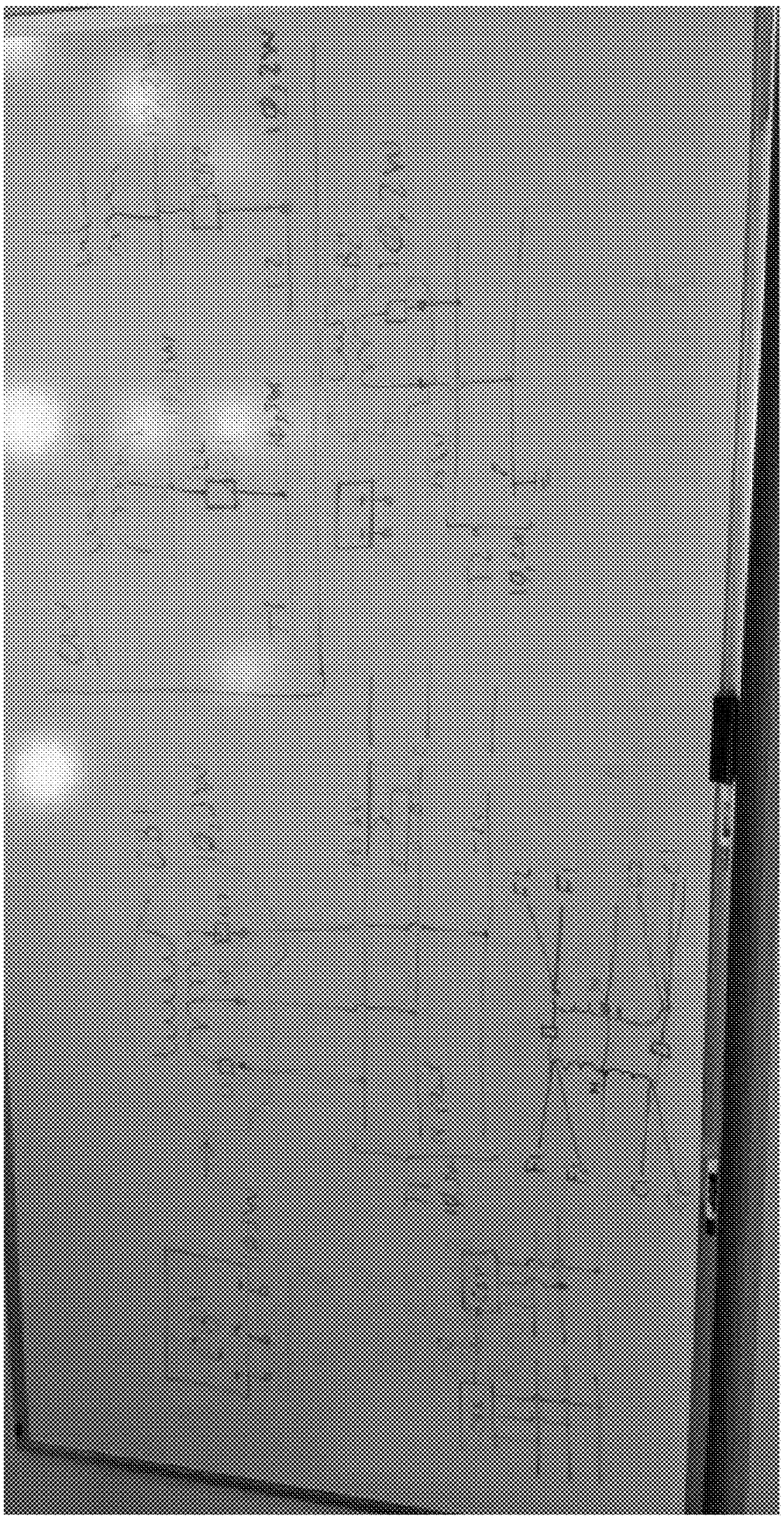
FIG. 15B shows an example embodiment of one line view (OLV), two line view and three line view.

FIG. 15B shows an example embodiment of one line view (OLV), two line view and three line view. In the example embodiment a user may be able to build logical electrical connection diagrams of the electrical system using a single-line diagram. A logical single-line diagram will connect with a schematic diagram (like CSD) of the electrical system.

Figure 15C:
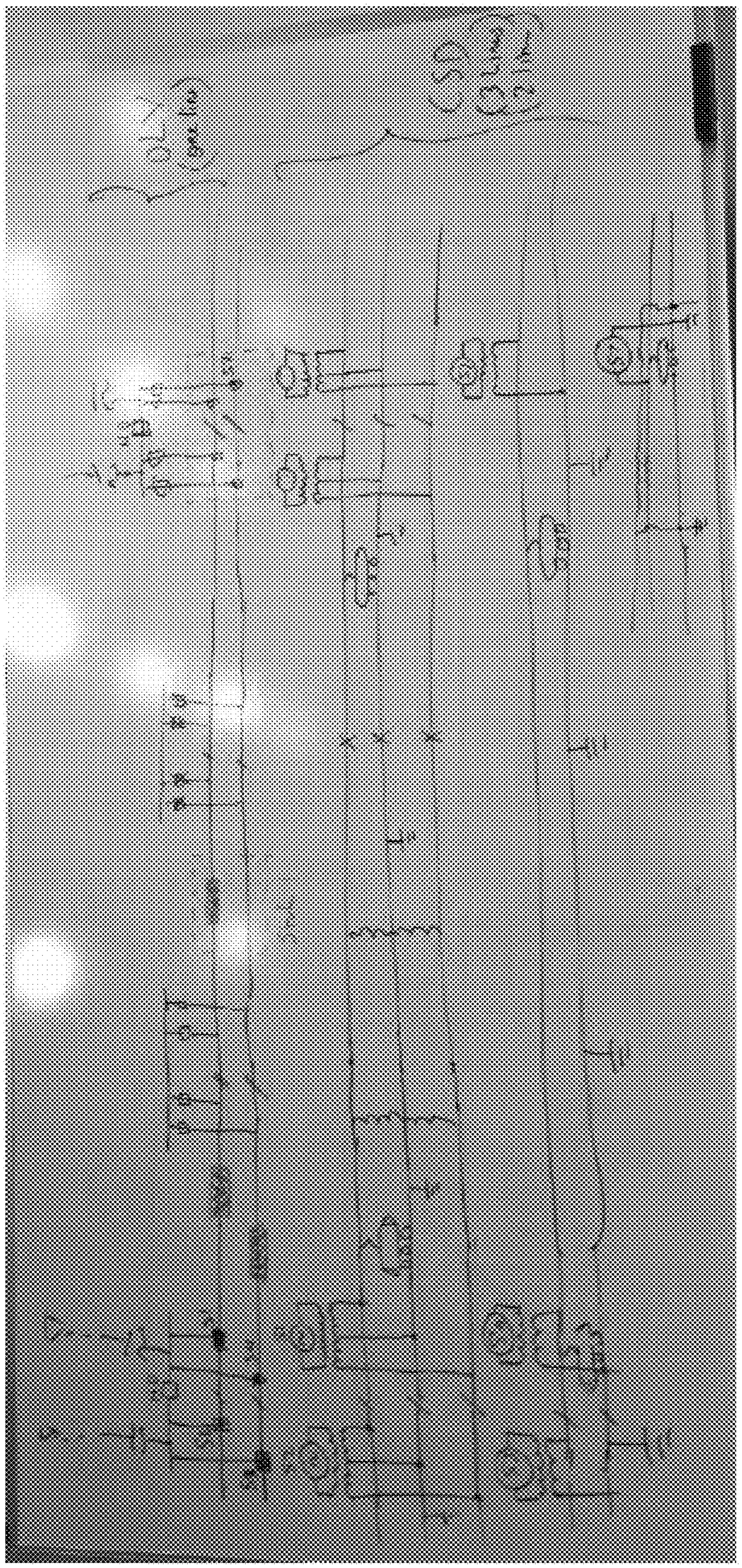
FIG. 15C shows an example embodiment of a traction power substation with a utility supply.

FIG. 15C shows an example embodiment of a traction power substation with a utility supply including an autotransformer feed system of 2×25 kV in accordance with the present invention. FIG. 15C shows an example embodiment of one line view and two and three line views as CSD.

Figure 15D:
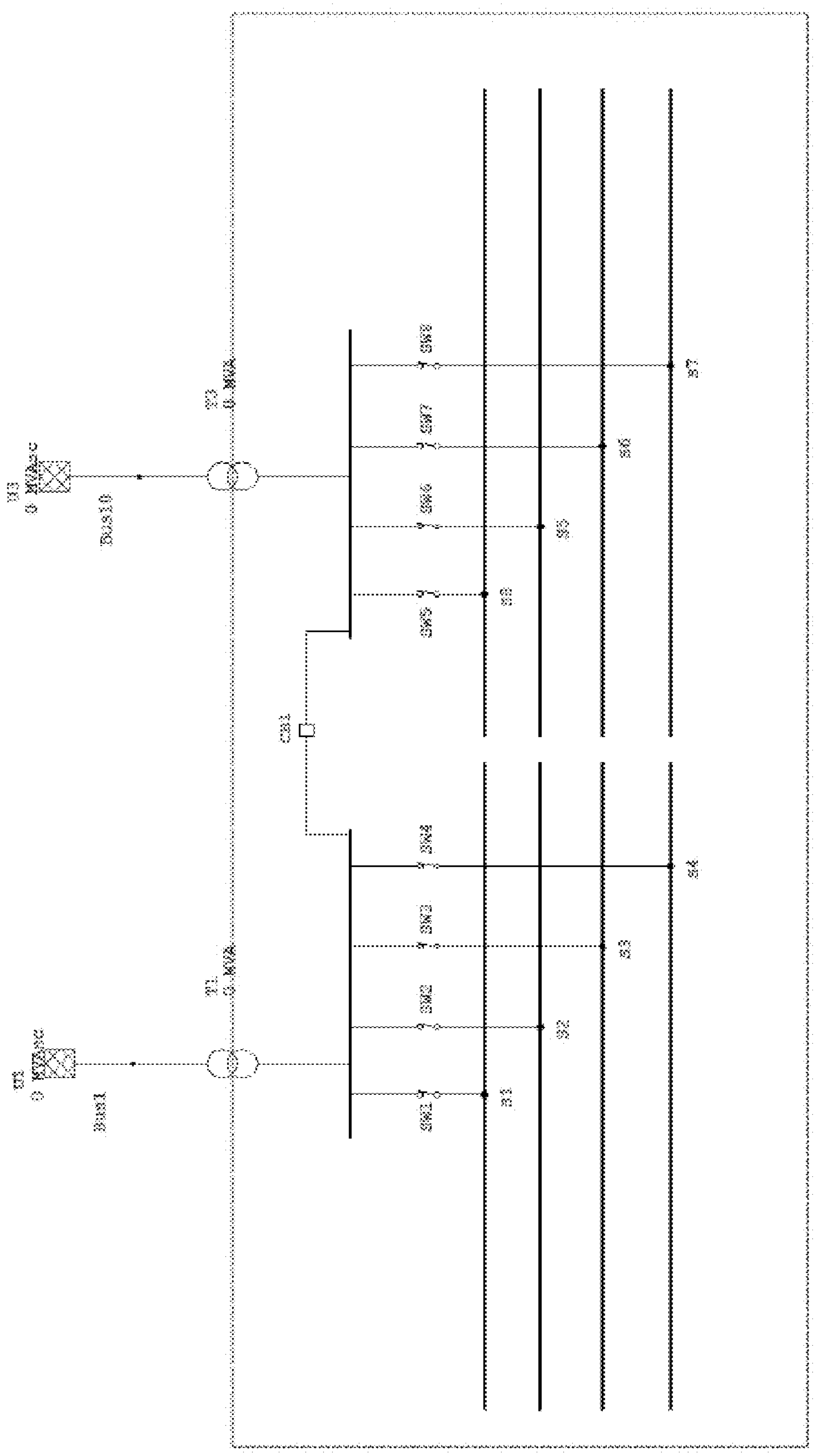
FIG. 15D shows an example embodiment of a system for use in the present invention.

FIG. 15D shows an example embodiment of a system for use in the present invention. In an example embodiment the following routine may be used for traction power systems. First a user may draw a single line diagram. When a user connects a supply to rail components a special electrical node (S1-S8) may be created and source points and all components up to a secondary of a first transformer (area inside box) may be available in a schematic two or three wire diagram.

Figure 16A:
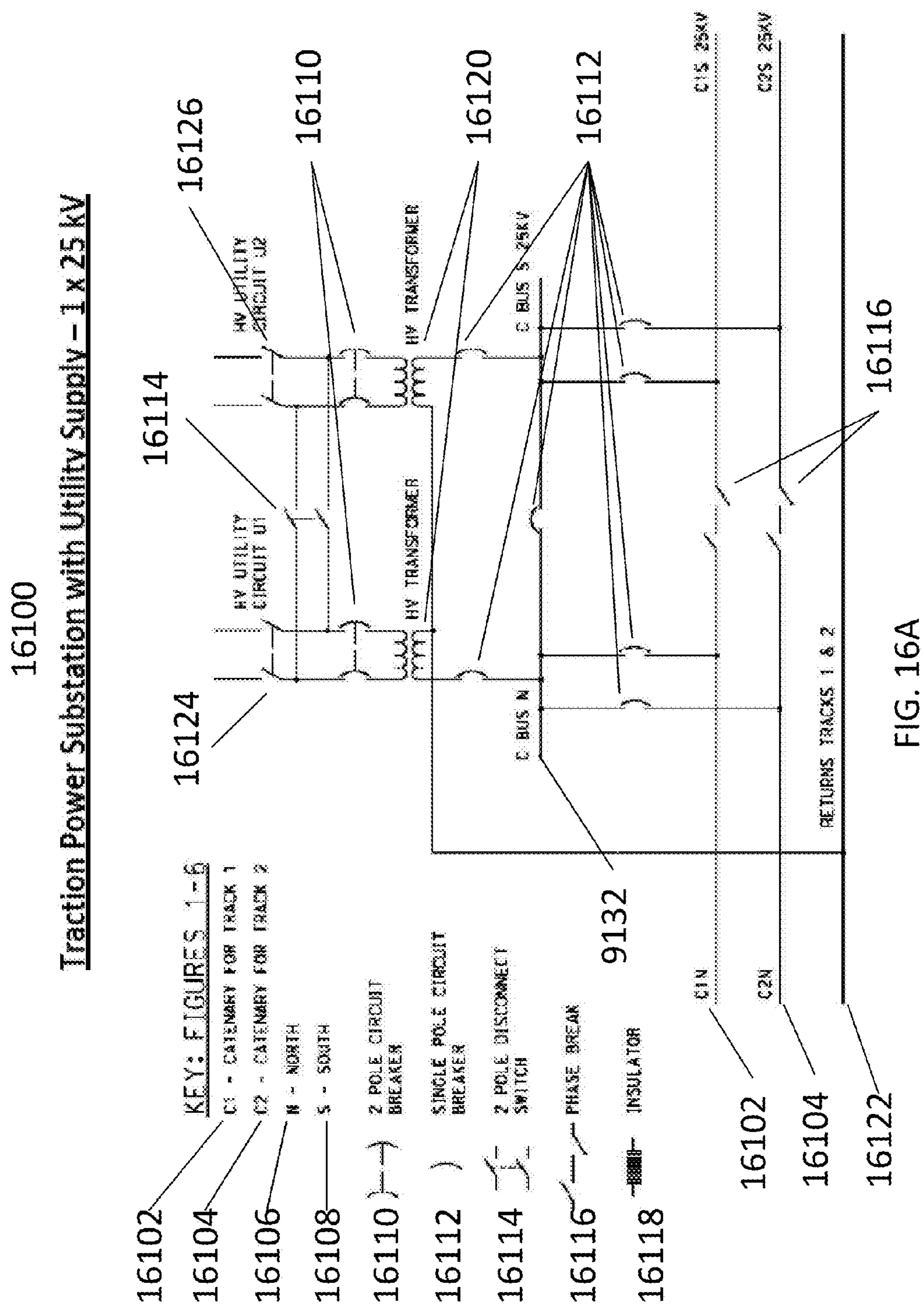
FIG. 16A shows an example embodiment of a traction power substation with a utility supply 1×25 kV utility supply.

FIG. 16A shows an example embodiment of a fraction power substation with a utility supply 1×25 kV utility supply that can be modeled in accordance with the present invention.

Figure 16B:
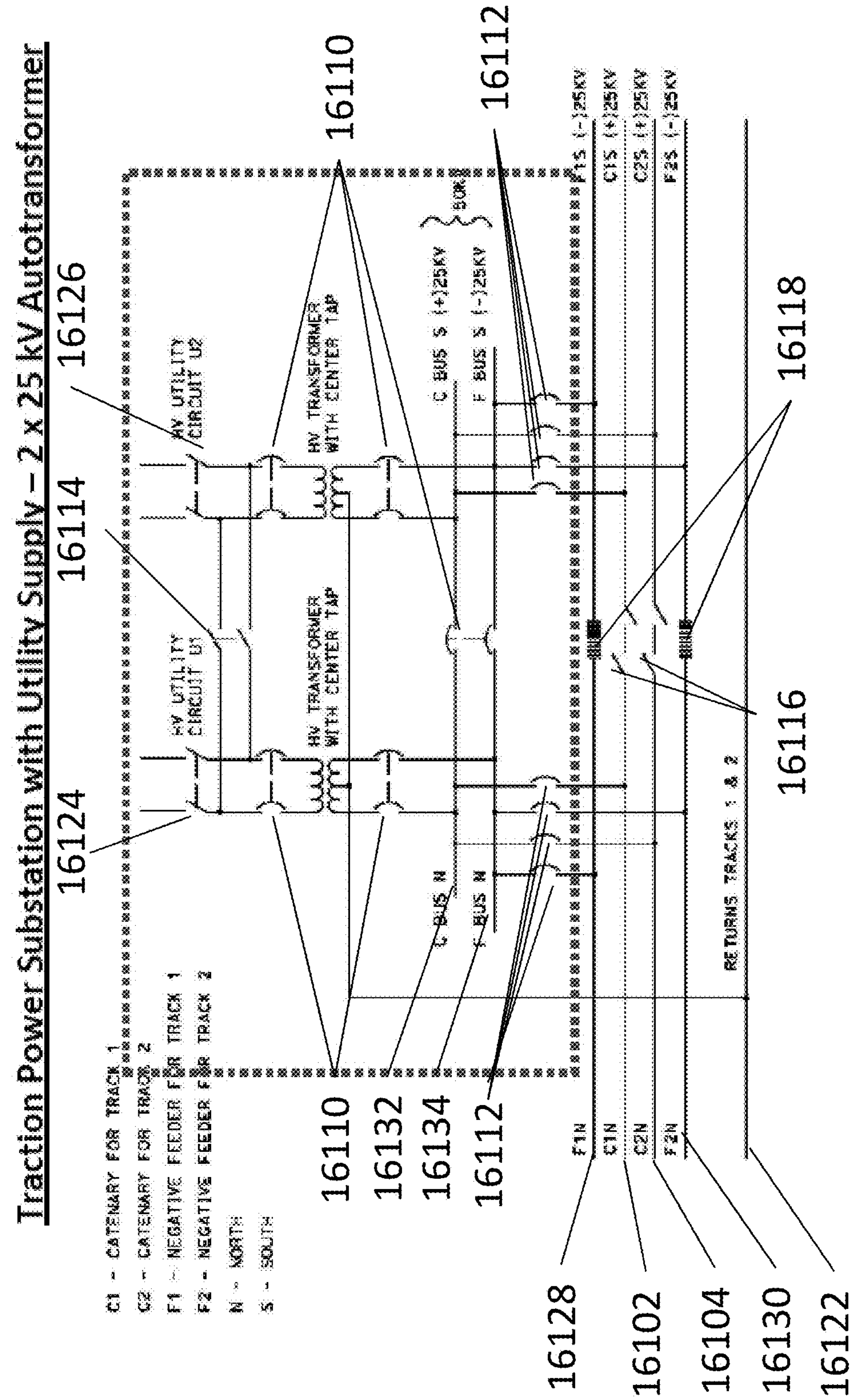
FIG. 16B shows an example embodiment of a traction power substation with a utility supply 2×25 kV autotransformer.

FIG. 16B shows an example embodiment of a fraction power substation with a utility supply 2×25 kV autotransformer that can be modeled in accordance with the present invention.

Figure 16C:
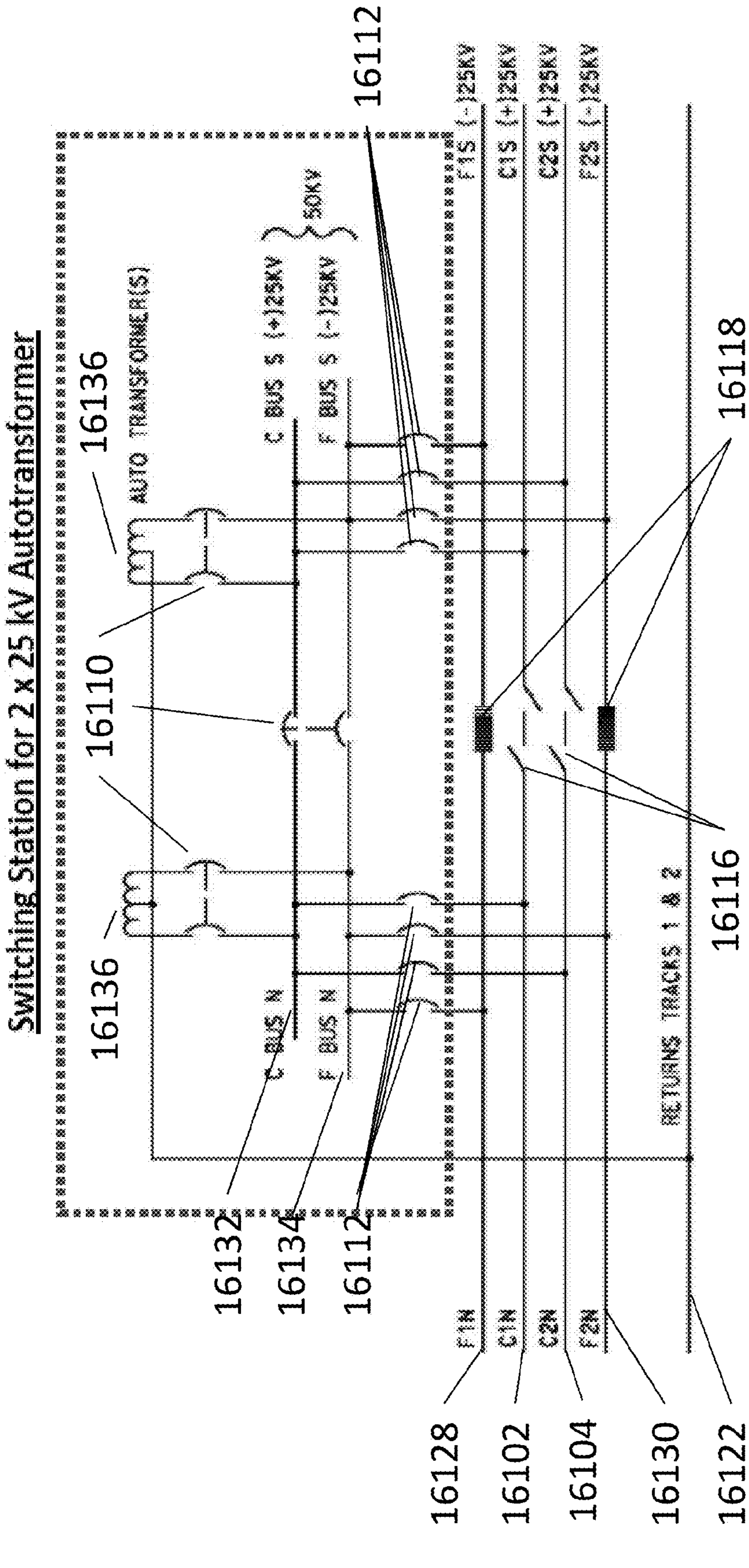
FIG. 16C shows an example embodiment of a switching station for a 2×25 kV autotransformer feed system in accordance with the present invention.

FIG. 16C shows an example embodiment of a switching station for a 2×25 kV autotransformer feed system in accordance with the present invention.

Figure 16D:
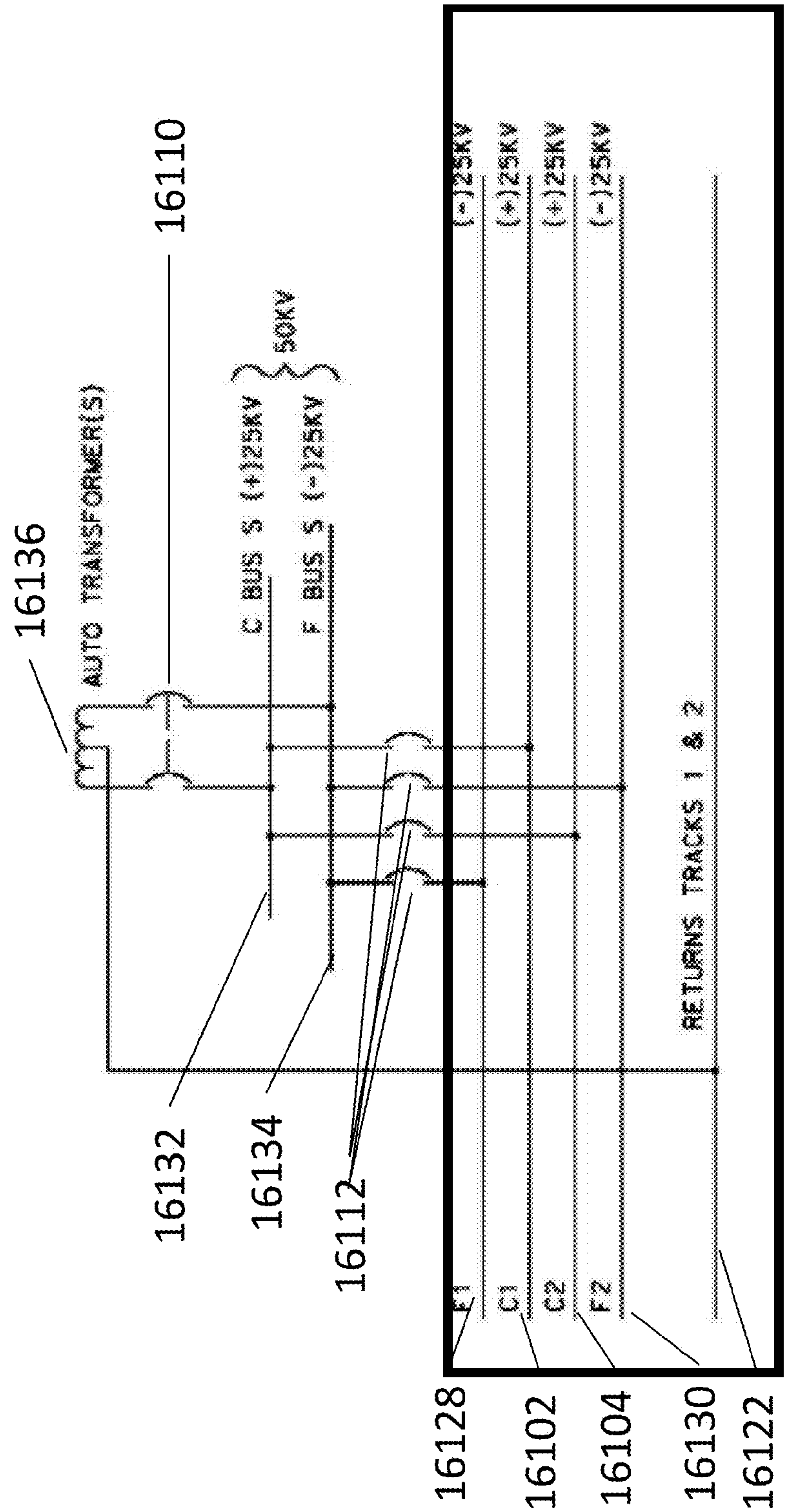
FIG. 16D shows an example embodiment of a paralleling station for a 2×25 kV autotransformer feed system in accordance with the present invention.

FIG. 16D shows an example embodiment of a paralleling station for a 2×25 kV autotransformer feed system in accordance with the present invention.

Figure 16E:
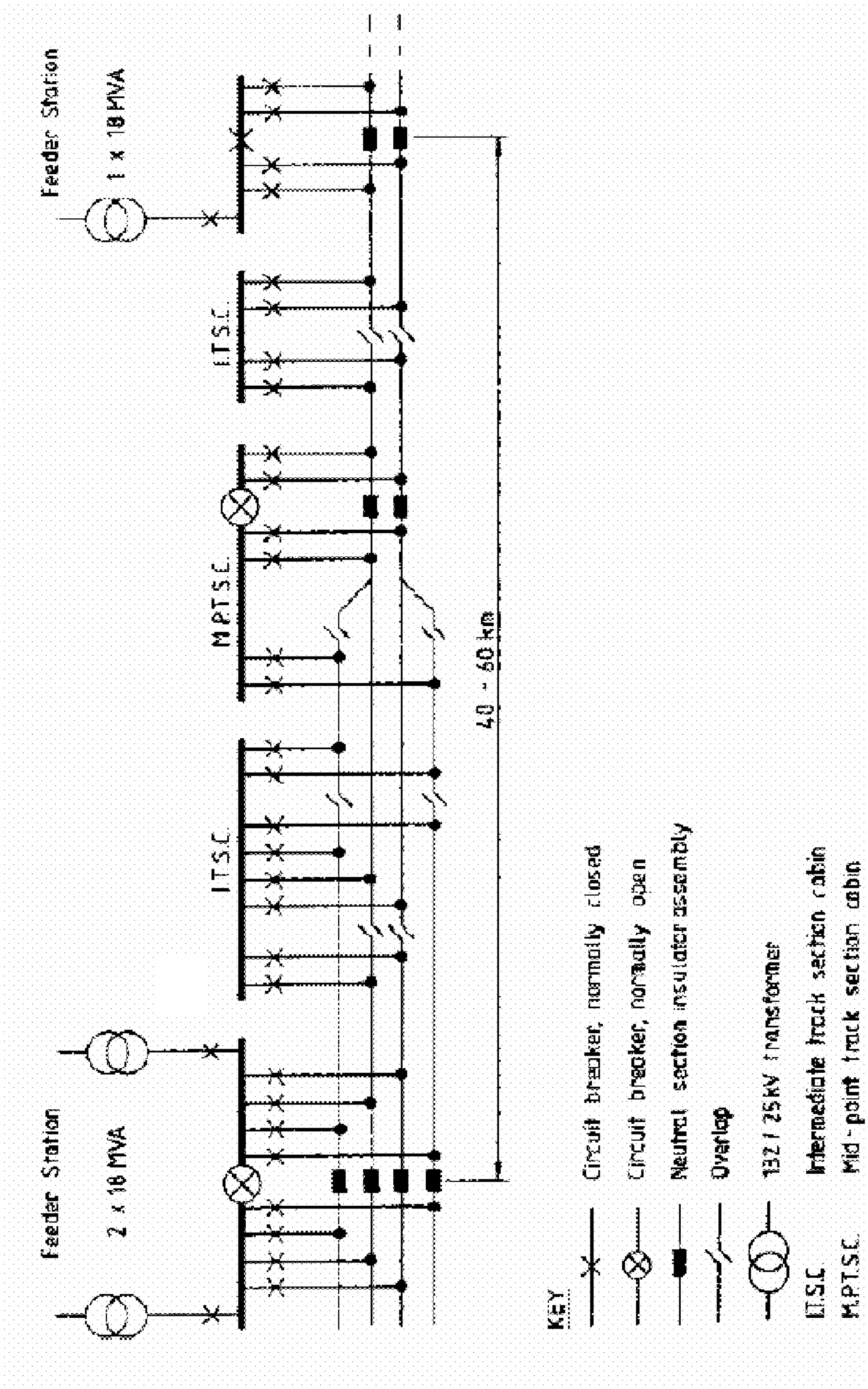
FIG. 16E shows an example embodiment of a logical electrical connection diagram of the electrical system for an AC Power Distribution System in accordance with the present invention.

FIG. 16E shows an example embodiment of a logical electrical connection diagram of the electrical system for an AC Power Distribution System in accordance with the present invention.

Figure 16F:
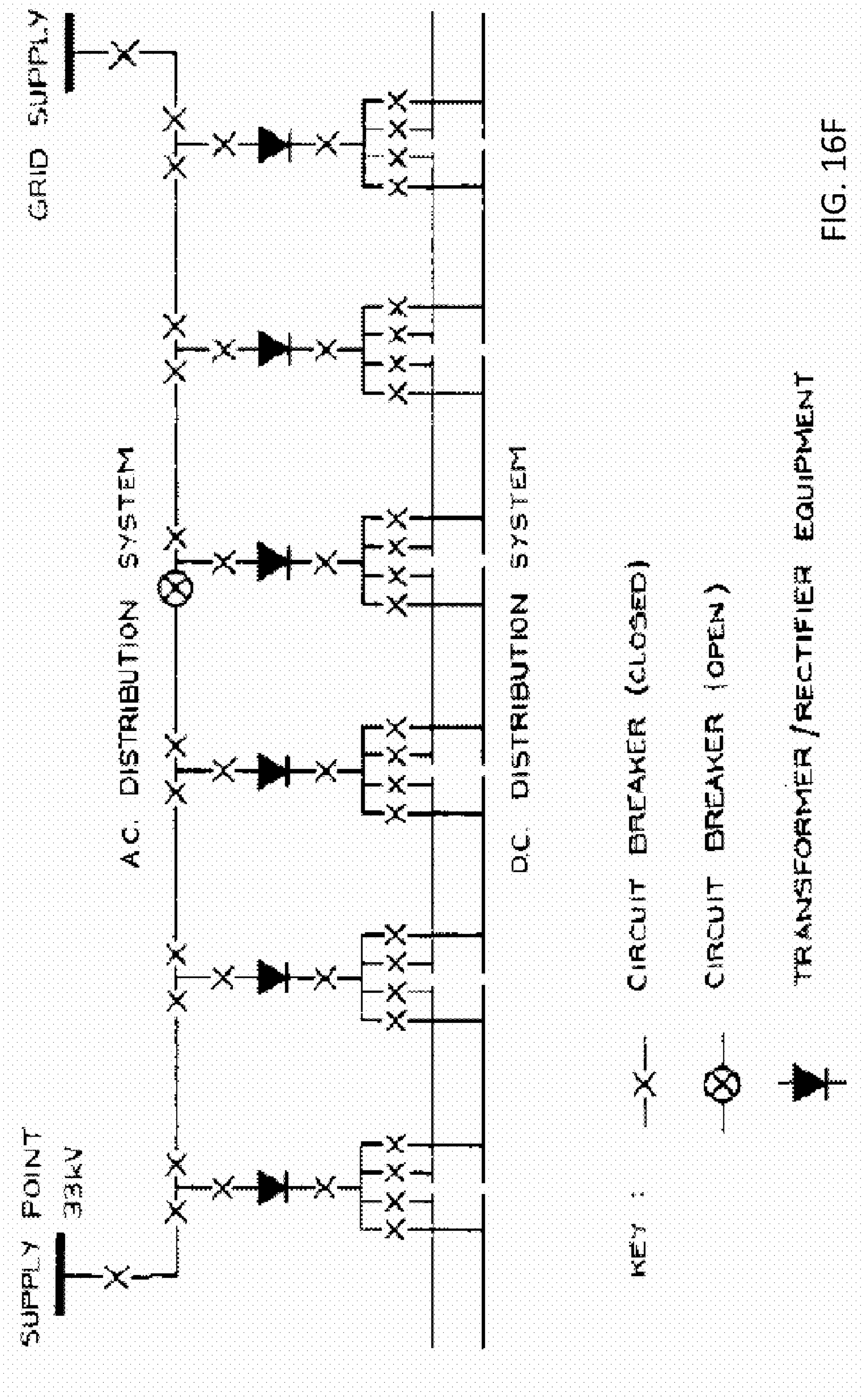
FIG. 16F shows an example embodiment of an OLV diagram of a DC Power Distribution System in accordance with the present invention.

FIG. 16F shows an example embodiment of an OLV diagram of a DC Power Distribution System in accordance with the present invention.

Figure 17A:
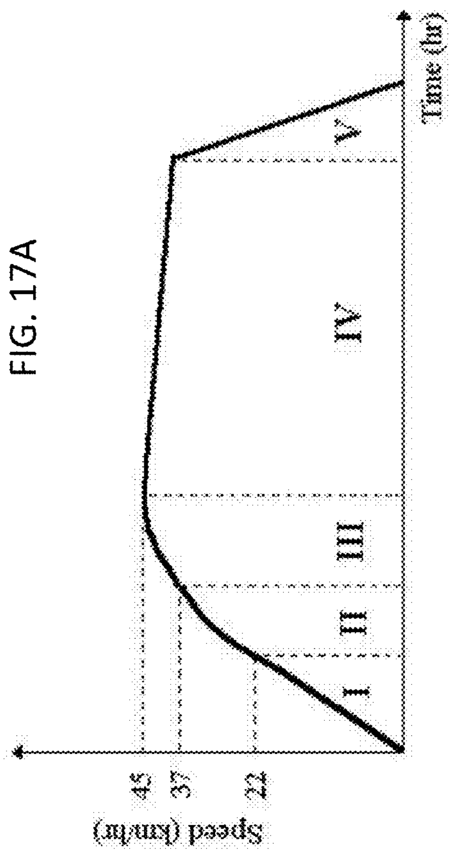
FIG. 17A-B show example embodiments of a speed profile of a train between two stations.

FIG. 17A shows an example embodiment of a speed profile of a train between two stations. A constant acceleration mode is shown in section I, a constant power section is shown in section II, a constant slip section is shown in section III, a coasting mode section is shown in section IV, and an energy conservation mode section is shown in section V. In the example embodiment as the train operates in constant acceleration mode and reaches 22 km/hr the operation mode is changed to constant power mode. Then, as the train passes 37 km/hr the train is operated in constant slip where fraction effort may be inversely proportional to the square of the speed of the train in the constant slip section. After a cruising speed of 45 km/hr is reached the train operates in a coasting mode without applying input propulsion power. When the train approaches the destination station, electric regeneration braking is applied by operating induction motors as induction generators in order to convert the kinetic energy of the train into electricity to achieve energy conservation.

Figure 17B:
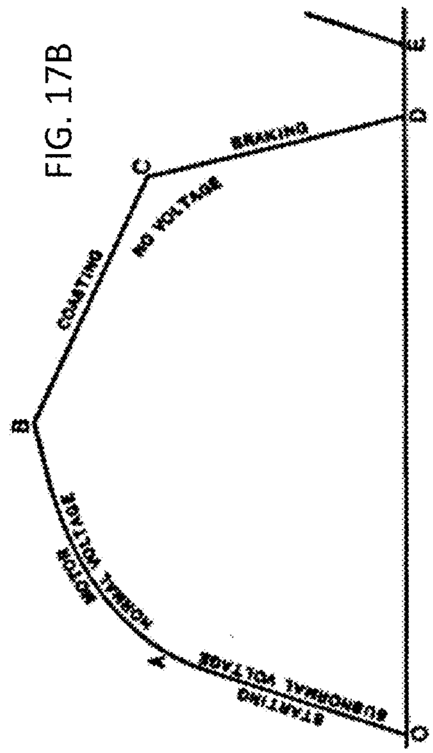

FIG. 17B shows another example embodiment of the figure shown in FIG. 17A. For illustrative purposes, a fraction effort equation Fsubu=Wsubg=Wsubf+Wsubs+Wsubk+Wsuba(wsubg)(Gsubz)=(wsubf+wsubs+wsubk+wsuba) Gsubz where Fsubu is the fraction at circumference of wheel in kgf, Wsubg is the total resistance to motion in kgf, Wsubk is the curve resistance in kgf, Wsubs is the gradient resistance in kgf, Wsuba is the accelerationresistance in kgf, Wsubf is the rolling resistance in kgf, WsubL is resistance to motion for locomotives in kgf, Wsub(WR) is resistance to motion for passenger trains in kgf, Wsub(WG) is resistance to motion for freight trains in kgf, Gsubz is train weight in Mgf, GsubW is weight of wagons in Mgf, csub0 is coefficient for rolling and frictional resistance of the axles in kgf/Mgf, and csub1 is coefficient for frictional resistance of the drive in kgf/Mgf.

Rolling Resistance (Wf) may be defined as Wsubf, =(wsubf)(Gsubz)=csub0Gsub1+(csub0+csub1) Gsubt+(csub2+(csub3)n)*0.5A((V+15)^2)/10, where csub2 is the drag coefficient of the leading vehicle, csub3 is the drag coefficient of the following vehicle, csub4 is the drag coefficient of the following vehicle for freight trains, n is the number of following vehicles, A is the frontal area (geometric cross sectional area) of the vehicle in m^2, V is the travelling speed in km/h, R is the curve radius in m, and a is the mean value of all fixed wheel bases with a <3.3S in m. Drag coefficients should be doubled for tunnel stretches.

FIGS. 17C-E show tables representing characteristic values of electric traction, force and velocity conditions for four operation regimes and train driving modes respectively.

Measurement of Train Resistance

The "Davis Equation" Ro=1.3+29/w+bV+(CAV^2)/wn is the standard general formula for train resistance. Variables are defined as follows: Ro=resistance in pounds per ton, w=weight per axle (=W/n), W=weight of car, n=number of axles, b=experimental friction coefficient for flanges, shock, etc., A=cross-sectional area of vehicle, and C=drag coefficient based on the shape of the front of the train and other features affecting air turbulence, etc.

The Davis equation has been updated modernly to R=A+BV+CDV^2. Variables are defined as follows: R=resistance in pounds, A=rolling resistance component independent of train speed (based on Journal resistance, Rolling resistance, Track resistance), B=coefficient used to define train resistance dependent on train speed (based on Flange friction, Flange impact, Rolling resistance wheel/rail, Wave action of the rail), C=streamlining coefficient used to define train resistance dependent on the square of the train speed (based on Head-end wind pressure, skin friction on the side of the train, rear drag, turbulence between cars, yaw angle of wind tunnels), D=aerodynamic coefficient or polynomial function used to further define train resistance (often combined with C) (based on Head-end wind pressure, skin friction on the side of the train, rear drag, turbulence between cars, yaw angle of wind tunnels), and V=train speed in miles per hour.

The equation which Davis proposed became R=1.3+29/W+0.045V+(0.0005aV^2)/(WN) for freight cars. Another modified version of the Davis Formula which showed improved results in the 1940s and 1950s is: R=0.6+20/W+0.01V+(KV^2)/(WN). Variables are defined as: R=resistance in pounds/ton, W=weight per axle in tons, N=number of axles, V=speed in miles per hour, K=combined air resistance coefficient (0.076 for conventional equipment, 0.16 for piggyback, 0.0935 for containers).

A Canadian National version of the train resistance formula is Rr=1.5+18N/W+0.03V+(CaV^2)/(10000 W). Variables are defined as: Rr=the rolling resistance of vehicle in pounds/ton, N=number of axles, W=total weight in tons of locomotive or car, V=velocity of train in miles per hour, C=Canadian National streamlining coefficient, and a=cross-sectional area of the locomotive or car in square feet.

Figure 17F:
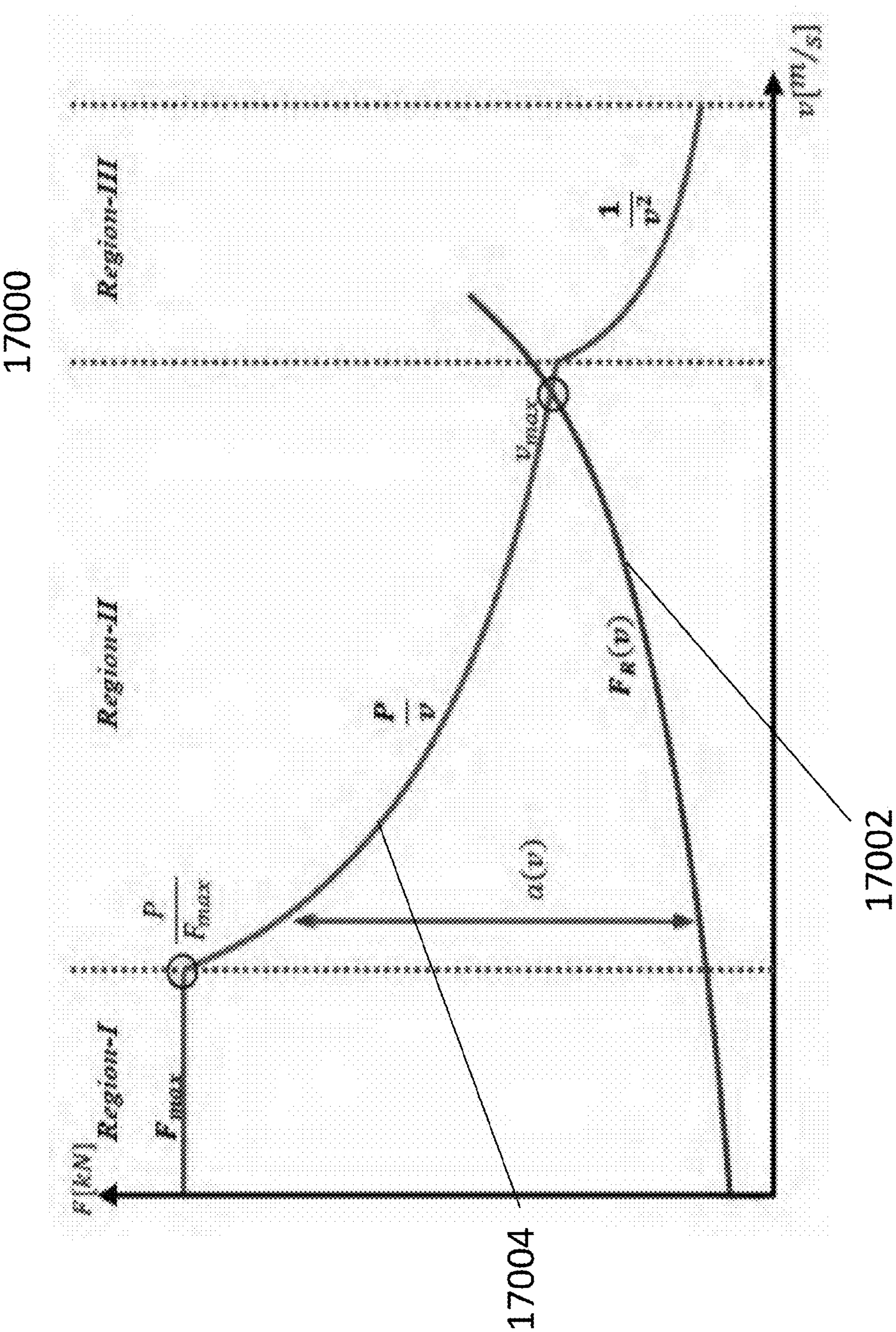
FIG. 17F shows an example embodiment of a chart of train force (kN) vs. velocity (m/s) graph

The chart in FIG. 17F shows an example embodiment of a train force (kN) vs. velocity (m/s) graph 17000. In the example embodiment line 17002 represents the load on the train motor while line 17004 represents the maximum load.

The tables in FIG. 17G, 17H show values of C coefficient for use with Canadian National Train Resistance Formulas. The tables depicted in FIGS. 17I, 17J show formulas for propulsion resistance for freight rollingstock and passenger rollingstock respectively.

Turning to FIG. 17K, an example diagram depicting the direction of forces used to calculated total vehicle resistance is shown. A generic formula for total resistance (Davis formula) R=AW+BV+CV^2 includes A which varies with weight (such as journal or bearing resistance), B which varies with velocity (such as flange resistance) and C which varies with the square of velocity (such as air resistance). To elaborate: A=resistances that vary with axle load including bearing friction, rolling friction and track resistance; B) resistances that vary directly with speed such as flange friction and effects of sway and oscillation; and C) resistances that vary as the square of speed such as those affected by the aerodynamics of the train. W equals weight and V equals velocity in this formula as well.

Figure 17L:
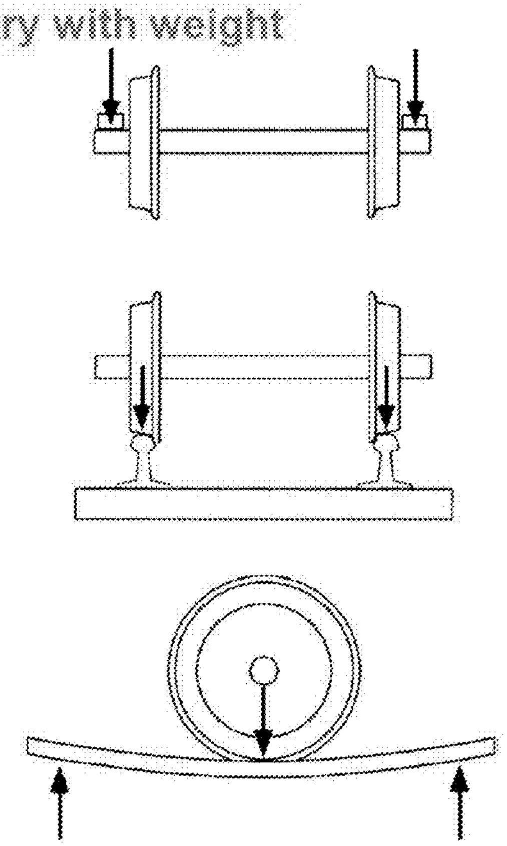
FIG. 17L shows an example embodiment of a diagram depicting resistances affected by weight on wheels.
Figure 17M:
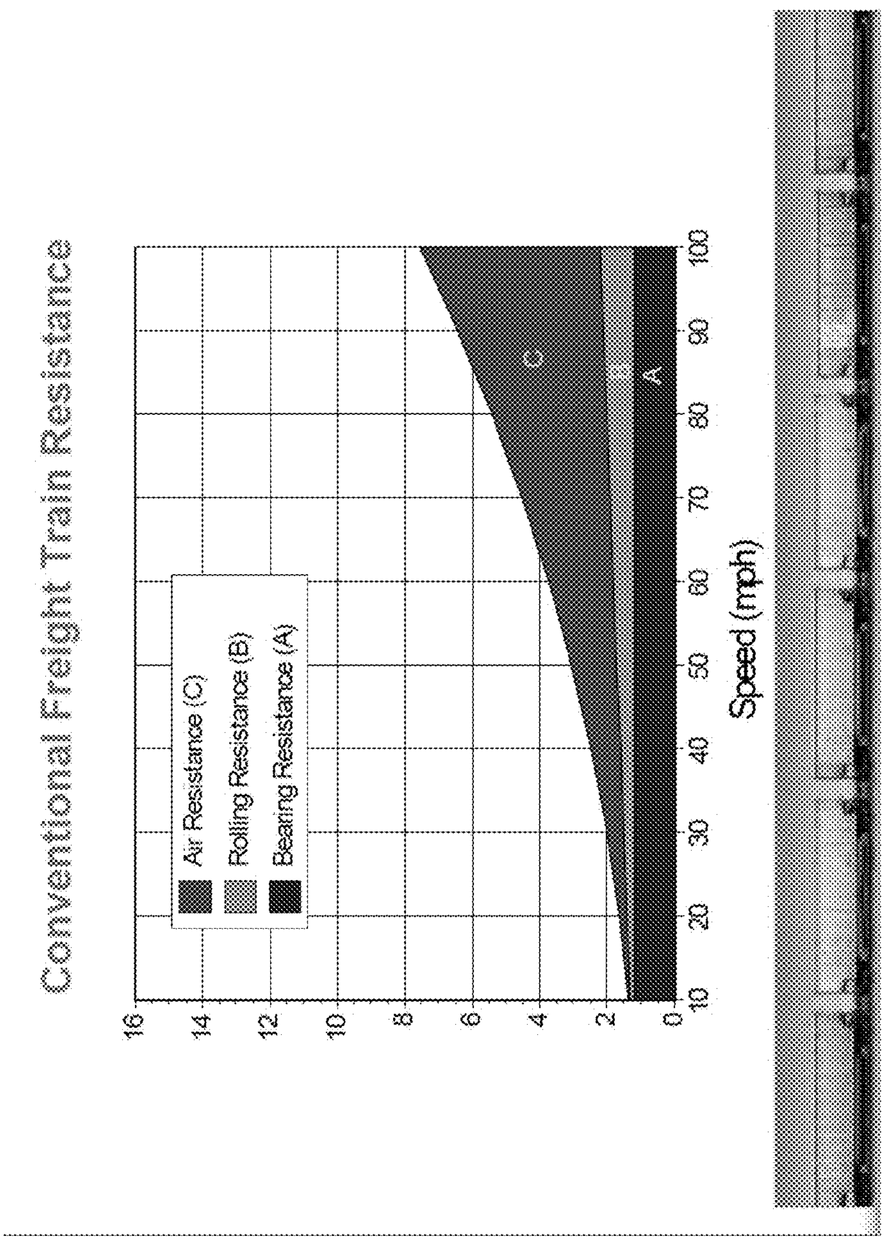
FIG. 17M shows an example embodiment graph of how resistances change with varying speeds on a conventional freight train and a diagram of a conventional freight train.
Figure 17N:
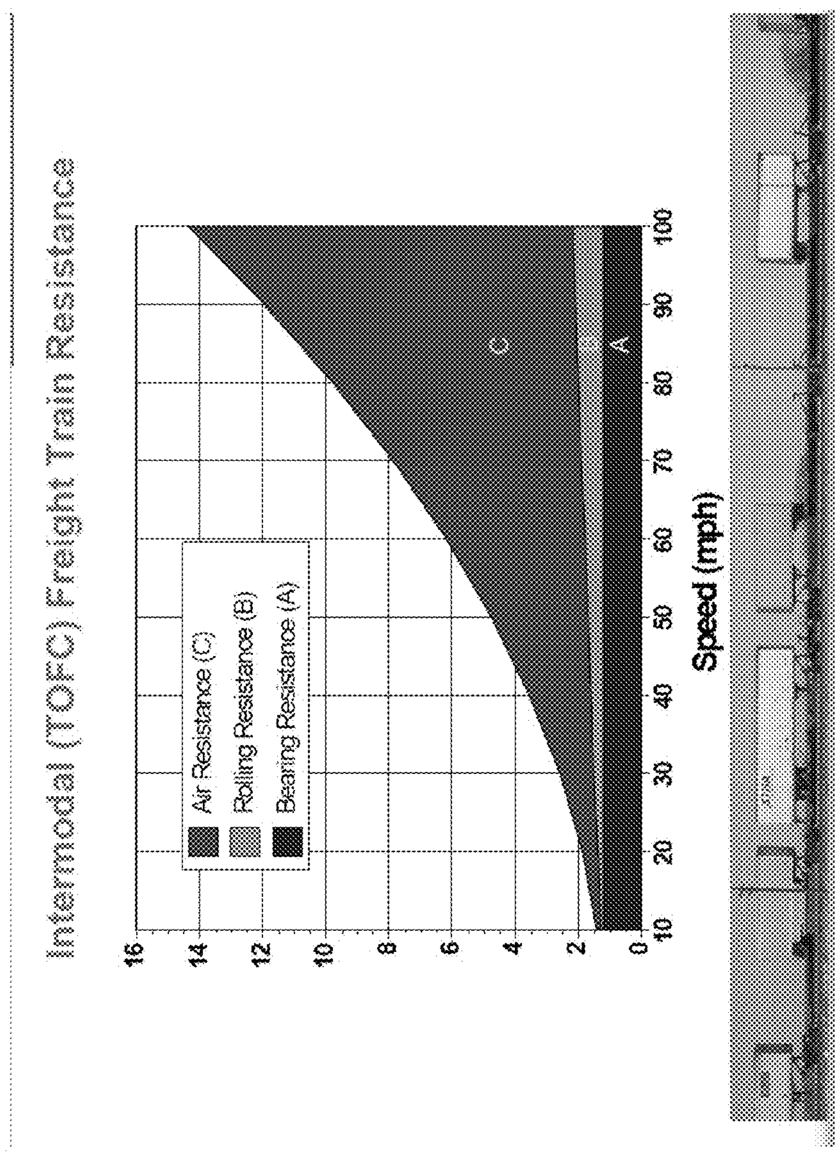
FIG. 17N shows an example embodiment graph of how intermodal freight train resistance varies with different speeds and a diagram of an intermodal freight train.

Turning to FIG. 17L, a diagram depicting resistances affected by weight on wheels is shown. Journal resistance may be friction between the journal and bearing. Rolling friction may be friction between the wheel and rail due to "creepage" at the interface and can also include minute elastic deformation of wheel and rail surfaces. Track resistances may include deformation of track structure and consequent "uphill" running FIG. 17M shows an example graph of how resistances change with varying speeds on a conventional freight train and a diagram of a conventional freight train. FIG. 17N shows an example graph of how intermodal freight train resistance varies with different speeds and a diagram of an intermodal freight train.

A version of the Davis equation approved used by committee 16 of the American Railway Engineering Association (AREA) is Ru=0.6+20/w+0.01V+(KV^2)/(wn) where Ru is the resistance in pounds/ton, w is the weight per axle (W/n), n is the number of axles, W is the total car weight on rails (tons), V is the speed in miles per hour and K is a drag coefficient. Values of K may be 0.07 for conventional equipment, 0.0935 for containers, and 0.16 for trailers on flatcars.

Additional terms for the Davis equation related to Gradient forces are RsubG(kN)=(Mg)/X where RsubG is the resistance (kN) due to gradients, M is the mass of the train in metric tons, g is the acceleration due to gravity (m/(s^2)) and X is the gradient in the form I in X (for example a grade of three percent is expressed as X=I/0.03=33.33.

Additional terms for the Davis equation related to Resistance due to Curvature are rsubc((kN)/t)=0.01 k/(Rsubc) where rsubc is the resistance due to curvature (kN/ton), k is a dimensionless parameter depending on the train (typically varies from 500 to 1200), Rsubc is the curve radius in a horizontal plane in meters.

Application of the Davis equation to a high speed rail system (e.g. Japan Shinkansen Series 200) has shown the equation R=8.202+0.10656V+0.01193V^2 where R is the total resistance (kN), V is the speed of the train in m/s. Tractive effort curve for the Shinkansen Series 200 can be derived from knowledge of the shaft horsepower delivered by the rail engines. The Shinkansen Series 200 typically deliver 15,900 horsepower.

FIG. 17O shows an example of coding which can be used in Matlab to calculate resistance forces for a Shinkansen Series 200 train. FIG. 17P shows an example of coding which can be used to calculate tractive effort of a Shinkansen Series 200 train.

A fundamental equation to convert power to tractive force (or effort) is shown as P=VT/η where P is the power output delivered by the engine, T is the tractive force or effort, η is the efficiency in converting power output to tractive force and V is the velocity of the vehicle. Tractive force or effort in typical units can be represented as T=2650(ηP)/V where T is in Newtons, P is in horsepower, and V is in kilometers/hour.

Figure 17Q:
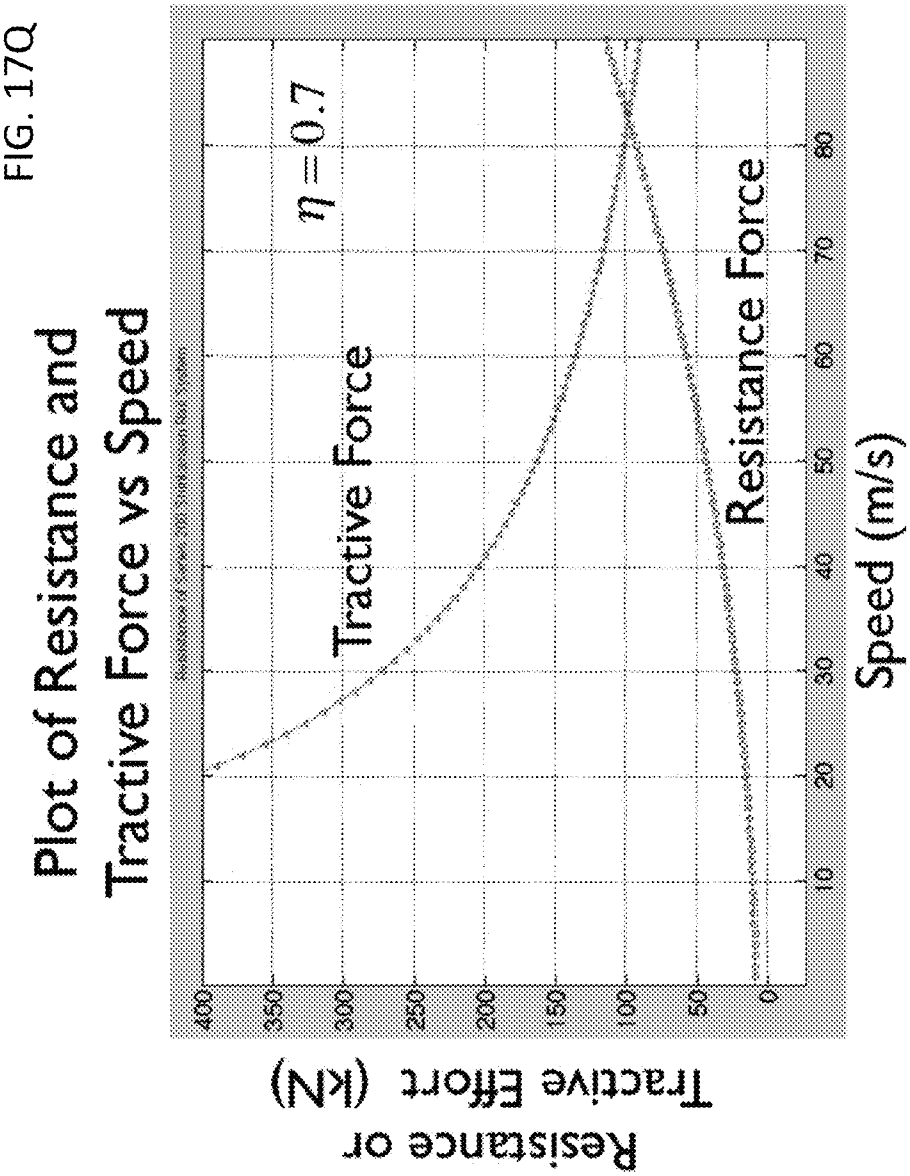
FIG. 17Q shows an example embodiment of a resistance/tractive effort in kN vs. speed in m/s graph.

FIG. 17Q shows an example of a resistance/tractive effort in kN vs. speed in m/s graph. According to plots of resistance and tractive force versus speed, a high speed rail system will reach maximum velocity at 82.8 meters per second (298 km/hr) when the value of efficiency is conservatively assumed to be 0.70 and there is zero gradient.

FIG. 18 shows an example embodiment of an animation which may appear in OLV along with a key explaining the features.

Figure 19A:
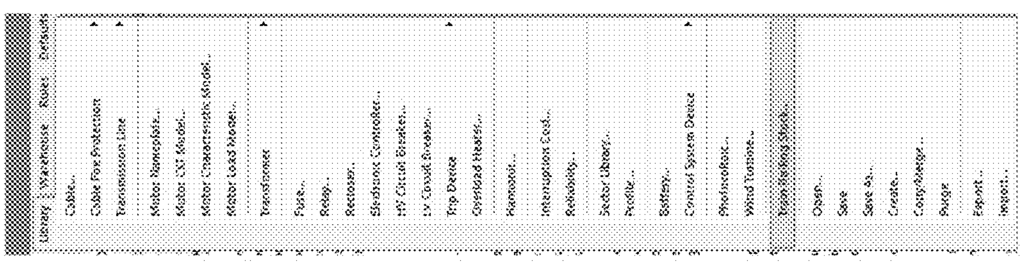
FIG. 19A shows an example embodiment of a train rolling stock button (for accessing a train rolling stock library) location in a menu in accordance with the present invention.

FIG. 19A shows an example embodiment of a train rolling stock button (for accessing a train rolling stock library) location in a menu in accordance with the present invention.

Figure 19B:
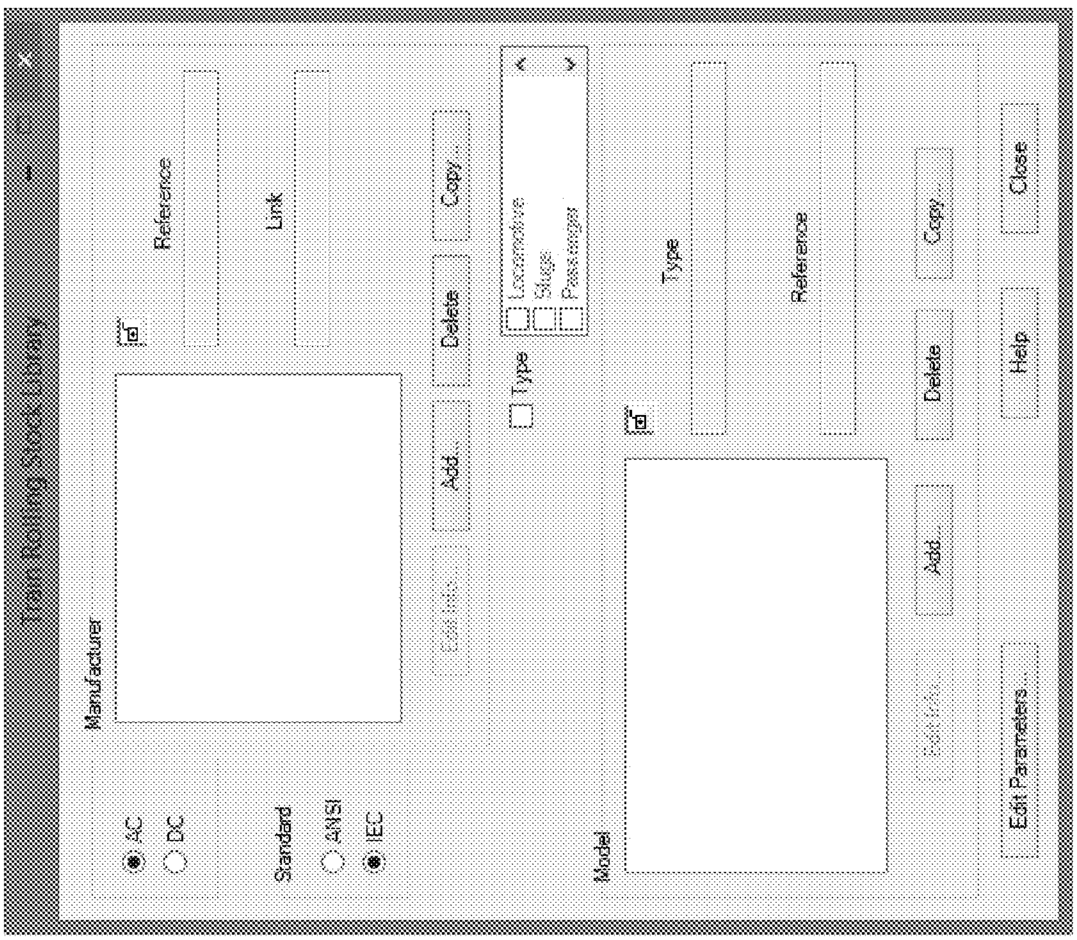
FIG. 19B shows an example embodiment of a rolling stock library editor that may be displayed when a user selects a train rolling stock button in accordance with the present invention.

FIG. 19B shows an example embodiment of a rolling stock library editor that may be displayed when a user selects a train rolling stock button in accordance with the present invention. In the example embodiment fields include manufacturer and model as well as standard and power type. In the example embodiment AC-DC can be selected as well as American and/or European standards.

Figure 19C:
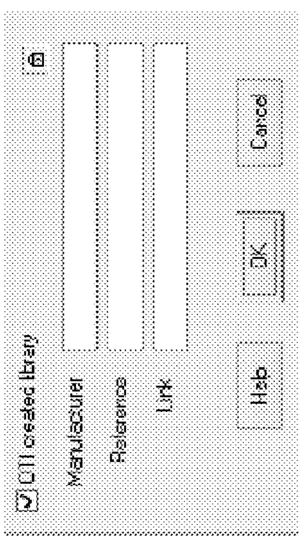
FIG. 19C shows an example embodiment of a manufacturer specific rolling stock editor that may be displayed if a user selects an add manufacturer button.

FIG. 19C shows an example embodiment of a manufacturer specific rolling stock editor that may be displayed if a user selects an add manufacturer button such as the one shown in FIG. 19B.

Figure 19D:
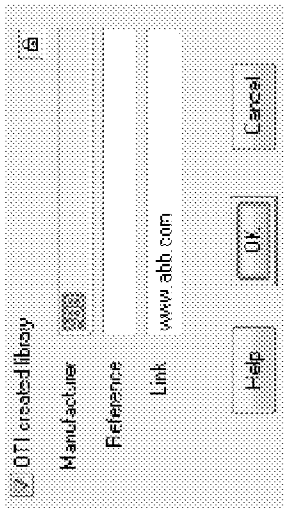
FIG. 19D shows an example embodiment of a manufacturer specific rolling stock editor that may be displayed if a user selects an edit info button.

FIG. 19D shows an example embodiment of a manufacturer specific rolling stock editor that may be displayed if a user selects an edit info button such as the one shown in FIG. 19B. If a user selects the ok button then a manufacturer may be added to the list.

Figure 19E:
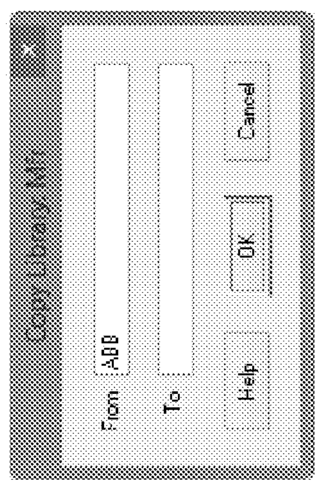
FIG. 19E shows an example embodiment of a manufacturer specific rolling stock editor that may be displayed if a user selects a copy button.

FIG. 19E shows an example embodiment of a manufacturer specific rolling stock editor that may be displayed if a user selects a copy button such as the one shown in FIG. 19B.

Figure 19F:
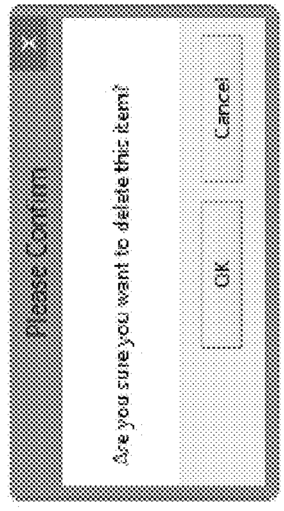
FIG. 19F shows an example embodiment of a manufacturer specific rolling stock editor that may be displayed if a user selects a delete button

FIG. 19F shows an example embodiment of a manufacturer specific rolling stock editor that may be displayed if a user selects a delete button such as the one shown in FIG. 19B. If a user selects an ok button on a confirmation dialog then a manufacturer and all associated models may be deleted from the library.

Figure 19G:
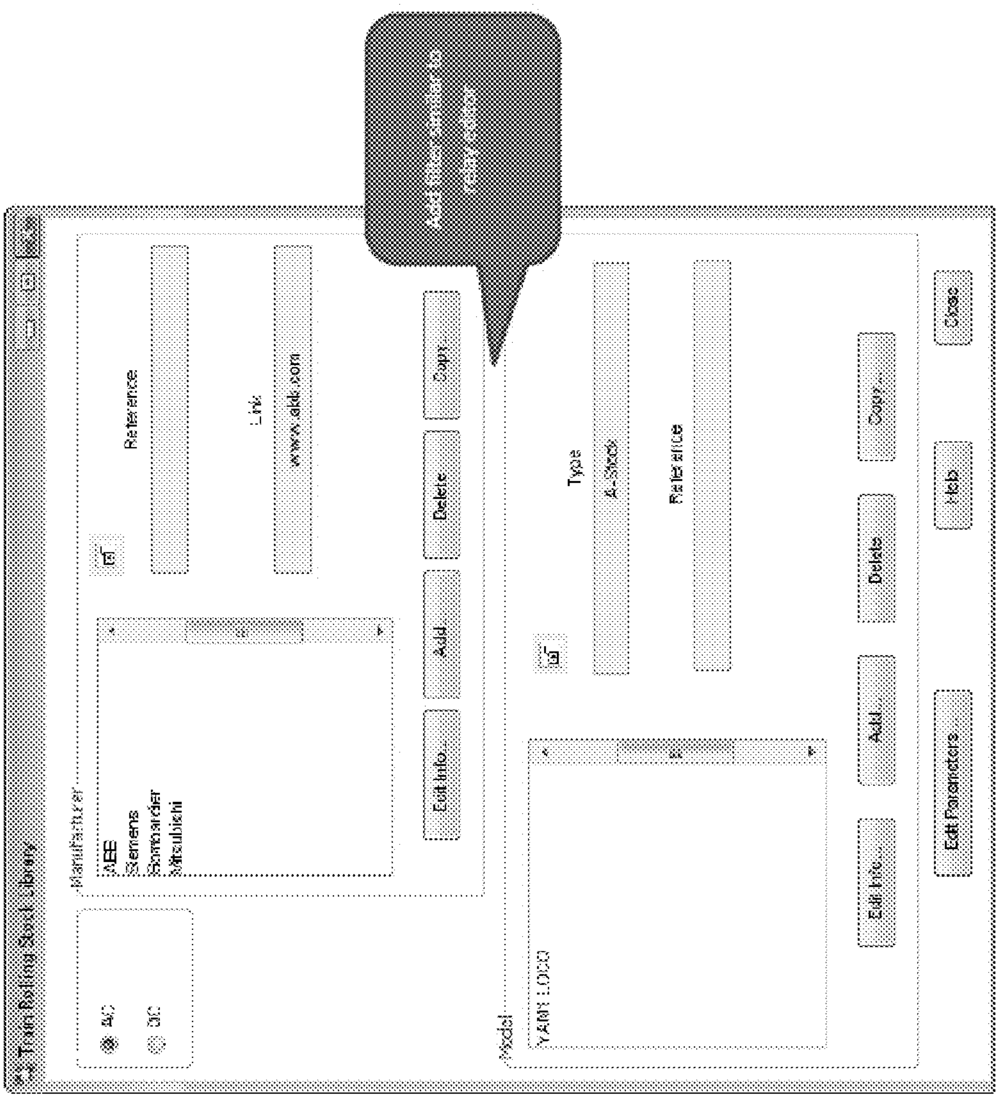
FIG. 19G shows an example embodiment of a filter which may be similar to a relay editor in accordance with the present invention.

FIG. 19G shows an example embodiment of a filter which may be similar to a relay editor in accordance with the present invention.

Figure 19H:
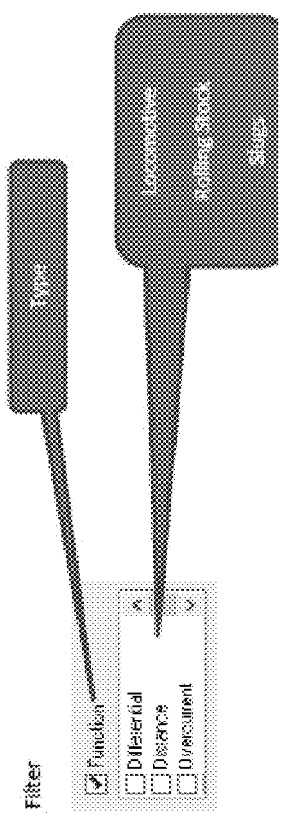
FIG. 19H shows an example embodiment of a filter enablement checkbox and list of filter options such as locomotive, rolling stock, slugs, and others.

FIG. 19H shows an example embodiment of a filter enablement checkbox and list of filter options such as locomotive, rolling stock, slugs, and others.

Figure 19I:
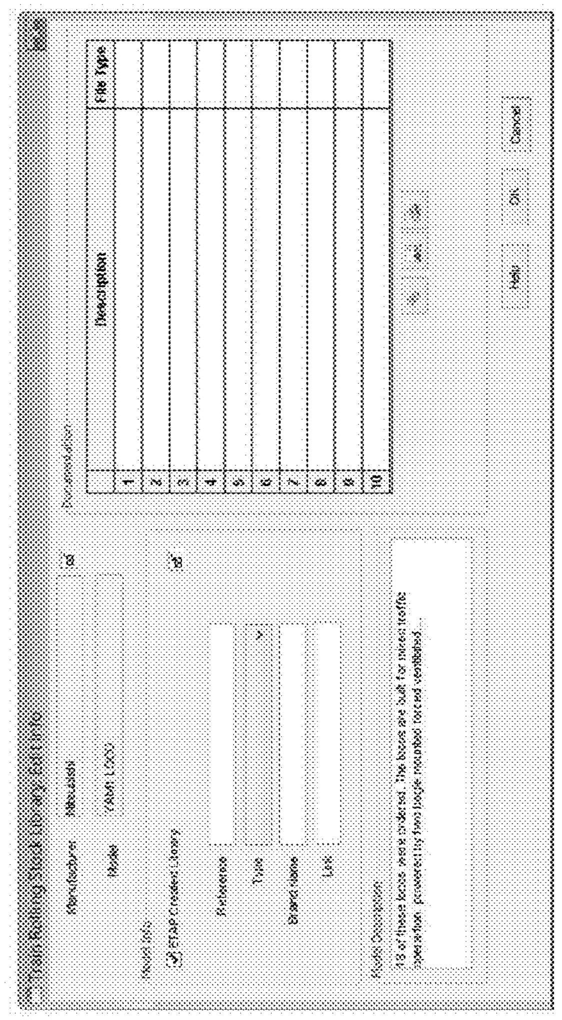
FIG. 19I shows an example embodiment of an editor that may be displayed if a user selects an add model button.

FIG. 19I shows an example embodiment of an editor that may be displayed if a user selects an add model button. In the example embodiment a documentation section may allow a user to embed files for a model including images, documents, PDF's and others. When a user selects a row, an attach button may be enabled by the program and once selected a display of standard windows file browse dialog may appear. After selecting file a file extension may be shown in a file type column and an editable description may be displayed which defaults to the file name. Users may view a selected row by selecting the row and launching a document in a default application viewer for the selected file type. A print button may launch a file in a default application viewer and send a print command.

Figure 19J:
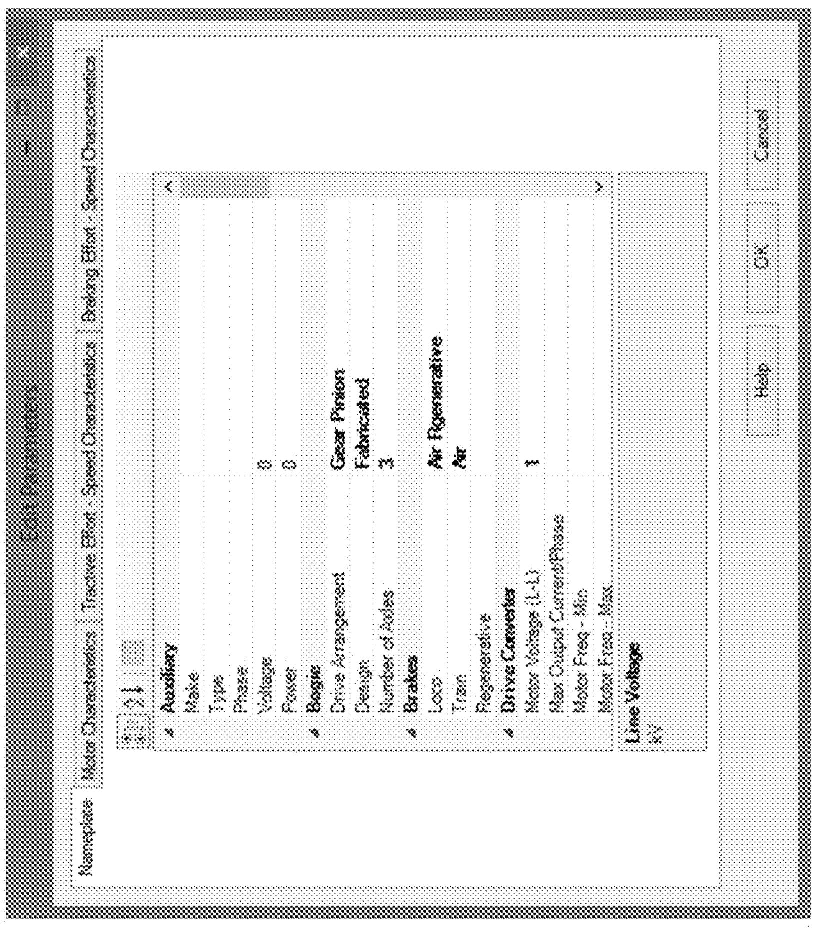
FIG. 19J shows an example embodiment of an editor which may be displayed if a user selects an edit parameters button.

FIG. 19J shows an example embodiment of an editor which may be displayed if a user selects an edit parameters button including tabs for nameplate, motor characteristics, tractive effort-speed characteristics, braking effort-speed characteristics and others.

Figure 19K:
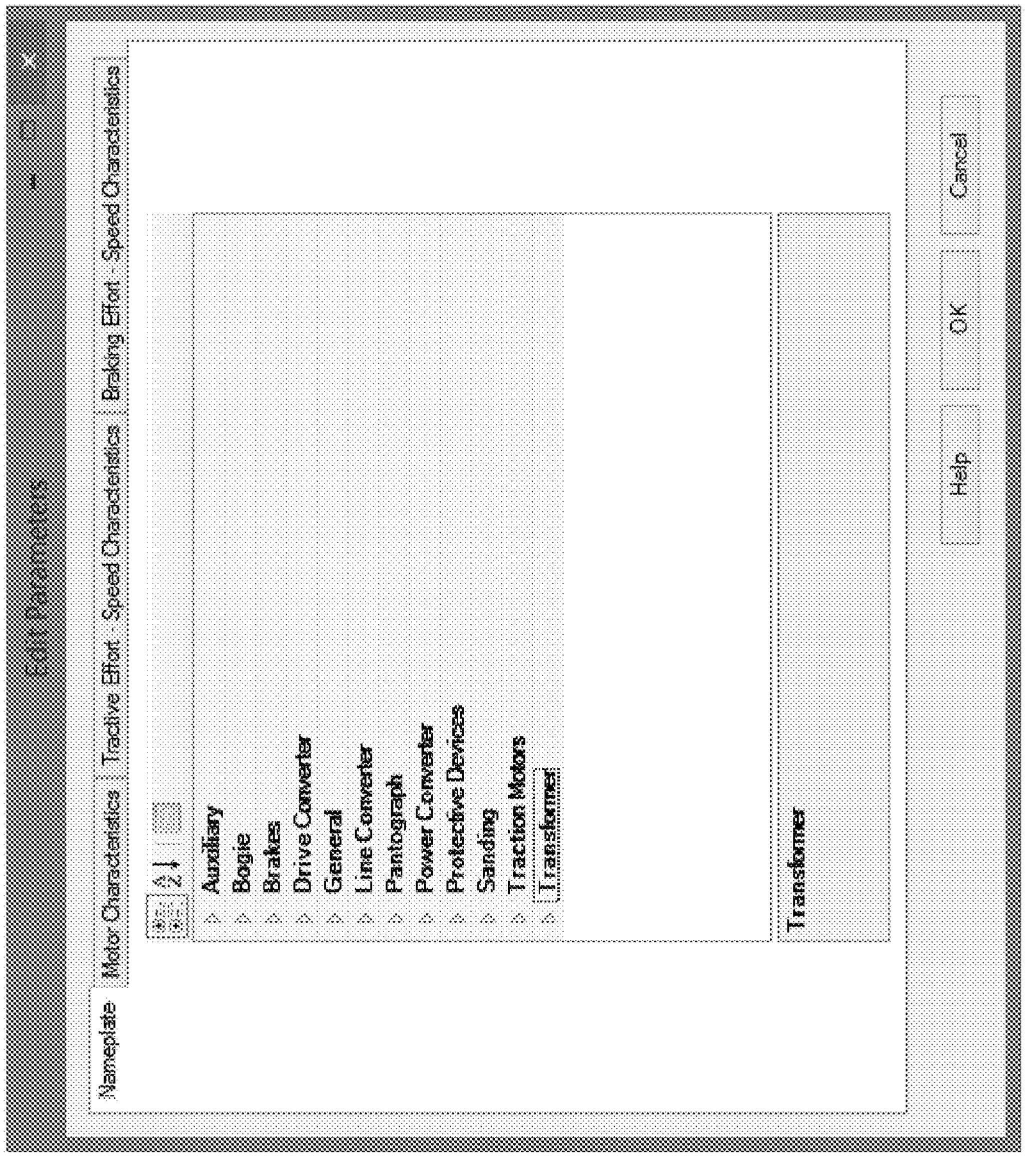
FIG. 19K shows an example embodiment of a nameplate tab.

FIG. 19K shows an example embodiment of a nameplate tab which may show a property sheet with collapsible/expandable groups similar to an options window.

FIG. 19L shows an example embodiment of an editable motor characteristics tab which includes information such as name, variable, curve type, notes, and lock.

FIG. 19M shows an example of an editable selected variable and speed relationship chart.

FIG. 19N shows an example embodiment of an editable speed and polynomial chart where speeds can include minimum and maximum speeds.

FIG. 19O is an example embodiment of an editable tractive effort—speed characteristics tab with fields for name, curve type, notes, and lock.

FIG. 19P is an editable chart including fields for tractive effort in tons and speed in kph.

FIG. 19Q is an editable chart similar to that shown in FIG. 19M.

FIG. 19R is an editable braking effort-speed characteristics tab with fields for name, curve type, notes, and locking.

FIG. 19S is an editable chart with fields for braking effort in tons and speed in kph.

FIG. 19T is an editable chart similar to FIG. 19M above.

FIG. 19U is a chart showing section, property, value type, unit.

Figure 20:
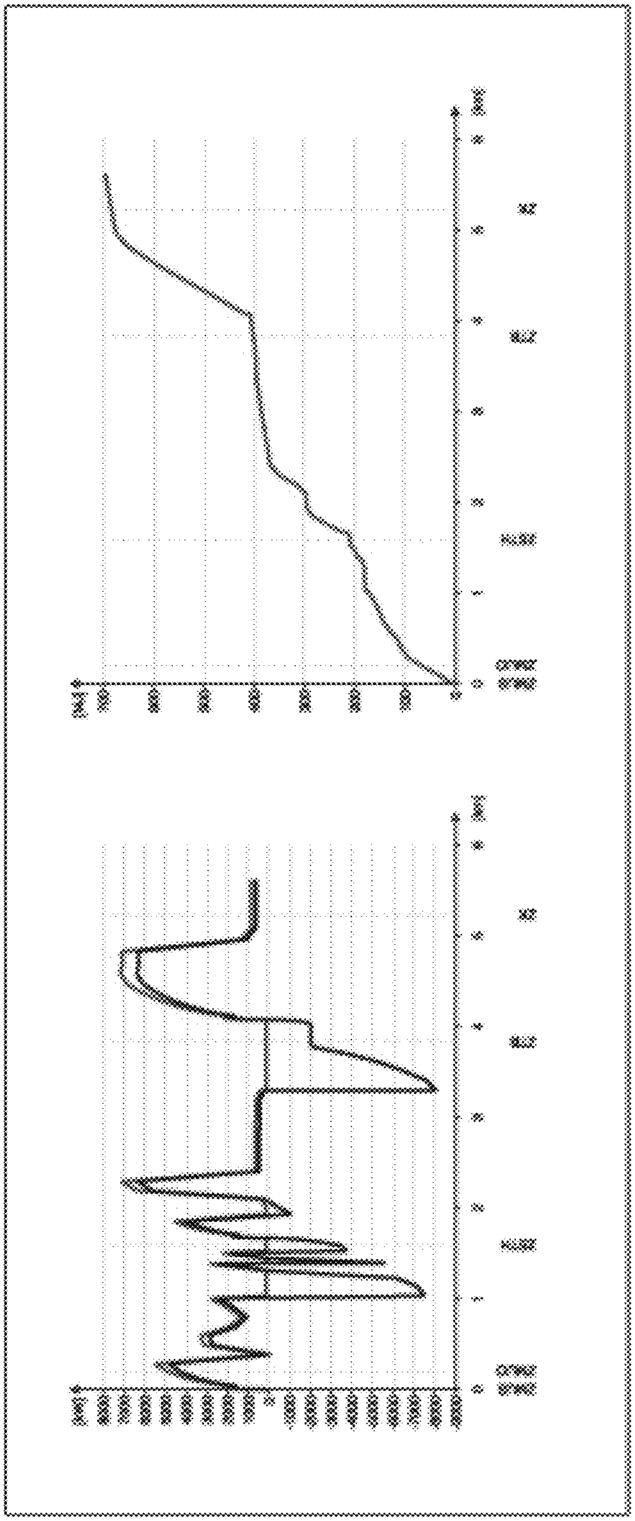

FIG. 20 shows two charts, the left is instantaneous power vs. distance while the right is accumulated energy (total consumed power) vs. distance.

Figure 21:
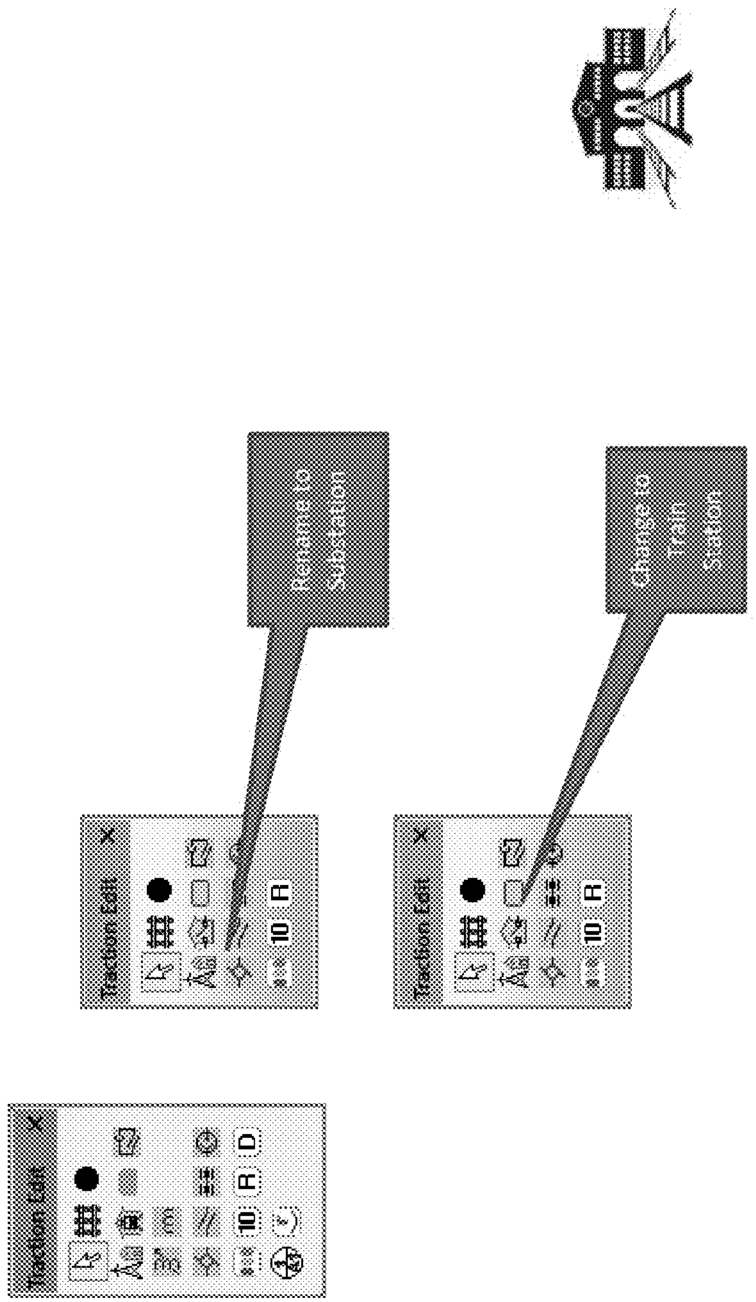

Turning to FIG. 21, an example embodiment of traction editing tools are shown. In the example embodiment users can select from pointer tool, track layer tool, and others including train station and substation.

Stations are graphical polygonal objects and in some embodiments may be similar in nature to substations regarding their graphical properties and capabilities. Stations can be drawn in the program intersecting any track object. Stations default as rectangular shapes when placed on tracks but may be editable to change size or shape or may have different default shapes in different embodiments.

Figure 22A:
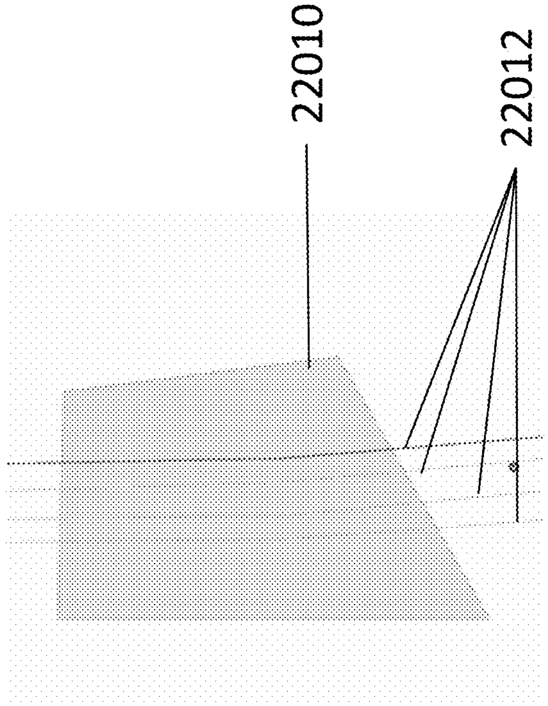

Turning to FIG. 22A, an example embodiment of a graphical view 22100 polygonal station 22010 is shown intersecting tracks 22012. A user may edit station 22010 characteristics by selecting station 22010 and bringing up editor 22200 as shown in FIG. 22B.

Figure 22B:
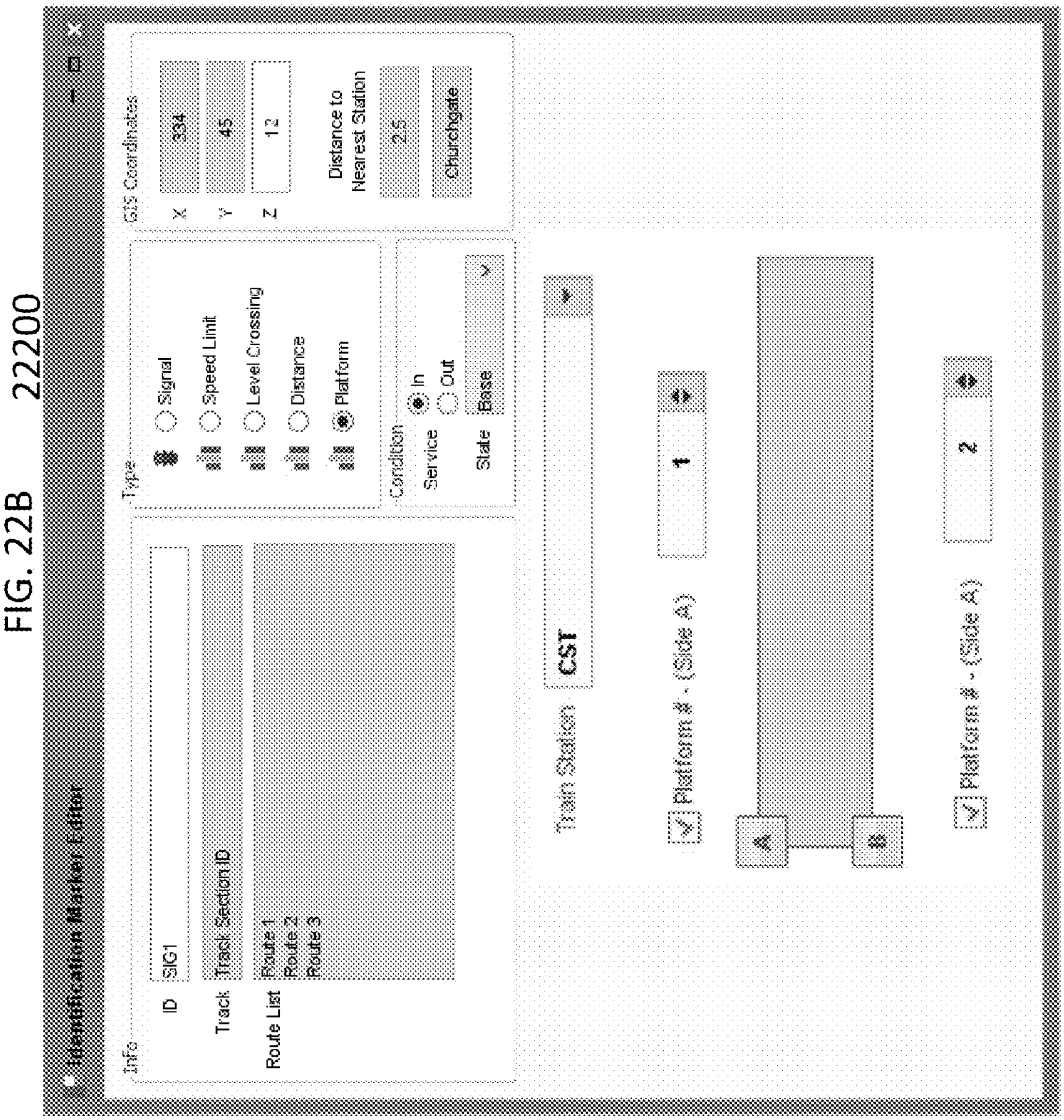

Turning to FIG. 22B, an example of station identification editor 22200 is shown. In the example embodiment a user may define station information, station element type, station condition, station type and name, and GIS coordinates. In the example embodiment station information includes a station ID, track section identification, and route lists that pass through the station. Route lists may auto-populate as may track section identification when a station is dropped on a track. In the example embodiment station element type includes radio buttons allowing the user to select signal, speed limit, level crossing, distance, and platform. Station condition allows users to select service conditions using radio buttons for in and out of service and also a drop-down menu for choosing the state of the condition, such as base. GIS coordinates fills in automatically when a station is dropped on a track. Included in the example embodiment are X, Y, Z coordinates, distance to nearest station, and nearest station name. Station type and name fields may include a graphical representation of the station such as a rectangle shown in the example embodiment. Station type may include a drop down menu with premade station types such as CST in the example embodiment. Users may be able to select platforms on one or both sides of a station in some embodiments and number the platforms such as 1 and 2.

Turning to FIG. 23A, an example embodiment of a graphical view of platform 23002 is shown. Platform 23002*s* are polygon objects and have similar graphical properties and capabilities to substations. In some embodiments platform 23002*s* may be rectangular. In some embodiments users may alter platform 23002 dimensions such as length and width and/or add bend points to convert platform 23002 into a polygon of different dimensions than rectangular. Platform 23002*s* are prevented from intersecting tracks and in some embodiments will automatically rotate when moved along tracks. This ensures that the edge of platform 23002 nearest tracks is parallel to tracks. In instances where platform 23002*s* are within or intersecting station 23004 boundaries then the program may automatically assign the platform to the station 23004 name. In instances where platform 23002 is moved outside station 23004 boundaries after starting within or intersection station 23004 boundaries then it may maintain station 23004*s* name. In instances where platform 23002 is moved from within or intersecting station 23004 to a position within or intersecting a second station (not pictured), platform 23002 may automatically be assigned the name of the second station (not pictured). In instances where platform 23002 is initially placed outside any station boundaries then the platform 23002 name will be set as the station name.

Turning to FIG. 23B, an example embodiment of how platform 23002 may be moved along a track from the position shown in FIG. 23A is shown. In many embodiments platforms may be selected and bring up platform editors such as in FIG. 23C.

Turning to FIG. 23C, an example embodiment of a platform editor 23100 is shown. In the example embodiment a platform information section includes a platform identification, a track section identification and a route list. In some embodiments the platform identification is a display only field that shows the assigned station name. A platform condition section includes radio buttons indicating whether the platform is in or out of service and the state of the platform (such as base). A GIS coordinates section includes X, Y and Z coordinates of the platform. Additionally, a platform list may be included with a train station dropdown selection list.

In some embodiments there may be additional fields such as indicating which side of the platform has tracks along its edge. In such embodiments a side 'A' may represent the left side of the platform and a side 'B' may represent the right side of the platform regardless of the platform orientation. In some instances if platform A & B sides are selected then there may be active side indicators on each side of the platform as shown in FIG. 23E.

Turning to FIG. 23D, an example embodiment of platform 23002 is shown with one active side 23006.

Turning to FIG. 23E, an example embodiment of platform 23002 is shown with two active sides 23006 and 23008. These two active sides may appear after a user has indicated in a platform editor that both sides are active in some embodiments. In other embodiments two active sides may appear when a platform is placed in an orientation in GIS with tracks along both sides of the platform.

Route and Track Definitions in some embodiments is a five step process. In embodiments where it is a five step process the steps may include: step 1) placing platform and/or station markers on GIS; step 2) creating tracks on GIS between stations using combinations of track segments; step 3) defining routes by designating start stations and end stations; step 4) defining train information; step 5) assigning trains to routes and trips (where routes are endpoint to endpoint non-time specific and trips are time-specific).

Turning to FIG. 24A, an example embodiment of step 1) placing platform and/or station markers on GIS 24000 is shown. In the example embodiment a user may place station 24002. After placing station 24002 the user may place platform 24004 and connection point 24006. Next a user may place station 24008. After placing station 24008 the user may place platform 24010 and connection point 24012. The user may then place platform 24014 and connection point 24016.

Turning to FIG. 24B, an example embodiment of step 2) creating tracks on GIS between stations using combinations of track segments 24100 is shown. In the example embodiment markers and nodes may create track segments. Platforms such as platform 24004, platform 24008, and platform 24010 may be markers placed on top of automatically created nodes. In some embodiments a user may double-click or otherwise select a track segment to launch a track editor. Track segments are considered the segments of track between markers. The track editor may be a modeless editor in some embodiments. After launching the track editor, the program may enter a track group definition mode that allows the user to select multiple track segments. This operability may be similar to standard OLV logic in that selecting multiple track segments may be accomplished by using a connected and operable mouse or cursor keys. When a track segment is selected and the track editor is open the program may automatically select all connected segments using an "automatic walk" until a node is encountered. After encountering a node the user may choose the next path. In many embodiments using a mouse to click once on a segment will select the segment while clicking on the segment again will unselect the segment. In some embodiments the program may automatically select a connecting segment if the user skips a connected segment. Using this multi-select functionality to include all track segments is important in many embodiments in order to ensure that all connected tracks are consistent in their definitions and functionality.

Turning to FIG. 24C, step 3) defining routes by designating start stations and end stations 24200 is shown. In the example embodiment multiple track segments may be selected including track segment 24020, 24022, 24024, 24026.

Turning to FIG. 24D, an example embodiment of how track segments may be automatically selected is shown. In the example embodiment a first step includes selecting track segment 24026. This will trigger a second step of automatically "walking up" to the first node and selecting track segment 24024. Then a third step is to automatically walk up to the next node and selecting track segment 24022. In a typical embodiment the selection process is stopped and the track group definition is complete when a platform and/or station is encountered. After a platform and/or station is encountered a new track group may be started by clicking on a "new" button as shown in FIG. 24E.

Turning to FIG. 24E, an example embodiment of a track editing window of a user interface is shown. Included is a track list with a breakdown of tracks by station segments. Also included is Track Segment Information. This Track Segment Information includes information such as object names, object types, segment identification by end-points, segment length, distance, speed information including class and unit, GIS coordinates including X/Y/Z coordinates and grade, and bend radius information. Track Segment Information may include all elements between two stations. Standard filters may be added to each column. Also included is a route listing. The route listing may be a read-only description of routes that are defined for the selected track. Track assignment may be done in the route editor. Also included is a rail resistance portion which allows users to select a track warehouse which may be a database of common track information.

In the example embodiment the dialog is modeless and when any item is selected the program may automatically zoom in order to find the element on the active presentation in GIS or OLV. The selected item may also be colored with a "selected color" choice button from a theme manager.

By selecting a tree item "Track 1" the user may change the name of the tree item by right clicking using an attached mouse and clicking edit. This provides for in-line editing of the name. In some embodiments there is no need for an edit dialog box. Regarding rail resistance, when any track with the tree item "Track 1" name is selected in the tree then the rail resistance warehouse selection may be displayed. Once a warehouse is selected by the user, the warehouse ID is assigned to all track segments incorporated in that particular track ("Track 1" in the example embodiment).

Turning to FIG. 24F, the table shown in FIG. 24E may be simplified when bend markers are considered.

Pages in the editor may be labeled train schedule or timetable, train configuration, train assignment, route, track, and others.

Turning to FIG. 25A, an example embodiment of a train and consist editor 25000 is shown. Typically this train and consist editor 25000 will be launched from a study toolbar (as shown in FIG. 37, third button down, although numerous other placements exist in other embodiments). Train and consist editor 25000 includes a Rolling Stock/Train Name portion with a list of train names, a locomotive section which has a library button, and a coupled consist section which has a library button. Located next to the train listing is a check box for each selection in the list which disables the selected train from being available in a Timetable or Schedule editor. If the train was previously selected in the timetable editor and the check box is unchecked then the train is inactive in the timetable used to run the analysis. As an example, if ADH2 is unchecked, then ADH2 will not be operating in any timetable in which it is selected.

Turning to FIG. 25B, an example embodiment of Route Editor 25100 is shown. Typically this Route Editor will be launched from a study toolbar. In the example embodiment a Route Name is an editable name used to define and identify a route. Routes may also be designated a particular color such as blue, green, yellow, or others. Distance may include the total distance of a particular route equivalent to the sum of the distances between each station along the route. A From and To station list is a list of all graphically created train stations. An additional signifier titled Distance may signify the distance between stations but is different from the one described above. Track may signify the tracks that have been selected in the graphic representation and the train stations between the selected tracks which are displayed. From and To stations may automatically total the distance of the route as a sum of distances between each station along the route. A route-track toggle may show Route Editor 25100 as depicted in FIG. 25B with the route names selected and corresponding tracks displayed. A track-route toggle may show the editor as depicted in FIG. 25C with track names selected and corresponding routes displayed.

Turning to FIG. 25D, an example embodiment of a track route display 25005 is shown. The track route display may be shown if a plot button is selected. The track route display 25005 shows all tracks connected from station to station including hubs.

Turning to FIG. 26, an example embodiment of a Train Route theme manager 26000 is shown. The Train Route theme manager 26000 in many embodiments is available in both GIS view and OLV. Train Route theme manager 26000 may be added to a theme manager color code section of the program (not shown). Train routes may be automatically color coded as an active presentation based on colors defined for each route when the Train Route theme manager 26000 is selected. In some embodiments the Train Route theme manager 26000 may only be accessible when a user has purchased a subscription and/or unlocked the full product with a license key. Active routes may be given route names from the route editor. In the example embodiment an On/Off toggle is operable to turn color coding on or off for a selected route. In some embodiments unchecked routes may be shown as transparent using an "unchecked route" option and the level of transparency may be adjustable using a slider bar and/or a percentage value input. Often this is useful for users in singling out one or more routes they wish to focus on at a particular time in testing or simulation.

Turning to FIG. 27A, an example embodiment of a train schedule editor 27000 is shown. The train schedule editor may be launched from a study toolbar. In the example embodiment the train schedule editor shows fields including routes, a weekly schedule, and a selected train schedule. The routes may display numerous routes which have been created in the program or are selected from a preprogrammed group. The weekly schedule shows the seven days of the week, national holidays, local holidays, and other user defined days. Each of these options may be selected or unselected as required by the user to analyze or simulate data based on the user's individual needs. Adjacent to the day in the example embodiment is the number of trains running on a particular day. As shown in the example embodiment some days may have fewer trains running than others and holidays may have particularly large numbers of trains running to accommodate increased passenger travel. The selected train schedule includes numerous fields such as station name and arrival, dwelling, and departure times for each location. For instance, in the example embodiment a train may arrive at Churchgate station at 15:40:30, dwell at the station for 0.5 minutes, and then depart at 15:41:00.

Turning to FIG. 27B, an example embodiment of a train time table storage structure is shown. In the example embodiment a hierarchical format of Route Names are shown with ten schedule days and each schedule day includes particular numbers of trains. In some embodiments the names of schedule days are fixed and non-editable and include Mon, Tues, Wed, Thur, Fri, Sat, Sun, Local Holiday, National Holiday and User-Defined. In the example embodiment all defined routes from the route editor are shown in the Route Names—in this embodiment Route 1 and Route 2. In many embodiments numerous timetables for each route may be created and stored by users in memory. The number of timetables created and stored per route may be limited in some embodiments while in other embodiments it may be unlimited or limited only by the available amount of storage. Schedule days shown for each selected route may be a number of timetables which are created by a user and stored or are pre-created by system administrators or others. In the example embodiment the number of trains is a display only field that provides a sum of all trains defined for a selected timetable.

Turning to FIG. 27C, an example embodiment of a toolbar for train schedules is shown. In the example embodiment a train add and train delete button are shown as a paper with folded corner and x buttons respectively. The last three buttons shown in FIG. 27C (stopwatches) will hide arrival time, dwell time, or departure time respectively if selected. In most embodiments users will want to always show arrival time but may wish to hide departure or dwell time.

Turning to FIG. 27D, an example embodiment of train adding buttons for the left and right side of a column are shown as well as a user interface "add trains" box if the buttons are selected. These buttons appear on the toolbar for train schedules shown in FIG. 27C. The user interface "add trains" box allows users to select a number of trains to add by typing the number in or using up or down arrows and users may also select an option to automatically calculate the arrival time of a train based on a previous train.

Turning to FIG. 27E, an example embodiment of a train schedule diagram is shown, such as may be displayed for a selected route if the tree button is selected from the toolbar for train schedules shown in FIG. 27C. S1-S10 along the sides of the diagram are stations while the bottom axis shows time. Horizontal flat lines represent dwell times while angled lines represent trips.

Turning to FIGS. 28A-28B, example embodiments of a train configuration editor are shown, as may be launched from a toolbar or editor and displaying various train configuration characteristics in at least two fields; train configuration and locomotive selection.

In the example embodiments train configuration includes a train configuration identifier, examples of which include "TrainConfig1", "TrainConfig2" and "TrainConfig3" in the example embodiment. In some embodiments this field is alphanumeric and may be thirty characters in length. A default configuration identifier may be an incremental number before a user changes it. Users have the option to turn train configurations on or off using check boxes in the example embodiment. The on or off allows train configurations to be activated or deactivated. Users may also create new configuration rows by selecting a new button or delete configurations by selecting one or more configuration identifiers and selecting a delete button.

Locomotive selection includes numerous editable characteristics related to a selected train configuration. In the example embodiment the user may define a train consist that includes an order of cars such as 1-12. This also includes a quantity of each type of car such as 1, 3, 5 or others. This also includes the type of cars such as locomotive, coach, wagon, passenger, slug, dining car and mail car in the example embodiment. Also included are fields for manufacturer, model, weight, percent loaded, library and length of each type of car in the example embodiment.

Users may select a row in the locomotive selection field and use a library button to launch a rolling stock library quick pick that includes a desired locomotive or train car. In some embodiments particular library data including type, weight, length, manufacturer, model and model description may be retrieved from the library and displayed in the locomotive selection field.

Turning to FIG. 29, an example embodiment of a Train Assign dialog box is shown and may be selected from a toolbar or editor. In the example embodiment a list of trains may be automatically populated from a train schedule page. A configuration identifier may include a drop-down list that allows a user to select a configuration created in the train configuration page. A "# in consist" field may display the number of trains in the consist that have been entered in a train configuration page and may be a summation of the row multiplied by the quantity. Users may also have the ability to copy and paste configuration identifiers into multiple rows in the Train Assign dialog box.

Turning to FIG. 30A, an example embodiment of an info tab of a transmission line editor is shown. A transmission line editor may be displayed when a track edge is selected for editing by a user, such as by double clicking in GIS or OLV. In the example embodiment various tabs are shown including Sag and Tension; ampacity; compensation; reliability; remarks; comment; info; parameter; configuration; grouping; Earth; impedance; and protection.

In the example embodiment the Info tab includes information related to the transmission line. Included is an Info field, Equipment field, Revision data field, Condition field, Connection field, and length field. The Info field includes information describing an identifier and the location of the line. In the example embodiment the line identifier is for Line4 and maintains power from Sub3 Swgr to Bus9 at 4.16 kV. In the example embodiment a user may name the line while the from and to locations may be dropdown menus. The Equipment field include user editable Tag#, Name and Description sub-fields. The condition field includes radio buttons which are selectable to set the line as in or out of service as well as a State drop-down menu which reads "As-built" in the example embodiment. The length field includes a user editable field for the length of the line, a drop down menu for unit—such as miles in the example embodiment, and a tolerance percentage editable field. The connection field includes radio buttons allowing a user to select three phase or single phase connection for the line.

Turning to FIG. 30B, an example embodiment of a parameter tab of a transmission line editor is shown. In a parameter tab a phase conductor field and a ground wire field may be included. The phase conductor field shown in the example embodiment includes information related to conductor type which is aluminum in the example embodiment. Also included are sub-fields for defining an outside diameter field in centimeters, a GMR field in meters, as well as a button which can be selected by a user to bring up a conductor library. The ground wire field has similar sub-fields to those of the phase conductor but has selectable buttons which may bring up a ground wire library or a conductive wire library. Conductor electrical properties data may be selected from a library and information in this figure can auto-populate.

Turning to FIGS. 30C-30D, an example embodiment of a warehouse structure screen is shown which may be displayed if a user selects a save to button in a transmission line editor. In the example embodiment tabs are included which allow users to view cable, line, line phase, line ground, line configuration, transformer, LVCB, fuse, switch, HVCB and railway track. The example embodiment shows the line tab as having sub-tabs for a warehouse ID, data source, phase warehouse, ground warehouse identifier, configuration warehouse identifier and phase type. At the right side of the warehouse structure screen is a display of information related to the selected data including frequency, temperature, option, phase, and line constant information including Raa, Rbb, Rcc, Rab, Rbc, Rca, Xaa and Xbb.

The major advantage of the warehouses in embodiments of this system is that elements can be defined once, placed in a warehouse, and applied globally across all interfaces available in the system. This reduces database size since the warehouse only needs to be defined once and not individually for different forms of user interfaces (GIS, OLV or others).

In some embodiments a user may wish to select a "Get From" button to launch the warehouse structure screen in quick pick mode. When a warehouse entry is selected and the OK button is selected then warehouse parameters may be loaded into the active line editor as shown in FIG. 30E.

Turning to FIG. 30E, an example embodiment of a transmission line editor for a line is shown where parameters from a warehouse have been loaded into the line editor and the library header has been changed to reflect this state. In the example embodiment information is included relating to the warehouse identifier, phase warehouse identifier, ground warehouse identifier, configuration warehouse identifier, a neutral # and a grounding #.

Turning to FIG. 30F an example of a warehouse editor is shown. Included are Warehouse identifier, standard, unit, unit length, electrical resistance, and other fields.

Turning to FIG. 31A, an example embodiment of an elevation marker is shown which may be included in a fraction edit toolbar in some embodiments.

Turning to FIG. 31B, an example embodiment of a bend radius marker is shown which may be included in a fraction edit toolbar in some embodiments.

Markers are also editable in various embodiments of the invention. In various embodiments users may drop speed, signal, level crossing, distance, platform, station (including node), elevation, and/or bend radius markers on tracks.

Users may select a marker and bring up a "Marker Editor" which allows users to include information related to the marker. In many embodiments the information included for new markers will be a copy of information dropped for a previous marker of the same type as the current marker. In some embodiments an exception will be the Z value which should be identical to the previous marker regardless of type. This Z value may be an elevation point and typically will not need to be changed in most instances since Z values are generally consistent.

Turning to FIG. 31C, an example embodiment is shown of an identification marker editor. This embodiment of the editor is shown when a user drops or places a signal marker on a track and then selects the editor. In the example embodiment numerous fields are shown including an info field, a signal field, a condition field, a GIS coordinates field and a configuration field. Many of these fields are similar to previously described fields and descriptions will not be repeated here to save space. Different fields include a signal field which may have sub-fields including drop down menus for # of lights and type of signal. Additionally, a configuration field may have an editable field to describe a status and a status selectable using radio buttons such as proceed/on, proceed slow, caution, attention, and stop/off.

Turning to FIG. 31D, an example embodiment is shown of an identification marker editor. This embodiment of the editor is shown when a user drops or places a speed limit marker on a track and then selects the editor. In the example embodiment numerous fields are shown including an info field, a speed limit field, a condition field and a GIS coordinates field. Many of these fields are similar to previously described fields and descriptions will not be repeated here to save space. Different fields include the speed limit field which allows users to select freight and/or passenger train and type in or otherwise input a speed limit for each class. In the example embodiment km/h is the default unit of measure but in some embodiments other units of measure may be used by selecting a dropdown menu option. Also included is a dropdown menu option to change track types.

Turning to FIG. 31E, an example embodiment is shown of an identification marker editor. This embodiment of the editor is shown when a user drops or places a level crossing marker on a track and then selects the editor. In the example embodiment numerous fields are shown including an info field, a condition field and a GIS coordinates field. Many of these fields are similar to previously described fields and descriptions will not be repeated here to save space.

Turning to FIG. 31F, an example embodiment is shown of an identification marker editor. This embodiment of the editor is shown when a user drops or places a distance marker on a track and then selects the editor. In the example embodiment numerous fields are shown including an info field, distance from field, a condition field and a GIS coordinates field. Many of these fields are similar to previously described fields and descriptions will not be repeated here to save space. Different fields include the distance from field which includes track start and track end sub-fields which contain user-selectable station names. Based on the distance between the distance marker and the relevant station, the distance marker sub-field will display the appropriate distance from or to the displayed station.

Turning to FIG. 31G, an example embodiment is shown of an identification marker editor. This embodiment of the editor is shown when a user drops or places a platform marker on a track and then selects the editor. This embodiment is similar to the figure shown in FIG. 22B.

Turning to FIG. 31H, an example embodiment is shown of an identification marker editor. This embodiment of the editor is shown when a user drops or places an elevation marker on a track and then selects the editor. In the example embodiment numerous fields are shown including an info field, a condition field and a GIS coordinates field. Many of these fields are similar to previously described fields and descriptions will not be repeated here to save space. In this embodiment the Z coordinate subfield of a GIS coordinates field is editable.

Turning to FIG. 31I, an example embodiment is shown of a bend radius/curvature marker. This embodiment shows a user editable bend radius for tracks. In the example embodiment a user may select a bend radius button and then specify a start and end point for the segment of track to be bent. As such, a bend radius marker may be created and deleted as a pair of points.

Turning to FIG. 31J, an example embodiment of a bend radius/curvature marker editor is shown. This editor may be displayed when a user selects either a start or end point of the segment of track to be bent. In the example embodiment an information field, condition field, bend radius field, and GIS coordinates-bend field are shown. Users may edit GIS coordinates of a bend radius including X, Y, and Z coordinates of "from" and "to" points in addition to a bend radius, which is displayed in meters in the example embodiment.

Turning to FIGS. 31K-1 to 31K-3, an example embodiment of a creation process for track bends is shown. In the example embodiment a user may have the option to automatically create bends in a track in GIS view using bend markers. A user may first create track logic with three segments as shown in FIG. 31K-1. Next a user may place two bend points, one on one segment of track and another on a second segment of track which intersects the first segment of track as shown in FIG. 31K-2. This may be accomplished by selecting a bend radius (BR) marker on a toolbar. In some embodiments a user may be able to select a create bend option from a menu when a user selects a point between two bend radius markers. Once this option is selected a circular arc may be created which fits between the two bend radius markers. A value of a calculated radius may be stored in association with the bend radius marker and this value may be available for user editing in a track editor. FIG. 31K-3 shows a bend arc created by a user. In some embodiments if a user deletes bend radius markers there will be no change to the bend points and the arc connected between them. In some embodiments if a user bends a track edge then the edge will pivot around the bend radius marker.

Turning to FIG. 31L, an example embodiment of a GIS coordinates field which may be editable by users in a node editor is shown. In the example embodiment the node editor shows the distance to a nearest station as well as the name of the nearest station.

Turning to FIG. 32, an example embodiment of a line editor is shown. This line editor may be displayed when a track edge is selected in GIS view or OLV and may be similar to distribution line editors. Properties for a track edge may be stored in a track edge table and displayed in the line editor. Differences between a line editor and a distribution line editor may include designation of an overhead catenary editor in place of a distribution feeder editor, use of the word feeder rather than catenary and others. In some embodiments an object list as shown in the lower half of the figure may be displayed and list each element for each section of track in order and in relation to other elements in the section.

Turning to FIG. 33, an example embodiment of an SRS is shown. The example embodiment can use as applicable the theoretical bases for performing calculations and creating simulations, design constraints, applicable codes/functions of the system (ASME, AISC, others), design performance with respect to accuracy/precision of calculations and others. Requirements are specified in a manner such that its achievement is capable of being objectively verified and validated. Requirements can be described or incorporated by reference. ANSI/IEEE Std 830-1984 (IEEE guide to software requirements specifications) describes necessary content and qualities of software requirements specification and provides templates for SRS. The example embodiment is designed based on prototype outline 1 for SRS section 3 although others can be used. SRS generally will follow practices as outlined in 830-1984 and utilize appropriate derivatives in many embodiments.

Turning to FIG. 34A, an example embodiment of an overhead catenary editor is shown. In the example embodiment a user may select a track segment in GIS view or OLV and then select a catenary editor which will display the editor shown and store properties entered in the editor as part of the selected track segment. In the example embodiment two tabs are shown, one titled info and another titled catenary. The info tab includes fields for inputting info, GIS coordinates, revision data, condition, connection, and length. Many of these fields have been described and operate similarly to fields in other editors described previously. In this editor the length field range and format are the same as that of the transmission line and length should be stored as an impedance length.

Turning to FIG. 34B, an example embodiment of a user button allowing for updated measurements is shown which a user may desire to double check if the length field or impedance field is updated.

Turning to FIG. 34C, an example embodiment of a catenary tab in the overhead catenary editor shown in FIG. 34A is shown. This editor includes fields for warehouse selection and warehouse parameters.

Turning to FIG. 34D, an example embodiment is shown that illustrates an included capability to open properties for multiple tracks in the editor. As such a user will be able to edit multiple tracks without the need to open each track individually, thus providing a savings in time and effort.

Turning to FIG. 34E, an example embodiment of a warehouse selection screen is shown on the right that may be displayed if a user selects a "Line Z" warehouse selection in catenary tab of the overhead catenary editor described above. The warehouse selection screen includes fields describing a warehouse identifier, a data source, a phase warehouse identifier, a ground warehouse identifier, a configuration warehouse identifier, a phase number, and other fields related to the warehouse. This information may be displayed under a line tab.

Turning to FIG. 34F, an example embodiment of a track warehouse selection screen is shown on the right that may be displayed if a user selects "track" warehouse selection in catenary tab of the overhead catenary editor described above. The track warehouse selection screen includes fields describing a warehouse identifier, a standard, a unit, a unit length, an electrical resistance, and other fields related to the warehouse. This information may be displayed under a railway track tab.

Turning to FIG. 34G, a data manager selection screen is shown. In the example embodiment a data manager selection screen for track may be the same as a distribution line editor. The data manager selection screen may allow users to update track warehouse and line warehouse in some embodiments. As shown in the example embodiment the data manager selection screen may be a GIS data manager and may include fields such as class, type, feeder identifier (ID), feeder, Equipment identifier (Eq. ID), Equipment type (Eq. type), shape length, warehouse ID and multiple error warnings. Feeder ID may signify a specific feeder (unique identifier) where power is coming from while feeder may signify which type of feeder is used. Eq. ID may signify which unique track is being used (such as Track 203 in the example embodiment) while Eq. Type may signify what type of equipment is used (such as track segment). Buttons for user interaction and navigation may include warehouse, clear, clear all, recreate, recalculate, replace, help, ok and cancel.

Turning to FIG. 35, an example embodiment of a study case toolbar is shown. In the example embodiment a user may view the study case toolbar when the user selects a particular mode, such as an eTraX mode in the example embodiment.

Turning to FIG. 36A, an example embodiment of an information page for a study case is shown. In the example embodiment a user may be presented with several fields in which to select options to customize or setup a study case. Fields may include a Study case ID field which allows a user to name a study case. A calculation options field may allow users to select a halt on non-convergence field and/or a halt on equipment overload option. These options may allow a user to immediately identify problem issues with a study case in the event non-convergence or equipment overload occurs and to conveniently address the issue. An update field may include options to update initial bus voltages, operating load and voltage, cable load amps, inverter operating load, transformer Load Tap Changers and relay amps. A report field may allow users to customize how the user will receive data information from the study case. Options may include a rated voltage option, a bus operation voltage, a power option, an equipment cable losses and Vd and a report sequence load flow results option. An initial voltage condition field may allow users to select bus initial voltages or user-defined using radio buttons. A study remarks field may allow users to type and save custom comments for later review. Also included may be buttons allowing a user to easily navigate from one train to another.

Turning to FIG. 36B, an example embodiment of an events page is shown. In the example embodiment an events field and an actions field are shown. An events field may include an event ID and time sub-field.

Turning to FIG. 36C, an example embodiment of an event editor window is shown. In the example embodiment this window may be shown when a user selects an add event button in the events page shown in FIG. 36B. The event editor may include user changeable options to set an event as active or inactive, to name an event with an EventID, to select a route from a route list of available routes (as defined in a route editor), and a time select button.

Turning to FIG. 36D, shows an example embodiment of an action editor window is shown. In the example embodiment this window may be shown after a user selects an add button in the action field of the events page shown in FIG. 36B. The action editor window may include fields such as an EventID field and an action field. The action field may include sub-fields such as Device Type, Device ID, Action, percentage, and time in seconds.

Turning to FIG. 36E, an example embodiment of many device types and actions is shown. In the example embodiment device types include bus, utility, circuit breaker, switch, none, and others. Device ID's may be included when a user adds them in the program. An action may include load impact, load ramp, and delete for a bus; voltage impact, voltage ramp and delete for a utility; open or closed for a circuit breaker or switch; and load flow for none. A percentage may be included for load impacts and ranges may be set as well. In the example embodiment ranges may include −200 to 200%. Time in seconds may also be set, for example, within a range of 0 to 9999.

Turning to FIG. 36F, an example embodiment of a loading page is shown. The loading page in the example embodiment includes fields for loading category with menus including options for design and buttons for enabling/disabling operating P (real power MW), Q (reactive power Mvar), generation category with menus including options for design and buttons for enabling/disabling operating P, Q, V These options are used to determine whether the loading and generation information used is from design data (disabled) versus operating or real-time data (enabled).

Turning to FIG. 36G, an example embodiment of a train schedule page is shown. In the example embodiment a selection filter field may allow a user to choose a selection from all, weekdays, weekends and holidays. A list of days with an associated number of trains for each day is also available for selection by a user. A view button (not pictured) may bring up a timetable editor for a user to review the previously inputted timetable. A list route identifiers with an associated number of schedules and schedule identifiers are also available for users to activate or deactivate. A calculation field includes options for a single load flow and time domain load flow (which may be a default) with a day, route selection, and time. In some embodiments when a time domain load flow is selected two further options may be displayed—complete timetable (as a default) or user-defined. Additionally, a time selection sub-field includes a complete train schedule and/or a user defined time or time range. Users may also select a time step and an associated unit of measure such as minutes, seconds or hours. In embodiments where a single load flow is selected this option may be hidden from a user.

Turning to FIG. 36H, an example embodiment of a calculation field is shown.

Turning to FIG. 36I, an alternative example embodiment of a route train schedule window with selection filters removed (such as all, weekdays, weekends, and holidays) is shown.

Also provided may be several additional screens which are similar to those described elsewhere herein. One example is an adjustment page to consider equipment tolerances such as length, temperature and electrical impedance. Advanced alerts to determine unbalance in phase voltage and current.

Additionally, a plot screen may include a device type list including buses, track nodes, overhead lines (including a from and to side), cables (including a from and to side), transformers, impedance (including a from and to side), reactors (including a from and to side), auto transformers (including a from side), booster transformers (including a from and to side), Syn. Generators, power grid, loads (including lumped and static), motors, train, and route.

Buses may further include Voltage A, B, C magnitude (L-N/L-L/C-angle) and time. Track nodes may include Voltage A, B, C magnitude (L-N/L-L/C-angle) and time. Overhead lines may include MWa, MWb, MWc, Mvara, Mvarb, Mvarc, kVAa, kVAb, kVAc, AmpsA, AmpsB, AmpsC, Average Amps, Voltage Drop A, Voltage Drop B, Voltage Drop C, Branch Losses A, Branch Losses B, Branch Losses C, and time. Cables may include MWa, MWb, MWc, Mvara, Mvarb, Mvarc, kVAa, kVAb, kVAc, AmpsA, AmpsB, AmpsC, Average Amps, Voltage Drop A, Voltage Drop B, Voltage Drop C, Branch Losses A, Branch Losses B, Branch Losses C, and time. Transformers may include MWa, MWb, MWc, Mvara, Mvarb, Mvarc, kVAa, kVAb, kVAc, AmpsA, AmpsB, AmpsC, Average Amps, Voltage Drop A, Voltage Drop B, Voltage Drop C, Branch Losses A, Branch Losses B, Branch Losses C, and time. Impedance may include MWa, MWb, MWc, Mvara, Mvarb, Mvarc, kVAa, kVAb, kVAc, AmpsA, AmpsB, AmpsC, Average Amps, Voltage Drop A, Voltage Drop B, Voltage Drop C, Branch Losses A, Branch Losses B, Branch Losses C, and time. Reactor may include MWa, MWb, MWc, Mvara, Mvarb, Mvarc, kVAa, kVAb, kVAc, AmpsA, AmpsB, AmpsC, Average Amps, Voltage Drop A, Voltage Drop B, Voltage Drop C, Branch Losses A, Branch Losses B, Branch Losses C, and time. Auto transformer may include MWa, MWb, MWc, Mvara, Mvarb, Mvarc, kVAa, kVAb, kVAc, AmpsA, AmpsB, AmpsC, Average Amps, Voltage Drop A, Voltage Drop B, Voltage Drop C, Branch Losses A, Branch Losses B, Branch Losses C, and time. Booster transformer may include MWa, MWb, MWc, Mvara, Mvarb, Mvarc, kVAa, kVAb, kVAc, AmpsA, AmpsB, AmpsC, Average Amps, Voltage Drop A, Voltage Drop B, Voltage Drop C, Branch Losses A, Branch Losses B, Branch Losses C, and time. Syn. Generators may include Voltage A, B, C magnitude (L-N/L-L/C-angle), time, MWa, MWb, MWc, Mvara, Mvarb, Mvarc, kVAa, kVAb, kVAc, AmpsA, AmpsB, and AmpsC. Power grid may include Voltage A, B, C magnitude (L-N/L-L/C-angle), time, MWa, MWb, MWc, Mvara, Mvarb, Mvarc, kVAa, kVAb, kVAc, AmpsA, AmpsB, and AmpsC. Loads may include Voltage A, B, C magnitude (L-N/L-L/C-angle), time, MWa, MWb, MWc, Mvara, Mvarb, Mvarc, kVAa, kVAb, kVAc, AmpsA, AmpsB, and AmpsC. Motors may include Voltage A, B, C magnitude (L-N/L-L/C-angle), time, MWa, MWb, MWc, Mvara, Mvarb, Mvarc, kVAa, kVAb, kVAc, AmpsA, AmpsB, and AmpsC. Train/Trip may include may include Voltage A, B, C magnitude (L-N/L-L/C-angle), time, MWa, MWb, MWc, Mvara, Mvarb, Mvarc, kVAa, kVAb, kVAc, AmpsA, AmpsB, AmpsC, net acceleration in (m/s^2), acceleration force, curve resistance, grade resistance, rolling resistance (total resistance), tractive effort, speed (in km/hr), train count, and train occupancy. Route may include curve, elevation, distance and speed limit.

Turning to FIG. 37, an example embodiment of a study toolbar is shown with buttons and explanations including run analysis, train schedule editor, train configuration, train assign, route editor, track group editor, alert view, report manager, analysis plots, display options, unit toggle, power units, voltage units, line and cable voltage drop toggle, halt current calculation, get online data and get archived data.

Turning to FIG. 38, an example embodiment of a calculation progress bar is shown which may also include progress messages to inform a user of operation progress. This progress bar may be shown once a user selects a run analysis option from a study toolbar.

Turning to FIG. 39, an example embodiment of a traction power time slider is shown. In the example embodiment a slider may be expanded or shrunk by a user in order to change a playback time interval. Additionally a user may manipulate subfields including start time, simulation days, and stop time in a total simulation time field. Similarly a playback time field may include subfields including start time, simulation day and stop time. Also included are play, pause, stop, rewind/reset, fast forward, step rewind and step fast forward buttons for controlling playback. A menu list may be provided that expands to a list similar to transient stability.

Turning to FIG. 40A, an example embodiment of a train animation/dispatch animation is shown. This screen may be displayed when a play button is pressed in the traction power time slider screen shown in FIG. 39. In the example embodiment train operation animation may be shown in GIS view and OLV.

Turning to FIG. 40B, an example embodiment of a train animation selection menu with radio buttons is shown such that a user may select different train symbols for display in an animation in addition to three options for display although many more options may be available. Users may also be able to change playback rate which is the plot time step as defined in the study case. Resulting annotation and train location will align to the same step when this is selected. In an example embodiment a playback rate equation representation may be Playback rate=X*plot time step defined in the study case where a default is 0.50 seconds. Default is typically the calculation time step which is the plot time step. X is typically a factor and the playback rate is the result of multiplying X and the plot time. This can allow for faster playback or slower playback, as required by a user.

Turning to FIG. 40C, an example embodiment of logic related to Train Symbol 2 from FIG. 40B is shown. In the example embodiment a number of rectangles may equal the number of cars in a consist to be represented based on the train configuration. Colors of rectangles may be used to represent whether a fraction motor is present. For example, an orange rectangle may be used to represent a fraction motor presence while a blue rectangle may be used to represent no fraction motor presence. The length of shapes may be proportional to the total length of the train configuration as well. Trains can be made to scale in various embodiments and train names can be shown to identify trains in various embodiments.

Turning to FIGS. 40D-40E, an example embodiment of an animation diagram is shown. In the example embodiment, when an animation trigger is selected and a user selects a specific train, for instance by clicking it, the diagram may automatically be moved to the center of a display screen. When the diagram has moved such that the train is in the center of the screen, the diagram may move such that a calculated train location is always in the center of the screen. This will give a user the impression that the train is stationary while the rest of the map or OLV moves in relation to the train.

Turning to FIG. 41A, an example embodiment of an OLV Display Options edit toolbar is shown. In the example embodiment a display options-train window is shown which allows users to change AC, AC-DC, Train, and Colors options. In the example embodiment a group named fraction is displayed and a display options matrix as shown in FIG. 41B may be displayed.

Turning to FIG. 41B, an example of a display options matrix is shown. In the example embodiment an "X" may hold the place of a checkbox and allow users to turn display of the selected option on or off. In the example embodiment a blank spot or a "-" implies that no checkbox is required for the function. In the example embodiment station, platform, autotransformer and booster transformer have options for rating, kV, A, Phase, Z, and DB as shown. Track node, Track—OCS, Track—Rail have options for WH ID, kV, length, phase, Z, and DB as shown. Insulator with Isolator, section insulator, insulated overlap, and isolator switch have options for rating, kV, A, open, Z, and DB as shown. Speed limit, signal, level crossing, distance, elevation, and bend radius, have options for nearest station distance, elevation, value 1, value 2, status, and DB as shown. In speed limit, value 1 may be passenger speed while value 2 may be freight speed. In signal, value 1 may be number of lights, value 2 may be type, and status may be configuration status.

Turning to FIG. 41C, an example embodiment of a study toolbar as shown in OLV is shown. In the example embodiment a study toolbar in OLV may include a results page, an AC page, an AC-DC page, and a colors page which may each be the same as unbalanced load flow. A train page may be the same as an edit toolbar described above. Included are fields for SRS ID, field name, light/heavy/NA, display only, format, range, display format, and default English and metric units with subfields for value and unit.

Turning to FIG. 41D, an example embodiment of a Display Options—Traction Power window is shown. In the example embodiment a results page may include information such as a Voltage Unit (e.g. kV) selection, show units and check-all selection boxes, voltage field, power rows field, load term, Base kV field, voltage drop field, average/phases field, flow results field, branch losses field, and meters field. The voltage field may include check boxes for bus mag., bus angle and load term mag. and load term mag may have radio buttons for L-N and L-L. Power rows field may have drop down units and radio buttons for kW+jkvar, kVA, and Amp. Load term, base kV field may have radio buttons for load rated kV and Bus Nom. kV. Voltage drop field may have check boxes for Line/Cable, Train and Load FDR. Average/Phases field may have radio buttons for Average values, All phases and All sequences. Row results field may have check boxes for branch, source, load, composite motor and composite network. Branch losses field may have a check box for kW+jkvar. Meters field may have check boxes for Ammeter, Voltmeter and Multi-Meter.

If the check box for train in the Voltage drop field is checked then a power flow annotations for Train may be displayed based on a "power flow" selection. A field called train may also be added to a Results page as shown in FIG. 41E. Trip data may be displayed for each train based on selections in the train field on the Results page. The train field in the example embodiment shown in FIG. 41E includes radio buttons for route, train and resistance. Check boxes may include speed, location/distance, elevation, kWh, Tractive effort, net acceleration, acceleration, rolling and curve.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A computer implemented method for generating signals for optimizing power use in an electrically powered transportation system, comprising:

storing transportation system specific information, including geographic mapping information, mechanical information, and electrical information as first data in non-transitory computer readable memory;

monitoring and processing real-time data that is measured by at least one sensor, configured to measure at least one characteristic affecting power usage in the transportation system, using a processor that is coupled to the sensor to create second data, wherein physical vehicle movement in the transportation system creates dynamic electrical loads;

storing the second data in non-transitory computer readable memory;

selectively perform power distribution calculations that apply at least some of both the stored first and second data according to instructions stored in non-transitory computer readable memory using the processor, in order to generate at least one power signal;

selectively display the power signal to a user via a graphical user interface of the computer;

selectively store the power signal in non-transitory memory; and selectively transmit the power signal to a real-time traction power management application for optimizing power use affecting the transportation system.

2. The computer implemented method for generating signals for optimizing power use in an electrically powered transportation system of claim 1, wherein selectively displaying the power signal via a graphical user interface of the computer includes displaying a dynamic power signal screen.

3. The computer implemented method for generating signals for optimizing power use in an electrically powered transportation system of claim 1, wherein mechanical information of the transportation system specific information further comprises rolling stock information.

4. The computer implemented method for generating signals for optimizing power use in an electrically powered transportation system of claim 1, wherein electrical information of the transportation system specific information further comprises power cable information.

5. The computer implemented method for generating signals for optimizing power use in an electrically powered transportation system of claim 1, wherein geographic mapping information of the transportation system specific information further comprises both natural and artificial details.

6. The computer implemented method for generating signals for optimizing power use in an electrically powered transportation system of claim 1, wherein selectively storing the power signal in non-transitory memory further comprises selectively storing the power signal with an event specific identifier based on load conditions in the transportation system.

7. The computer implemented method for generating signals for optimizing power use in an electrically powered transportation system of claim 1, wherein a display of the graphical user interface can be selectively changed between a geospatial view to a one-line view.

8. The computer implemented method for generating signals for optimizing power use in an electrically powered transportation system of claim 1, further comprising accessing a third party server via a communications network and downloading transportation system specific information before storing transportation system specific information as first data in non-transitory computer readable memory.

9. The computer implemented method for generating signals for optimizing power use in an electrically powered transportation system of claim 1, wherein storing transportation system specific information as first data in non-transitory computer readable memory further comprises storing user-inputted transportation system specific information in non-transitory computer readable memory.

* * * * *